United States Patent [19]

Wilks et al.

[11] 4,448,680

[45] May 15, 1984

[54] APPARATUS AND METHOD FOR CLASSIFYING FUEL PELLETS FOR NUCLEAR REACTOR

[75] Inventors: Robert S. Wilks, Plum Borough; Eliezer Sternheim, Pittsburgh; Gerald A. Breakey, Penn Township, Allegheny County; Robert H. Sturges, Jr., Plum Borough; Alexander Taleff, Churchill Borough; Raymond P. Castner, Monroeville, all of Pa.

[73] Assignee: The United States of America as represented by the United States Department of Energy, Washington, D.C.

[21] Appl. No.: 171,606

[22] Filed: Jul. 22, 1980

[51] Int. Cl.³ .................... B07C 1/10; B07C 5/16; B07C 5/344
[52] U.S. Cl. .................... 209/564; 209/579; 209/587; 250/223 R; 358/106; 356/72; 356/237; 356/385; 356/426; 364/507
[58] Field of Search ............... 209/563, 564, 576, 577, 209/579, 587; 250/223 R, 560, 562, 563, 572; 356/72, 237, 383–387, 426; 364/507, 522; 358/106

[56] References Cited

U.S. PATENT DOCUMENTS

| | | | |
|---|---|---|---|
| 3,221,152 | 11/1965 | Jones | 364/552 |
| 3,513,321 | 5/1970 | Sherman | 356/386 X |
| 3,806,253 | 4/1974 | Denton | 250/560 X |
| 3,880,750 | 4/1975 | Butler et al. | 209/526 |
| 3,967,114 | 6/1976 | Cornillault | 250/572 X |
| 4,117,935 | 10/1978 | Richardson et al. | 209/586 |
| 4,120,403 | 10/1978 | Stephanos | 209/586 X |
| 4,143,770 | 3/1979 | Grimmell et al. | 209/587 X |
| 4,162,126 | 7/1979 | Nakagawa et al. | 356/237 |
| 4,166,029 | 8/1979 | Rhotert | 209/586 X |
| 4,166,541 | 9/1979 | Smith | 209/587 |
| 4,219,277 | 8/1980 | Yaroshuk et al. | 356/237 X |

FOREIGN PATENT DOCUMENTS

| | | |
|---|---|---|
| 1239962 | 7/1971 | United Kingdom . |
| 1328161 | 8/1973 | United Kingdom . |
| 1461536 | 1/1977 | United Kingdom . |
| 1516881 | 7/1978 | United Kingdom . |

Primary Examiner—David A. Scherbel
Attorney, Agent, or Firm—Daniel C. Abeles

[57] ABSTRACT

Control for the operation of a mechanical handling and gauging system for nuclear fuel pellets. The pellets are inspected for diameters, lengths, surface flaws and weights in successive stations. The control includes, a computer for commanding the operation of the system and its electronics and for storing and processing the complex data derived at the required high rate. In measuring the diameter, the computer enables the measurement of a calibration pellet, stores that calibration data and computes and stores diameter-correction factors and their addresses along a pellet. To each diameter measurement a correction factor is applied at the appropriate address.

The computer commands verification that all critical parts of the system and control are set for inspection and that each pellet is positioned for inspection. During each cycle of inspection, the measurement operation proceeds normally irrespective of whether or not a pellet is present in each station. If a pellet is not positioned in a station, a measurement is recorded, but the recorded measurement indicates maloperation.

In measuring diameter and length a light pattern including successive shadows of slices transverse for diameter or longitudinal for length are projected on a photodiode array. The light pattern is scanned electronically by a train of pulses. The pulses are counted during the scan of the lighted diodes. For evaluation of diameter the maximum diameter count and the number of slices for which the diameter exceeds a predetermined minimum is determined. For acceptance, the maximum must be less than a maximum level and the minimum must exceed a set number. For evaluation of length, the maximum length is determined. For acceptance, the length must be within maximum and minimum limits.

35 Claims, 93 Drawing Figures

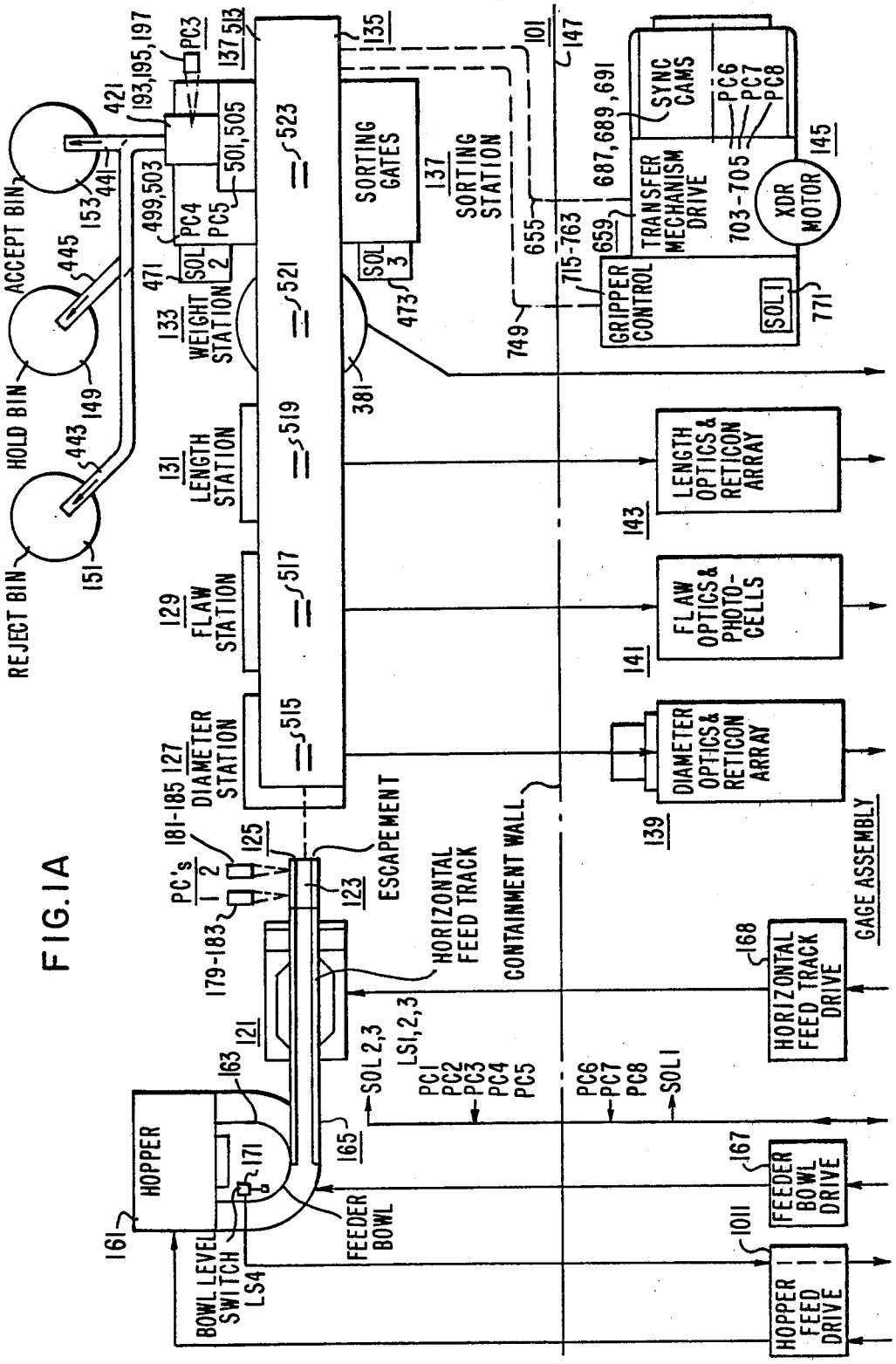

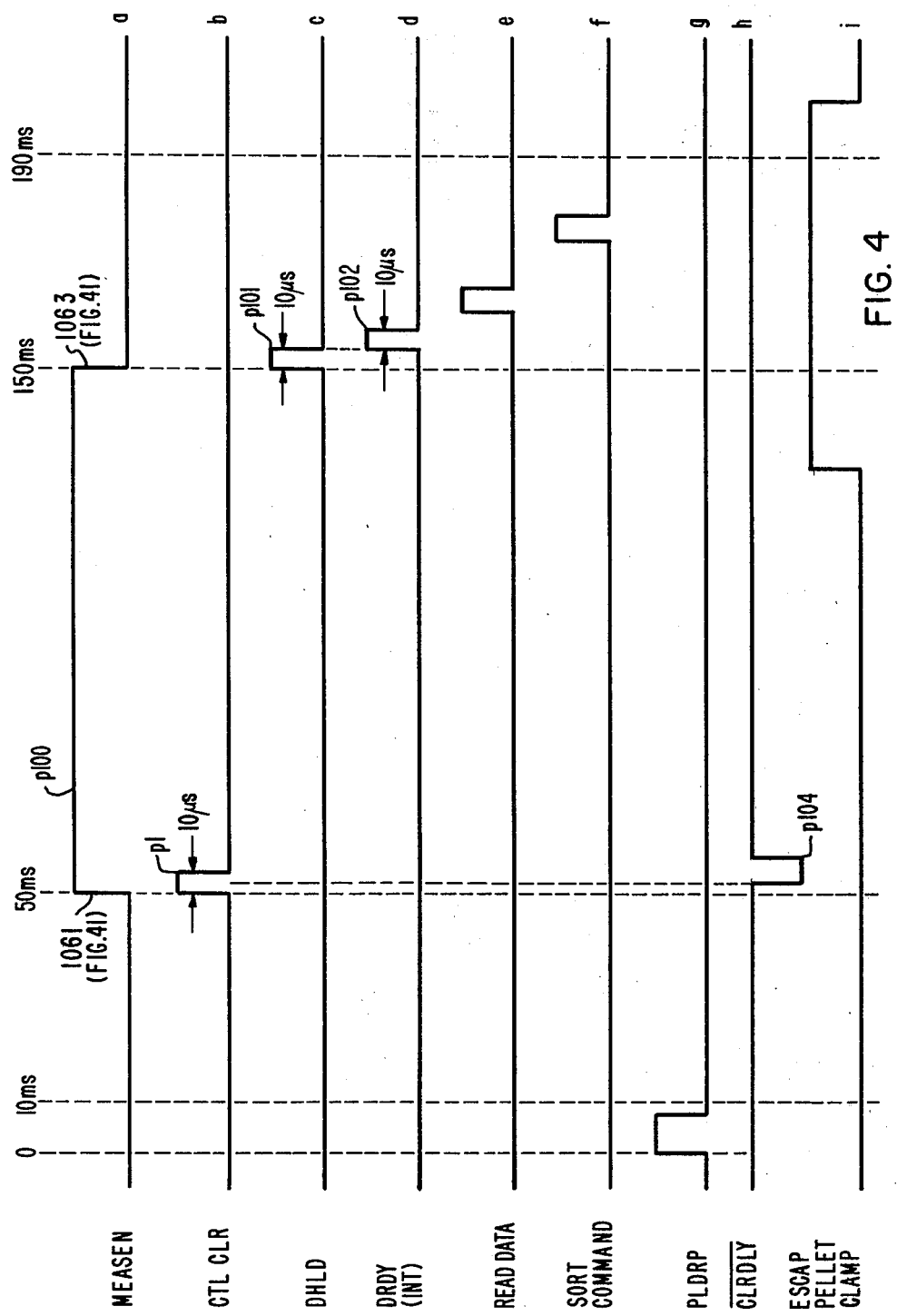

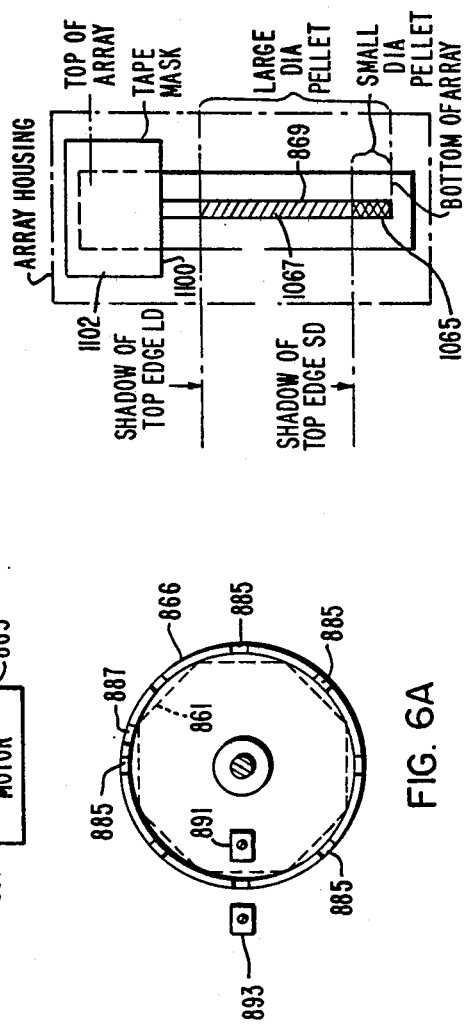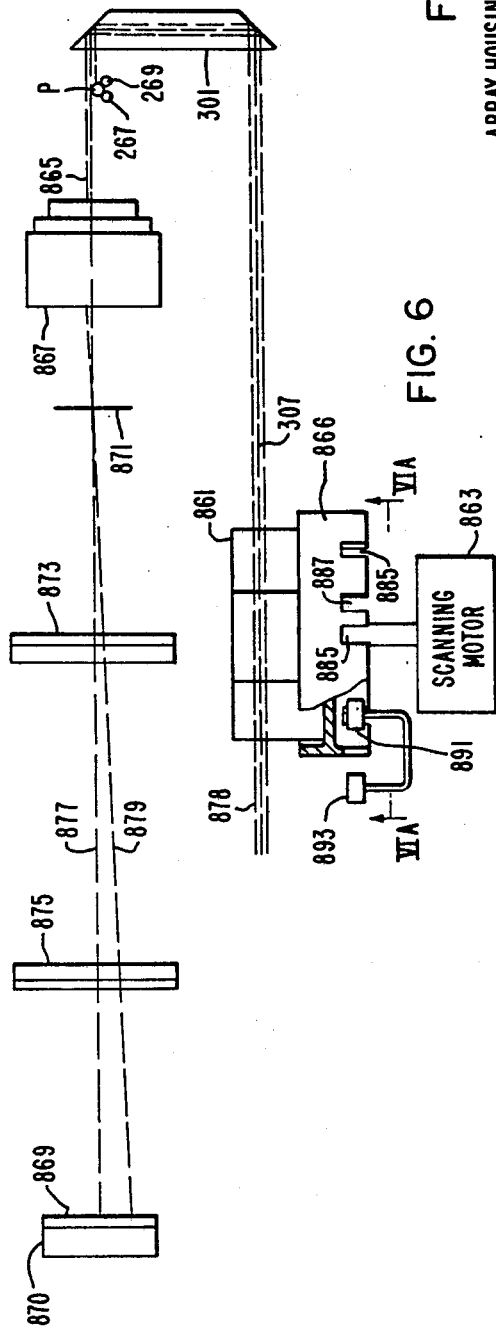

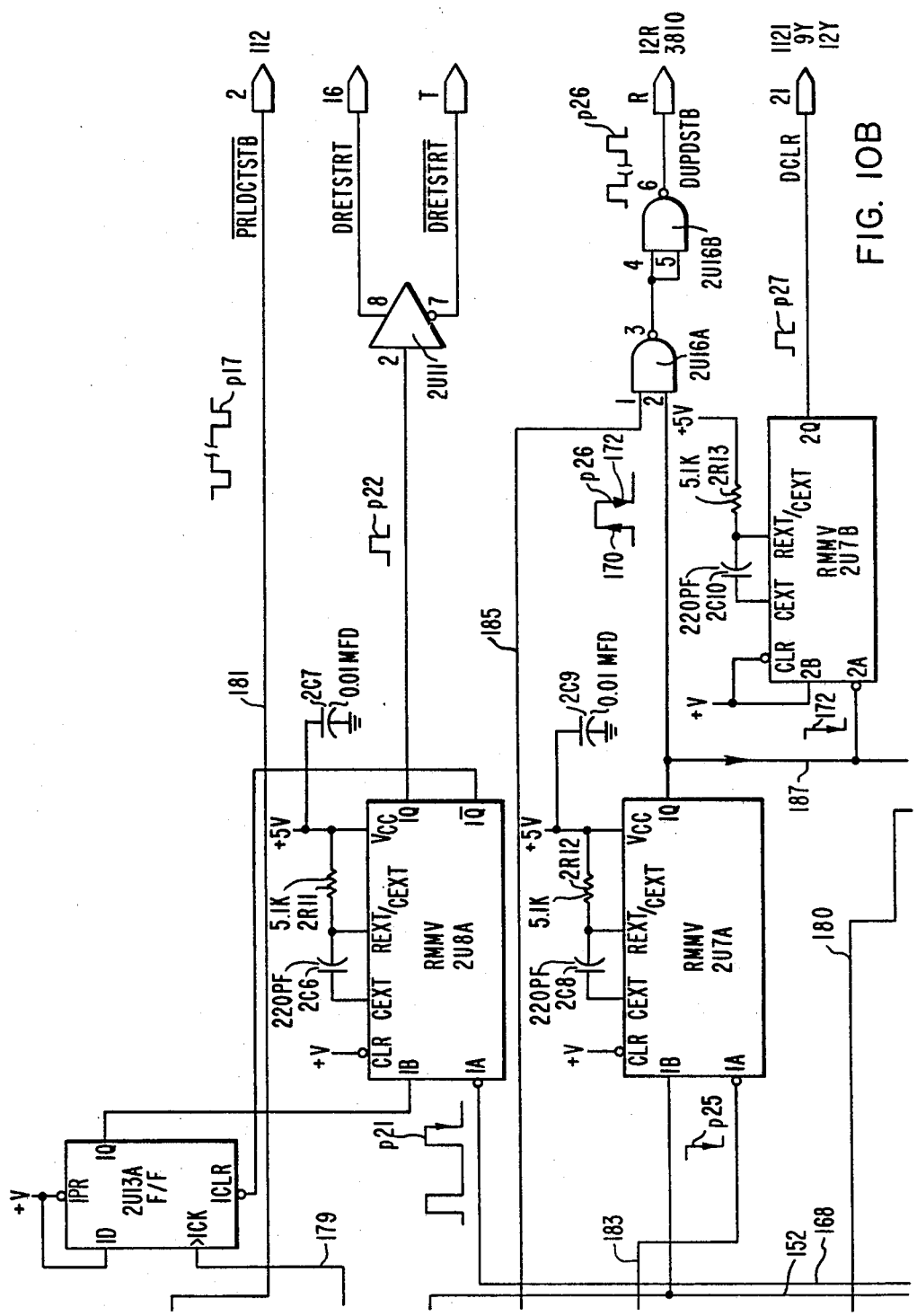
FIG. IOB

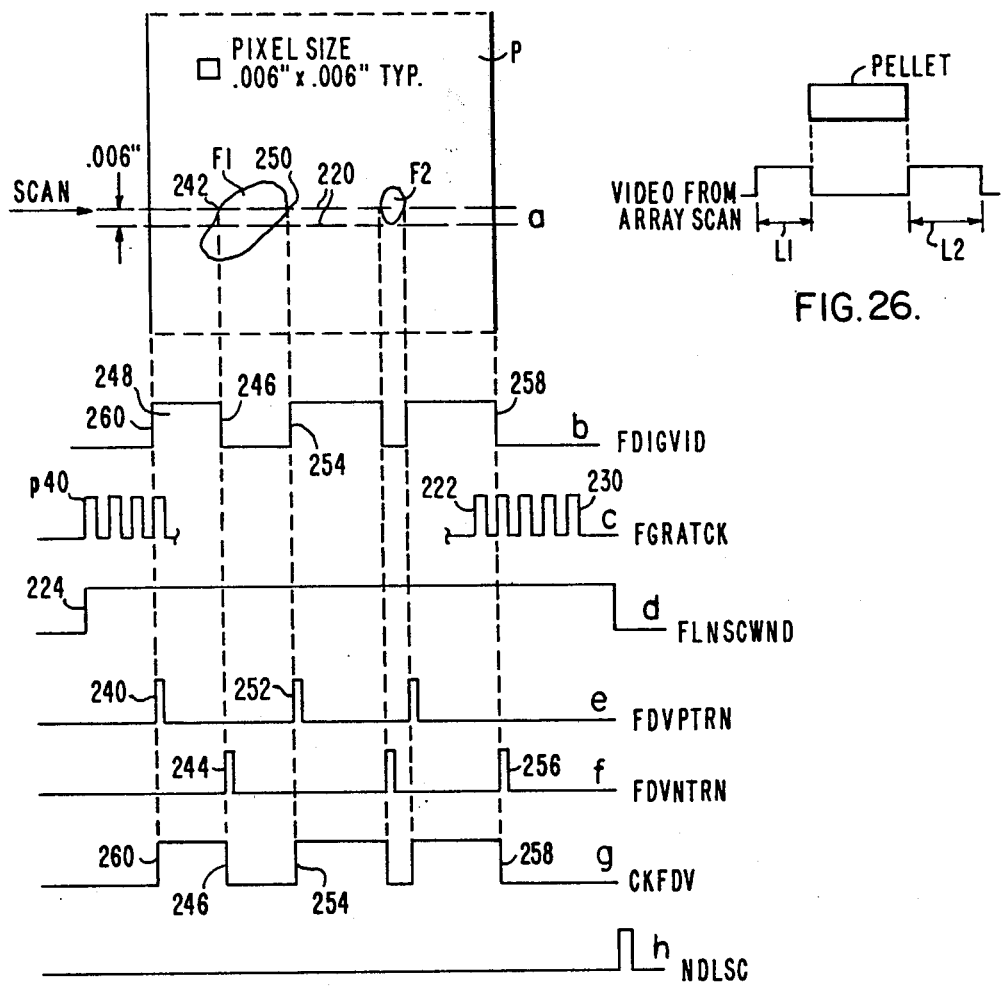
FIG.26.
FIG.31.
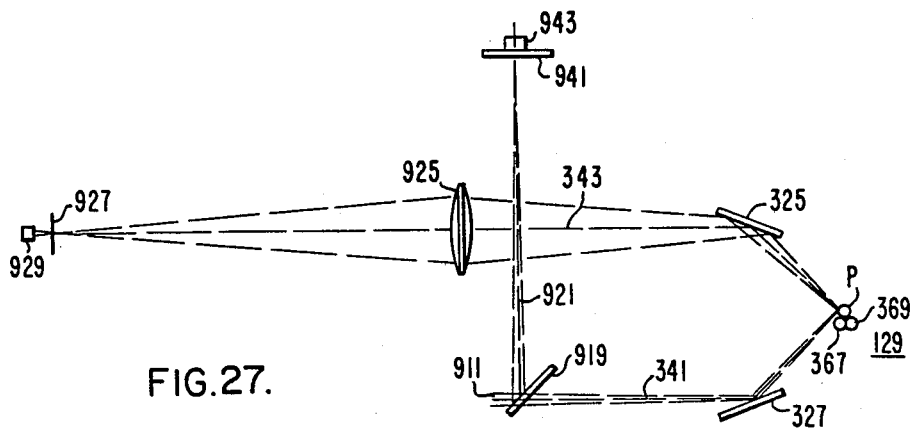
FIG.27.

| | | | | |
|---|---|---|---|---|
| 412 | 12B | 23B | 34B | 2 ⇨ DW0 |
| 413 | 12C | 23C | 34C | 3 ⇨ DW1 |
| 414 | 12D | 23D | 34D | 4 ⇨ DW2 |
| 415 | 12E | 23E | 34E | 5 ⇨ DW3 |
| 416 | 12F | 23F | 34F | 6 ⇨ DW4 |
| 417 | 12H | 23H | 34H | 7 ⇨ DW5 |
| 418 | 12J | 23J | 34J | 8 ⇨ DW6 |
| 419 | 12K | 23K | 34K | 9 ⇨ DW7 |
| 4110 | 12L | 23L | 34L | 10 ⇨ DW8 |
| 4111 | 12M | 23M | 34M | 11 ⇨ DW9 |
| 4112 | 12N | | 34N | 12 ⇨ DW10 |
| 4113 | 12P | | 34P | 13 ⇨ DW11 |
| 4114 | 12R | | 34R | 14 ⇨ DW12 |
| 4115 | 12S | | 34S | 15 ⇨ DW13 |
| 4116 | 12T | | 34T | 16 ⇨ DW14 |
| 4117 | 12U | | 34U | 17 ⇨ DW15 |
| | | | 29B | B ⇨ DWFL0 |
| | | | 29C | C ⇨ DWFL1 |
| | | | 29D | D ⇨ DWFL2 |
| | | | 29E | E ⇨ DWFL3 |
| | | | 29F | F ⇨ DWFL4 |
| | | | 29H | H ⇨ DWFL5 |
| | | | 29J | J ⇨ DWFL6 |
| | | | 29K | K ⇨ DWFL7 |
| | | | 29L | L ⇨ DWFL8 |
| | | | 29M | M ⇨ DWFL9 |
| | | | 29N | N ⇨ DWFL10 |
| | | | 29P | P ⇨ DWFL11 |
| | | | 29R | R ⇨ DWFL12 |
| | | | 29S | S ⇨ DWFL13 |
| | | | 29T | T ⇨ DWFL14 |
| | | | 29U | U ⇨ DWFL15 |

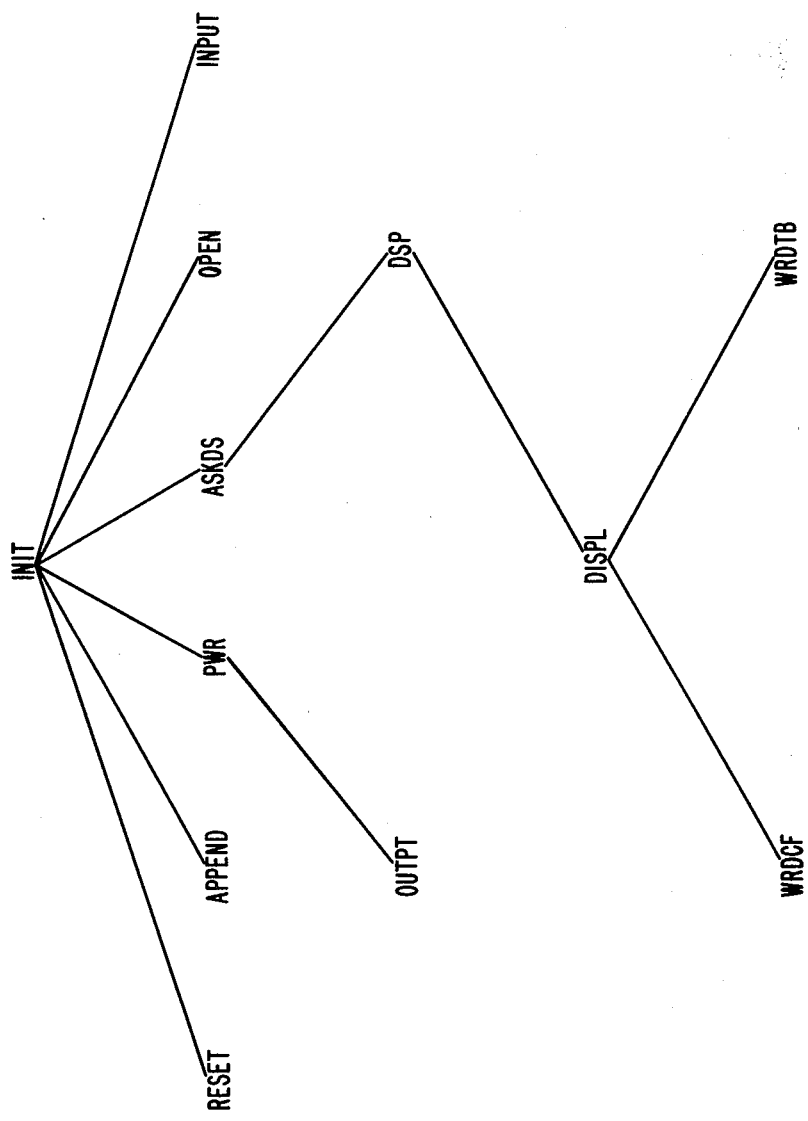

APPARATUS AND METHOD FOR CLASSIFYING FUEL PELLETS FOR NUCLEAR REACTOR

GOVERNMENT CONTRACT

The invention herein described was made in the course of a contract, or subcontract thereunder, with the Department of Energy bearing No. EY-67-14-C-2170.

CROSS-REFERENCE TO RELATED APPLICATION

This application relates to and incorporates by reference application Ser. No. 136,122, filed Mar. 31, 1980, to Robert S. Wilks, Robert H. Sturges and Alexander Taleff for "PELLET INSPECTION APPARATUS" and assigned to Westinghouse Electric Corporation (herein called Wilks application).

BACKGROUND OF THE INVENTION

This invention relates to the control and electronics art and has particular relationship to the art of controlling the inspection and sorting or classification of articles. A mechanical handling and gauging system to which this invention is applicable is disclosed in Wilks application. This system is conceived for the sorting or classification of fuel pellets for a nuclear reactor. The pellets are inspected in this system for diameter, length, surface flaws and density. The mechanical system includes an array of stations in which each pellet is successively subjected to measurement of one of the parameters. The inspection for diameter and flaws is carried out by sweeping or scanning each pellet lengthwise with a light beam as the pellet rotates. The light beam is shaped to accommodate the measurement. The light beam for diameter measurement is in the form of a vertical ribbon which envelops the pellet transversely producing shadows of elemental transverse slices on a photo-diode array on which the beam, as modified by the pellet, is incident. The light beam for flaw measurement produces a spot on the surface of the pellet lighting elemental areas from which light is reflected to a photo-diode if the surface is unflawed and away from the photo-diode if the surface is flawed. For length inspection a chisel-shaped beam (a flat beam in a horizontal plane) is projected across the length of the pellet as the pellet rotates. Shadows of elemental longitudinal slices of the beam are produced on a photo-diode array on which the beam is incident. To inspect for density, the weight of each pellet is measured and divided by the length. The pellets are moved from station to station by grippers carried by a gripper beam.

The system is capable of carrying out the inspection at a high time rate. Typically 3 pellets per second are inspected for diameter, flaws and length. For weight a pellet is inspected at the rate of 1 every two seconds or more generally 1 every N seconds. In practice all pellets are inspected at the rate of 3 per second for diameter, flaws and length and one pellet in 6 is inspected for mass every two or N seconds. The longer period for weight is required to enable the scale to stop oscillating after it receives the pellet.

In use the pellets are stacked in tubes or cladding of zircaloy or stainless steel to form fuel elements. For effective heating of the coolant and to avoid hot spots it is desirable that the pellet diameter should be maintained within close tolerances so that there is a minimum of annular space between the pellets and the inner wall of the cladding. Typically the diameter of a pellet is 0.1945±0.002 inch. The length is likewise maintained within close tolerances. Typically the length of a pellet is 0.2425±0.020 inch. The weight determines the density and should be maintained within limits to avoid localized heating or cooling. The weight is typically 1 gram±5 milligrams.

It is an object of this invention to provide a control for a mechanical handling and gauging system, typically as disclosed in Wilks application, under whose governance the mechanical system shall operate reliably to inspect fuel pellets at a high time rate and to classify pellets with the dimension criteria within the above-stated close tolerances.

Typically plutonium pellets are inspected. Because of the hazards which plutonium presents, it is desirable that all pellets under inspection be accounted for. It is another object of the invention to provide a control for a mechanical system which shall assure that the above parameters are measured while the pellets move with 100% accountability through the system from a feed hopper to sorting bins i.e., the control must assure that the number of pellets deposited in the bins must equal the number of pellets which enter the array of inspection stations.

It is a further object of the invention to provide a control for a mechanical handling and gauging system for fuel pellets which shall reliably assure, prior to each cycle of inspection, that the system is fully set for inspection and that the pellets to be subject to mesurement and weighing are in their stations properly positioned to be measured or weighed. It is also an object of this invention to provide such a control with facilities for enabling the measurement of the diameter and the length of each pellet precisely.

SUMMARY OF THE INVENTION

The control according to this invention is comprehensive apparatus including a computer system and electronics in the form of a plurality of control components external to the computer. To distinguish the overall comprehensive control from the external control components, the aggregate of control components will herein be called electronics or electronic apparatus. The control system cooperates with the mechanical handling system to enable its various operating components to carry out their functions in the proper sequence. It receives timing and verifying signals from photo-sensors of the mechanical systems and times and controls the operation of the mechanical system in accordance with these signals. The control system also acquires from the mechanical system and, to an extent, processes the measurement data produced in the mechanical system. The computer system governs the operations and the cooperation of the mechanical system and the electronics. It assures that these operations are carried out in the proper sequence. At the beginning of each inspection cycle, the computer commands, and participates in verification that, the mechanical system and electronics are set for operation as to all critical functions and that the pellets, in the stations involved, are in position to be measured or weighed. The computer system receives the data from the electronics, carries out computations on this data, and as necessary, stores this data or returns it to the control system for further processing. The computer system coacts directly with the electronics and the electronics coacts directly with the mechanical system. The control by the computer of the mechanical system is indirectly through the electronics. Because of the speed with which the computer operates, its governance of the electronics and mechanical system enables the inspection and sorting to be carried out at the high time rate at which the mechanical system performs these functions. As a practical matter inspection and sorting at a high time rate is indispensible because of the high number of pellets required for a typical reactor. A test reactor having an output of 400 megawatts thermal energy requires 2,357,000 pellets and a 1200-megawatt thermal-energy commercial reactor requires 10,000,000 pellets.

In addition to the features described above, this invention comprehends within its scope unique features of the control and its unique cooperation with the mechanical handling and gauging system. Among these are the verification that the pellets are properly positioned in the stations for inspection by carrying out a normal measurement operation and relying on the presence or absence of an anticipated response from a pellet if it is present at an advanced point in the operation. Another feature is the measurement of diameter or length of a pellet by projecting a light pattern including an appropriate shadow of the pellet on a photo-diode array in each position of a scan of the pellet and electronically scanning the diode array for each scan position with pulses, and counting the pulses in the lighted (or shadowed) part of the array. A further feature is the application of a correcting factor to the diameter measurement at each scan address to correct for optical aberration and possible eccentricity of the mechanical scanning mechanism.

BRIEF DESCRIPTION OF THE DRAWINGS

For a better understanding of this invention, both as to its organization and as to its method of operation, together with additional objects and advantages thereof, and for a more detailed description of the above features of the invention and additional features not mentioned above, reference is made to the following description, taken in connection with the accompanying drawings in which:

FIGS. 1A and 1B together are a block diagram of this invention showing the principal components of the mechanical system which derive the overall data and carry out the control the also the control paths and the signal paths involved in the practice of this invention;

FIG. 4 is a graph showing the enable and command pulses produced during each inspection cycle which in addition synchronize the operations during the cycle;

FIG. 6 is a fragmental diagrammatic view showing the optical system for measuring the diameters of the pellets;

FIG. 6A is a fragmental view in section taken along line VIA—VIA of FIG. 6;

FIG. 7 is a diagrammatic view showing the light pattern which appears on the photo-diode array during the measurement of the diameter of a pellet at each scan position;

FIGS. 10A, 10B, 10C, 10D together are the logic schematic for the diameter scan count and the diameter correction factor (DCF herein);

FIG. 26 is a diagrammatic view showing how data is derived from the scanning of a pellet during length measurement; FIG. 27 is a fragmental diagrammatic view showing the optical system for measuring the areas and perimeters of flaws in the surface of a pellet;

FIG. 31 is a graph illustrating the timing and operation in the detection of surface flaws;

FIGS. 56 through 60 show the tree structures for the subroutines of the computer program.

The composite figures such as FIGS. 12A, 12B, 12C, 12D are sometimes referred to herein only by their numbers. For example, FIGS. 12A, 12B, 12C, 12B are referred to as "FIG. 12".

DESCRIPTION OF THE PREFERRED EMBODIMENT

Figure 1B:
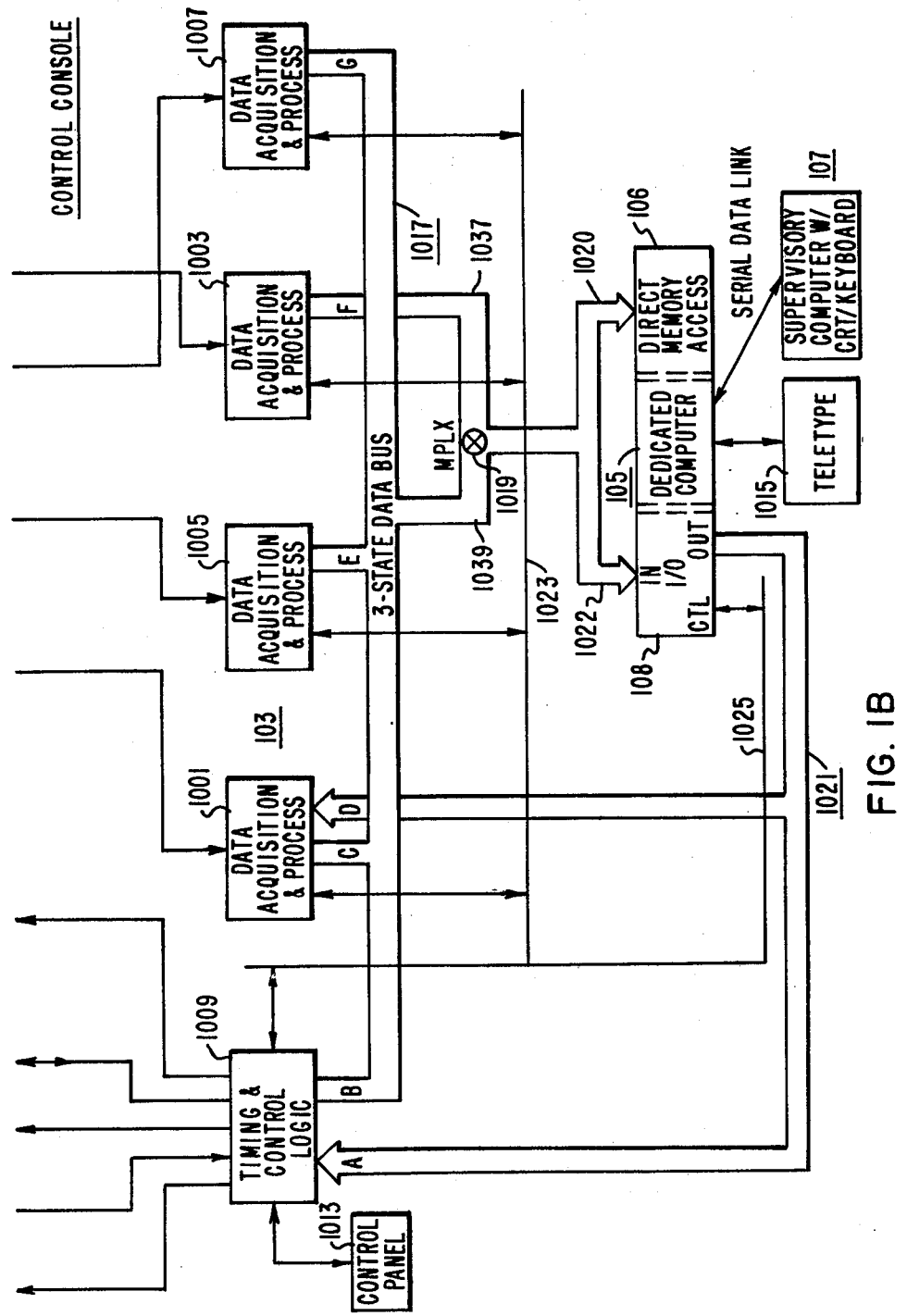

At the outset it appears desirable to describe the meaning of the terms and symbols used in this application. The control system includes logic elements, NAND's, OR's, exclusive OR's, NOR's, AND's and the like. In addition there are circuit components such as flip-flops, retriggerable monostable multivibrators, registers, buffers, counters, adders, memories, multiplexers, latches and the like. The adders, registers, buffers, multiplexers and memories have individual component elements which are sometimes referred to as "blocks". The above components are referred to as having "inputs" and "outputs". The connections between the units of the apparatus shown in the logic schematics are referred to as "input terminals" and "output terminals". The control signals which are impressed on the inputs of these components are voltages sometimes referred to in the art as "low" or "high" or "lo" or "hi". A "low" signal conventionally has a magnitude of 0 to 0.8 volts, a "high" signal has a magnitude of 2.4 to 5.25 volts. In this application a "low" signal is referred to as 0 and the high signal as 1.

The variations between 1 and 0 which serve control purposes take several forms. These include a change in level from 1 to 0 or from 0 to 1, square wave oscillations and individual pulses or pulse trains. Square wave oscillations are characterized by periodic variations between 1 and 0 for which the duration of the 0's and 1's are substantially equal. A pulse train is characterized by a series of 0 or 1 pulses separated by 1 or 0 pulses of longer duration. A triangle at the clock (CK) input of a component signifies that the component is clocked by the positive-going leg of a pulse. For a positive-going pulse the component is clocked by the leading edge of the pulse and for a negative-going pulse the component is clocked by the trailing edge. Proper sequencing of functions is achieved by clocking a leading function with a positive pulse and a following function with a negative pulse.

Terminal symbols on the logic schematics having the form of boats or pins or stakes represent interconnection terminals between circuit boards of the electronics. The sharp tip of the boat or pin points in the direction, in or out, in which the signal impressed on the pin flows. Diamond-shaped terminal symbols represent terminals on the circuit boards of the electronics which are connected to the computer and receive signals and data from the computer or send signals and data to the computer. Functionally these signals pass through an input-output (IO) interface board and a direct memory access (DMA) interface which are structurally part of the computer. Symbols having the form of circles represent the input and output terminals from the IO and DMA boards to the circuit boards of the control system.

Symbols having the shape of small squares represent terminals which interconnect the IO and DMA interface boards and the computer proper. Angles connected to the ends of conductors whose openings extend away from the conductors represent sockets; angles whose openings face towards the conductor represent plugs which engage in the sockets.

In each of the figures presenting logic schematics, the output terminal of another figure to which each input terminal is connected and the input terminal of another figure to which each output terminal is connected are indicated adjacent the end of the terminals. The indication includes a one or two digit number identifying the other figure followed by a number or letter identifying the remote output or input terminal. For example, the indication "9L" to the left of input terminal L of FIG. 10 indicates that input terminal L is connected to output terminal of FIG. 9; the indication 1118 to the right of output terminal 18 in FIG. 10 indicates that output terminal 18 of FIG. 10 is connected to input terminal 18 of FIG. 11.

An overall description of the control to which this application is directed with reference to the drawings is now in order. In the drawings the parts and components which are common to this application and the Wilks application bear the same number labels as in the Wilks application. The control described in this application synchronizes the start of the individual measurements of the pellets with the mechanical system. The mechanical handling system moves pellets P from a feed hopper 161 (FIG. 1A) through the bowl 163 and horizontal feeders 165 to an escapement 125. The pellets are picked from the escapement by gripper fingers 515-523 attached to a reciprocating beam 513 and cyclically are moved sequentially through the diameter, surface-flaw, length, and weight stations 127-133. At each of the first three stations 127-131, the pellet resides in a measurement window for a time interval determined by the cycle rate of the mechanical handling system. The measurement window is related to the optical system and scanning laser beams. At the weight station 133, the pellet rests on an electromagnetic force-counter-balancing weight sensor. After leaving the weight station 133, the pellet is dropped into a sorting mechanism 137 that allows the pellet to drop into a REJECT bin 151 or deflects it into either an ACCEPT or a HOLD bin 153 or 149 by rotary solenoid actuated vanes (described in Wilks application).

Figure 29A:
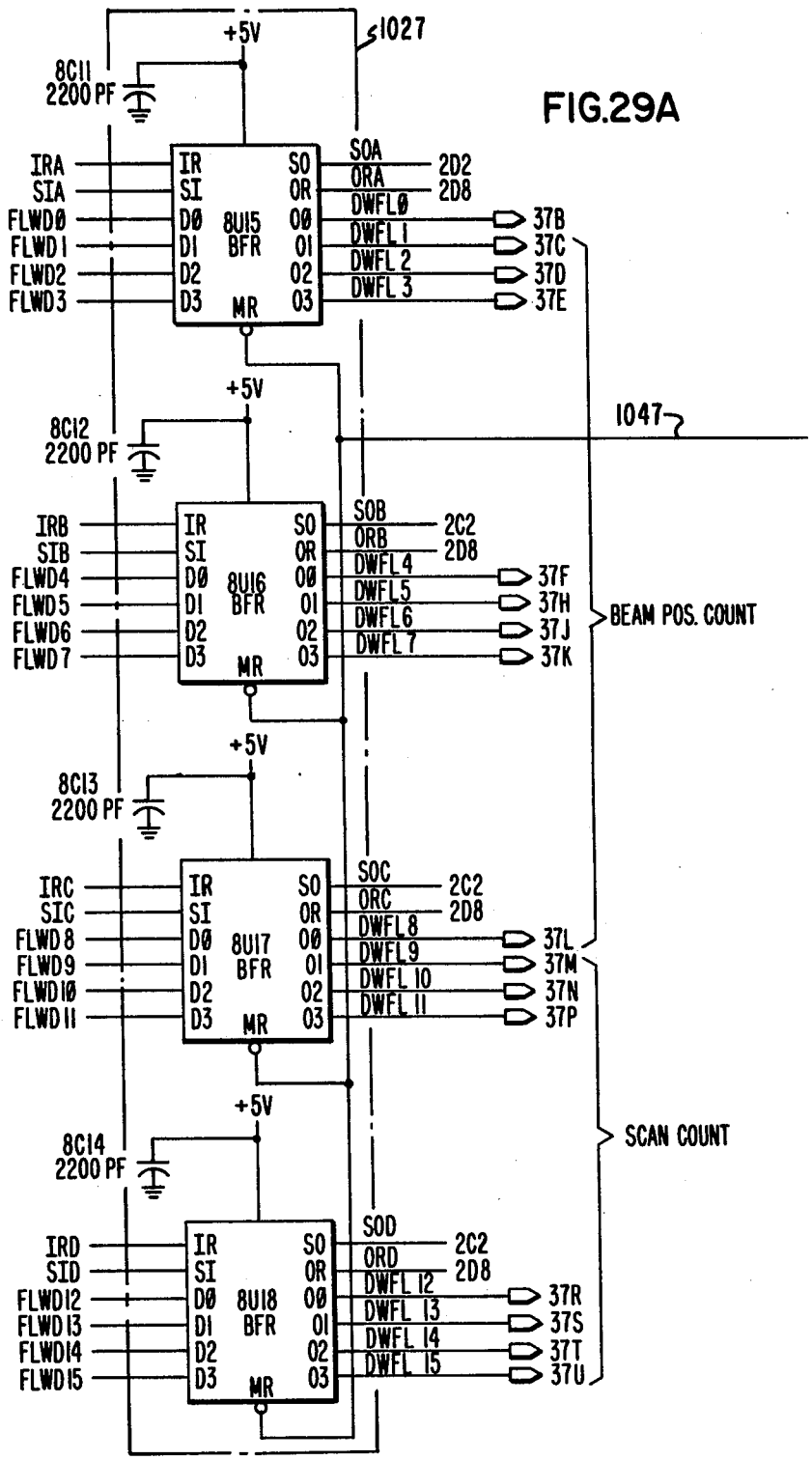
FIGS. 29A, 29B, 29C together are the logic schematic showing the FIFO buffer and its operation.
Figure 29B:
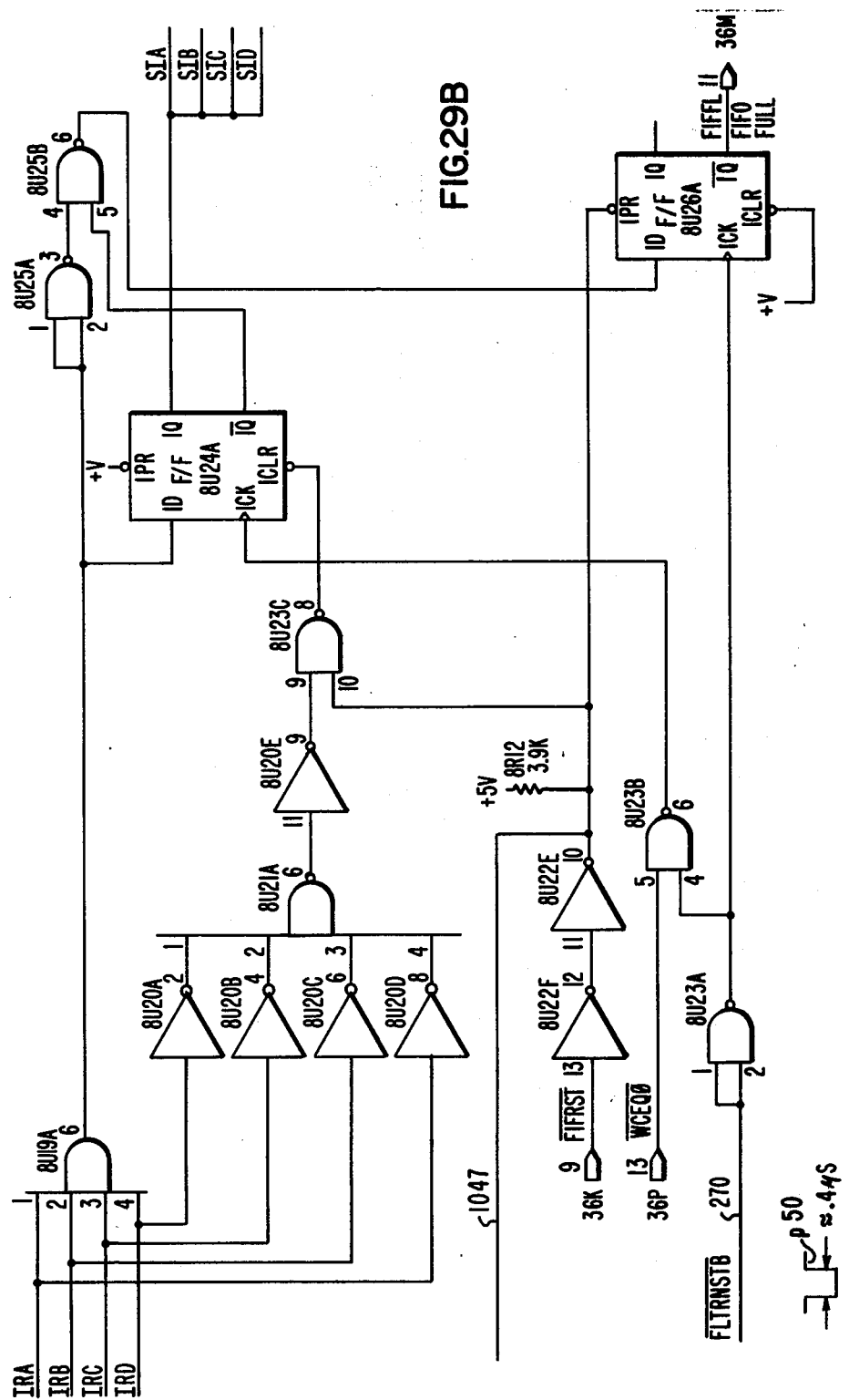
Figure 29C:
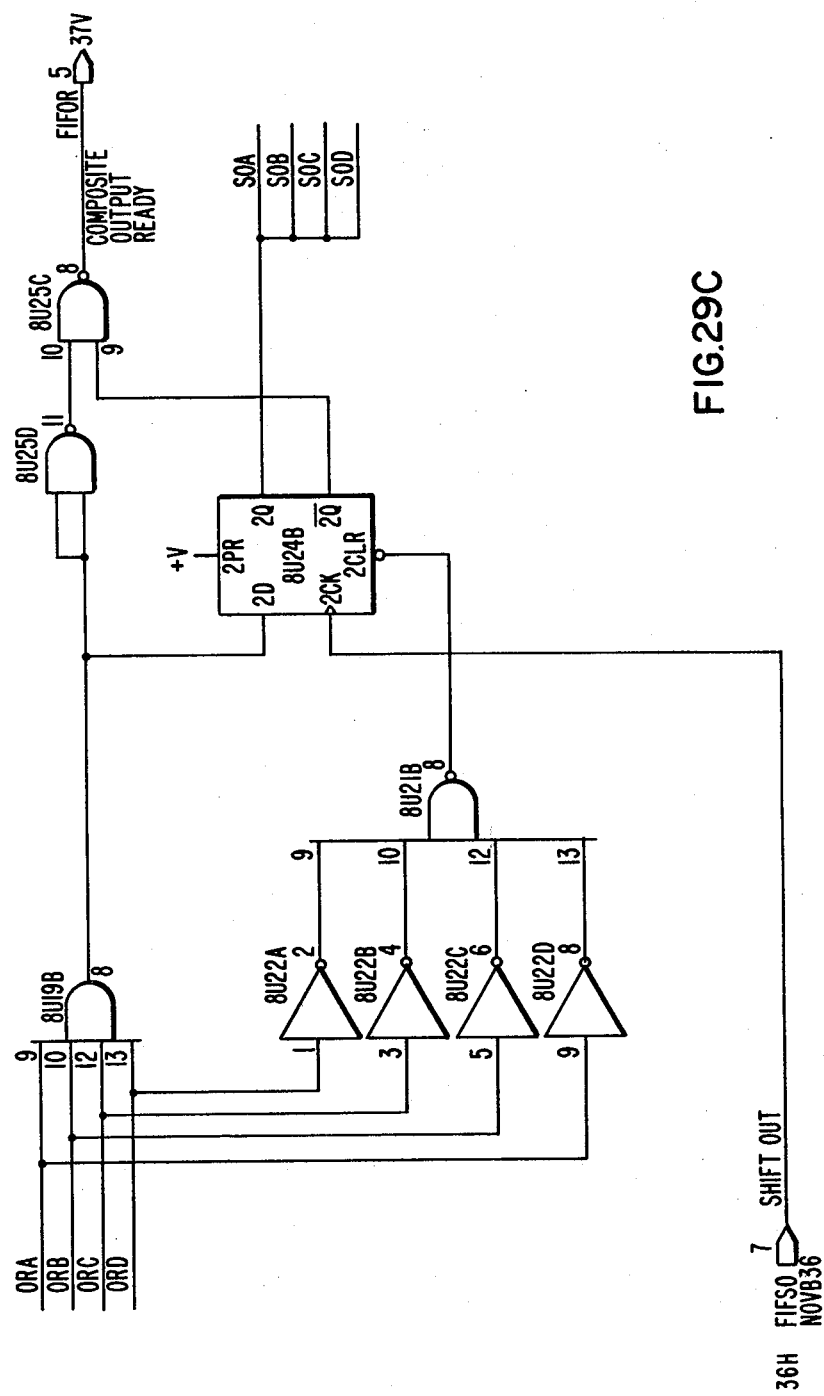

Synchronism of the state of measurement to the time interval during which conditions exist for valid data is dependent upon a photo-sensor PC6 that is responsive to an adjustable-sector light-beam interrupter cam attached to the shaft of the transfer-mechanism drive 145. (See FIG. 3 for the timing of the handling cycle.) FIG. 4 shows the resulting synchronization timing signals. The cam photo-sensor produces the MEASEN, measurement enable, signal which is used to produce the CTL CLR, control clear, signal that initializes the individual measurement subsystems and the DHLD, data hold signal, that latches or strobes the measurement data into their respective storage registers. The DHLD signal triggers the DRDY, data ready signal, that signals the computer that a measurement cycle is complete and data is available for acquisition. The computer 105 responds with a sequence of address and enable signals to read data from the 3-state registers of the diameter, length and weight stations 127-131. Because of the large volume of surface flaw data, it is necessary to use a DMA, direct-memory access, input to the computer and take flaw data during the measurement interval. A FIFO, first in-first out buffer, 8U15-8U18 (FIG. 29) is used to store bursts of data and then pass it to the DMA at a computer-determined rate.

Figure 2:
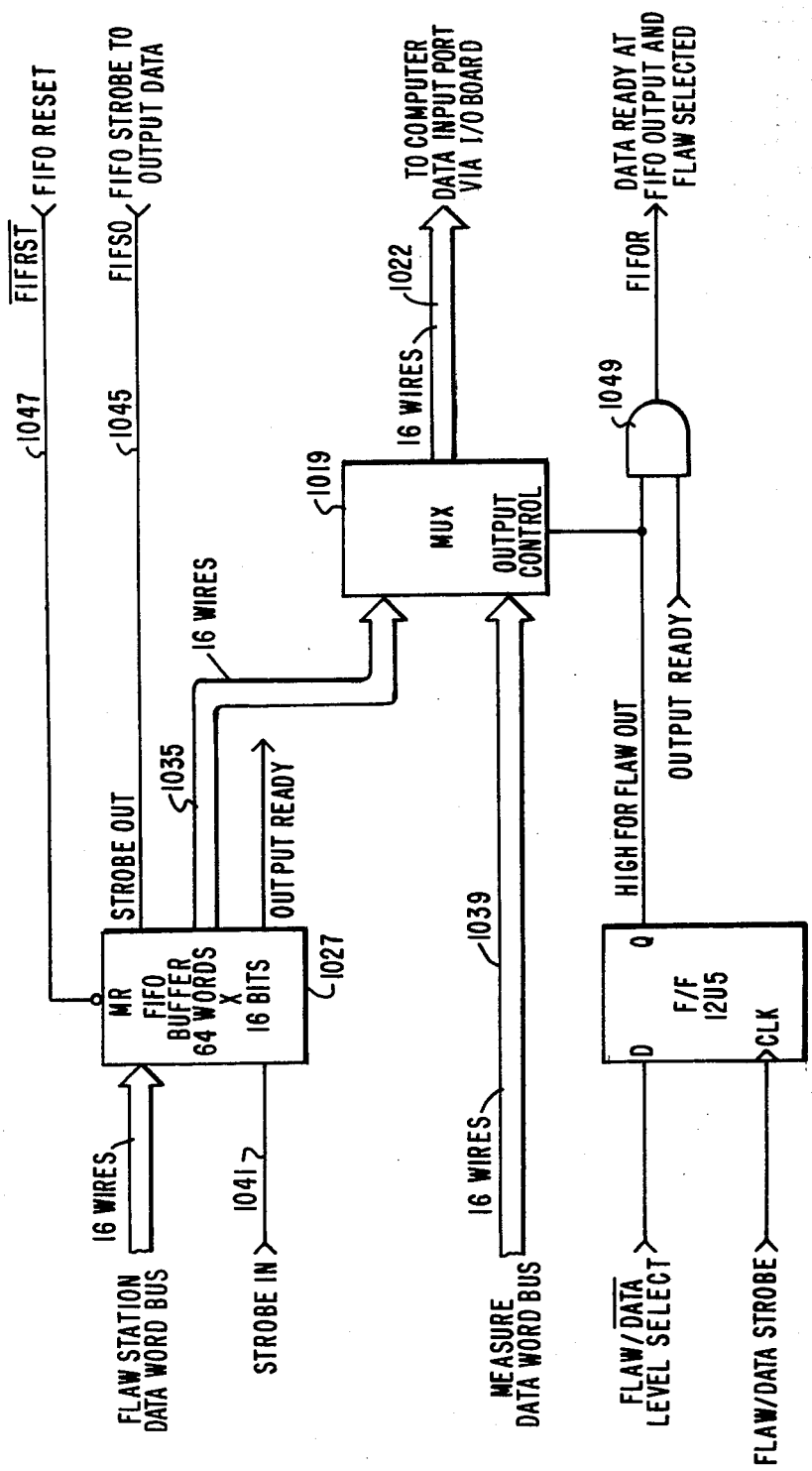
FIG. 2 is a block diagram, supplemental to FIG. 1, showing the handling of the flaw data and the multiplexing of all data.

The overall data and control signal paths are shown in FIG. 1. The flaw and other data words multiplexing are shown in FIG. 2.

A diagram of the optics used, in measurement of the diameter of the pellets P, to produce a shadow image of the top of the pellet P on a Reticon linear diode array 869 is shown in FIG. 6 Lenses (855 and 857 Wilks application) serve to form a collimated vertical ribbon-like beam of light 307 which is scanned across one side profile of the pellet by the rotating prism 861. Lenses 873 and 875 focus that portion of the ribbon-like beam which is not obscured by the pellet onto the narrow photo-sensor array 869. The instantaneous pellet diameter is indicated by the length of the shadow projected onto the array; the top of the shadow is the reference line for measurement. FIG. 7 shows the relative positions of the shadow edges and respective illuminated diode spans for large and small diameter pellets. The array 869 is electronically scanned from bottom to top resulting in high lighted-diode counts for small diameter pellets and lower counts for larger diameter pellets.

Figure 56:
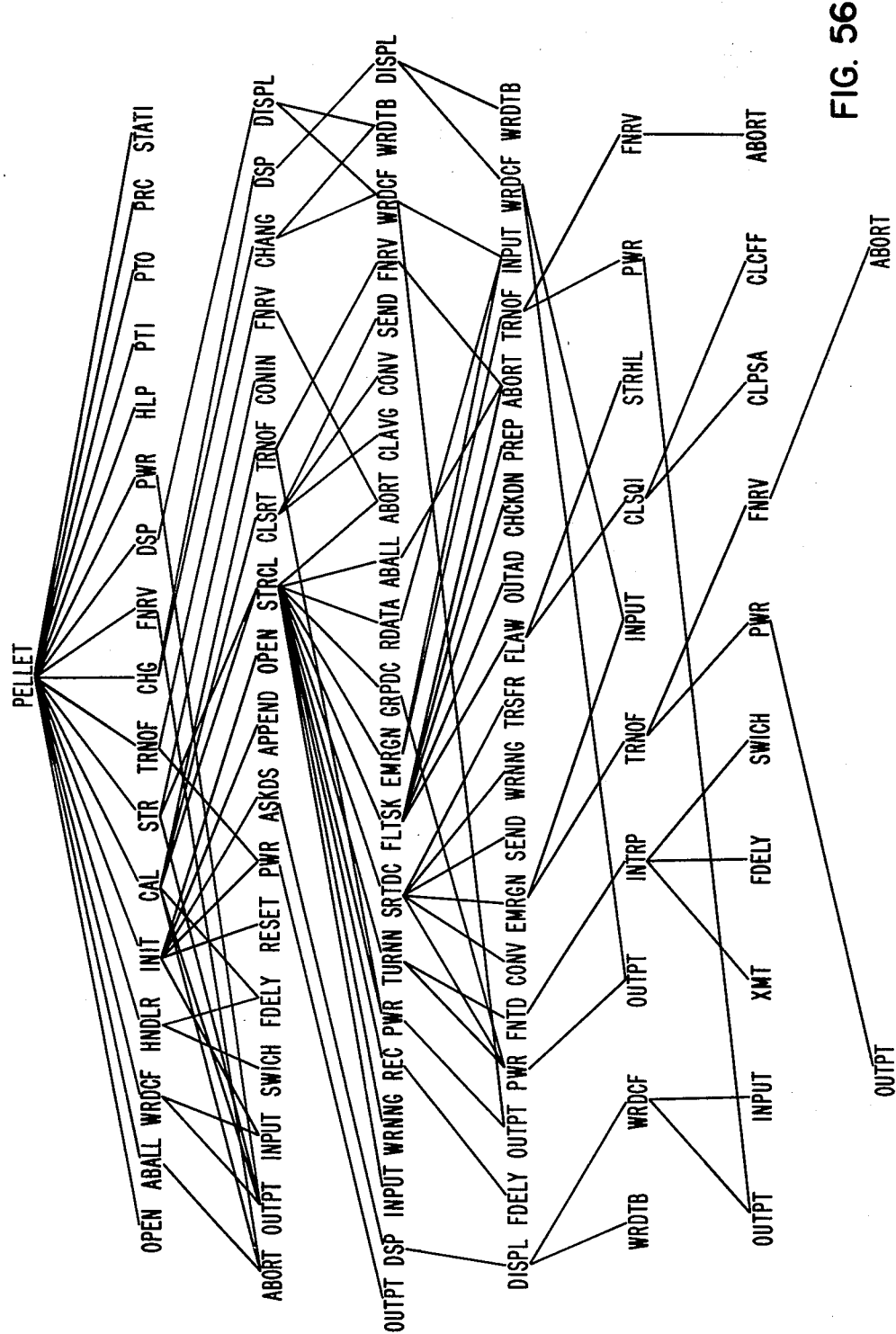
Figure 57:
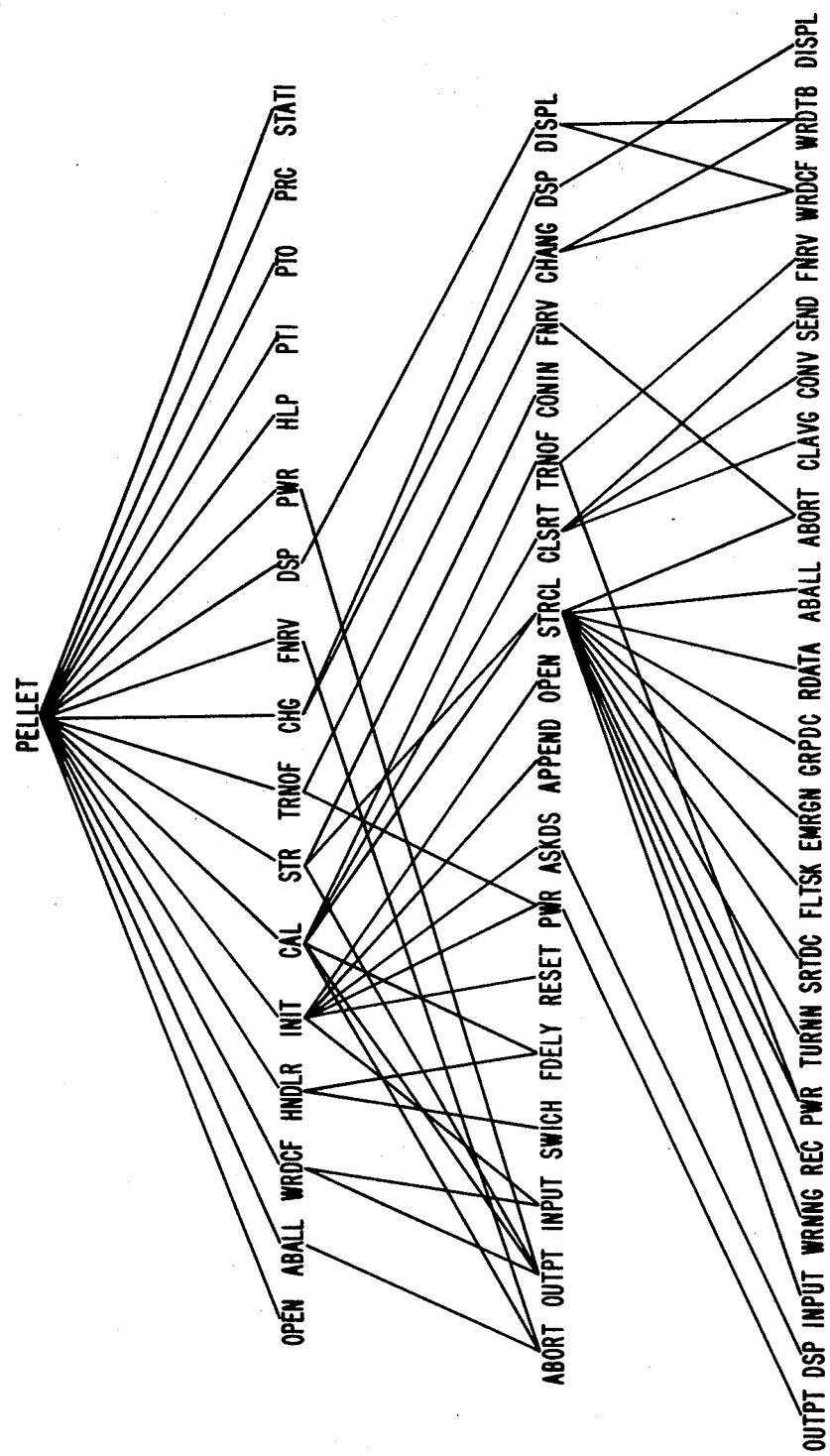
Figure 58:
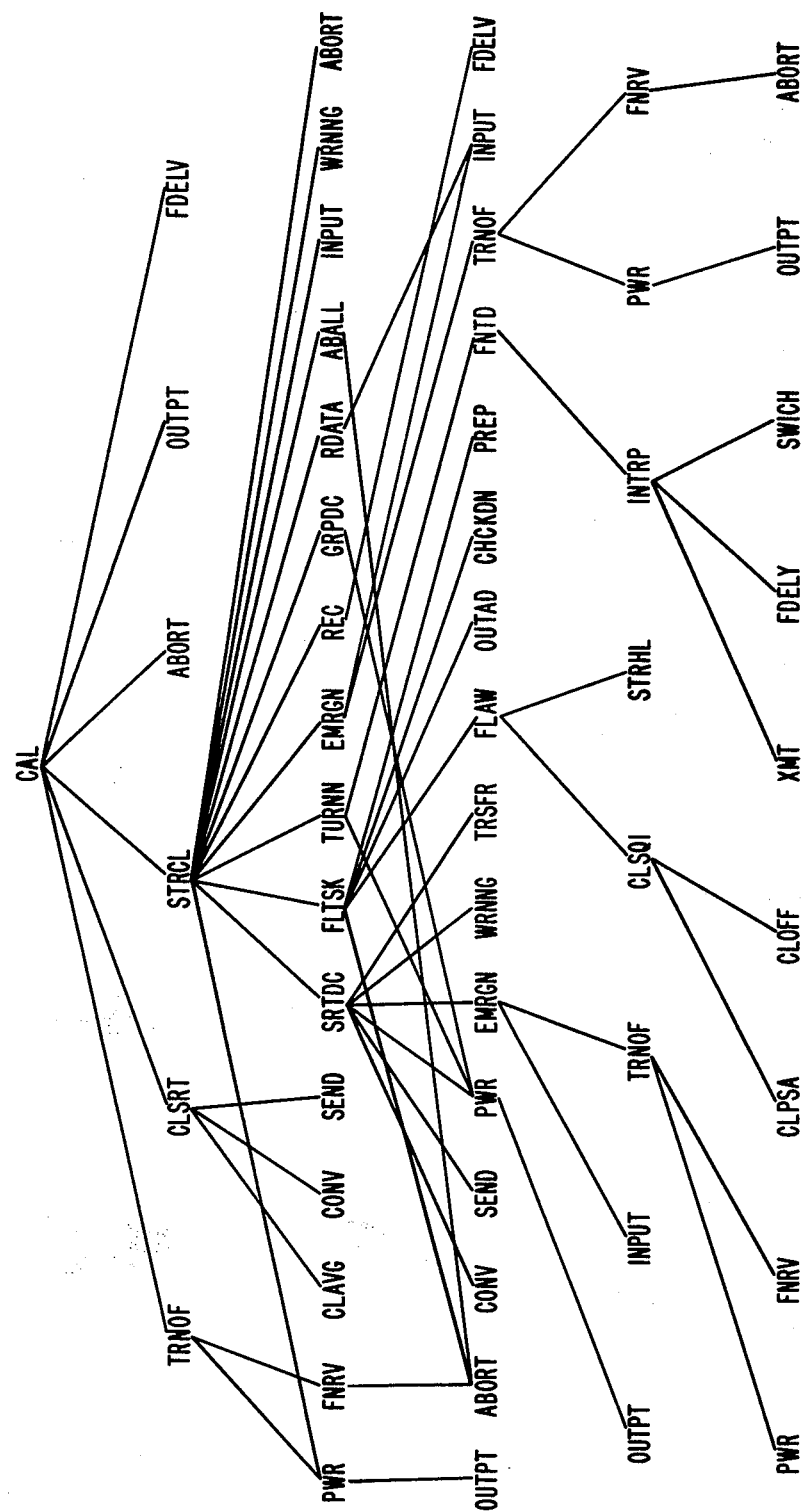
Figure 59:
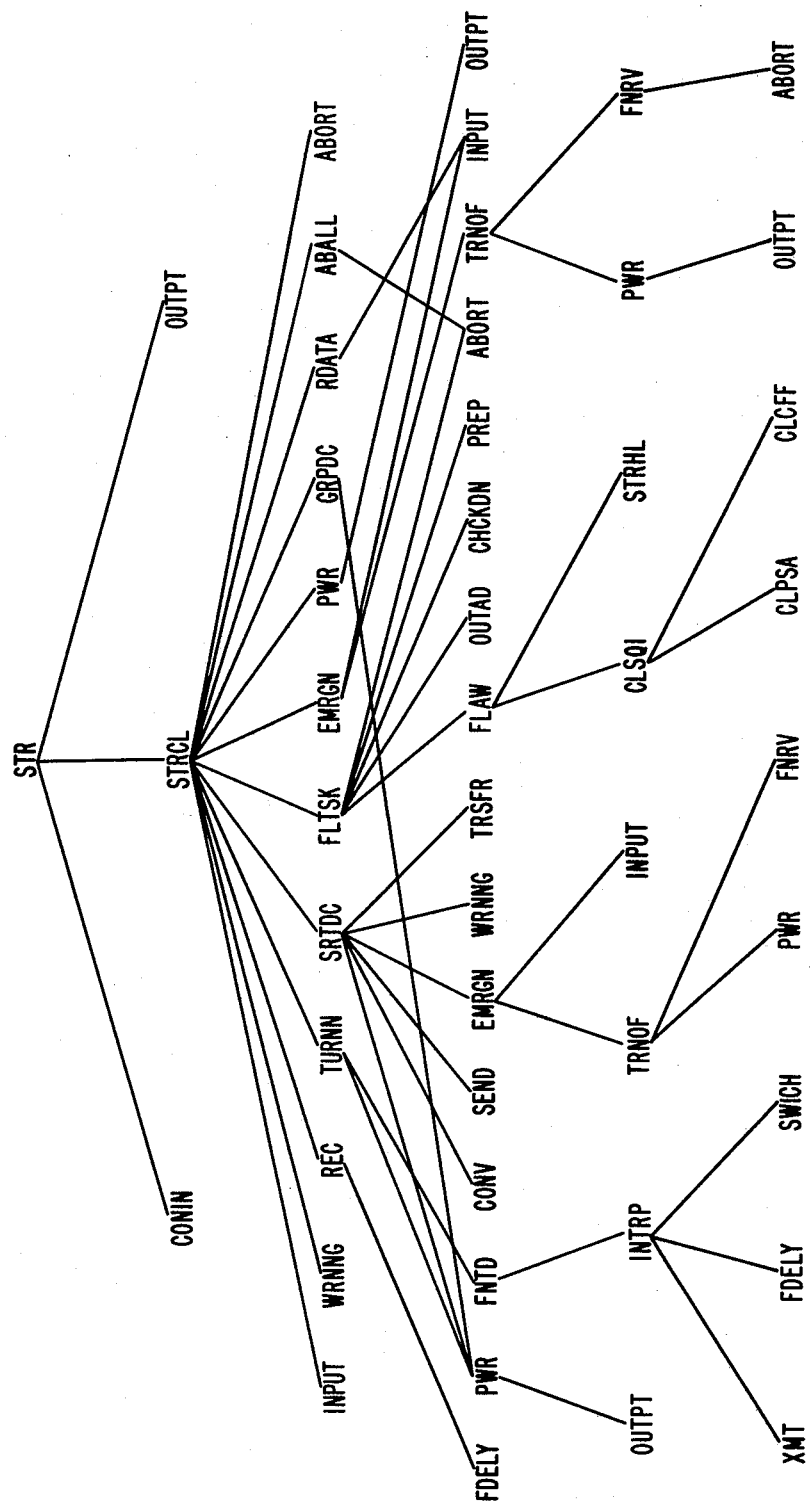

It is desired that a series of diameter measurements be made along the length of the pellet as the beam scanner sweeps the shaped laser beam across the measurement window into which the pellet has been placed. The beam position or scan address for each diameter measurement must be known. This is accomplished as follows: The beam scanner 861 has a slotted skirt 866 (see also FIG. 56 Wilks application) that interrupts light from a source 241 to a photocell 893 (see also FIG. 54 Wilks application). The photocell is used to synchronize a phase-locked loop oscillator. The frequency is such that 128 pulses per prism face, or a total of 1024 pulses per scanner rotation, are generated. The skirt has eight slots 885 (FIG. 56 Wilks application) for this synchronization and a ninth slot 887 to identify a reference face. Each pulse is used to trigger a photo-diode array scan so each diameter measurement can be associated with a particular beam position. FIG. 9 shows the logic used to generate the Scan Word Addresses, SWA, which are the unique beam positions.

To reduce the required diode-array electronic scan rates for diameter measurement, a 75 rpm scanner rotational speed was chosen with the result that each prism face's horizontal scan time is 100 ms; 1000/[(75/60)(8)] ms. Within this 100 ms, the array is scanned at each of the 128 SWA's or at a period of approximately 781.25 $\mu$s (100/128)(1000). Since the measurement period at a 3 pellets per second rate is set at 100 ms typically and the starting position of the scanning beam is not synchronized with the measurement period, it is necessary to provide logic that can initiate a diameter measurement sequence when the beam starts on the pellet and terminate the sequence when the beam returns to the same SWA position on the next prism face. (The SWA consists of 7 bits for beam position within a face and 3 bits to identify which face; see FIG. 9). This is accomplished by jamming the SWA at the beginning of a measurement period into a register and starting a diameter measurement sequence. This starting SWA is constantly compared with the current SWA and when coincidences occurs, the diameter measurement sequence is terminated. The number of diameter measurements made depends on the pellet length.

Figures 15, 16:
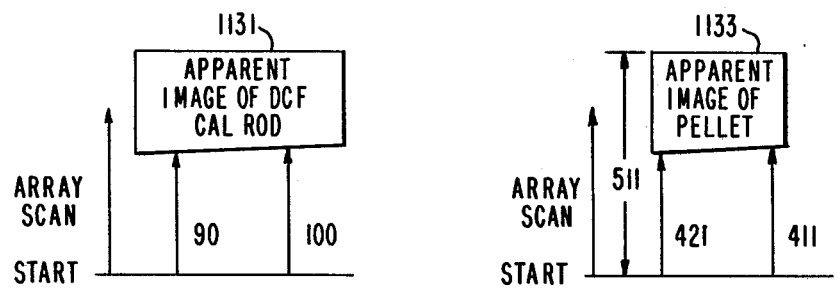
FIGS. 15 and 16 are diagrams showing how the DCF is applied to measured diameter.

Because of aberrations in the optical system and possible eccentricity in the scanner drive it is necessary to provide a diameter-correction factor, DCF, which can be used to correct the raw diameter measurements at each SWA (FIGS. 15, 16). A second problem is anomalies in beam behavior outside the required measurement window, but still within the diameter scan acquisition range of the diode array. Because of difficulties in mechanically limiting this range (diffraction effects, etc.), electronically generated boundaries are used.

Figure 8:
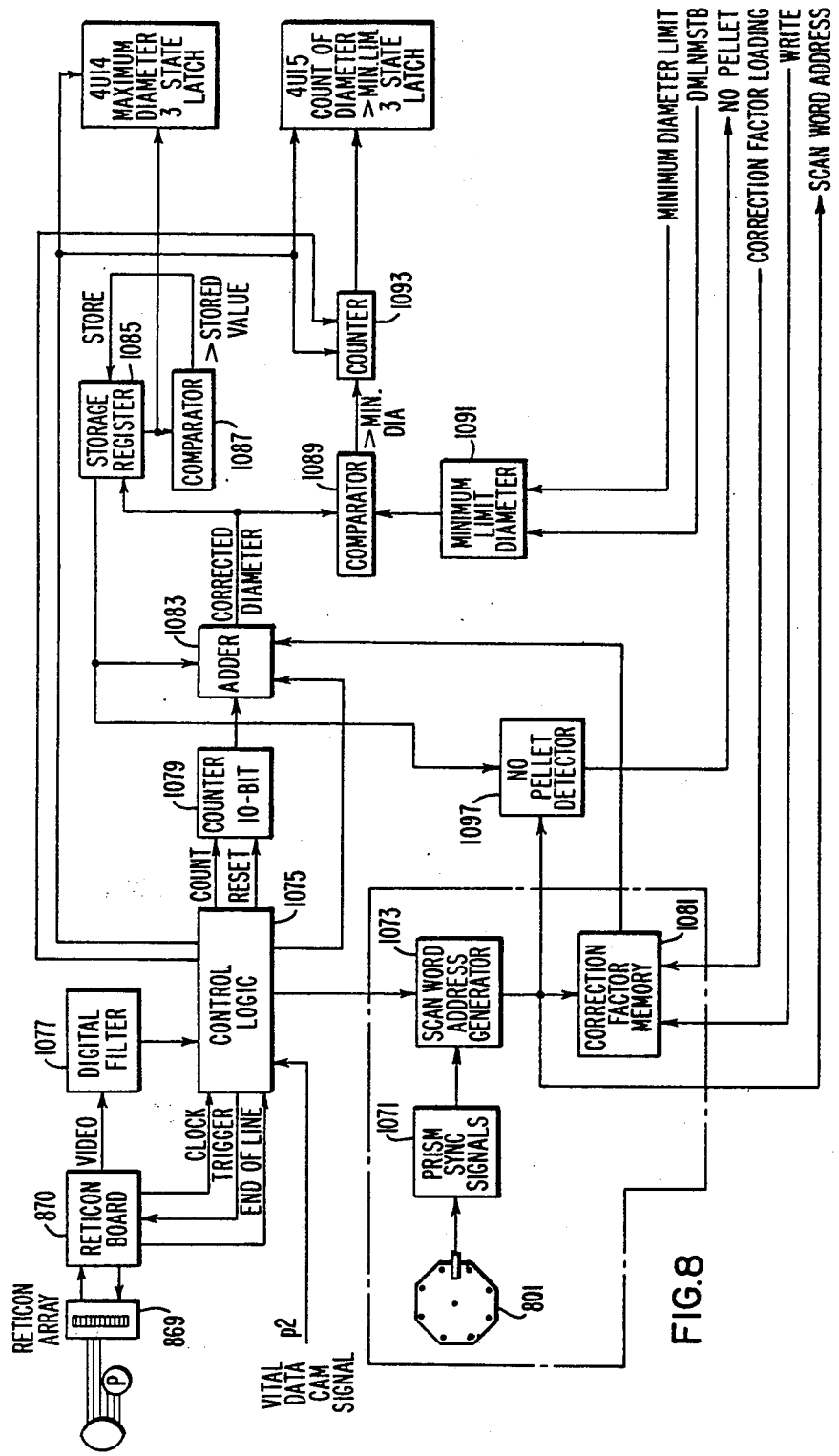
FIG. 8 is a block diagram showing the peripheral components of the electronics which take part in the measurement of diameter and the cooperative relationship between the electronics components.

To ensure proper loading of the fuel-pellet containing tubing, no single diameter along the length of the pellet may exceed a maximum value. Also, to ensure proper heat transfer, a preselected number of diameters must be greater than some minimum diameter. As each diameter measurement is made, it is corrected by application of the DCF and compared with the previous values to determine the maximum diameter. Each diameter is also compared with a minimum diameter limit to determine the number of measured diameters above the minimum. The block diagram FIG. 8 shows the diameter measurement process which incorporates these features.

With the apparatus in AUTO, automatic, mode and in the MAIN PROGRAM, and a long pellet that spans beyond the horizontally-scanned measurement window placed on the diameter station, the command CAL DCF, calibrate, diameter-correction factor, is given to the system. The CAL DCF sequence turns on the laser and scanning prism for diameter measurement and initiates a preset delay to permit the scanning prism to reach synchronous speed. Then the apparatus acquires a series of raw DCF values each having a Scan Word Address (SWA) which is generated in synchronism with the rotation of the prism. At each successive SWA, the Reticon 870 is triggered to start a scan the photo-diode array and the resulting illuminated diode count is loaded into the DCF memory 3U12, 3U13 (FIG. 11) of the control system 103 (FIG. 1) (at a location corresponding to the SWA). The calibration time period is software adjustable and is typically 1–2 seconds. At the completion of this raw DCF data acquisition period and with the MAIN PROGRAM resident in the dedicated minicomputer 105, the program reads the raw DCF data from the DCF register, "FIXS" it, and reloads the FIXED DCF data back into the DCF register. An image of the FIXED DCF data is retained in the computer memory for downline loading into the DCF register at some later time. Tables I and II on the following page shows the DCF data in its two states: the raw data (Table I) consisting of the illuminated photo-diode array counts as taken during the scanning portion of calibration and the "FIXED" data (Table II) which is reloaded into the DCF memory 3U12, 3U13 memory (FIG. 11) after manipulation of the raw data by the computer program.

TABLE I

MECHANIZED FUEL PELLET INSPECTION SYSTEM CONTROLS

| Prism Face | Raw DCF Data | | | | | | | |
|---|---|---|---|---|---|---|---|---|
| | 1 | 2 | 3 | 4 | 5 | 6 | 7 | 8 |
| | 158 | 158 | 159 | 159 | 158 | 158 | 159 | 158 |
| | 159 | 159 | 158 | 158 | 159 | 159 | 158 | 159 |
| | 158 | 158 | 158 | 159 | 158 | 159 | 159 | 158 |
| | 159 | 159 | 157 | 158 | 158 | 159 | 158 | 159 |
| | 158 | 158 | 157 | 159 | 159 | 158 | 159 | 158 |
| | 159 | 159 | 156 | 158 | 159 | 159 | 158 | 159 |
| | 157 | 157 | 157 | 159 | 157 | 158 | 159 | 158 |
| | 156 | 157 | 156 | 157 | 157 | 157 | 158 | 156 |
| | 157 | 156 | 157 | 157 | 157 | 157 | 157 | 157 |
| | 155 | 156 | 155 | 156 | 155 | 156 | 155 | 156 |
| | 156 | 155 | 156 | 157 | 155 | 156 | 156 | 156 |
| | 155 | 156 | 155 | 155 | 156 | 156 | 155 | 155 |
| | 156 | 155 | 156 | 157 | 155 | 156 | 156 | 157 |
| | 154 | 155 | 154 | 155 | 156 | 155 | 154 | 154 |
| | 156 | 154 | 155 | 155 | 155 | 156 | 155 | 155 |
| | 155 | 156 | 156 | 154 | 156 | 155 | 155 | 155 |
| | 156 | 155 | 155 | 156 | 155 | 156 | 156 | 156 |
| | 154 | 156 | 156 | 155 | 156 | 155 | 155 | 155 |
| | 155 | 155 | 154 | 155 | 154 | 156 | 156 | 155 |
| | 154 | 155 | 155 | 155 | 155 | 154 | 154 | 155 |
| | 156 | 154 | 155 | 154 | 155 | 155 | 155 | 155 |
| | 155 | 156 | 156 | 156 | 156 | 155 | 155 | 155 |
| | 156 | 155 | 156 | 155 | 155 | 156 | 156 | 156 |
| | 156 | 157 | 157 | 157 | 157 | 156 | 156 | 155 |
| | 156 | 156 | 155 | 156 | 156 | 157 | 157 | 157 |
| | 155 | 156 | 156 | 157 | 156 | 155 | 155 | 155 |
| | 156 | 155 | 155 | 155 | 155 | 156 | 156 | 156 |
| | 158 | 157 | 157 | 160 | 157 | 156 | 156 | 156 |
| | 158 | 156 | 156 | 156 | 157 | 158 | 157 | 157 |
| | 157 | 157 | 157 | 157 | 157 | 156 | 156 | 156 |
| | 156 | 156 | 155 | 156 | 156 | 157 | 157 | 157 |
| | 156 | 156 | 156 | 156 | 156 | 156 | 155 | 155 |
| | 153 | 153 | 154 | 154 | 153 | 154 | 155 | 155 |
| | 153 | 153 | 152 | 154 | 153 | 153 | 152 | 152 |
| | 151 | 152 | 152 | 152 | 151 | 152 | 153 | 153 |
| | 150 | 151 | 150 | 152 | 150 | 151 | 150 | 150 |
| | 149 | 149 | 150 | 149 | 148 | 148 | 149 | 149 |
| | 85 | 148 | 101 | 150 | 78 | 148 | 147 | 148 |
| | 0 | 0 | 0 | 61 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 28 | 17 | 0 | 0 | 29 | 0 | 0 | 0 |
| | 5 | 19 | 30 | 12 | 0 | 30 | 31 | 29 |
| | 45 | 29 | 5 | 31 | 69 | 5 | 3 | 5 |
| | 142 | 124 | 91 | 18 | 143 | 91 | 71 | 93 |
| | 159 | 159 | 157 | 107 | 161 | 158 | 157 | 158 |

TABLE I-continued
MECHANIZED FUEL PELLET INSPECTION SYSTEM CONTROLS
Raw DCF Data

| Prism Face | 1 | 2 | 3 | 4 | 5 | 6 | 7 | 8 |
|---|---|---|---|---|---|---|---|---|
| | 161 | 161 | 161 | 159 | 160 | 158 | 161 | 160 |
| | 161 | 161 | 161 | 161 | 162 | 159 | 161 | 162 |
| | 162 | 162 | 162 | 161 | 161 | 161 | 162 | 161 |
| | 161 | 161 | 161 | 162 | 162 | 162 | 161 | 162 |
| | 162 | 162 | 162 | 161 | 161 | 162 | 162 | 161 |
| | 161 | 161 | 161 | 162 | 162 | 162 | 161 | 162 |
| | 161 | 162 | 162 | 161 | 161 | 162 | 162 | 161 |
| | 161 | 160 | 160 | 162 | 162 | 161 | 160 | 161 |
| | 161 | 162 | 161 | 160 | 161 | 162 | 162 | 161 |
| | 161 | 160 | 160 | 162 | 161 | 161 | 161 | 162 |
| | 160 | 161 | 161 | 161 | 161 | 161 | 161 | 160 |
| | 160 | 159 | 159 | 160 | 159 | 160 | 160 | 160 |
| | 159 | 160 | 160 | 161 | 160 | 161 | 160 | 159 |
| | 159 | 159 | 159 | 159 | 160 | 159 | 160 | 160 |
| | 160 | 160 | 160 | 160 | 159 | 160 | 160 | 159 |
| | 159 | 158 | 158 | 159 | 160 | 160 | 160 | 160 |
| | 159 | 159 | 160 | 160 | 158 | 159 | 159 | 159 |

TABLE II
MECHANIZED FUEL PELLET INSPECTION SYSTEM CONTROLS
"Fixed" DCF Data

| 1 | 2 | 3 | 4 | 5 | 6 | 7 | 8 |
|---|---|---|---|---|---|---|---|
| 4 | 4 | 5 | 5 | 4 | 4 | 5 | 4 |
| 5 | 5 | 4 | 4 | 5 | 5 | 4 | 5 |
| 4 | 4 | 5 | 5 | 4 | 4 | 5 | 4 |
| 5 | 5 | 3 | 4 | 4 | 5 | 4 | 5 |
| 4 | 4 | 3 | 5 | 5 | 4 | 5 | 4 |
| 5 | 5 | 2 | 4 | 5 | 5 | 4 | 5 |
| 3 | 3 | 3 | 5 | 3 | 4 | 5 | 4 |
| 2 | 3 | 2 | 3 | 3 | 3 | 4 | 2 |
| 3 | 2 | 3 | 3 | 3 | 3 | 3 | 3 |
| 1 | 2 | 1 | 2 | 1 | 2 | 1 | 2 |
| 2 | 1 | 2 | 3 | 1 | 2 | 2 | 2 |
| 1 | 2 | 1 | 1 | 2 | 2 | 1 | 1 |
| 2 | 1 | 2 | 3 | 1 | 2 | 2 | 3 |
| 0 | 1 | 0 | 1 | 2 | 1 | 0 | 0 |
| 2 | 0 | 1 | 1 | 1 | 2 | 1 | 1 |
| 1 | 2 | 2 | 0 | 2 | 1 | 1 | 1 |
| 2 | 1 | 1 | 2 | 1 | 2 | 2 | 2 |
| 0 | 2 | 2 | 1 | 2 | 1 | 1 | 1 |
| 1 | 1 | 0 | 1 | 0 | 2 | 2 | 1 |
| 0 | 1 | 1 | 1 | 1 | 0 | 0 | 1 |
| 2 | 0 | 1 | 0 | 1 | 1 | 1 | 1 |
| 1 | 2 | 2 | 2 | 2 | 1 | 1 | 1 |
| 2 | 1 | 2 | 1 | 1 | 2 | 2 | 2 |
| 2 | 3 | 3 | 3 | 3 | 2 | 2 | 1 |
| 2 | 2 | 1 | 2 | 2 | 3 | 3 | 3 |
| 1 | 2 | 2 | 3 | 2 | 1 | 1 | 1 |
| 2 | 1 | 1 | 1 | 1 | 2 | 2 | 2 |
| 4 | 3 | 3 | 6 | 3 | 2 | 2 | 2 |
| 4 | 2 | 2 | 2 | 3 | 4 | 3 | 3 |
| 3 | 3 | 3 | 3 | 3 | 2 | 2 | 2 |
| 2 | 2 | 1 | 2 | 2 | 3 | 3 | 3 |
| 2 | 2 | 2 | 2 | 2 | 2 | 1 | 1 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 7 | 7 | 7 | 8 | 8 | 8 | 7 | 8 |
| 8 | 8 | 8 | 7 | 7 | 8 | 8 | 7 |
| 7 | 7 | 7 | 8 | 8 | 8 | 7 | 8 |
| 7 | 8 | 8 | 7 | 7 | 8 | 8 | 7 |
| 7 | 6 | 6 | 8 | 8 | 7 | 6 | 7 |
| 7 | 8 | 7 | 6 | 7 | 8 | 8 | 7 |
| 7 | 6 | 6 | 8 | 7 | 7 | 7 | 8 |
| 6 | 7 | 7 | 7 | 7 | 7 | 7 | 6 |
| 6 | 5 | 5 | 6 | 5 | 6 | 6 | 6 |
| 5 | 6 | 6 | 7 | 6 | 7 | 6 | 5 |
| 6 | 6 | 6 | 6 | 5 | 6 | 6 | 5 |
| 5 | 5 | 5 | 5 | 6 | 5 | 6 | 6 |
| 6 | 4 | 4 | 5 | 6 | 6 | 6 | 6 |
| 5 | 5 | 6 | 6 | 4 | 5 | 5 | 5 |

The data is arranged in eight columns of 128 locations which correspond to the eight prism faces with 128 SWA's for each face. The raw data shows two transition regions, A and C, where the scan is entering or leaving region B, which is that with no laser illumination. The balance of the data is valid "measurement window" data. The "FIXED" data shows two regions: D, which is where the eight DCF memory bits are all set to ones and the balance which contains the fixed DCF values used to correct raw-diameter measurements. The ones are logically decoded to inhibit the output of diameter data to the storage register. The boundaries of this region are determined as follows: the first horizontal row containing at least five zero diode counts is located and region D is started six rows prior to that row; the first row after the dark region containing at least five non-zero diode counts is located and region D is terminated six rows following that row. The "FIXED" data outside of region D is the difference between each diode count and the minimum diode count. If one locates a "0" "FIXED" DCF value and then its corresponding raw diode count, how the remaining raw and "FIXED" DCF values are related is apparent.

The first column for prism face 1 represents SWA's 0 through 127, the second column represents 128 through 255, and the others continue through 1023 in blocks of 128 addresses. (Tables I and II show only 100 addresses for each face since this is sufficient for the explanation of DCF and the electronics window.)

Figure 17:
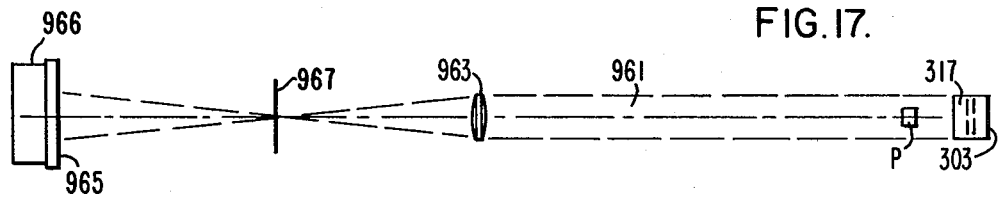
FIG. 17 is a fragmental diagrammatic view of the optical system for determining length of a pellet.
Figure 20:
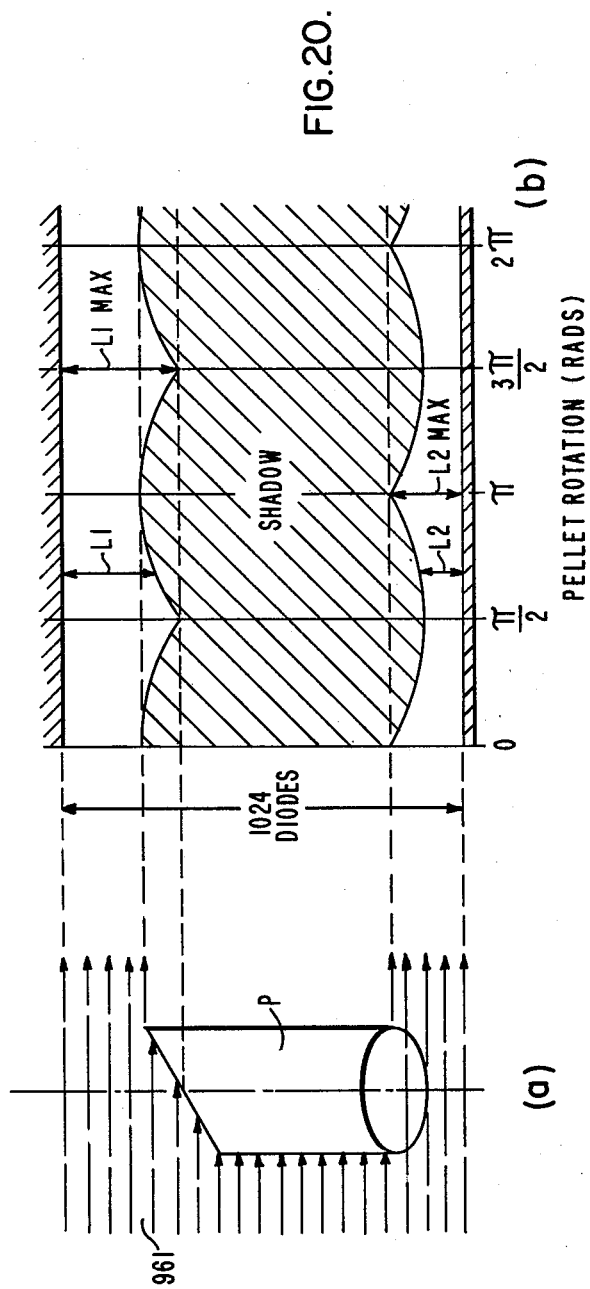
FIG. 20a is a diagrammatic view showing the manner in which a light beam is projected on a pellet in the determination of length in the practice of this invention.
FIG. 20b is a graph based on FIG. 20a showing the shadow of the pellet of FIG. 20a as it is scanned by rotation in the light beam.

The desired length measurement is the distance between the points of intersection of the axis of a pellet P with two hypothetical planes held against the ends of the pellet. A pellet placed on rollers and rotated in the path of a chisel-like horizontally-collimated laser beam that strikes the pellet in the plane including its axis, as shown in FIG. 17, produces on a linear diode array 965 (FIG. 17) placed behind the pellet time-varying illumination as shown in FIG. 20. The desired length is the width of the beam less the sum of L1 MAX and L2 MAX.

The pellet is rotated once in 100 milliseconds and the linear diode array 865 is electronically scanned every 2.5 ms to obtain nominally 40 length samples. For each scan, the illuminated diodes representing L1 and L2 are counted and individually compared with their respective previous highest values and, if the new value(s) exceed the comparison value(s), the new values are strobed into the appropriate storage register 6U4, 6U8, and 6U12, 6U16 (FIG. 23). The stored values of L1 MAX and L2 MAX are continuously added and the highest sum, L1 MAX+L2 MAX, is latched into a 3-state output latch 6U21, 6U22 (FIG. 23) at the completion of 40 samples or the end of the MEASEN interval. Since the beam width is not directly measured, a calibration with long and short pellets of known lengths is used to relate the L sums to actual physical lengths.

Figure 21:
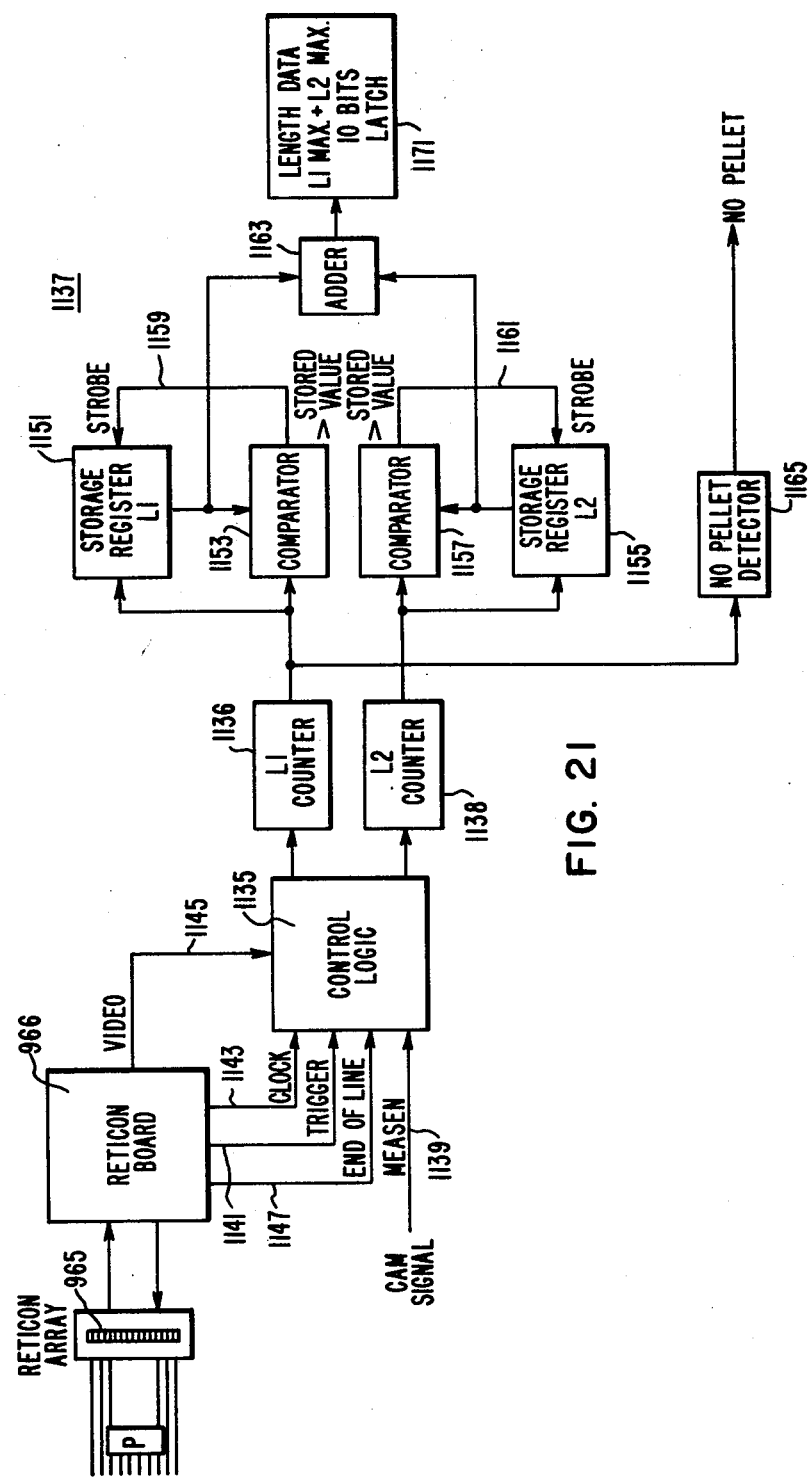
FIG. 21 is a block diagram showing the components of the control system for measurement of the length of a pellet and their cooperative relationship.
Figure 24:
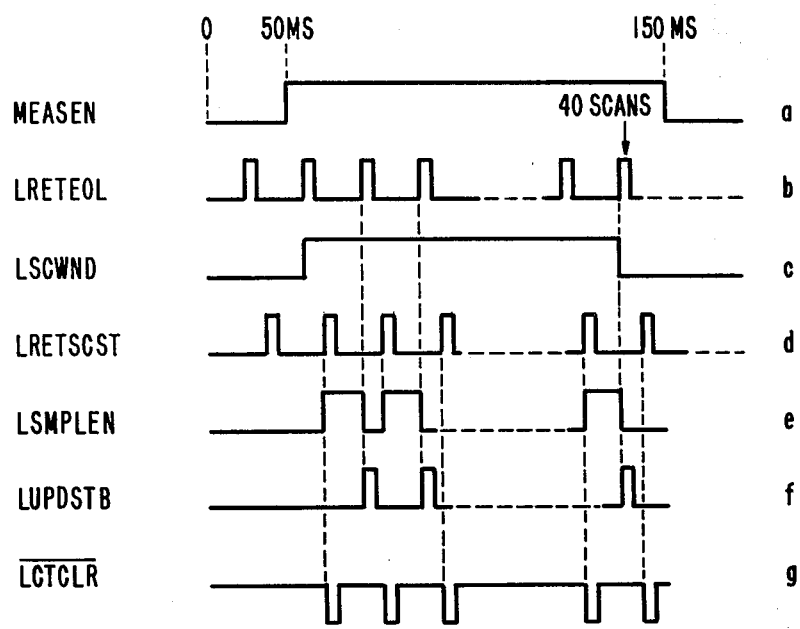
FIG. 24 is a graph showing the pulses taking part in the length measurement and their timing functions.
Figure 25:
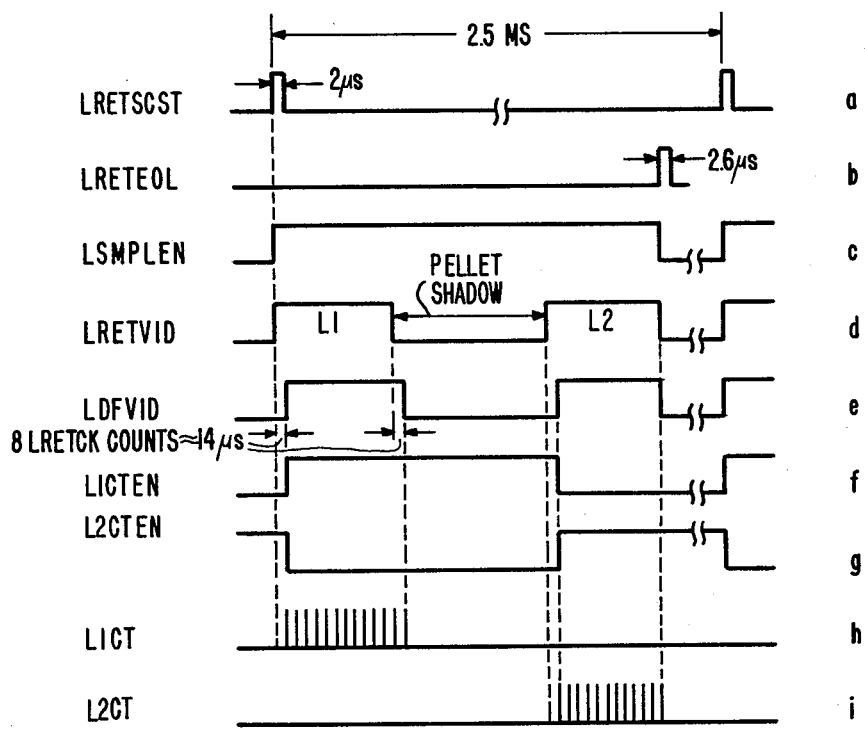
FIG. 25 is a graph on an enlarged time scale showing how the measurement of length of a pellet is carried out in one scan position.

The length station block diagram is shown in FIG. 21 and the timing chart in FIGS. 24 and 25.

The important features of this measurement are:
1. Digital filtering of the L1 and L2 counts at each light-to-dark or dark-to-light transition of the shadow at the pellet ends to eliminate count errors caused by diffraction.
2. The method of obtaining L1 MAX and L2 MAX values.

The manner in which the flaw data is derived will be understood from the discussion of FIGS. 26 through 32 and FIGS. 51 through 55d in the detailed treatment of this invention which follows. Of importance in the measurement is the reliance upon the response of the photodiode 929 (FIG. 26), on which the reflections from the pellet P are projected, to the transitions between flawed and unflawed surface areas as the pellet is scanned. As the scan passes from beyond the end of a pellet into a pellet at the incident end, there is a positive transition, from dark to light. As the scan passes from unflawed surface to a flawed area, there is a negative transition, from light to dark. As the scan leaves the flawed area there is a positive transition from dark to light. As the scan leaves the pellet at the scan exit end there is a negative transition from light to dark. The flawed area is determined by determining the aggregate counts between intermediate negative and positive transition between the positive transition marking the scan incidence on the pellet and the negative transition marking the scan exit from the pellet.

Figure 33:
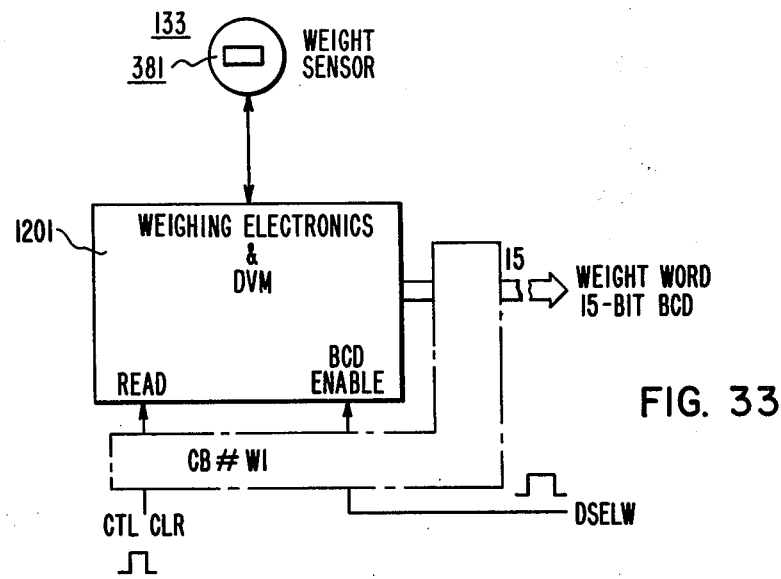
FIG. 33 is a block diagram showing generally the determination of the weight of a pellet.
Figure 35:
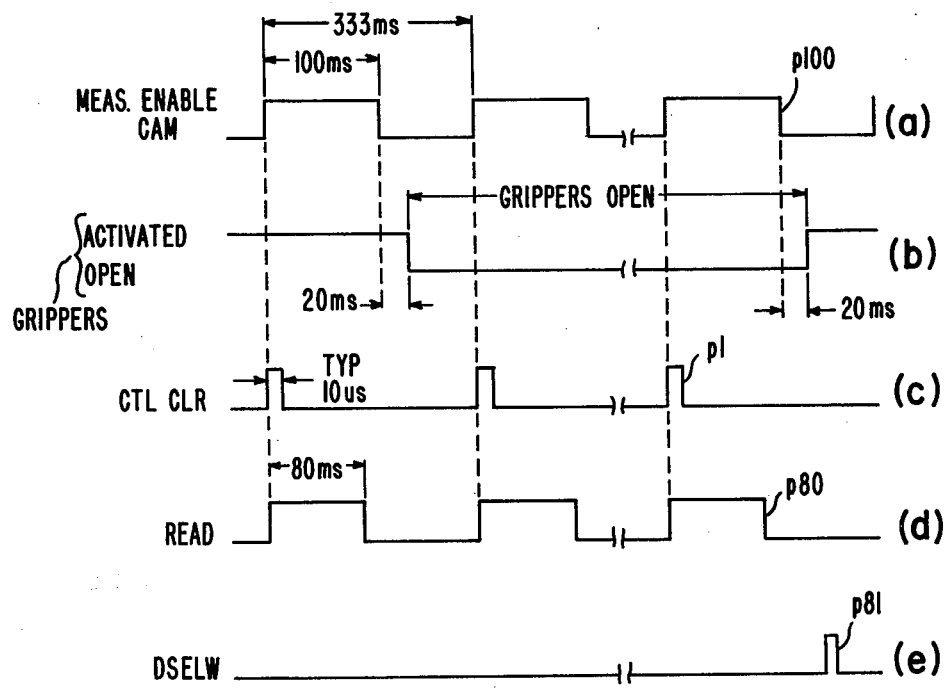
FIG. 35 is a graph showing the pulses involved in weight determination and their timing relationships.
Figure 34A:
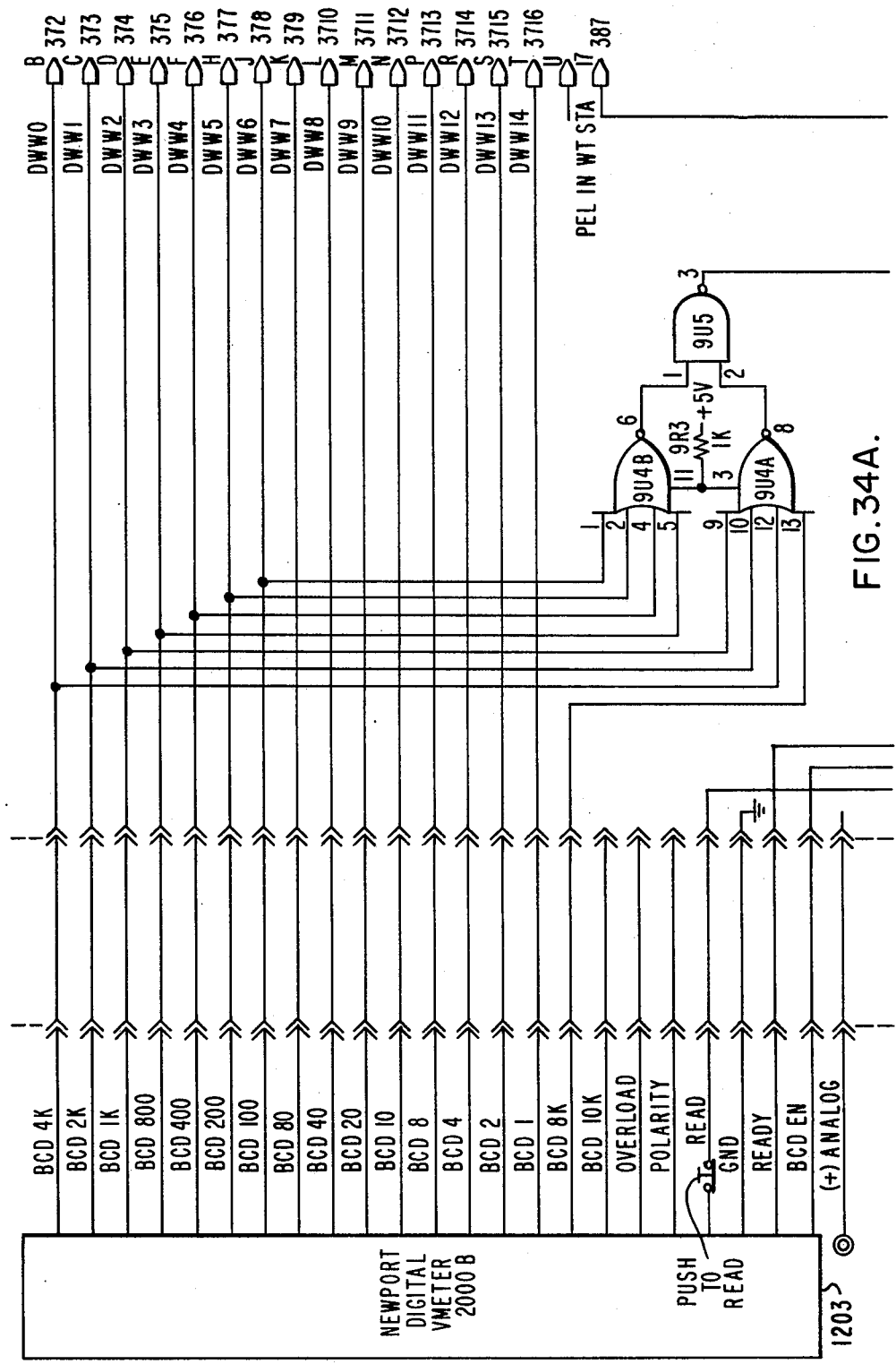
FIGS. 34A, 34B together are the logic schematic of the weight determination.
Figure 34B:
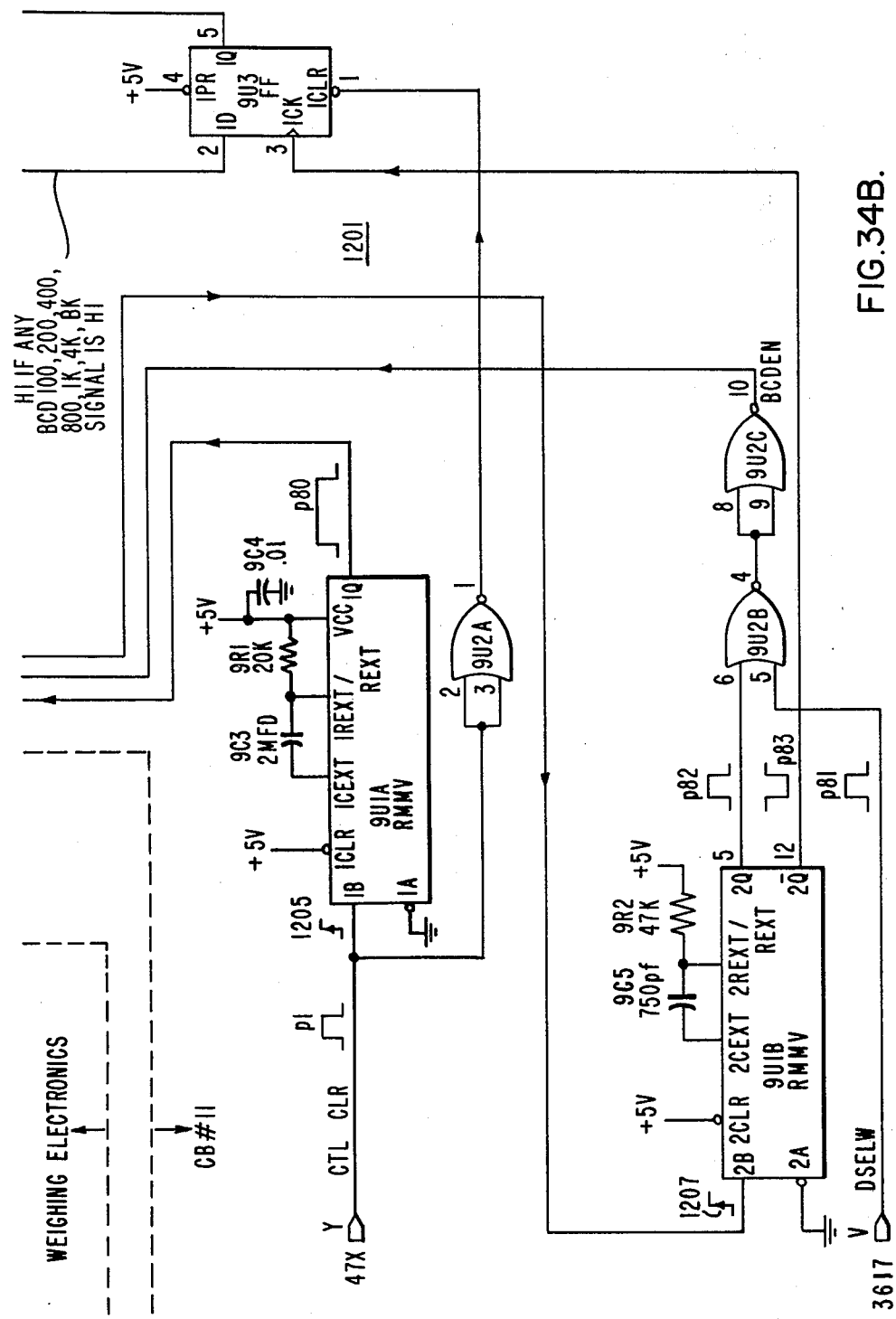

The weight or mass measurement will be understood from the detailed discussion of FIGS. 33, 34 and 35.

The apparatus shown in FIG. 1 includes a mechanical handling and gauging system 101, electronics 103, a dedicated computer 105 and a supervisory computer 101. A direct-memory access 106 and an input-output (IO) interface 108 are associated with the dedicated computer 105. The DMA 106 and the IO board 108 are actually structurally part of the dedicated computer but are shown separately in the interest of facilitating description of this invention inasmuch as they perform special functions. The electronics 103 and the computers 105 and 107 constitute the comprehensive control of this invention.

The mechanical system 101 is described in detail in Wilks application. As shown diagrammatically in FIG. 1 the mechanical system 101 includes a pick-up station 123 in which each pellet to be inspected is positioned to be picked up and moved downstream to an array of stations for carrying out the inspection and classification: a diameter station 127, a flaw station 129, a length station 131, a weight station 133 and a sorting station 137. These stations are mounted in succession in the downstream direction in the above order. In the diameter, flaw and length stations 127, 129, 131 the pellets are deposited on rollers by which they are spun.

The pellets are deposited in a hopper 161 whence they are advanced by a pellet feeder 121. The feeder 121 includes a vibrating feeder bowl 163 which advances the pellets to a vibrating horizontal feed track 165. The feed track 165 deposits the pellets one-by-one in the pick-up station.

The pellets are advanced by a gripper transfer mechanism 135. The mechanism includes a beam 513 which carries grippers 515, 517, 519, 521 and 523. The beam 513 and its grippers is reciprocated between an upstream position where the grippers pick up pellets P and a downstream position where the grippers open and deposit pellets. The grippers return open to the upstream position. The beam is reciprocated by oscillating shaft 655 which is driven by transfer drive 659. The transfer mechanism 135 is shown in FIG. 1 in the downstream position with the grippers 515 through 523 open.

At the start of the normal operation of the apparatus in which fuel pellets are inspected, the transfer mechanism 135 advances the first pellet in the pick-up station 123 to the diameter station 127 during the first cycle of operation. The diameter of the first pellet is measured during this first cycle. During the second cycle the mechanism advances the first pellet to the flaw station 129 and a second pellet to the diameter station. During this second cycle the diameter measurement of the second pellet and the flaw measurement of the first are carried out simultaneously. This operation continues until during the fourth cycle and thereafter there are pellets in all four stations 127 through 133 and they are inspected and thereafter transferred downstream simultaneously. The closing and opening of the grippers 515 through 523 is controlled by push rod 749 which is activated by the gripper control 715–763.

Inspection or measurement for diameter, flaws and length are carried by optical systems 139, 141 and 143 respectively and for mass by scale 381. Depending on the results of the inspection each pellet is deposited in a hold bin or boat 149, a reject bin 151, or an accept bin 153 by sorting mechanism 137. Typically the sorter 137 is normally set to deposit pellets in the reject bin. Once the sorter is set for accept or hold, it remains as set until a command for a change is entered by computer 105.

The selective operation of the sorting vanes of the sorting gates 455 and 457 (Wilks application) is controlled by solenoids 471 and 473 (labelled Sol2 and Sol3). The closing and opening of the grippers 515 through 523 is controlled by solenoid 771 (labelled Sol1). There is in addition a solenoid 218 (not shown—but shown in Wilks application FIG. 3) for controlling the clamping of each pellet following a pellet advance to the pick-up station 123. When plutonium pellets P are inspected the hopper 161, feeder bowl 163, horizontal feed track 165, stations 123, and 127 through 137, transfer mechanism 135 and bins 149–153 and their associated parts are in an hermetically sealed containment 147 as shown in FIG. 1.

Figure 3:
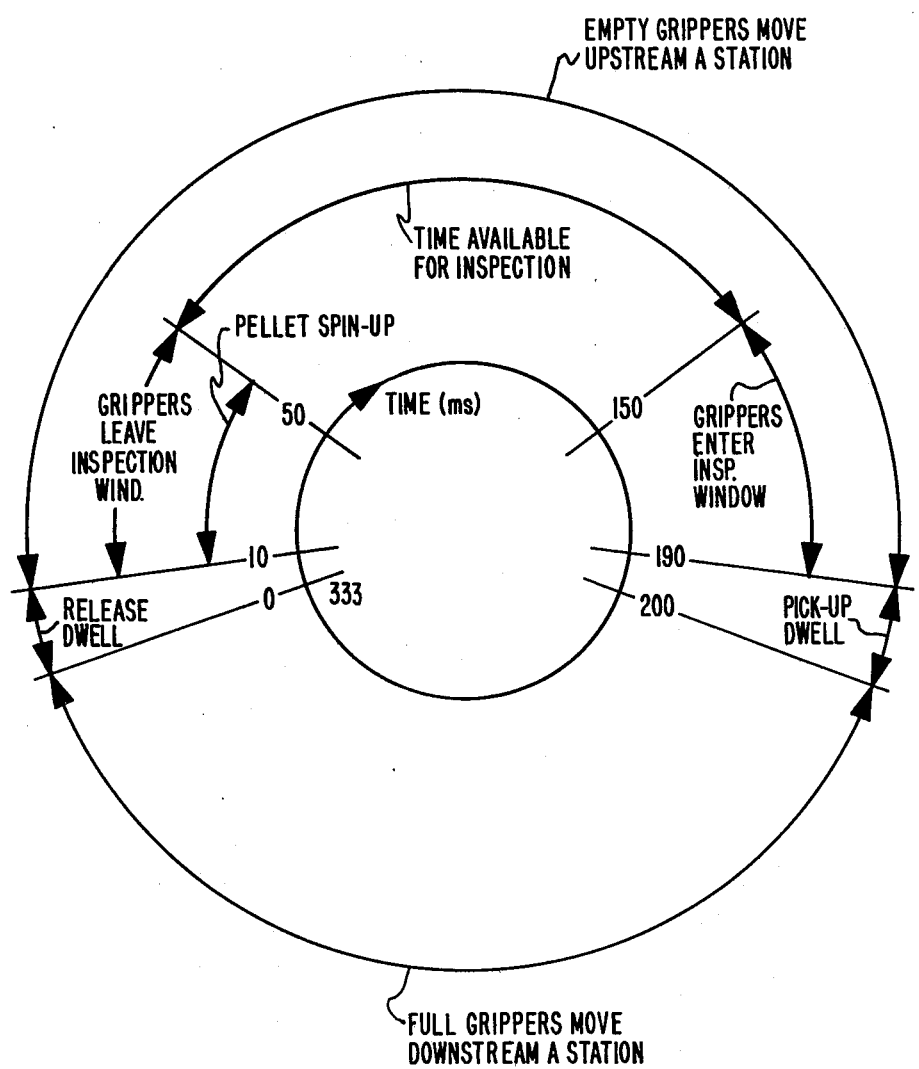
FIG. 3 is a timing chart showing the time taken for various functions of the mechanical system during an inspection cycle and the time available for inspection.

FIG. 3 shows the timing of the events which occur during 1 cycle of operation of the mechanical handling and gauging system. In the inner circle, time is plotted circumferentially in milliseconds. It is assumed that 3 pellets are inspected (for diameter, flaws, and length) per second. A complete cycle consumes 333 ms as shown. A cycle starts with the grippers 515 through 523 in pellet deposit-positions downstream, each gripper engaging a pellet. The grippers open and the pellets are relased between 0 and 10 ms into the cycle. The open grippers then return to the respective upstream stations during the next 180 ms. Between 50 ms and 150 ms into each cycle, the grippers no longer obstruct the windows in the station; beginning at 150 ms into the cycle the returning open grippers again obstruct the windows. The time available for inspection is 100 ms. Between 190 and 200 ms into the cycle, the grippers pick up their respective pellets. During the last 133 ms of the cycle, the grippers carrying the pellets return to their respective downstream stations.

The mechanical system includes photo-sensors which are labelled PC1 through PC8. Photo-sensor PC1, including incandescent light source 179, and photo-transistor detector 183 ("SKAN-A-MATIC") (FIG. 5) and PC2, including a like source 181 and photo-transistor detector 185, operate together to verify that a pellet P is properly positioned to be picked up in the pick-up station 123 at the escapement 125. PC1—Upstream position—Senses that a pellet P has entered the pick-up station 123 but does not confirm that the pellet is in position for pick-up. It serves in conjunction with PC2 to determine if the escapement is empty. PC2—Downstream position—Senses that the pellet has advanced completely into the pick-up station.

Three photo-sensors PC3, PC4 and PC5 monitor the sorting station 137. PC3—Consists of a single incandescent light source 197 with a collimated beam and two photo-transistor detectors 192 and 195 connected in series that sense that a pellet has been released into the throat of the sort mechanism. PC4—includes an LED 499 and photo-transistor detector 503 normally blocked by a vane on the Accept-sort gate. This photo-sensor detects when the gate solenoid has been actuated to move the gate into position to deflect the pellet into the Accept collector bin 153. PC5—includes an LED 501 and phototransistor detector 505 normally blocked by a vane on the Hold/Sort gate. This photo-sensor detects when the gate solenoid has been actuated to move the gate into position to deflect the pellet into the Hold collector bin 149.

Figure 14:
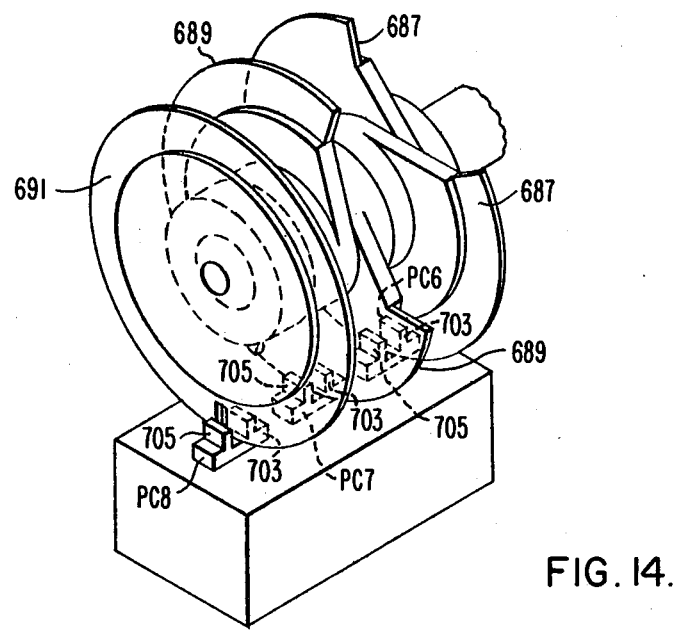
FIG. 14 is a fragmental view in perspective showing the timing cams which operate in the practice of this invention.

Photo-sensors PC6, PC7, and PC8 are controlled by cams 687, 689 and 691 (FIG. 14). Each photo-sensor includes an LED source 703 and a photo-transistor detector 705. The cams 687, 689 and 691 pass between each source 703 and its associated detector 705. Cams 687 and 689 have adjustable open sectors through which the detectors 705 are exposed to the light from the LEDs 703. Cam 691 has a slot through which the detector 705 is exposed. PC6—is actuated by Cam 687 to generate MEASEN, measure enable, signal that enables the individual stations 127 through 133 to take measurements. Cam 687 is adjusted so that the MEASEN period begins when the grippers have cleared the paths of the lasers in the measurement windows of the stations and ends when they re-enter. PC7—is actuated by cam 689 to control the escapement solenoid 218 (FIG. 5B) that inhibits the movement of pellets into the escapement pick-up position. After the MEASEN signal has strobed the absence of a pellet in the escapement into the STATUS word, the word which indicates that status of the pellets in the stations, the advance of a pellet even partially in gripper range must be prevented since the grippers 515–523 are allowed to be active with an empty escapement 125 and they could attempt to pick up a pellet when none in indicated in the STATUS word and subsequently cause a logic error. PC8 is actuated by cam 691 to generate the XDR HOME, transfer-drive home, signal used in the MAN CONTROL MODE for SINGLE CYCLE operation. This signal indicates that the transfer drive mechanism has advanced and just released pellets (when correctly phased to the transfer drive).

Figure 5A:
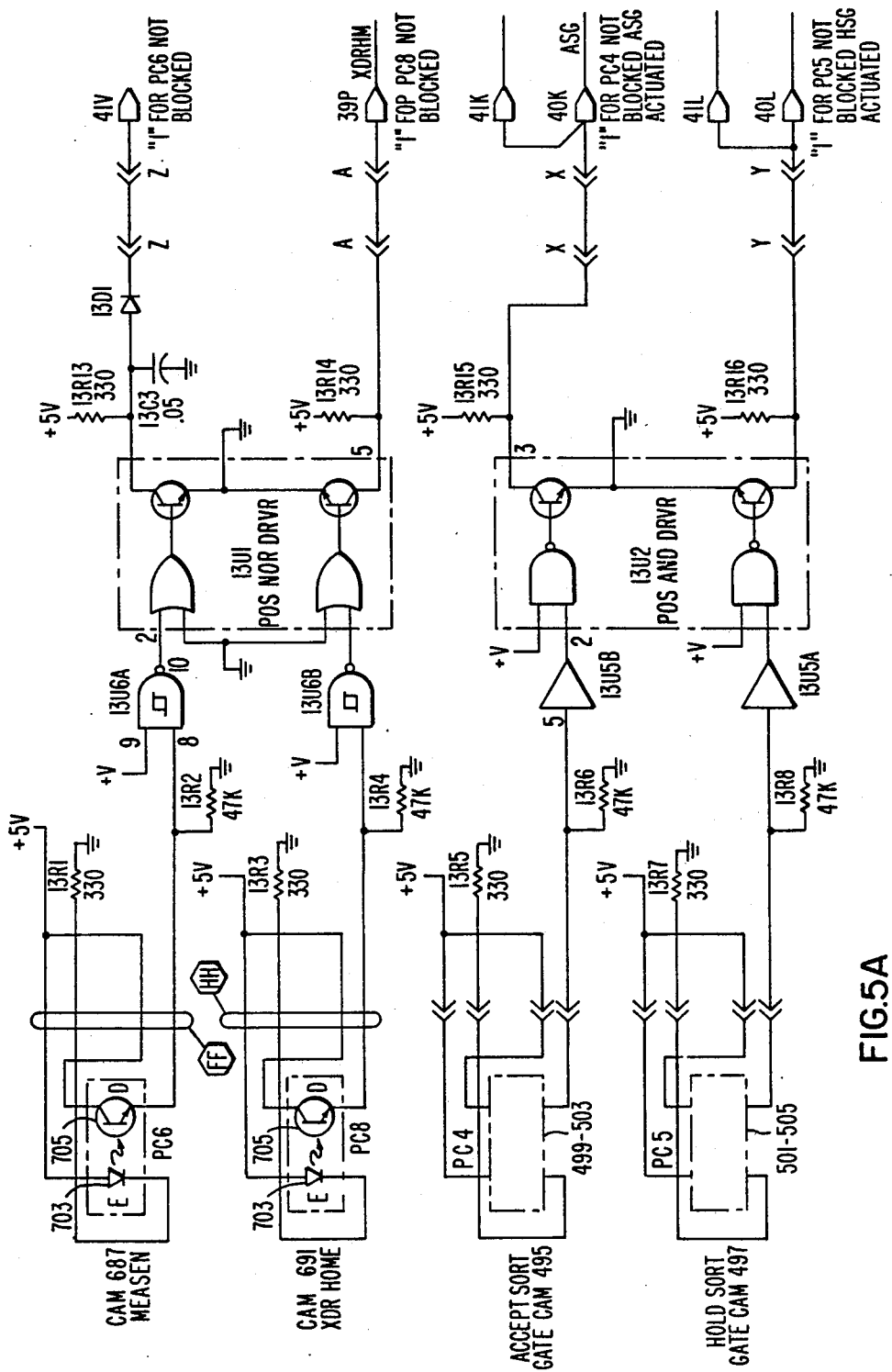
FIGS. 5A and 5B together are a schematic showing the circuits and functions of the photo-sensors of the mechanical system.
Figure 5B:
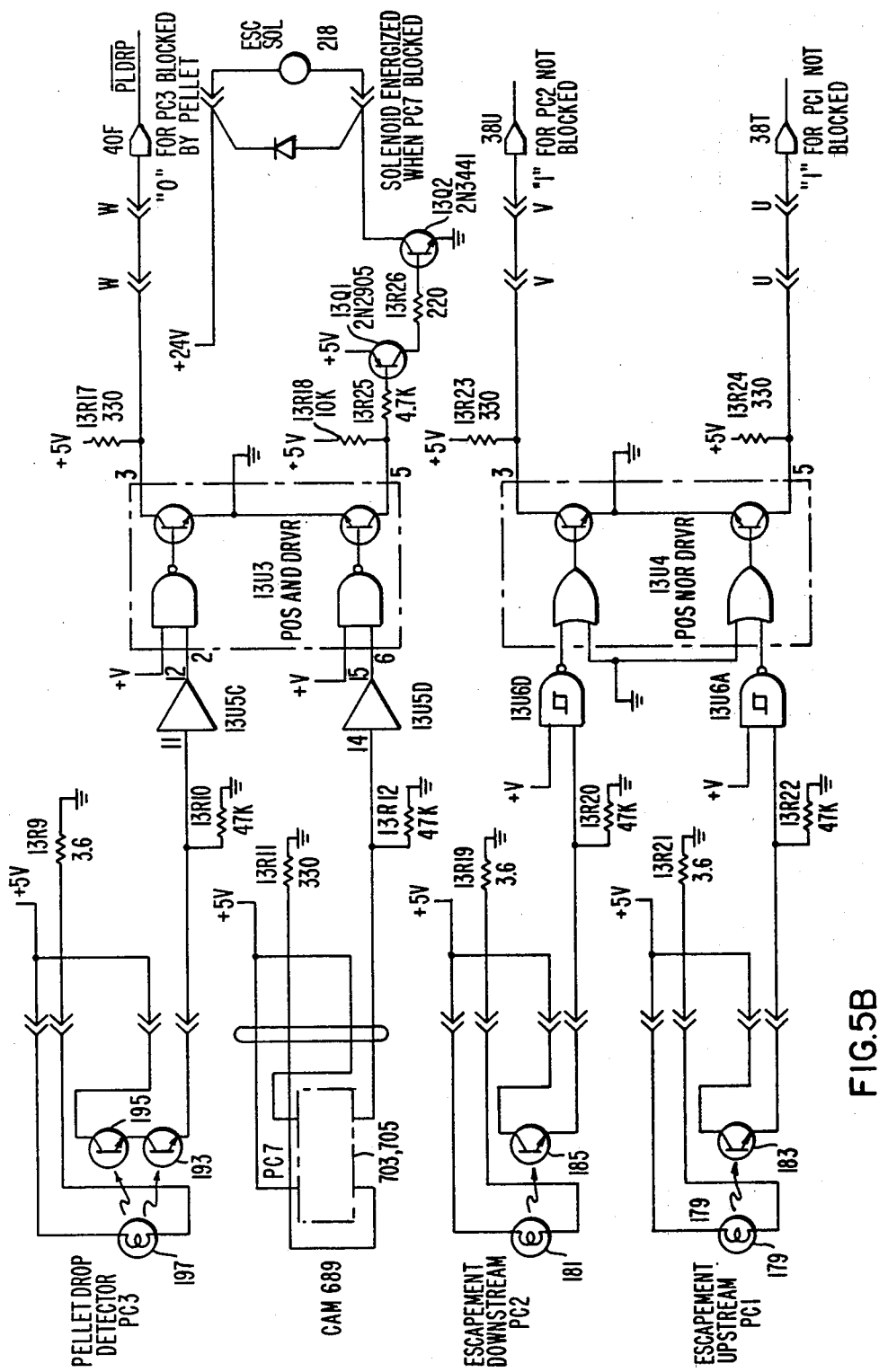

FIG. 5 is a schematic of the circuits of the photo-sensors PC1 through PC8. These circuits will be described here in the order in which they appear in FIG. 5.

During the interval when cam 687 (FIG. 1A) blocks incidence of light from source 703 and photo-transistor 705 of sensor PC6, there is a 0 at input 8 of NAND Schmidt trigger 13U6A and a 1 at its output 10 and on input 2 of positive NOR driver 13U1. Current is conducted through resistor 13R13 entering a 0 on output socket Z shown connected to an input terminal labelled 41V through diode 13D1. The labelling of the output terminal signifies that socket Z is connected to input terminal V of FIG. 41. FIG. 5 shows the input terminals of remote circuit boards to which its sockets are connected.

During the interval during which cam 687 unblocks photo-transistor 705, there is a 1 on input 8 and also on input 9 of NAND 13U6A and a 0 on input 2 of 13U1. Current is not conducted through resistor 13R13 and a 1 is entered on terminal 41V. This 1 persists during the MEASEN, measurement enable, interval (P100, FIG. 4a). The instants of beginning and end of the interval and its duration may be set as disclosed in Wilks application. Photo-sensor PC8 operates similarly. When light on photo-transistor 705 of sensor PC8 is blocked, there is a 0 on output 5 of NOR driver 13U1 and on output terminal P of FIG. 39. During the short interval that light is incident on photo-transistor 705, there is a 1 on terminals 39P. Terminal 39P is labelled XDRHM, transfer drive home. The cam 691 operates to set the apparatus at a home position if the operation is stopped.

When cam 495 blocks the incidence of light on photo-transistor 503, there is a 0 on input 5 of amplifier 13U5B and a 0 on input 2 of the AND driver 13U2. There is a 0 at output 3 of 13U2 and on terminals 40K and 41K labelled ASGPC, accept-sort gate photocell. When photo-transistor 503 is unblocked, there is a 1 on 13U5B and input 2 of 13U2 and a 1 on its output 3 and on terminals 40K, 41K. As indicated at input terminal 40K the sorting station 137 is set at ASG, accept-sort gate. Acceptable pellets are deposited in bin or boat 153.

Likewise when cam 497 is set to block photo-transistor 505 of sensor PC5 output 40L is 0. HSG hold sort gate is set so that the hold bin 149 does not receive pellets. When cam 497 unblocks photo-transistor 405, terminal 40L is 1 to indicate that the hold-sort gate is enabled to conduct pellets to the hold bin 149.

In the absence of passage of pellets through the opening (451 FIG. 32—Wilks application) through which pellets to be sorted pass at station 137, photo-transistors 193 and 195 are conductive and there is a 1 on input 11 and output 12 of amplifier 13U5C. There is a 1 on input 2 of positive AND driver 13U3 and a 1 on output 3 of 13U3 and on 40F, PLDRP, pellet drop. This signifies that a pellet has not dropped through the opening. When a pellet P drops through the opening one or both photo-transistors 193 and 195 are instantaneously blocked. There is a 0 pulse on input 11 and output 12 of amplifier 13 U5C and a 0 on output 3 of positive AND driver 13U3 and on input terminal 40F, $\overline{PLDRP}$.

When the light to photo-transistor 705 of photo-sensor PC7 is blocked by cam 689, there is a 0 on input 14 and output 15 of amplifier 13U5D and on input 6 of positive AND driver 13U3. There is a 0 on output 5 of 13U3 and transistor 13Q1 conducts. Current flows through the base and emitter of 13Q2, rendering this transistor conducting. The escapement solenoid 218 in the collector-emitter circuit of this transistor is actuated. Under this condition the spring 217 (FIG. 8 Wilks application) is counteracted and pellets can flow into the pick-up station 123. When photo-transistor 705 of PC7 is unblocked, there is a 1 on input 6 of positive AND driver 13U3 and 1 on its output 5. Current does not flow through transistors 13Q1 and 13Q2 and the solenoid 218 is deenergized so that the spring is effective in clamping a pellet P following a pellet in the pick-up station 123.

The circuits for photo-sensors PC2 and PC1 operate in the same way as the circuits for PC6 and PC8. In the absence of a pellet in the pick-up station 123, there are 1's at outputs 3 and 5 of positive NOR driver 13U4 and on output terminals 38U and 38T. With a pellet at least partly advanced into the pick-up station, photo-transistor 183 is blocked; there is a 0 at output 5 of 13U4 and on output terminal 38T. With a pellet P properly positioned in the pick-up station 123 at the escapement 125, there are 0's on outputs 3 and 5 of 13U4 and on input terminals 38T and 38U.

Figure 22A:
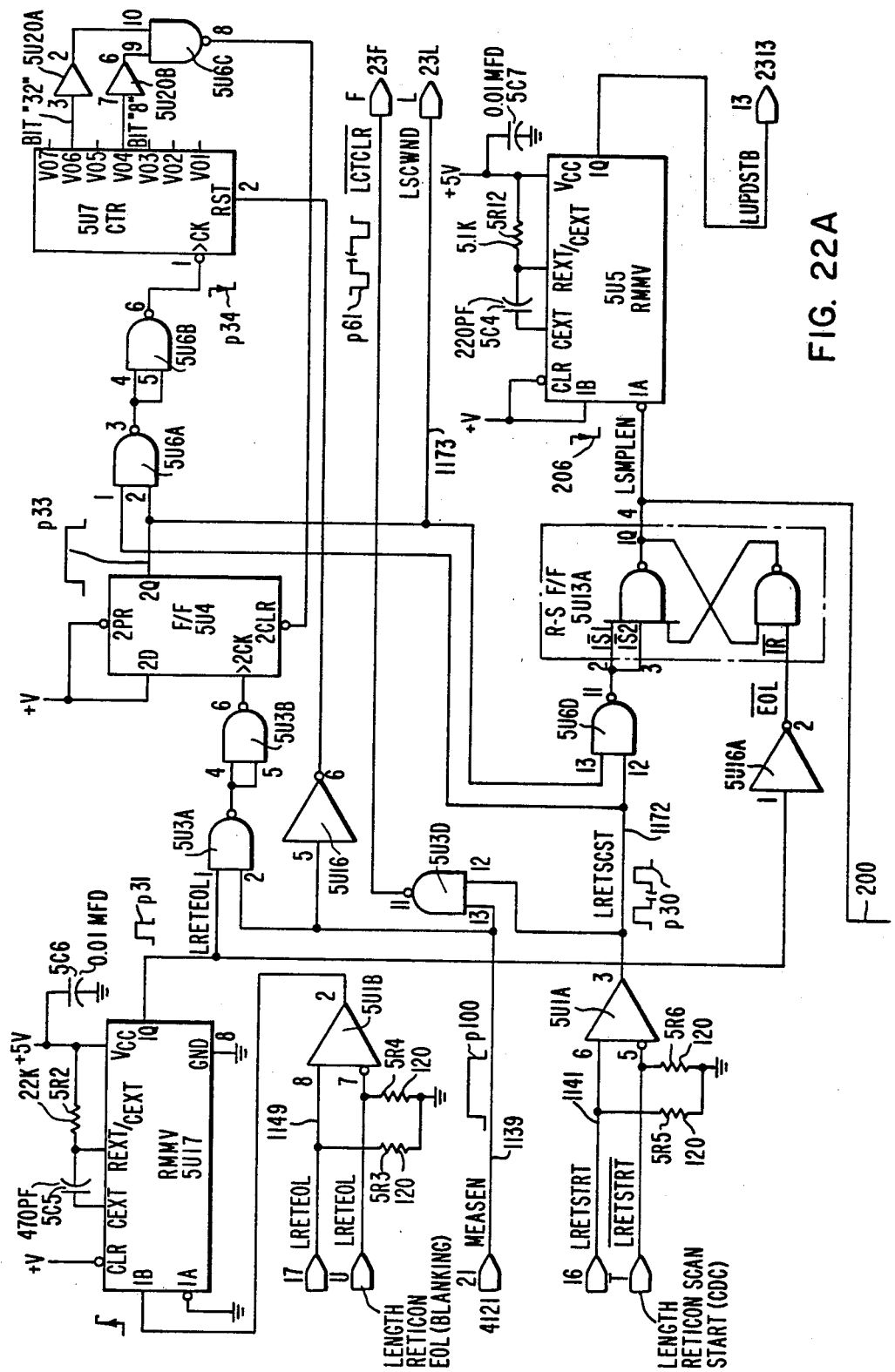
FIGS. 22A and 22B together are the logic schematic for count control in the measurement of the length of a pellet.

The electronics 103 (FIG. 1B) includes data acquisition and process units 1001 for diameter, 1003 for flaws, 1005 for length and 1007 for weight. The data acquisition and process unit 1001 is shown in detail in FIGS. 9, 10, 11, 12, the flaw unit 1003 in FIGS. 28 and 29, the length unit 1005 in FIGS. 22 and 23, and the weight unit 1007 in FIGS. 33 and 34. The electronics 103 also includes a timing and control-logic unit 1009. This unit is shown in detail in FIGS. 38, 39, 40 and 41. The control system is operated from a control panel 1013 on which there are switches, push buttons and indicator lights.

The dedicated computer 105 and the supervisory computer 107 are NOVA 3-12 computers made by Data General Corp. The details of these computers are described in Data General literature. The computer 105 has a teletype 1015 through which commands may be impressed and into which the computer can print intelligence. The direct memory access (DMA) 106 makes available direct access, independently of the computer functions, to the memory of computer 105 particularly for the purpose of handling the flaw data which is produced at a high rate and whose processing requires considerable computer time. The data is collected during the MEASEN interval. The input-output (IO) interface board 108, sometimes referred to as computer interface board, includes facilities for transferring data in and out of the computer. FIGS. 42 and 43 together are schematics of the interconnections of the board 108 and DMA 106 and the control system 103.

Figure 36A:
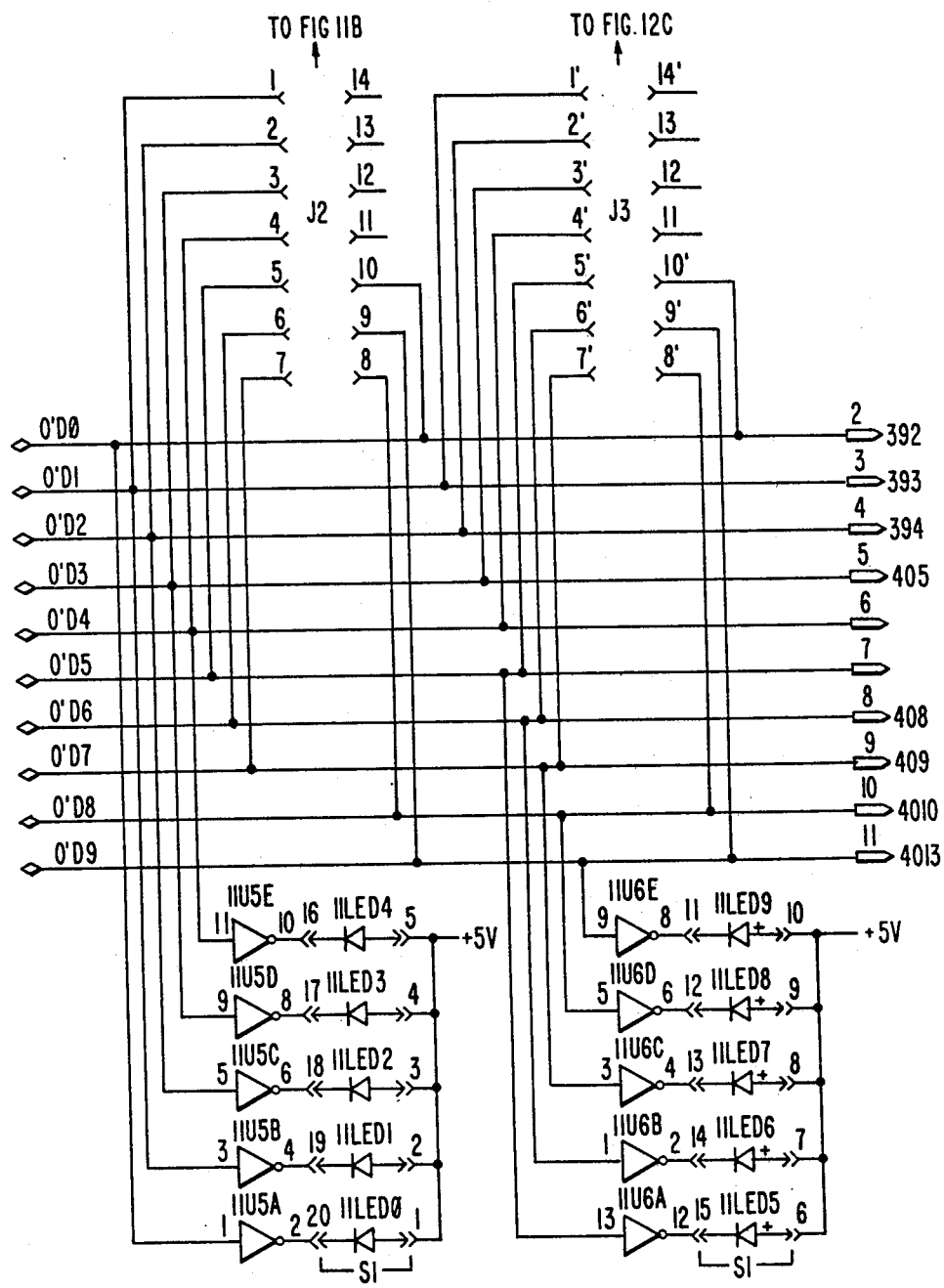
FIGS. 36A, 36B together are the logic schematic of the computer-control interface which forms a part of the electronics showing the reception of command signals and data from the computer and their transmission to the electronics.
Figure 36B:
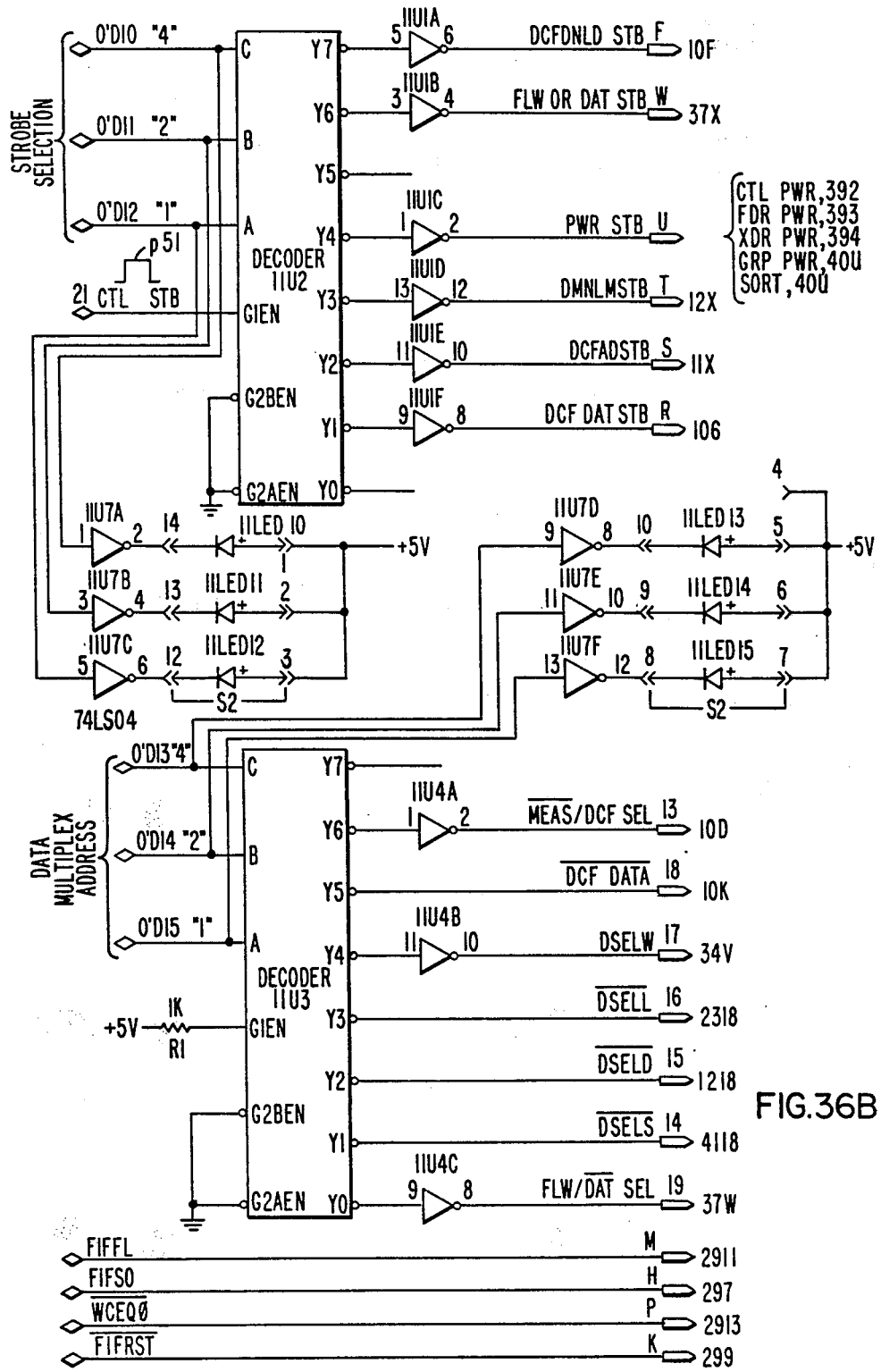

The data acquisition and process units 1001, 1003, 1005 and 1007 and the timing and control logic unit 1009 supply data and timing and control commands to the computer through the multiconductor 3-state data bus 1017, the multiplexer 1019, the IO board 108 and the DMA 106. The DMA 106 receives intelligence, control signals and strobes through branch 1020 and the IO data is received through branch 1022. FIG. 36 shows the connections for flow of intelligence from the IO computer board and DMA and FIG. 37 shows the connections for the flow of intelligence to the computer IO board and DMA. The cable 1017 is a ribbon cable typically having 50 conductors. Only the flaw data is supplied from data acquisition process unit 1003 through the DMA 106. THe units 1001, 1003, 1005, 1007 are connected to bus 1017 through the branches B, C, E, F, G, respectively. The computer 105 supplies data to the timing and control unit 1009 through the computer IO board 108 and branch A of bus 1021. Data is also supplied to the diameter data-acquisition-and-control unit through branch D of bus 1021. This data includes the raw data and fixed DCF data and the minimum diameter limit. Timing and control signals flow in both directions between the timing and control logic unit 1009 and the data-acquisition-and-processing units 1001 through 1007 through conductors represented by line 1023. Control signals flow in both directions, between the IO board 108 and the units 1001, through 1009 through conductors represented by line 1025.

The DMA has two counters (not shown): one for counting flaw words entered into the computer 105 and the other for identifying addresses for the flaw words in the computer 105. At the start of a MEASEN interval the computer enters a negative number into the first counter which is equal to the number of flaw words its memory is set to accept. As each flaw word is entered in the memory of the computer, 1 is subtracted from the negative number. When the negative number entered in the first counter becomes 0, the flow of flaw words from the FIFO buffer 1027 (FIGS. 2, 29) to the computer is stopped. The computer also enters two series of numbers in the second counter. Each number of a series represents an address reserved for flaw data in the computer. These numbers are incremented by 1 as each flaw data word is entered in the corresponding address. Two series of numbers are entered because the computer has two buffers (not shown) which accept flaw data for successive pellets. As the data in the first buffer is processed, data is entered on the second buffer at addresses in a series incremented from a second starting number. Data from a third pellet may then be entered in the first buffer as the data in the second buffer is processed. In the general practice of this invention there may be more than two sequentially operating buffers in the computer.

It is essential that flaw data be entered only during one complete revolution of a pellet P. Typically a pellet is scanned by 100 scanning lines during each revolution. The number of scanning lines per revolution are entered into the memory of the computer 105. The computer is programmed so that once the intelligence from 100 lines is received for a pellet, the computer prevents the further flow into it of flaw data. The number of word counts, positive or negative transitions, entered into the computer 105 during flaw inspection of a pellet P, is a measure of the extent to which the surface of the pellet is flawed. If the word counter in the DMA reaches 0 before the computer has received data for a complete revolution of the pellet, the pellet is rejected for excessive flaws. If the word count reaches 0 after the pellet has completed a revolution, the acceptability of the pellet is determined by computations based on the areas and perimeters of the flawed regions.

Figure 42A:
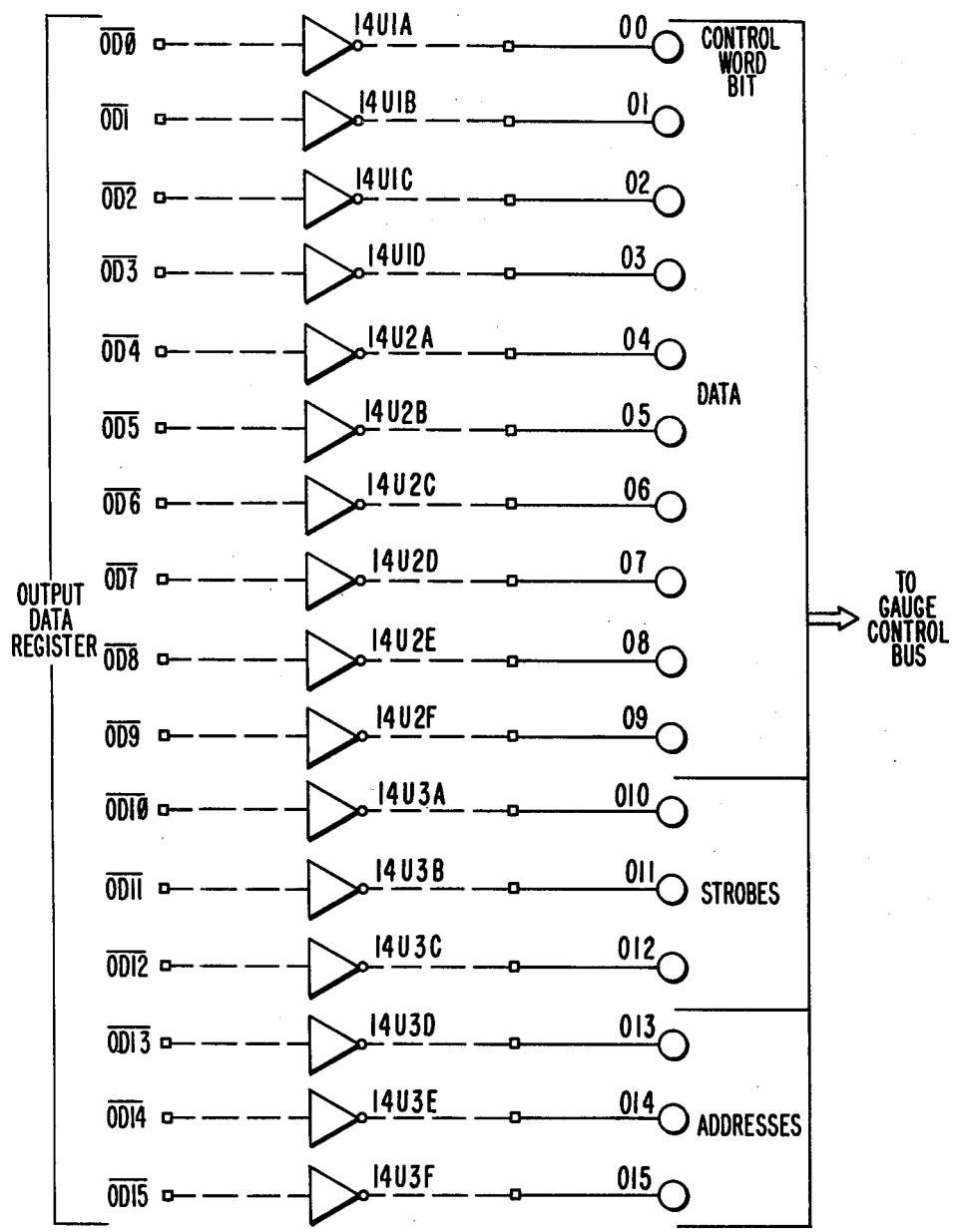
FIGS. 42A, 42B together are the schematic of the interface of the computer showing the connections of the computer to the electronics.
Figure 42B:
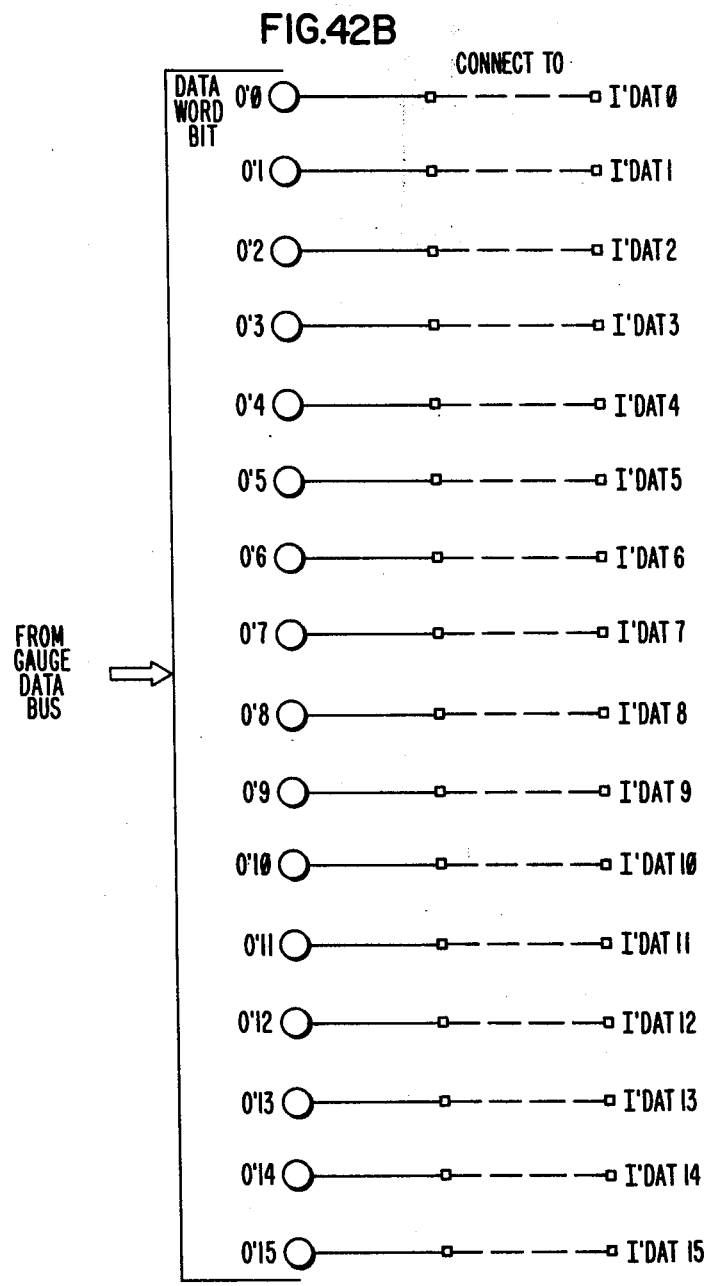
Figure 43:
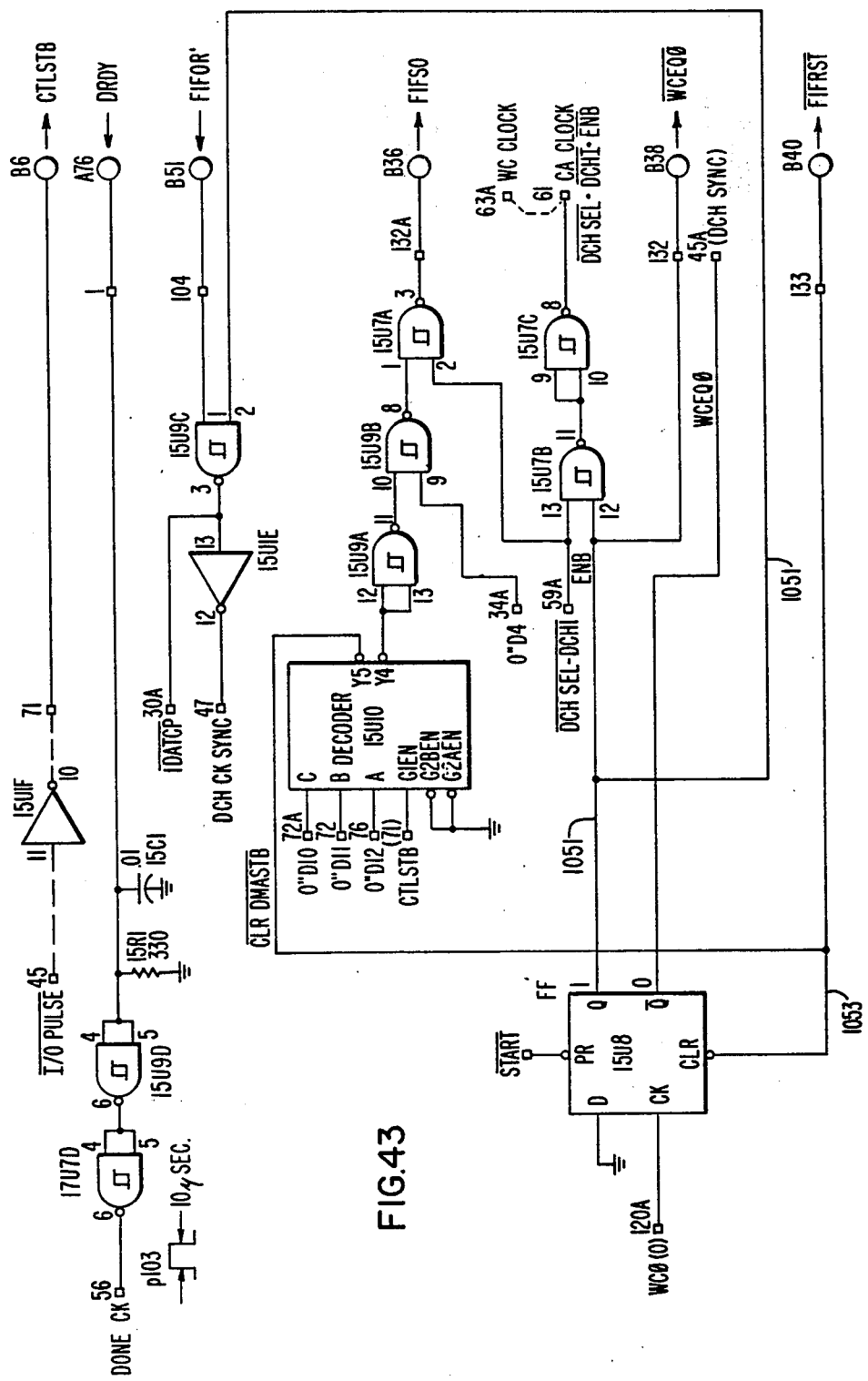
FIG. 43 is a schematic also of the interface of the computer showing the connections from the electronics to the computer and to the buffers through which the flaw data is transferred to the computer.

It appears at this point desirable to describe the part of the computer interface board 108 shown in FIGS. 42A and 42B. FIG. 42A shows on the left an array of connections 1031 between an output-data (OD) register (not shown in FIG. 42A) in the computer IO board 108 and an external IO interface board shown in FIG. 36. The register derives its data from the computer 105. The data, derived from the register impressed on conductors OD0 to OD15 and is the resulting intelligence is transmitted through terminals 00 through 015. As indicated on the right a control word bit and data words are derived from terminals 00 to 09, codes for strobes are derived from 010 through 012 and codes for addresses as to the functions of the apparatus to be carried out from 013 through 015. The data from the output data register is inverted by inverters 14U1A through 14U1D, 14U2A through 14U2F and 14U3A through 14U3F interposed between the OD input terminals and 0 output terminals. The data from 00 through 015 is impressed on input terminals O′D0 to O′D15 of external interface, FIG. 36.

The array 1033 in FIG. 42B shows the connections for transmitting 16-bit data words from the multiplexer circuit shown in FIG. 37 to a register (not shown in FIG. 42B) in the IO board. The data in this register is entered into the computer 105 proper. The data from multiplexer 1019 shown in FIG. 37 is transmitted from terminals IDAT0 through IDAT15 to input terminals O′0 through O′15 (FIG. 42B) and thence to terminals I′DAT0 through I′DAT15. The data on I′DAT0 through I′DAT15 is entered in the register and from the register into the computer proper.

The supervisory computer 107 serves to program the dedicated computer 105. The program may also be entered on a disc or tape and the dedicated computer 105 can be programmed from the disc or tape independently of the supervising computer 107. The computer 107 also serves to carry out statistical analyses of the data acquired by the dedicated computer 105. It also may retain in its memory the DCF data developed by the dedicated computer so that if this data is erased from the dedicated computer 105, it may be replaced without a new calibration operation.

The block diagram of FIG. 2 shows generally and conceptually the manner in which data flows into the IO board 108 and through it into the computer 105 proper. The flaw data is supplied at a high rate. The scanning motor 901 typically operates at a speed of 8025 RPM (Wilks application page 66) and during each revolution the pellet P is scanned 8 times by 8 prisms. Each scan takes place in 0.93 ms. Because of the rate at which flaw data is acquired, it is stored temporarily in FIFO buffer 1027. From the buffer the flaw data is supplied to the multiplexer 1019 through branch cable 1035, typically carrying 16 wires for 16 bits. The remainder of the data for diameter, length and weight is supplied to the multiplexer 1019 through branch cable 1039 also of 16 wires. The flaw data is strobed into the FIFO buffer 1027 by a strobe entered through conductor 1041. The flaw data is strobed from the FIFO buffer 1027 on the entry of a strobe through conductor 1045 FIFSO, FIFO shift out, from the IO board 108 (output terminal B36 FIG. 43). The data in the buffer 1027 is strobed into the multiplexer 1019 as it is ready at the output. The buffer is reset by a reset 0 signal on its MR input on conductor 1047, FIFRST, FIFO reset, from the IO board 108 (FIG. 43 output terminal B40).

The multiplexer outputs data to the computer 105 through the IO board 108, through the 16 wire conductor 1022 (wires O′0 through O′15, FIG. 42). The output of data by multiplexer 1019 is selectively controlled by flip-flop 12U5 (FIG. 37). The control signal is entered on input D of the flip-flop 12U5. There is normally a 0 level on the Q output flip-flop 12U5. The output at Q is impressed on the output control of multiplexer 1019. With a 0 level on Q, multiplexer 1019 is set to output data for diameter, length and weight. If flaw data is selected a 1 level is entered on input D of flip-flop 12U5. The flip-flop 12U5 is clocked by the flaw or data strobe to enter a 1 on output control of multiplexer 1019 and the multiplexer is set to output flaw data. The 1 on Q output of flip-flop 12U5 also is entered at one input of AND 1049 shown in FIG. 2. As the output of the buffer 1027 (FIG. 2) is ready to output its data to the multiplexer 1019, a 1 pulse is delivered from its output-ready terminal to an input of AND 1049. This AND produces a 1 pulse at its output FIFOR, FIFO ready. This pulse is impressed on terminal FIFOR′ of the IO board 108 (FIG. 43).

At this point it is desirable to describe the operation of the part of the IO board 108 shown in FIG. 43. Flip-flop 15U8 is preset and at the start has a 1 on its Q output and 0 on its $\bar{Q}$ output. There is then a 1 level on conductor 1051 and on input 2 of Schmidt NAND 15U9C. A 1 pulse on FIFOR′ produces a 0 pulse at output 3 of 15U9C and on terminal 30A, $\overline{\text{IDATCP}}$, input-data clock pulse. This signal enables the input data register (not shown) of the IO board 108 to receive data from the FIFO buffer 1027 through the multiplexer 1019. A 1 is also entered through inverter 15U1E on terminal 47 DCH CK SYNC, data channel clock synch. This signal causes the computer to arbitrate between different data sources which are seeking input and to assign priority to the sources. Assuming that priority is assigned to the flaw data, a 0 pulse is entered on terminal 59A, $\overline{\text{DCH SEL.DCHI}}$ data-channel select data-channel input. There is at this time a 0 from O″D4 on pin 34A. There is a 1 on input 1 of NAND 15U7A. In the absence of the $\overline{\text{DCH SEL.DCHI}}$ 0 signal on terminal 59A, there is a 1 on this terminal and on input 2 of NAND 15U7A. There is then a 0 on terminal B36, FIFSO, FIFO shift out. When the 0 pulse $\overline{\text{DCH SEL.D CHI}}$ is entered, there is a 1 at terminal B36, FIFSO. This 1 pulse is impressed as a strobe on FIFO buffer 1027 through conductor 1045 (FIG. 2). The word at the output of buffer 1027 is then strobed into the input data register (not shown) of the IO board 108. From this register the data is transferred to one of the buffers (not shown) of the computer for processing. Only 1 $\overline{\text{DCH SEL.DCHI}}$ pulse is transmitted for each transfer of data from the FIFO buffer 1027 to the computer.

When the 0 $\overline{\text{DCH}}$ $\overline{\text{SEL.DCHI}}$ is entered, a 0 is entered on input 13 of 15U7B. A 0 is entered on output 8 of 15U7C and on output terminals 63A and 61. The address register or counter and the word count of the IO board 108 are incremented by 1. An address is provided for the data derived from the buffer 1027 (FIG. 2) and 1 is subtracted from the negative word count entered in this counter. When the word count in the word counter reaches 0, a clock pulses is entered at input CK of flip-flop 15U8. Output Q becomes 0 level and output $\overline{\text{Q}}$ becomes 1 level. The 0 on conductor 1051 blocks further FIFSO signal pulses. A 0 appears on terminal B38 $\overline{\text{WCEQ 0}}$, word count equal 0. The bar over this mnemonic means that with a 1 on terminal B38 the word count is not equal to 0. A 1 also appears on terminal 45A WCEQ O, word count equals 0. A 1 level is entered on DCH SYNC preventing pulses from demanding computer time.

The decoder 15U10 performs two functions: it clears flip-flop 15U8 and resets the FIFO buffer 1027 and it serves for checking the transmission of data during a diagnostic operation. Binary code derived from the computer 105 through conductors O"D10, O"D11, O"D12 serve to set the function of the decoder. The control strobe, CTLSTB, at input 71, G1en G1 enable, which enables the decoder is commanded from the computer by the IO pulse through inverter 15U1F. For a binary 5 on the inputs A, B, C of the decoder 15U10, a 0 pulse, $\overline{\text{CLR DMA STB}}$, clear DMA strobe, is delivered at output Y5. This strobe is impressed on conductor 1053. It clears flip-flop 15U8. This 0 pulse is also delivered at output terminal B40, $\overline{\text{FIFRST}}$, FIFO reset. Through this terminal and conductor 1047 (FIG. 2) this pulse is entered on the MR, master reset, input of FIFO buffer 1027 resetting this buffer.

For diagnostic purposes, a binary 4 is entered on conductors O"D10, O"D11, O"D12 of decoer 15U10. When this decoder is strobed at input G1EN, a 0 pulse is delivered at output Y4. A 1 pulse is entered at input 10 of NAND 15U9B. At the same time a 1 level is entered from conductor O"D4 on terminal 34A and on input 9 of NAND 15U9B. A 0 pulse is entered on input 1 of NAND 15U7A and a 1 is entered on output terminal B36, FIFSO. The FIFO buffer 1027 is shifted one step.

At this point it is desirable to describe the timing pulses which are produced during measurement and the relationship. FIG. 4 is a timing chart relating to this aspect of this invention. Discussion of FIG. 4 will here be supplemented by discussion of the related part of FIG. 41.

In each of the graphs a through i of FIG. 4 time is plotted horizontally and amplitude, 1 or 0 vertically. The points of intersection of a vertical line with the axes a through i identify the same instant of time. FIG. 4 presents the timing chart for part of one cycle of the operation, from 0 to 190 ms into the cycle with reference to FIG. 3. The times in the cycle are shown at the top of FIG. 4.

Figure 41A:
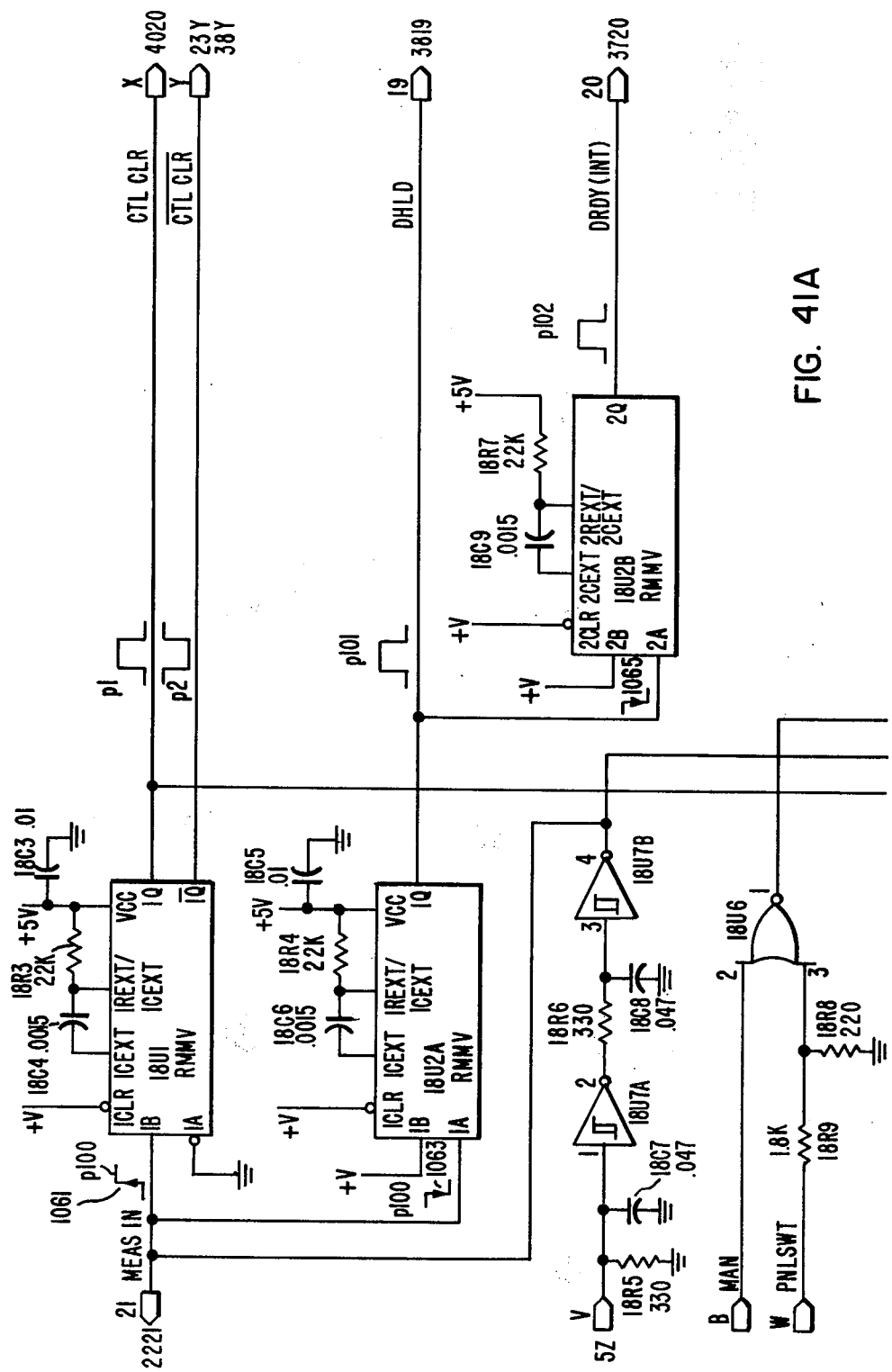
FIGS. 41A, 41B together are the logic schematic of the various control functions of the mechanical system and the electronics including the components responsive to the proper positioning of the pellets in the stations.

The signal impressed on input terminal V FIG. 41 is the long 1 MEASEN, measurement enable, pulse derived from PC6 (FIGS. 1A, 5). The pulse is processed through Schmidt triggers 18U7A and 18U7B and filters 18R5–18C7 and 18R6–18C8 (FIG. 41A) to provide a clean pulse p100 which rises and falls abruptly at leading and trailing edges. FIG. 4a shows the MEASEN pulse p100. The leading edge 1061 of pulse p100 is entered on input 1B of retriggerable monostable multivibrator 18U1 (FIG. 41) producing the 1 pulse p1, CTL CLR, control clear, shown in FIG. 4b at the 1Q output and the 0 pulse p2 at 1$\overline{\text{Q}}$ output. The duration of these pulses is determined by the time constant of the network 18C4–18R3. Networks of this type are included throughout this application on retriggerable monostable multivibrators and other like components. It appears unnecessary to refer to this network at every place in the specification where it appears. The CTL CLR pulse p1 is entered on input terminal 20 of the circuit shown in FIG. 40B. This pulse is processed by Schmidt triggers 17U10C and 17U10D and by delay capacitor 17C9 and Schmidt trigger 17U108 producing a pulse p104 $\overline{\text{CLR DLY}}$, clear delay, presented in FIG. 4b. Pulse p104 is impressed to clear flip-flops 17U11A, 17U11B, 17U11C (FIG. 40D) which control the transmission and display of intelligence involving the sorter 137. Pulse p104 is delayed to preclude clearing before data is entered into the computer for processing.

The trailing edge 1063 of pulse p100 is impressed on input 1A of retriggerable monostable multivibrator 18U2A (FIG. 41A), producing the 1 pulse p101 at its 1Q output. This is DHLD, data hold, pulse plotted in FIG. 4c. The trailing edge of pulse p101 is impressed on input 2A of retriggerable monostable multivibrator, 18U2B producing pulse p102 at output 20. This pulse is DRDY-(INT), data ready, (interrupt), presented in graph 4d. The INT signifies an interrupt command to computer 105 to enter the measurement data (other than flaw) derived during the cycle. This signal is entered at terminal A76 of the computer IO board 108 (FIG. 43). Pulse p102 is impressed on inputs 4 and 5 of Schmidt NAND 15U9 whose output is impressed on inputs 4 and 5 of Schmidt NAND 15U7 producing sharp pulse p103 commanding the computer to interrupt the receipt of flaw data and to receive diameter, length and weight data.

On receiving the DRDY the dedicated computer 105 reads the diameter, length and weight data. The READ DATA pulse presented in FIG. 4e is symbolic of reading of this data. After this the computer sends the SORT COMMAND pulse presented in FIG. 4f and the mechanical system is set for sorting. The PLDRP, pellet drop, signal is received from photo-sensor PC3 (FIG. 5) during the first 10 ms of the succeeding cycle and is presented in FIG. 4g. The pulse causing operation of the escapement pellet clamp is presented in FIG. 4i. During the 0 interval of graph i, the escapement solenoid (218 Wilks FIG. 3) is actuated and another pellet flows into pick-up station 123 (Wilks FIG. 1). During the 1 interval of graph FIG. 4i, the solenoid is deenergized and the pellet following the one which flowed into station 123 is clamped by the action of a spring (217 Wilks FIG. 4).

For an understanding of diameter measurement of pellets, a brief description of the apparatus for measuring diameter is desirable. The optical system for measuring diameter is disclosed in detail in Wilks application with reference to FIGS. 53 through 59. For the purpose of this application FIGS. 6 and 6A will suffice. The numbering in FIG. 6 is the same to the extent practicable as the numbering in Wilks application.

A thin vertical beam 878 from a laser (not shown) is incident on an octagonal scanning prism 861 rotated about a vertical axis by scanning motor 863. A skirt 866 extends from the prism 861 and is rotatable therewith. The skirt 866 has a plurality (8) of uniformly spaced slots 885 each slot corresponding to a face of the prism 861. There is also an additional (9th) slot 887 between two of the uniformly-spaced slots. The skirt 866 is interposed between a source 891 an a photo-diode or photo-transistor 893. As the skirt rotates the device 893 produce 9 pulses, eight of the pulses occur at equal time intervals and the 9th between two of the equally spaced pulses. The equally-spaced pulses are impressed into the electrical system to define addresses for the positions of the scan. The 9th pulse serves to identify the first prism face of the scan; i.e., the first set of addresses.

As the prism rotates it converts beam 878 into a thin vertical beam 307 which sweeps horizontally. The beam 307 is projected on pellet P by dove prism 301. As the beam sweeps, it scans thin transverse sections of the pellet. The pellet produces a shadow in the beam at each position of the scan. The height of the shadow depends on the diameter of the pellet at the position of scan. The resulting beam is collimated and imaged on diode array 869 by lenses 867, 873, 875. Screen 871 suppresses spurious rays. Typically diode array has 1024 diodes.

FIG. 7 shows diagrammatically the essential features of the pattern which is projected on the diode array 869 with the difference in diameter exaggerated. The top of the array is masked by tape 1102 limiting the number of diodes exposed. The shadow of a small-diameter pellet is shown in the doubly-hatched section 1065 at the bottom of the array. The shadow of a large-diameter pellet includes both the doubly-hatched section and the singly-hatched section 1067. The array is scanned by a pulsating signal from the Reticon board 870. The number of pulses produced during the scanning of the lighted diodes is a digital measure of the diameter. In practice a number (511) is inserted in a counter and the diameter is determined by subtracting from it the number of pulses produced when the lighted or illuminated diodes are scanned.

The diode array 869 is adjustable vertically, up and down, and horizontally, from side to side. It may also be rotated about a horizontal axis. The diode array 869 must be so set that the light pattern produced by scanning each pellet remains along the array as the scanning beam sweeps over the pellet. The pattern and array 869 need not be set so that the bottom of the shadow of the pellet is precisely at the bottom of the array (FIG. 7). The determination is made from counts of lighted diodes between the bottom 1100 of the tape 1102 and the top of the shadow. This is essentially an arbitrary number but this number is related to a linear calibration curve from which the diameter of a pellet in inches or centimeters is derived. This curve is based on a calibration measurement of precisely machined calibration mock-up pellets of known diameter. Typically 15 such pellets of the highest acceptable diameter and 15 pellets of the lowest acceptable diameter are machined. The actual dimensions in inches (or centimeters) of these pellets are measured. The deviations from the assigned highest and lowest diameters must be within close limits. The mean maximum counts for the highest-diameter pellets and for the lowest diameter pellets are determined in the same way as the maximum diameters are determined for fuel pellets. Each mean maximum count together with the corresponding mean diameter in inches defines a point on a linear curve in the memory of computer 105 which presents inches of the diameter as a function of counts. For any count for a fuel pellet the diameter of the pellet in inches can be derived from the curve. It is essential that the setting of the diode array relative to the pellet seat on station 127 should be set precisely and remain so set for all calibration as well as all fuel pellet measurements.

The diameter measurement is shown generally in block diagram in FIG. 8 and in detail in FIGS. 9 through 12. The scanning prism sync signals 1071 are supplied to the scan word address (SWA) generator 1073 (FIGS. 9A, 9C). The SWA generator is controlled from the control logic 1075 shown predominately in FIGS. 9 and 10. The control logic also sends trigger signals to the Reticon board 870 to synchronize its operation. The control logic 1075 receives clock signals (CK) (FIG. 10) and End-of-Line (EOL) signals from the Reticon Board 770. The clock signals synchronize the operation of the control logic 1075 with internal clock of the Reticon board 870. The EOL signals mark the end of each scan of the diode array 869. The video which marks the duration of the scan of lighted diodes is derived from the Reticon board and is entered into the control logic 1075 through digital filter 1077 (FIG. 10C). The count of the number of pulses produced during the scan of the lighted diodes is thus transmitted to the control logic (FIG. 10) for processing. The counter 1079 (FIG. 11A) counts these pulses.

Figure 11A:
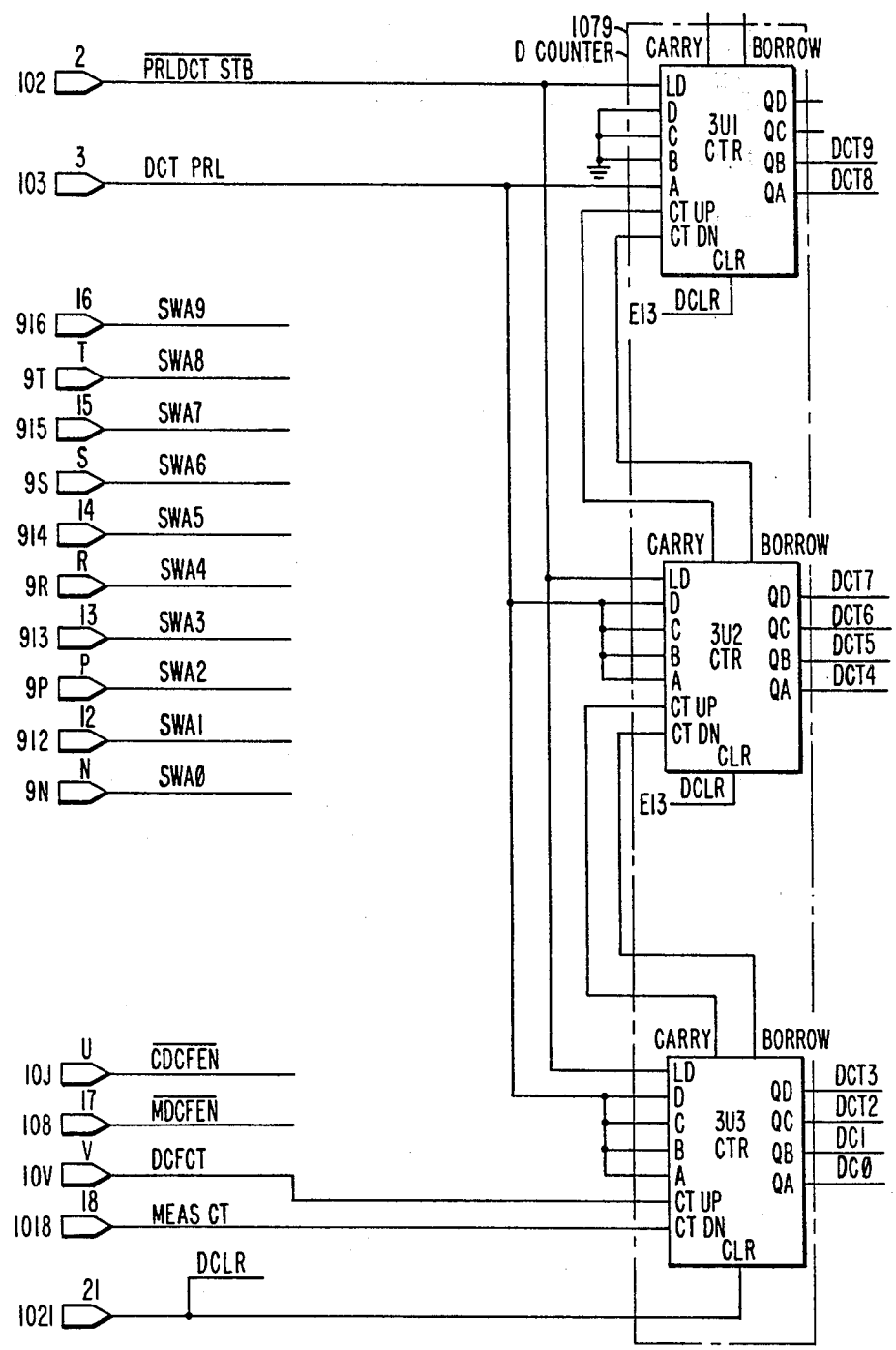
FIGS. 11A, 11B, 11C, 11D together are the logic schematic for the DCF register.
Figure 11B:
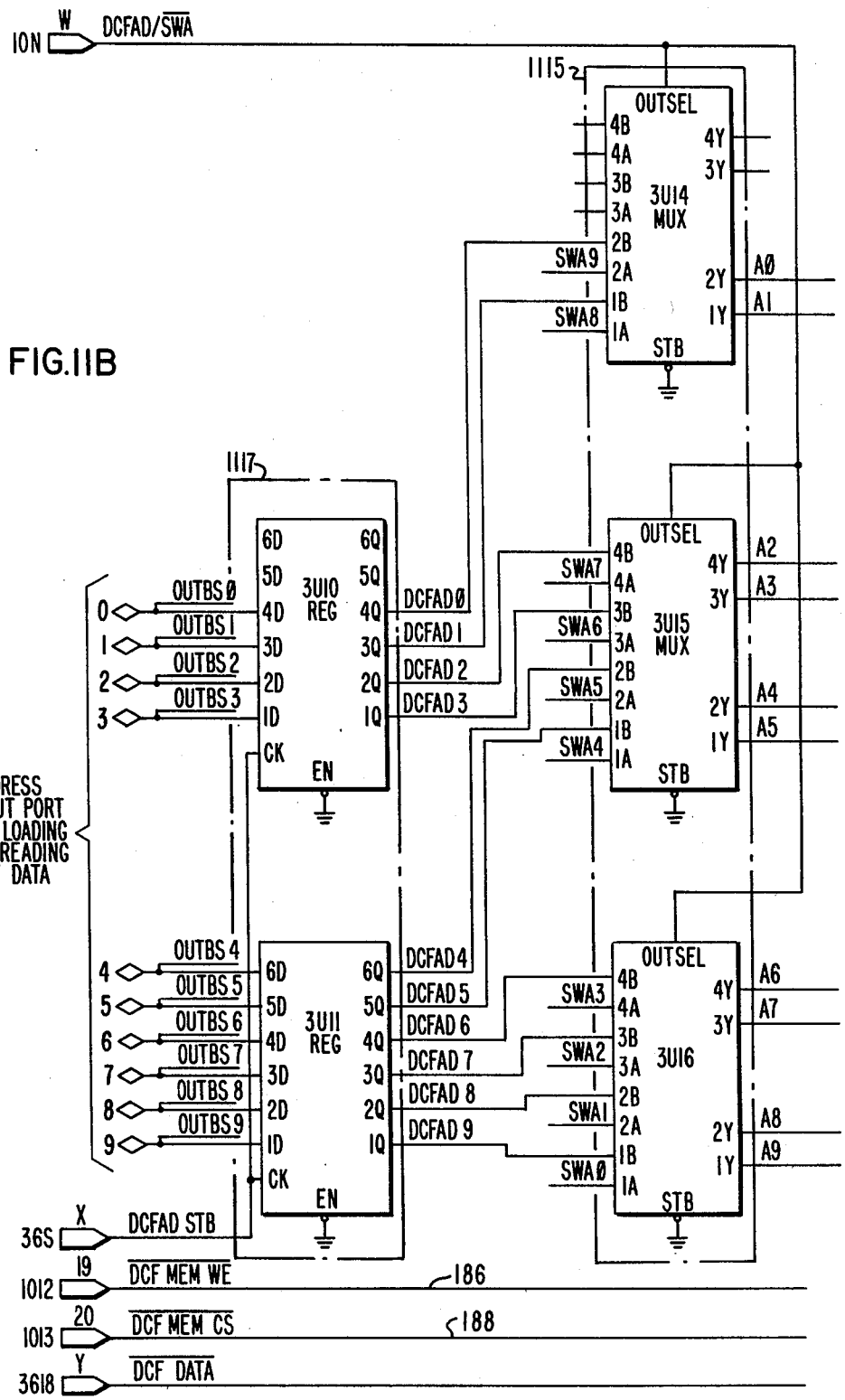
Figure 11C:
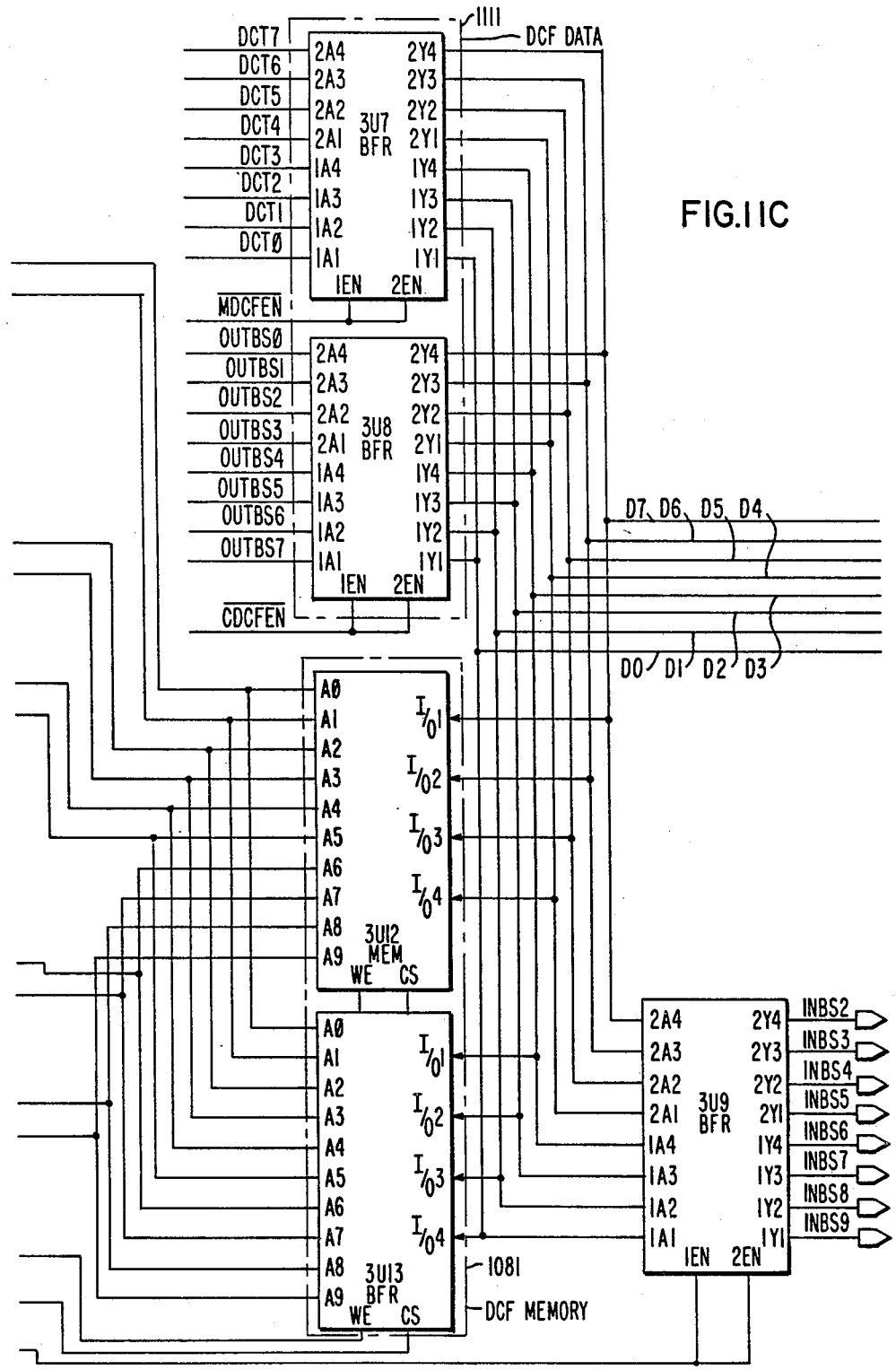
Figure 11D:
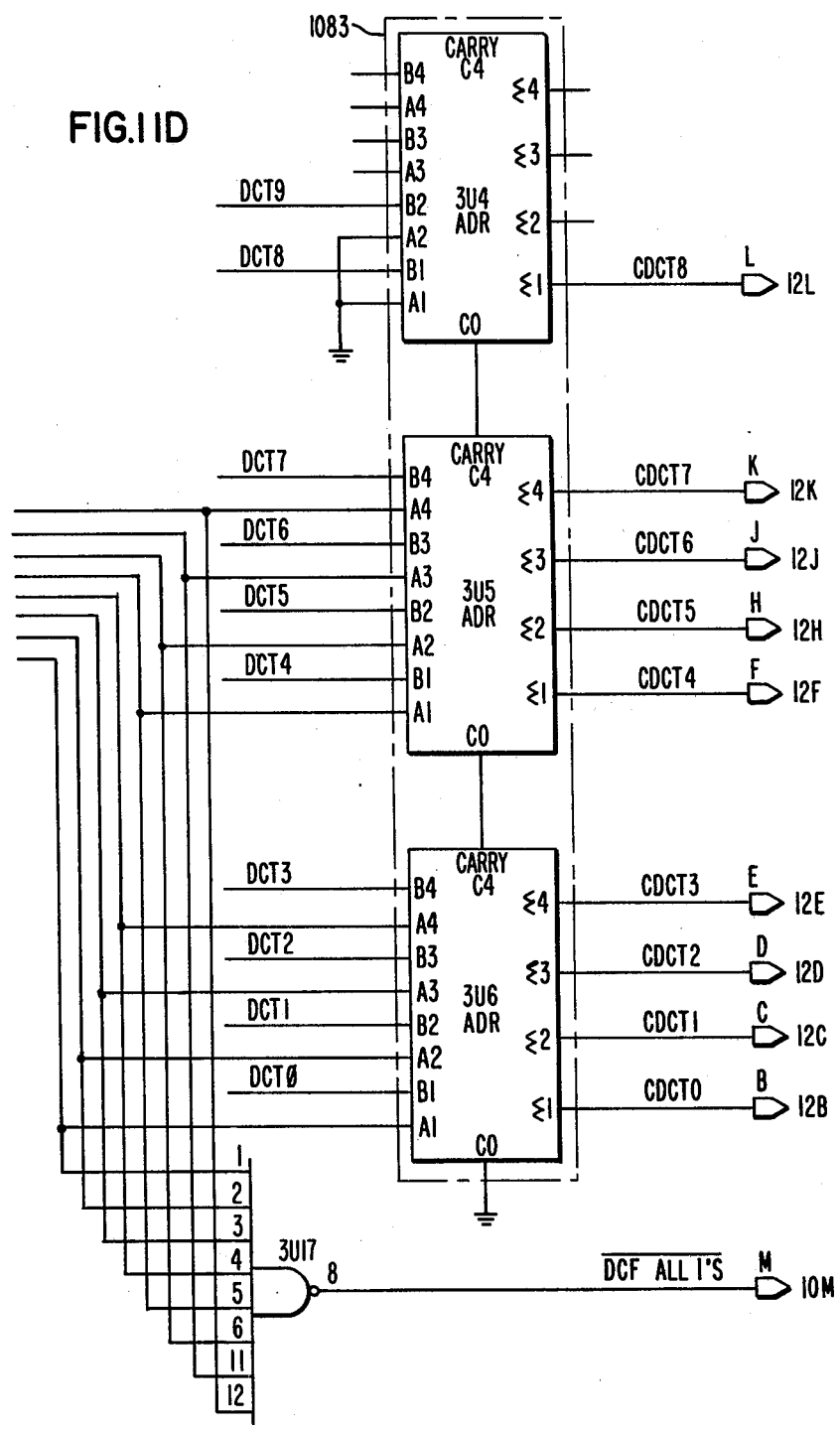
Figure 12A:
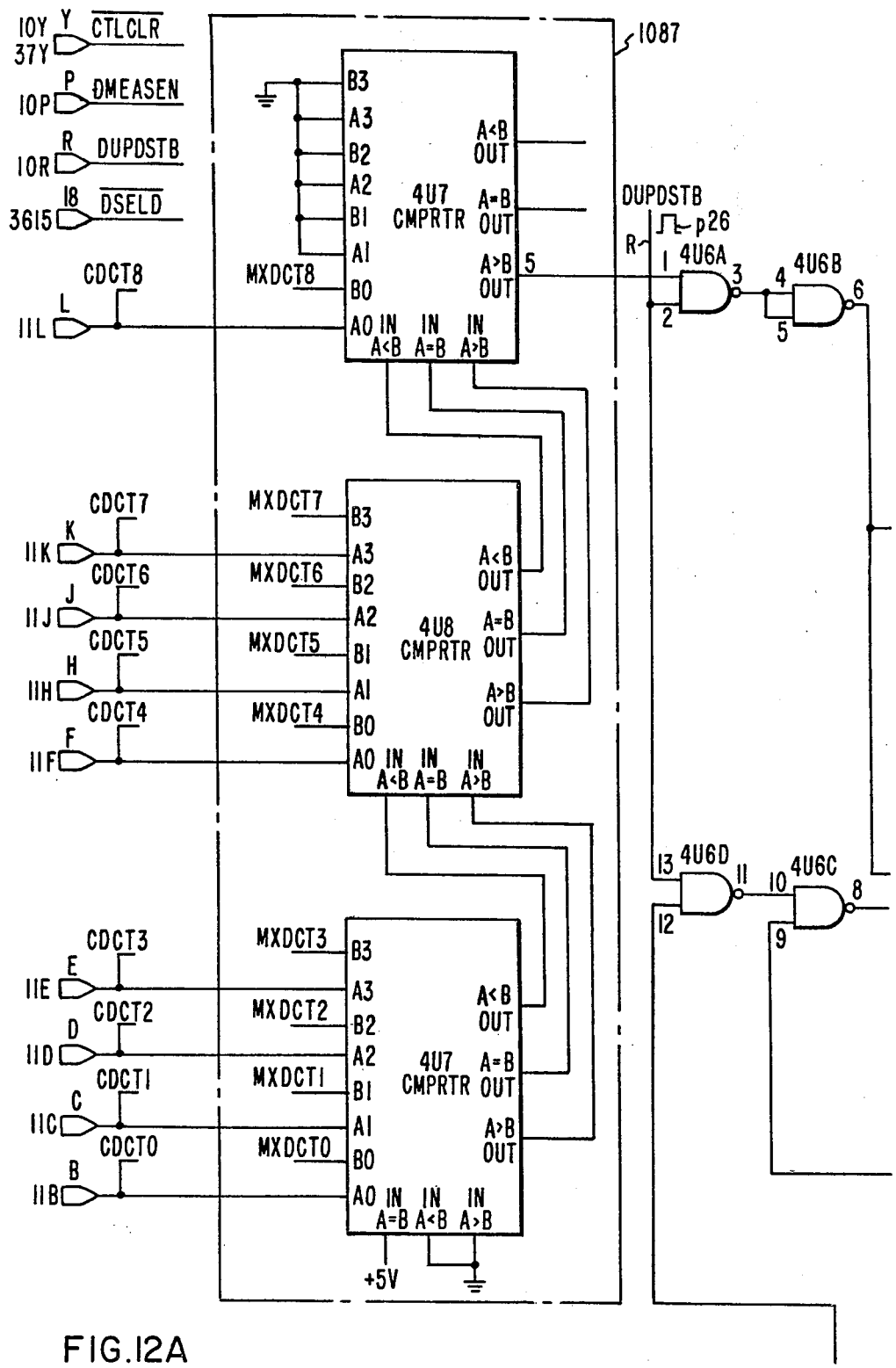
FIGS. 12A, 12B, 12C, 12D together are the logic schematic for the comparison of diameter counts to arrive at a maximum diameter measurement and a number of diameter measurements exceeding an established minimum diameter.
Figure 12B:
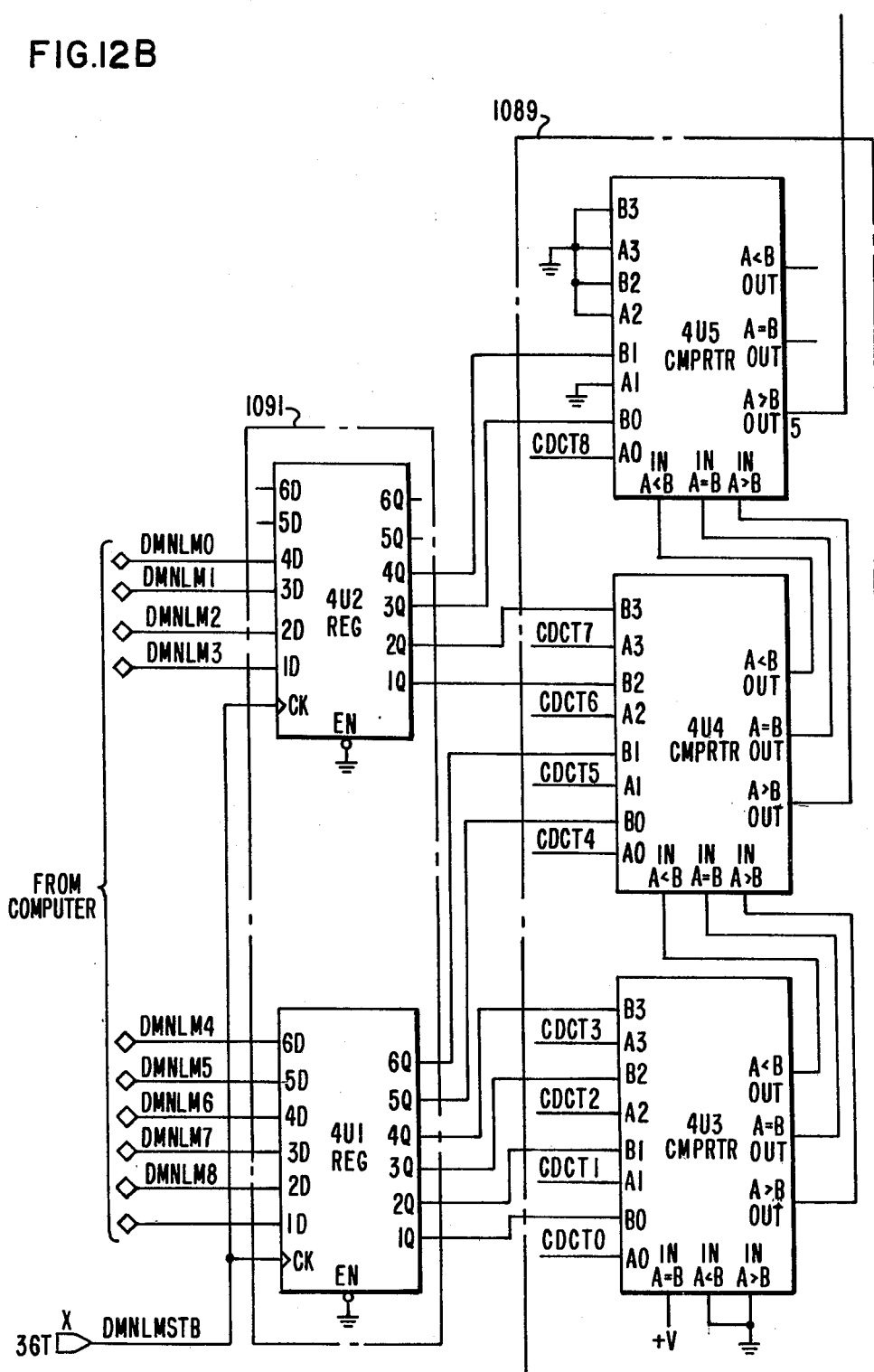
Figure 12C:
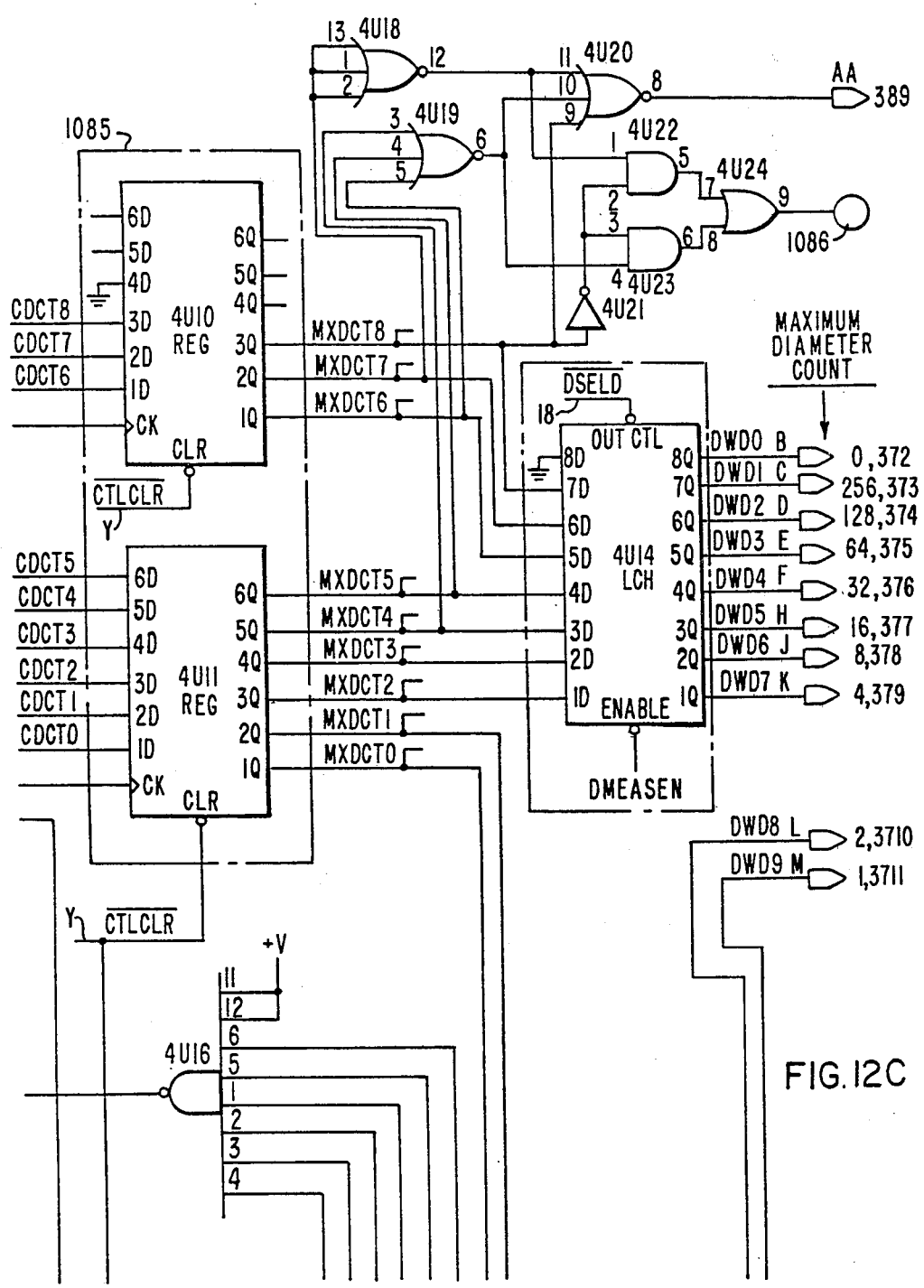
Figure 12D:
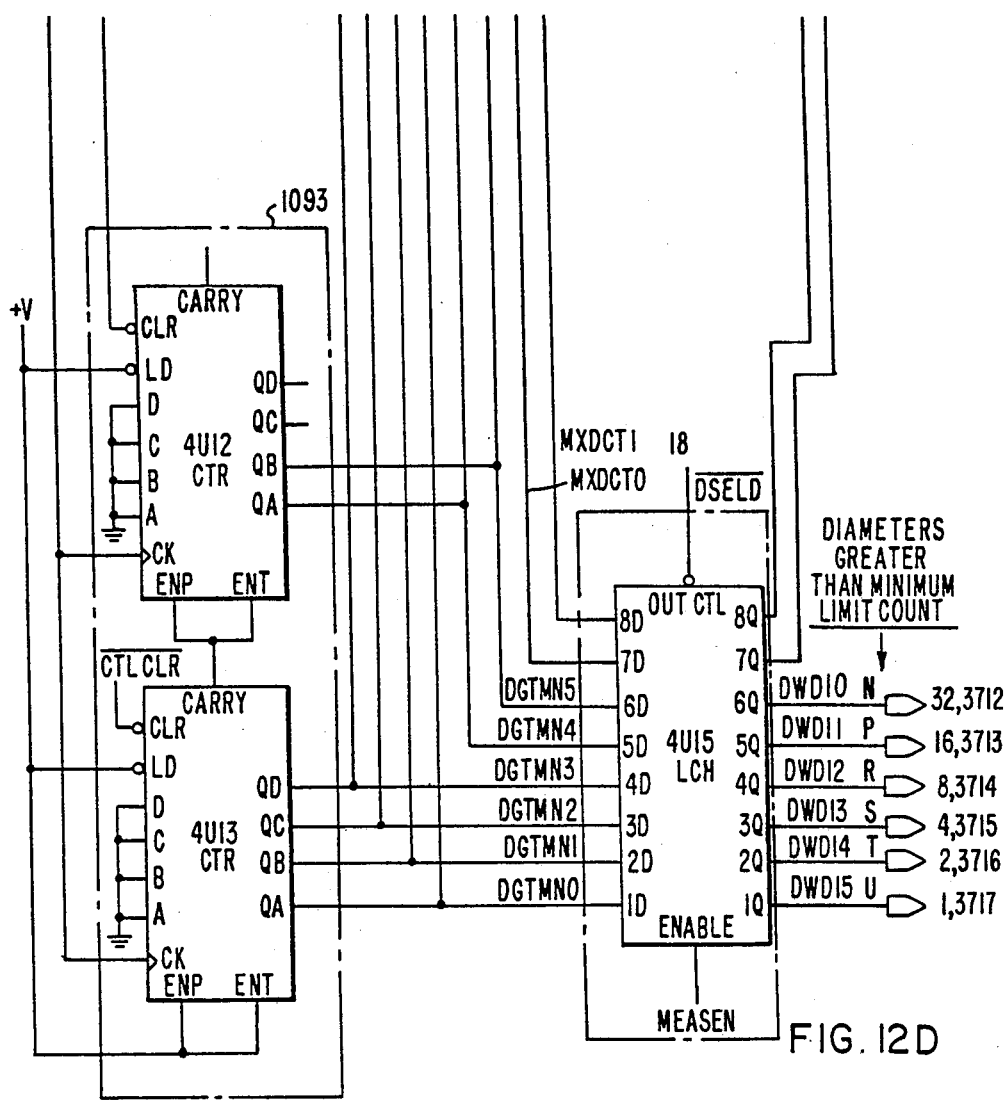

The SWA generator transmits scan-word addresses to the computer 105. The computer has previously, on measurement of a DCF calibration pellet, to be distinguished from the 30 calibrated pellets described above, computed and stored in its memory the diameter correction factor (DCF) for each address. The DCF is written into a correction factor memory 1081 at each address. The count from counter 1079 and the DCF is entered in an adder 1083 (FIG. 11D). The count for each address, corrected in the adder 1083, is supplied to storage register 1085, maximum diameter comparator 1087, and minimum-diameter-limit comparator 1089 (FIG. 12B). As the measurement progresses the temporary maximum diameter measured is entered into the storage register 1085. Each temporary maximum diameter is compared in the comparator 1087 with each new diameter measured at each element of the scan in the comparator 1087 from which it is entered into a latch 4U14. If the new diameter exceeds the temporary maximum diameter, a new temporary maximum diameter is entered into the latch and the old temporary maximum diameter is discarded. If not, the new diameter measured is discarded. The latch 4U14 is enabled by the trailing edge of the signal measuring the interval during which the diameter is measured, to latch-in the last maximum diameter. This ultimate maximum diameter determined for a scan of a pellet is processed in the computer to convert the count measured into inches or centimeters. The comparator 1089 compares the diameter count at each element of the scan with a minimum limit diameter derived from the memory of the computer 105 and stored in a minimum limit diameter storage register 1091 (FIG. 12). The number of scan elements for which the diameter exceeds the minimum diameter is stored in counter 1093 (FIG. 12) and entered in latch 4U15. At the end of each scan the count of diameters exceeding the limit is latched in by the trailing edge of the signal which latched in the maximum diameter. From the latch 4U15 the data is transmitted to the computer for processing.

A pellet is acceptable if the maximum diameter is less than a predetermined first magnitude and if the count of diameter elements exceeding the minimum is greater than a predetermined second magnitude. If the maximum diameter is greater than the first magnitude and has a count greater than the second magnitude and is otherwise acceptable, the pellet is deposited in the hold bin 149 (FIG. 1) for reprocessing. If the maximum diameter is less than the first magnitude and/or the count is less than the second magnitude, the pellet is deposited in the reject bin 151.

Figure 38A:
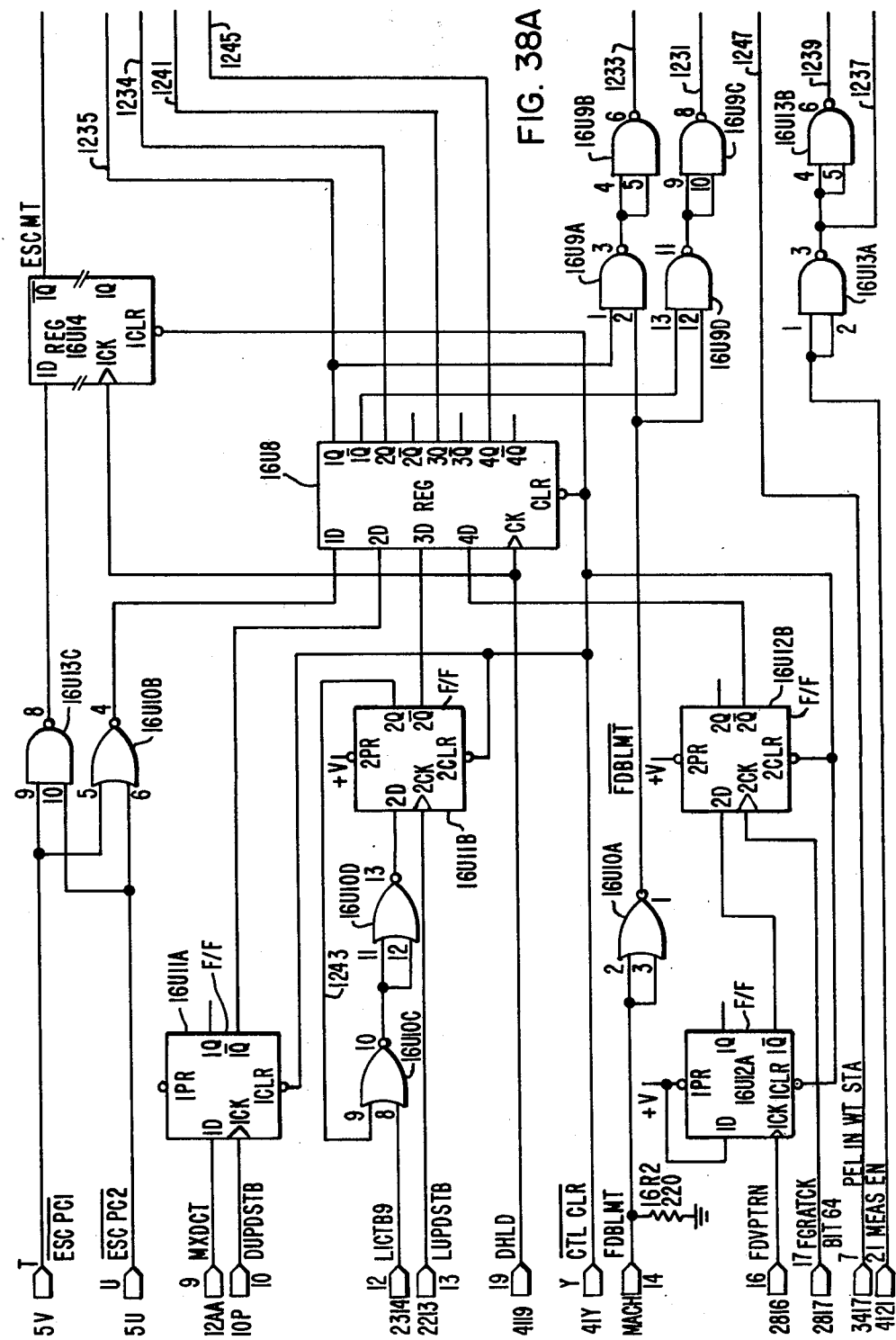
FIGS. 38A, 38B together are the logic schematic of the control for verifying that the pellets are properly positioned in the stations for inspection including the components for enabling the appropriate signals.
Figure 38B:
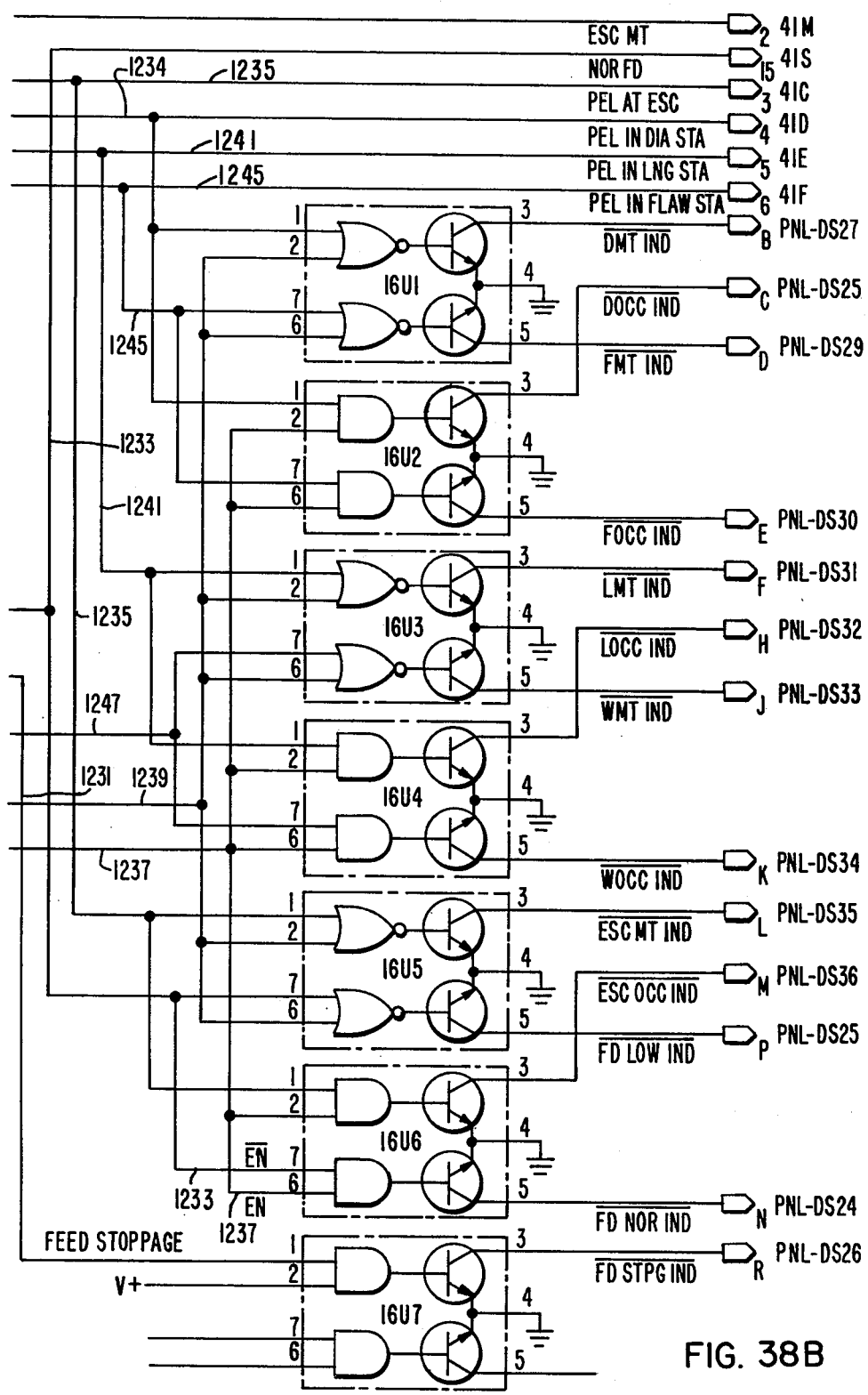

The electronics also includes a no-pellet detector 1097 (FIG. 38). The no-pellet detector receives signals from the register 1085 which verify the presence or absence of a pellet.

The SWA generator receives the pulses derived from the slots 885 and 887 (FIG. 6) in the skirt 866 of the scanning prism 861 for diameter inspection and produces the addresses of the typically 128 scan elements of inspection along the pellet P as the diameter-inspection beam scans the pellet over one prism face. The diameter inspection takes place during a sub-interval of MEASEN (FIG. 13a) which has the mnemonic DMEASEN, diameter measure enable (FIG. 13b). The pulses representing DMEASEN and MEASEN are shown at the top left of FIG. 9. The scanning prism 861 rotates continuously during the operation of the mechanical handling system and is not synchronized with the MEASEN pulse. The MEASEN pulse may start with the scanning beam at any position along the pellet. The start of the MEASEN pulse defines an initial address of the inspection beam on the pellet. The addresses of the other 127 elemental areas inspected by the beam are referred to this initial address. The completion of a diameter measurement interval for a pellet, DMEASENC (FIG. 13c pulse p18) is defined by comparison of the addresses following the initial pulse with the address (number) of the initial elemental area. When a subsequent address is the same as the initial address, the measurement interval is terminated. The addresses are impressed on the address bus of the local memory 1081 (FIG. 11C) of the control and the corresponding diameter-correction factors (DCF) are recorded at these addresses via the data bus. It is necessary that the diameter measurements be coordinated with addresses so that each measurement may be corrected by a DCF applicable to the element of the scan corresponding to this address. It is necessary that the diameter be measured to ±0.0001 or ±0.0002 inch. Correction must therefore be made for aberration of the optical system and for wobble in the rotation of the scanning prism, and for anomalies arising from diffractions etc. in the scanning beam outside of the measurement window but within the scan acquisition range of the diode array.

Figure 9A:
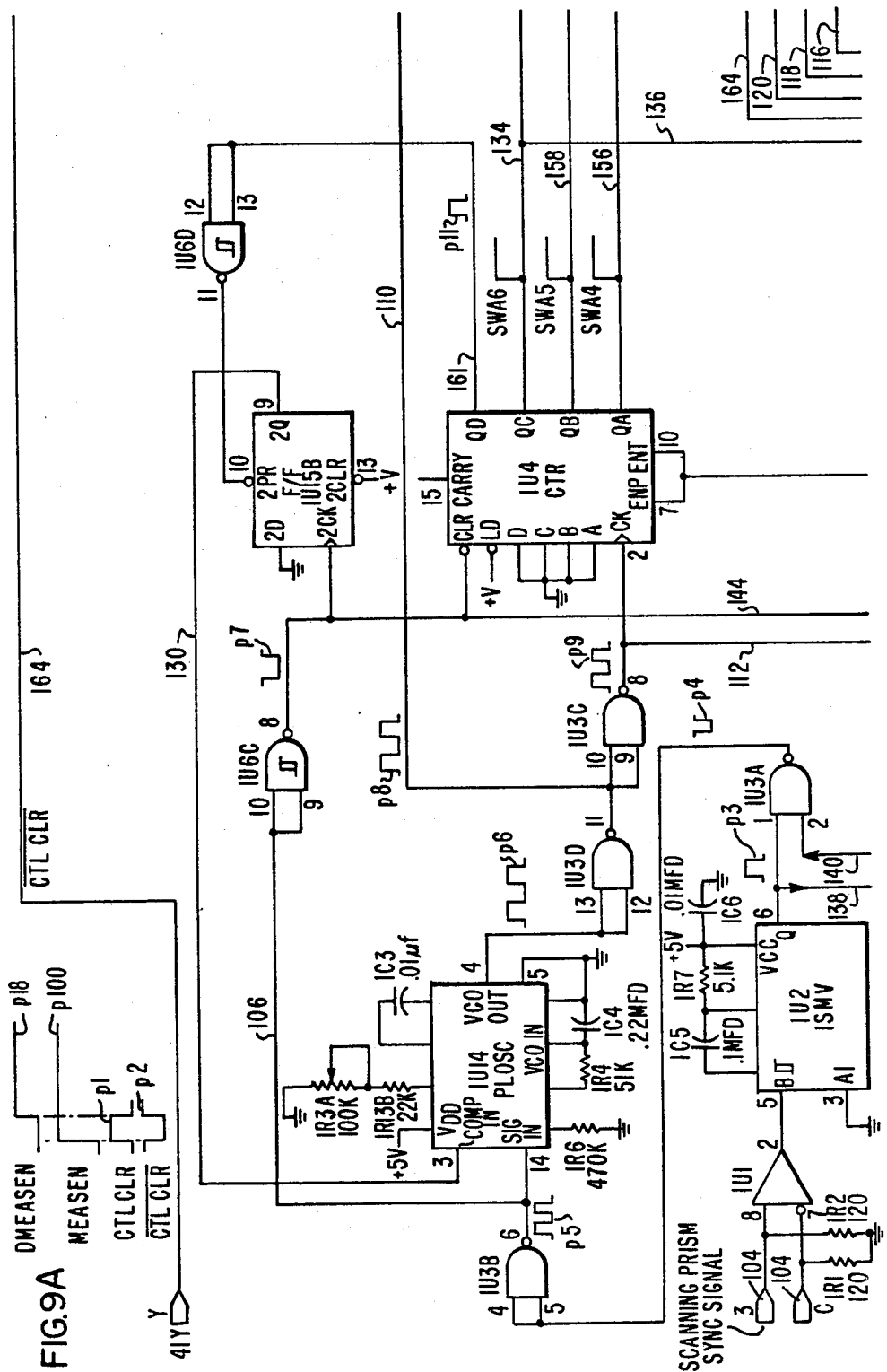
FIGS. 9A, 9B, 9C together are the logic schematic for the diameter scan-word address generator.

In the upper left-hand corner of FIG. 9A the signals which control the operation of the SWA generator are shown in addition to DMEASEN and MEASEN. The short pulses p1 CTL CLR, control clear, (FIG. 4b) and its conjugate p2 $\overline{\text{CTL CLR}}$ are derived as shown in FIG. 41 from the 1Q and 1$\overline{\text{Q}}$ retriggerable monostable multivibrator 18U1. Pulses p2 as impressed on conductor 164.

The oscillator 1U14 of the SWA generator is a voltage controlled oscillator and produces square-wave oscillations P6 continuously. The frequency of the oscillations is determined by the network 1R3A-1R3B-1C3. The network 1R4-1C4 is a filter. The DC voltage appearing at the junction 1R4 and 1C4 is the voltage which controls the frequency of the oscillator. Typically the frequency of the oscillations is 1280 Hertz. The scanning prism rotates typically at 75 RPM or 5/4 RPS. This is at the rate 10 prism faces per second. One prism face is scanned while the oscillator produces 128 waves.

Trains of timing pulses are produced by the slots 885 on the skirt 866 of the scanner 861. The control pulses from the slots 885 (FIG. 6) which are injected into the scan-word-address generator via 1U1 are shortened to 350 μs duration by 1U2; the duration between pulses is 100 ms or 100,000 μs.

The operation before a MEASEN signal is impressed will first be considered. At this time phaselocked oscillator 1U14 is oscillating and producing square waves p6 at the rate of 1280 per second (FIG. 13e). These waves are inverted by NAND 1U3D to produce waves p8 and are again inverted by NAND 1U3C to produce waves p9. The pulses p9 are impressed on output terminal L, SCADCK, scan address clock, (FIG. 9C through conductor 112. The pulses p9 are impressed at inputs CK as clock pulses on the counters 1U4 and 1U5 FIG. 9C.

The leading edges of waves p9 clock the counters 1U4 and 1U5 causing them to count from 1 to 128. The counts up to 127 are impressed on inputs 1D through 3D. of register 1U1U and 1D through 4D of 1U11. Before the signal p2 is impressed, the 1's or 0's corresponding to each count enter the count at each wave from the oscillator 1U14 in the registers 1U10 and 1U11. The counts of counters 1U4 and 1U5 are also impressed on the conductors SWA0 through SWA6. The 128th count is impressed on conductor 161 and is designated p11 (FIG. 9A).

Figure 9B:
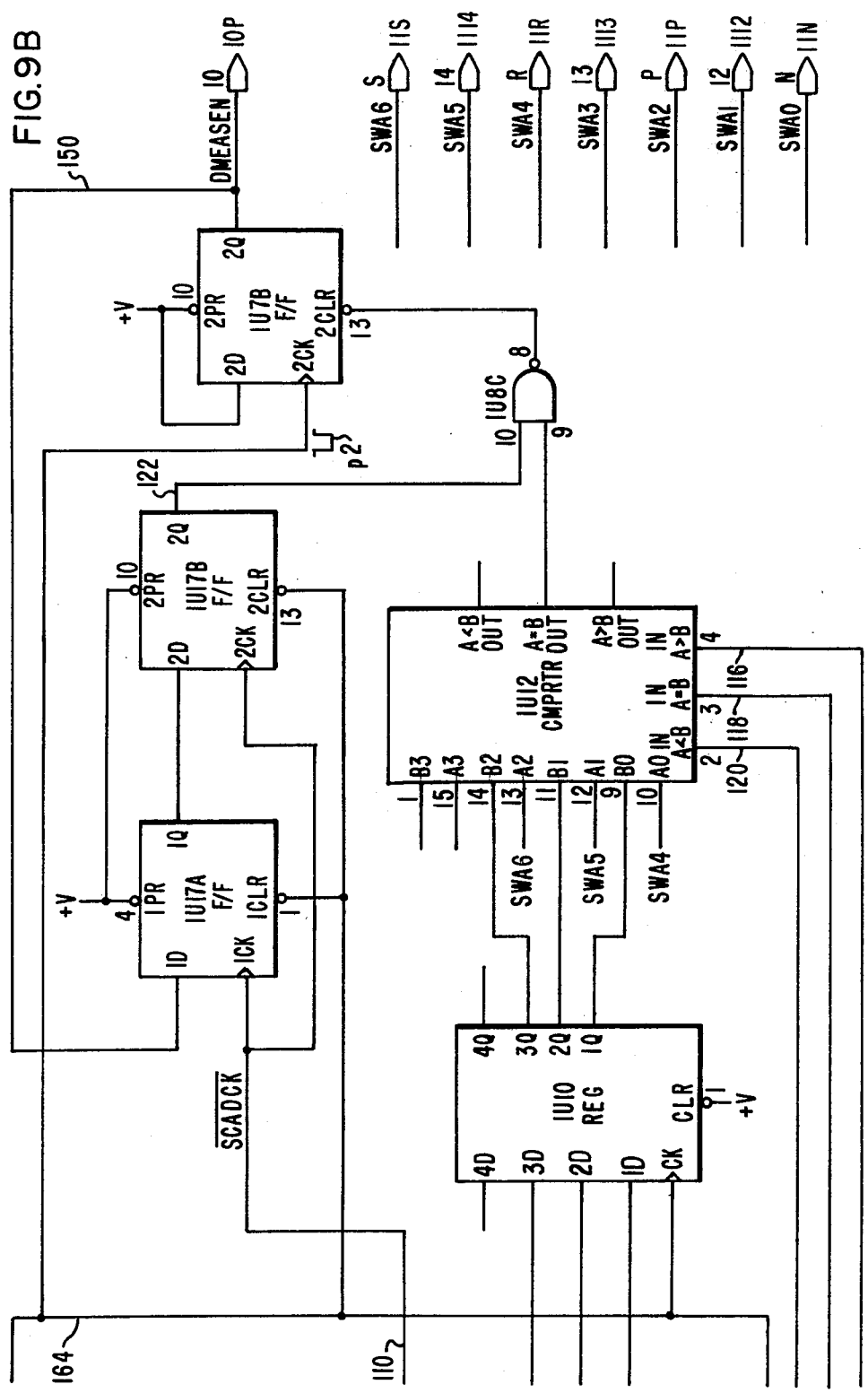

The inverted pulse p8 $\overline{\text{SCADCK}}$, is impressed as a clock pulse on flip-flop 1U17A and 1U17E (FIG. 9B). At this time flip-flop 1U7B has not received p2 as a clock pulse and there is a 0 in its output 2Q and on conductor 150. There is a 0 on input 1D of flip-flop 1U17A and there is a 0 on input 10 of NAND 1U8C from 2Q or 1U17B. Output 8 of 1U8C is 1 and no "clear" signal is applied to the 2CLR terminal 13 of 1U7B.

Counters 1U4 and 1U5 cyclically count up to 128 and then repeat. At the 128th count, flip-flop 1U15B is preset by signal p11 through conductor 161. The output 2Q is preset to 1. Flip-flop 1U15A (FIG. 9C) is also controlled by counters 1U4 and 1U5. The output 1Q of this flip-flop is 1 level after a 0 signal is impressed on preset 1PR and is 0 level when a clock pulse is impressed on input 1CK. When counters 1U4 and 1U5 count up to 64 the output (01C or 1U4) of the counter is impressed on 1PR of 1U15A from conductors 134 136 and NAND 1U6A and conductor 162. This signal is a 0 level and persists until the counters count up to 128. During this interval 1Q of 1U15A is preset to 1 and there is a 1 on conductor 140.

Figure 9C:
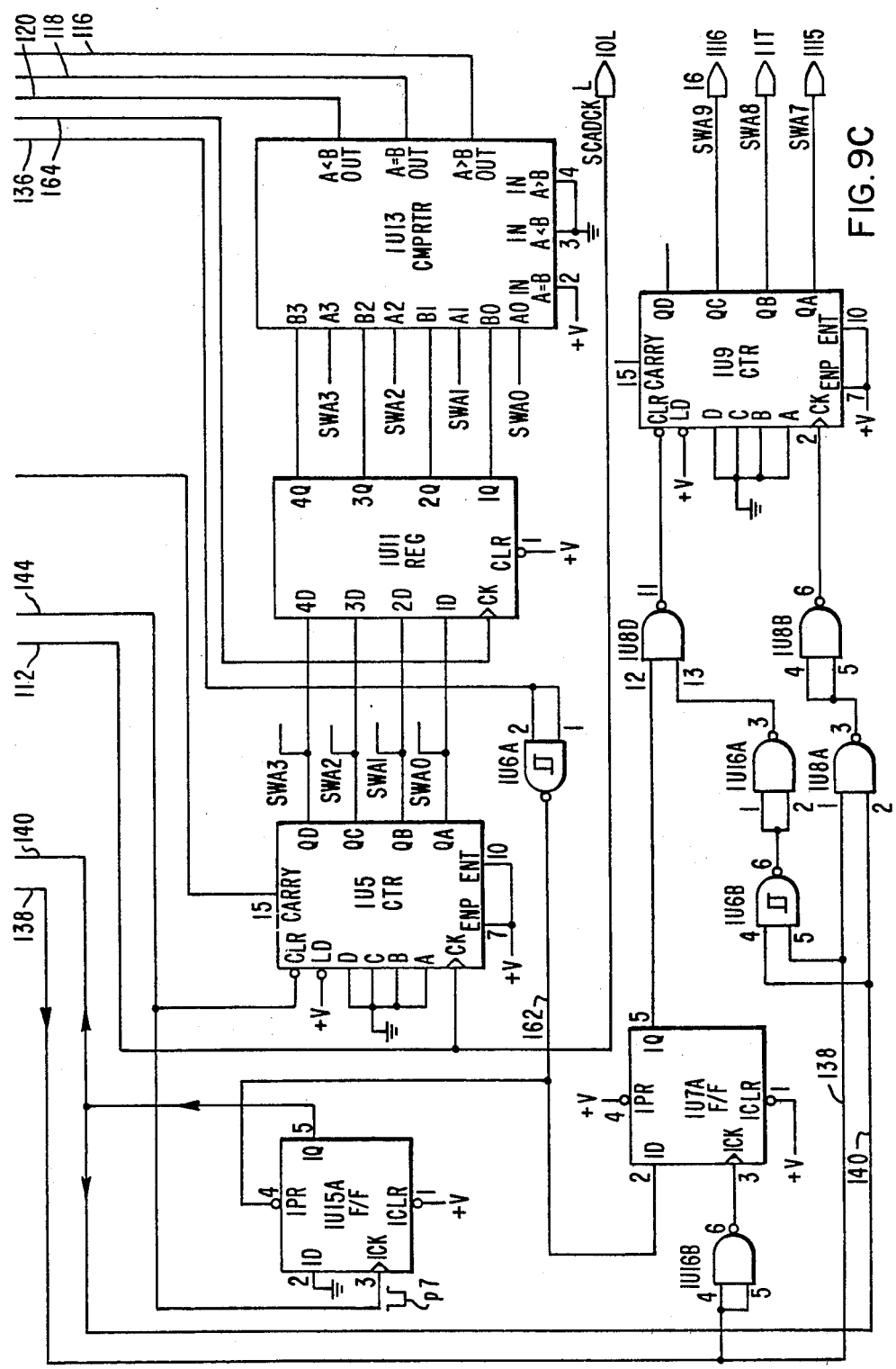

The pulses from the skirt 866 (FIG. 6) of the scanner 861 are impressed on inputs 104 of amplifier 1U1. The pulse derived from amplifier 1U1 is reduced in duration to 350 μs, typically, by 1-shot multivibrator 1U2 and this positive-going pulse p3 is impressed at the 1 input of NAND 1U3A. The counters 1U4 and 1U5 may at this time be between counts 64 and 128 or they may reach count 64 after p3 is produced. In either event flip-flop 1U15A is in preset condition by the 1 on conductor 136 through NAND 1U6KA and conductor 162. There is a 1 on input 2 of 1U3A. A negative-going pulse p4 is produced at the output 3 of 1U3A. Pulse p4 is inverted by 1U3B. This enters a positive-going pulse p5 at the SIG IN input of the oscillator 1U14 and also on conductor 106. Pulse p5 locks the oscillator 1U14 into synchronization with the scanning prism. Pulse p5 on conductor 106 is inverted by NAND 1U6C and the positive-going edge of the resulting pulse p7 clocks 1U15B to produce a 0 level on conductor 130 and the COMP IN input of oscillator 1U14. Pulse p7 also impresses a clear signal on CLR inputs of counters 1U4 and 1U5. The count of these counters then starts with 1 on the leading edge of the succeeding wave p9. The counting of counters 1U4 and 1U5 starts at the same time that a pulse is impressed from a slot 885 of the clock. When the counters 1U4 and 1U5 count up to 128, output 2Q of flip-flop 1U15B is preset to 1 level. The 1 is impressed on COMP IN of oscillator 1U14 and the transition to the 1 level serves to pull the oscillator into synchronism with the pulses from the slots 885 and to maintain the synchronism. The pulse p7 also serves as clock pulse for 1U15A through conductor 144 producing a 0 level at 1Q. Each scanner pulse then impresses a 0 on conductor 140 (FIG. 9A, 9C).

Pulse p3 is also impressed as 1 on conductor 138. After counters 1U4 and 1U5 reach the 64th count and until they reach the 128th count there is a 1 level on conductor 140. There is also a 0 level on input 1D of flip-flop 1U7A. NANDS 1U8A and 1U8B then transmit a clock pulse to counter 1U9 producing one count. A clock pulse is also transmitted by conductor 138 to 1U16B. A 0 appears on 1Q of 1U7A and on terminal 12 of NAND 1U8D. A clear signal is not transmitted to counter 1U9 because the output of 1U8D is 1. This operation continues until the 9th slot 887 (FIG. 6) produces a pulse. This happens only after the just preceding pulse 885 of the uniformly spaced pulses has produced its pulse. The counter 1U9 thus counts the 8 faces of the prism 861.

Since the counters 1U4 and 1U5 start to count on the entry of a pulse from the uniformly spaced slots 885, the 9th slot produces a pulse for counts between 0 and 128. This 9th slot 887 is positioned so that its pulse occurs before the 64th count of the cycle started by the pulse from the just preceding slot 885.

Before the 64th count there is a 0 on conductor 136 and 1 on conductor 162 and input 1D of flip-flop 1U7A is at 1. Output 1Q of 1U15 is 0 as set by the clock pulse p7. There is a 0 on input 2 of 1U3A and the 9th pulse cannot pass through 1U3A. The 9th pulse enters a clock pulse on 1U7A through NAND 1U16B and a 1 level is entered on input 12 of NAND 1U8D. At this time there is a 1 on conductor 138 from the 9th slot but a 0 at 140. There is a 0 at input 13 of NAND 1U8D. There is no clear signal in CLR of counter 1U9. Since there is a 0 on conductor 140, the 9th pulse cannot pass through NANDS 1U8A and 1U8B.

The pulse from the next uniformly spaced slot 885 is now impressed. This occurs after the 64th count. Flip-flop 1U15A is preset and its output 1Q and conductor 140 are 1. Input 13 goes from 0 to 1 when the impulse p3 from the last slot is impressed and a clear signal is entered at CLR at 1U9, clearing this counter. A clock signal is also entered on 1U9 but is overridden. A new count of the faces of prism 861 starts.

Now assume that a MEASEN signal has been entered and p2 is impressed on conductor 164. Pulse p2 impresses clock signals on registers 1U10 and 1U11 transferring the count registered at the instant when p2 is impressed to inputs B0 through B3 of the comparators 1U12 and 1U13. At this time the same count is impresed on conductors 1SWA0 through 1SWA6 and on inputs A0 through A3 of the comparators 1U12 and 1U13. However, there is a 0 on terminal 10 of 1U8C from output 2Q of flip-flop 1U17B and the signal indicating equality of the counts (A=B) on 1SWA0 through 1SWA6 and that in the Q outputs of registers 1U10 and 1U11 cannot pass through 1U8C. Pulse p2 is also impressed as a clock pulse on 1U7B starting the DMEASEN signal. The pulse p2 produces a 1 level at output 2Q of flip-flop 1U7B and on the 1D input of flip-flop 1U17A. On the next p8, e,ovs/SCADCK/ pulse 1U17A is clocked producing a 1 level at output 1Q of 1U17A and on input 2D of 1U17B. On the third e,ovs/SCADCK/ pulse flip-flop 1U17B is clocked producing a 1 on output 2Q of 1U17B and on input 10 of 1U8C.

Counters 1U4 and 1U5 continue to count increasing the counts on inputs A0 through A3 of comparators 1U12 and 1U13. When the counts on the A inputs equal the counts on the B inputs, a 1 is entered on input 9 of NAND 1U8C. A 0 is produced on output 8 of the NAND. Flip-flop 1U7B is cleared and the DMEASEN interval is terminated. Since 1 DMEASEN starts with the address count at the start of a scan and ends with the same address count after one scanning sweep, its duration is equal to the period of one scanning cycle.

Figure 10A:
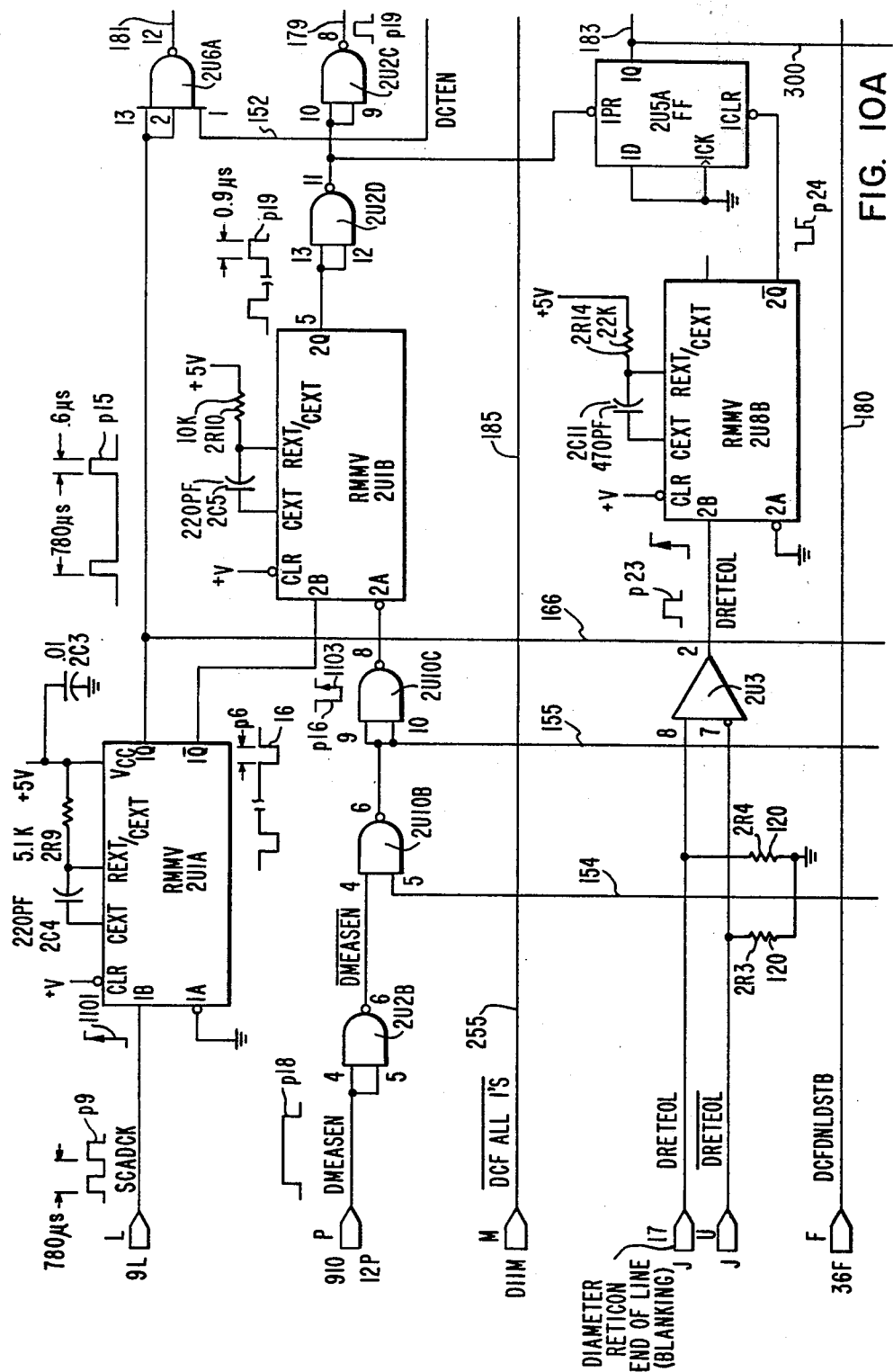
Figure 10C:
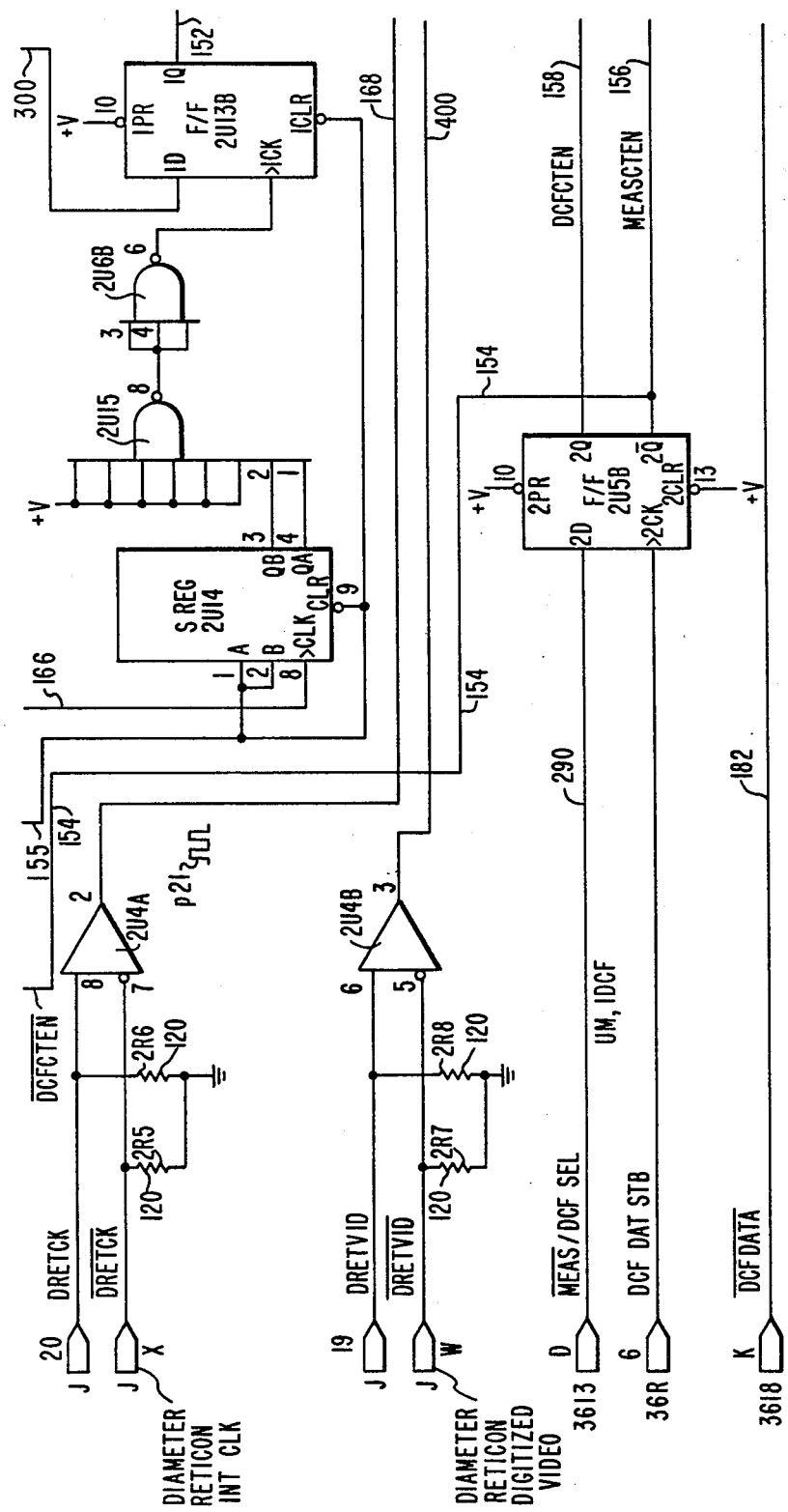
Figure 10D:
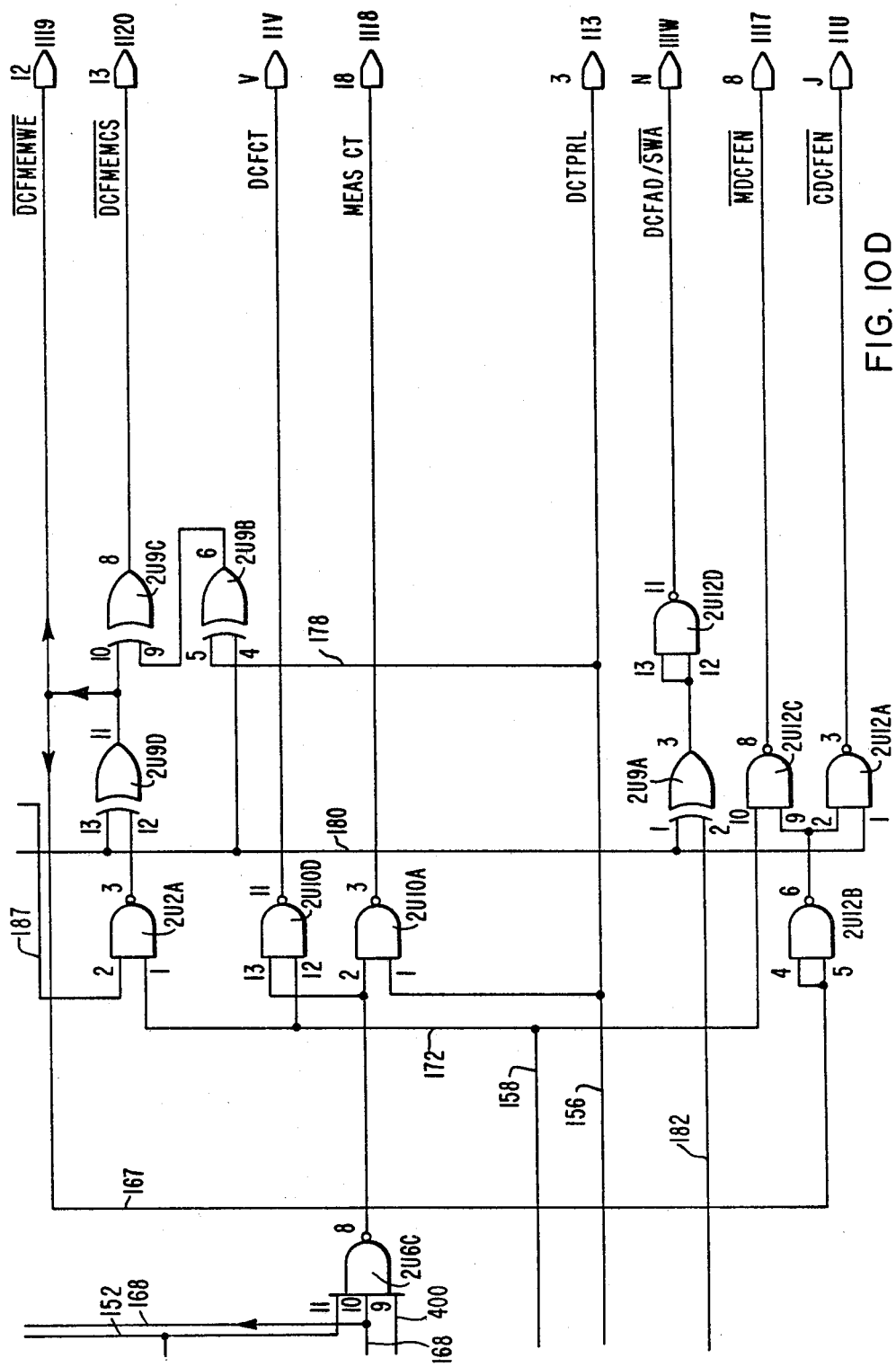

The circuit shown in FIG. 10 controls the flow of diameter-measurement counts (MEAS CT) and the diameter-corrected factor (DCF) counts through the diameter measurement apparatus. Whether there is measurement or DCF is determined by the impressing of a 0 or a 1 on input terminal D, $\overline{\text{MEAS}}$/DCF SEL, (FIG. 10C) measurement or DCF select; if a 1 is impressed, the apparatus is set for DCF, i.e., DCF calibration; if a 0 is impressed the apparatus is set for measurement. The selection is commanded by the computer 105 through the decoder 11U3 of the external interface, (FIG. 36B). The Y outputs of this decoder are normally at 1 level. The $\overline{\text{MEAS}}$/DCF SEL selection signal is derived from the Y6 output of 11U3 connected to output terminal 13 through inverter 11U4A and is 0. Terminal 13 is connected to input terminal D of FIG. 10. The circuit shown in FIG. 36 is normally set for measurement, thus being at 1 level on Y6. To set this terminal for DCF SEL, the computer impresses a binary code (a 6) on the input terminals O'D13, O'D14, O'D15. The computer is set to DCF SEL by the teletype 1015 (FIG. 1).

It is assumed that the circuit shown in FIG. 10 is set for measurement. There is a 0 on input terminal D and on input 2D of flip-flop 2U5B. The FIG. 10 circuit is enabled to carry out a measurement by a strobe impressed through its input terminal 6 DCF DAT STB, DCF data strobe. The strobe is derived from output terminal R DCF DAT STB of the decoder 11U2 (FIG. 36). The computer 105, as programmed, enters the appropriate code (a binary 1) on input terminal O'D10, O'D11, O'D12 the decoder 11U2 at the appropriate time. The computer then enters an enabling pulse p51 on input G1EN of Y outputs of decoder 11U2 and there are 0's at its active output terminals F, W, U, T, S, R through inverters 11U1A through 11U1F. The code enters a 0 in the selected Y output, in this case Y1, and the strobe, a1, is produced on the entry of the pulse p51.

Figure 13:
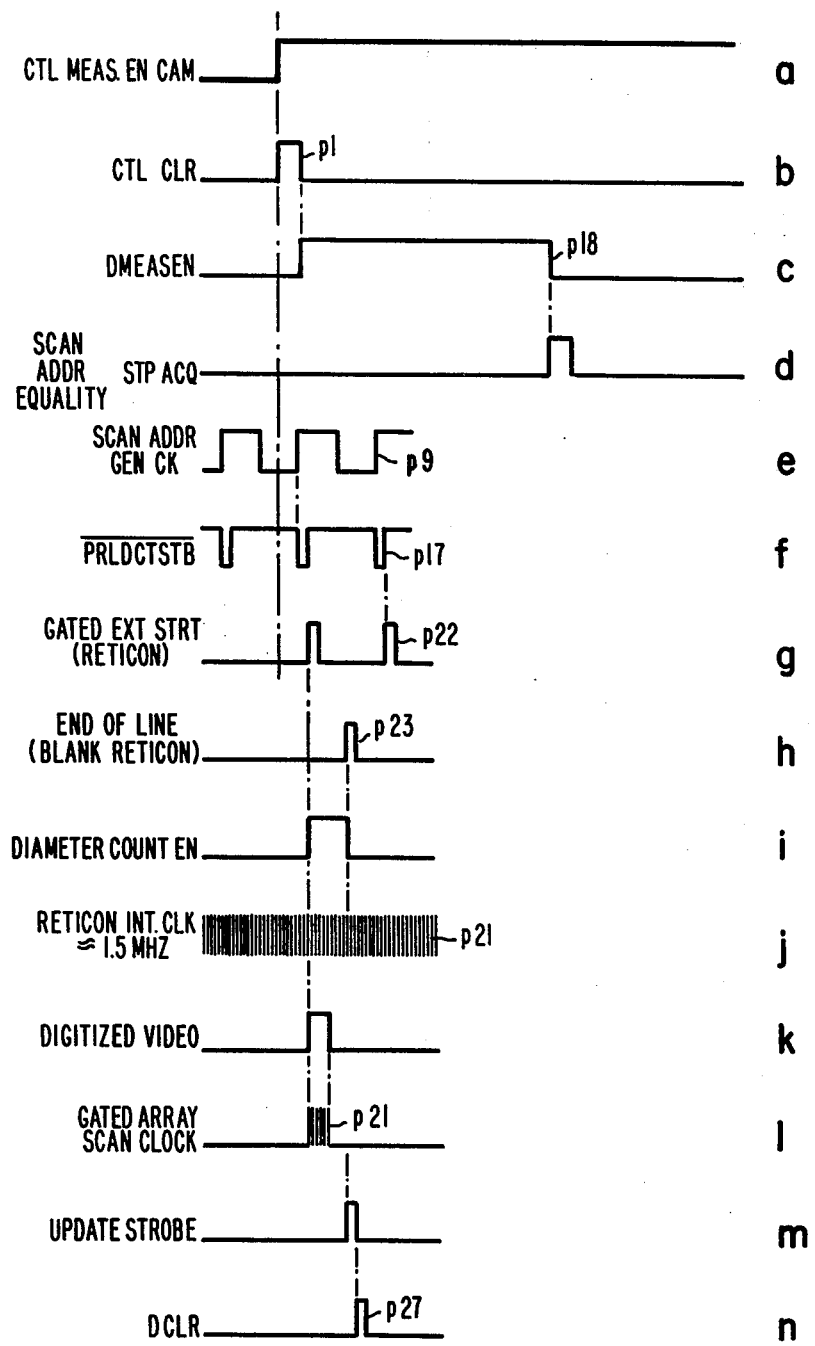
FIG. 13 is a graph showing the timing and relationship of pulses during measurement of diameter of a pellet.

From time to time in the discussion that follows FIG 13 will be referred to. FIG. 13 is a graph which shows the time relationship of the pulses involved in diameter measurement. Time is plotted horizontally and amplitude, 1 or 0, vertically. The intersections of a vertical line with all time axes define the same instant of time.

The leading edge of the DCF DAT STB impresses a clock signal on flip-flop 2U5B (FIG. 10) and a 0 appears at 2Q and a 1 on 2$\overline{\text{Q}}$. There is a 1 on conductor 154 $\overline{\text{DCF}}$ $\overline{\text{CTEN}}$ (DCF count enable) and on conductor 156, MEASCTEN, measurement count enable.

Conductor 156 is connected to output terminal 3 DCTPRL, diameter count preload. Through this output terminal and input terminal 3 of FIG. 11 the counter 1079 (FIG. 11A) is conditioned to be preloaded with 511 counts from which the diameter is counted down on the entry of a strobe or input terminal 2 (FIG. 11). A 1 level is also entered on input 1 of NAND 2U10A from conductor 156. Input 2 of this NAND is controlled from output 8 of NAND 2U6C. It is assumed that at this time DMEASEN pulse p18 (FIG. 13c) has not been impressed. There is a 0 on inputs 4 and 5 of NAND 2U2B (FIG. 10A), a 1 on input 4 of NAND 2U10B from output 6 of 2U2B and a 1 on input 5 of 2U10B from conductor 154. There is a 0 at 1CLR of flip-flop 2U13B (FIG. 10C) through conductor 155. There is 0 on output 1Q of 2U13B and on input 11 of 2U6C from conductor 152. There is a 1 on input 2 of 2U10A. There is a 0 on output terminal 18, MEAS CT, measurement count.

NAND 2U6C (FIG. 10D) operates as a gate for the clock pulses p21 (FIGS. 10B, 10C) derived from the Reticon board 870 (FIG. 6). These pulses provide a time base for counting the lighted diodes of the array 869. These pulses are gated by the video from the Reticon board which measures the duration of the train of lighted diodes as shown in FIG. 13j. The Reticon clock pulses p21 are continuously impressed through input terminals 20 and X, DRETCK and $\overline{\text{DRETCK}}$, diameter Reticon clock, and amplifier 2U4A, on input 10 of 2U6C. These pulses p21 are typically of 200 ns duration; they have a repetition rate of 1.5 MHz. NAND 2U6C only passes these 1.5 MHz pulses while input 11 is 1 and while input 9 is 1. Input 11 is 1 during DMEASEN. Input 9 is 1 while the video is received through conduction 400 from input terminals 19 and W, DRETVID, $\overline{\text{DRETVID}}$, diameter reticon video; i.e., during the scanning interval when the diode array 869 (FIG. 6) is lighted by the beam which measures the diameter. This is shown in FIGS. 13k and 13l.

There are 1024 diodes in the diode array 869. These diodes are scanned once for each element or each address of the scan of the pellet. The scanning of the pellet may be regarded as a horizontal scan and the scanning of the diode array as a vertical scan. During each period of the Reticon clock frequency, one diode of the array is scanned. The 1024 diodes are scanned in a time interval equal to 1024 multiplied by the period of the Reticon clock frequency or $1024 \times 1/1.5 \times 10^{-6}$ or 683 μs.

There are 8 rest periods of the scanning frequency between complete scans primarily to afford the photodiode scanning sweep to return for a new scan. The frequency of 1.5 MHz is higher than the frequency for 1032 periods if the scanning were continuous. The higher frequency is desirable to assure that the scanning at each diameter scan element is completed before the light beam moves to the succeeding position.

Input terminal L (FIG. 10A) receives SCADCK, scan address clock, signal from output terminal L of FIG. 9. This signal is a square wave, p9, (FIG. 13e) of 1280 Hertz frequency or of 780 μs period. Retriggerable monostable multivibrator 2U1A converts this square wave into a train of pulses p15 of 0.6 μs duration which occur at the rate of 1280 per second or at intervals of 780 μs; the leading edge 1101 of each wave p9 triggers 2U1A. This interval of 780 μs is substantially longer than the 683 μs during which the 1024 diodes are scanned. The pulses p15 derived from 1Q of 2U1A are positive; the pulses p16 derived from $1\overline{\text{Q}}$ are negative. Pulses p15 are impressed on inputs 13 and 2 of NAND 2U6A. When input 1 of 2U6A receives a 1 signal from conductor 152, negative pulses p17 (FIG. 13f) are transmitted to output terminal 2 and through this terminal to input terminal 2 of FIG. 11. These pulses have the mnemonic $\overline{\text{PRL DCT STB}}$, preload diameter count strobe. This strobe causes number 511 to be preloaded into the counter 1079. The preloading is through conductor 156 and output terminal 3 (FIG. 10). As shown in FIGS. 13e and f this strobe is triggered at the beginning of each period of SCADCK; i.e., at beginning of the diode array scan at each scan element.

The signals to input 1 of 2U6A (FIG. 10A) is controlled by the DMEASEN signal p18 (FIG. 13c) through conductor 152. This signal is derived from output terminal 10 of FIG. 9, through input terminal P. Before DMEASEN pulse p18 is impressed at P, there is a 0 at the input to NAND 2U2B and its output is 1. Conductor 154 enters a 1 on input 5 of NAND 2U10B. Since there is also a 1 on input 4, output 6 is at 0. This output is connected through conductor 155 to inputs 1 and 2 of shift register 2U14 and to 1CLR of flip-flop 2U13B. Output 1Q of flip-flop 2U13B is 0 as are enabling input 11 of 2U6C and enabling input 1 of 2U6A. Signals do not pass through 2U6C and 2U6A. Input 1B of retriggerable monostable multivibrator 2U7A (FIG. 10B) is 0 and there is no output from this multivibrator.

When p18, DMEASEN, is 1 output 6 of NAND 2U2B is 0 and output 6 of 2U10B is 1. There is a 1 on conductor 155 during the time that DMEASEN is on. Input CLR of shift register 2U14 is disabled. Clock pulses p15 (FIG. 10A) are derived from 1Q of multivibrator 2U1A through conductor 166. On the second clock pulse, inputs 1 and 2 of NAND 2U15 (FIG. 10C) are 1 and output 8 is 0. NAND 2U6B transmits a clock pulse to 1CK of flip-flop 2U13B.

Now consider the status of flip-flop 2U5A. Since output 6 of NAND 2U10B is 1 during DMEASEN, output 8 of NAND 2U10C and input 2A of retriggerable monostable multivibrator 2U1B are 0. With a 1 on input 2A multivibrator 2U1B is unable to output pulses; with a 0 on 2A it is enabled. On the trailing edge 1103 of each negative pulse p16, from output $1\overline{\text{Q}}$ of multivibrator 2U1A, following the entry of DMEASEN, multivibrator 2U1B is triggered to produce a1 pulse p19 at its output 2Q. Zero pulses are impressed on preset input 1PR of flip-flop 2U5A through NAND 2U2D and a 1 is impressed from its output 1Q and on input 1D of flip-flop 2U13B through conductor 181.

On the second clock pulse to shift register 2U14, 1Q of flip-flop 2U13B and conductor 152 receive a 1 signal. It is emphasized that the 1 appears on conductor 152 only on the second pulse from 2U1A; i.e., about 780 μs after the start of DMEASEN. The 1 on input 1A of 2U7A prevents its being triggered by the 1 on its input 1B.

The train of pulses p15 pass through 2U6A and are inverted in polarity. the resulting pulses p17 (FIG. 13f) are impressed on output terminal 2, $\overline{\text{PRLDCT STB}}$. This strobe enables the entry of the preload count of 511 into the counter 1079 in FIG. 11 from conductor 156 through output terminal 3. NAND 2U6C is also enabled to pass the Reticon clock pulses (1.5 MHz) gated or modulated by the video (FIG. 13l).

Pulse p19 on the output of multivibrator 2U1B for each scan address, inverted by 2U2D and again inverted by 2U2C is impressed as a clock pulse on flip-flop 2U13A through conductor 179 (FIG. 10B). The output 1 level at 1Q of 2U13A is impressed on imput 1B of retriggerable monostable multivibrator 2U8A. With 2U8A enabled by the 1 level on 1B, the trailing edge of the first Reticon clock pulse impressed on 1A produces pulse p22 at output 1Q of 2U8A and the complementary negative pulse at 1$\overline{Q}$. The positive pulse p22 (FIG. 13g) is transmitted to output terminals 16 and T DRETSTRT and $\overline{\text{DRETSTRT}}$, diameter Reticon start, through amplifier 2 2U11. Pulse p22 starts the scanning of the diode array. The 0 at 1$\overline{Q}$ of 2U8A is impressed as clear signal on flip-flop 2U13A clearing the flip-flop and conditioning it to operate 2U8A on the occurrence of the next pulse p19 for the next diode array scan address. The pulses p19 have a period of 780 $\mu$s and the pulses p22 have the same period. This duration is longer than 683 $\mu$s, the time interval during which the diodes of the array are scanned. While the Reticon pulses p21 (FIG. 13j) have a frequency of 1.5 M-Hertz only one pulse p19 is produced for each SCADCK period. Because of the delay in the shift register 2U14, DRETSTRT is enabled on SCADCK period before conductor 152 becomes 1 enabling 2U6C and 2U6A. Once conductor 152 becomes 1, 2U6A is conditioned to preload counter 1079 (FIG. 11) and 2U6C is conditioned to pass the Reticon clock pulses. The Reticon clock pulses are gated by the signal on input 9 of 2U6C. This signal is derived from input terminals W and 19, DRETVID, diameter Reticon video, through amplifier 2U4B. This signal is a pulse (FIG. 13k) whose duration is the time taken by the Reticon to scan the lighted diodes and measures the number of lighted diodes for each scanned element of a pellet (FIG. 13l).

Input 10 of 2U6C is pulsed by short duration pulses at the rate of 1.5 MHz. During the intervals when these pulses are 1, output 8 of 2U6C is 0 and output 3 of 2U10A is 1. During the intervening 0 intervals of the Reticon clock pulses, output 8 and input 2 of 2U10A are 1 and output 3 of 2U10A is 0. During the video interval Reticon clock pulses are transmitted through output terminal 18, MEASCT, measurement count. These counts are impressed on the counters 1079 to count down from the preload of 511 for each address.

At the end of the diode-array scan a pulse is transmitted from the Reticon through input terminals 17 and U (FIG. 10A), DRETEOL and $\overline{\text{DRETEOL}}$ diameter Reticon end of line. Pulse p23 (FIG. 13k) is impressed from the output of amplifier 2U3 on input 2B of retriggerable monostable multivibrator 2U8B. Output pulse p24 from 1$\overline{Q}$ of 2U8B is impressed from on 1CLR of flip-flop 2U5A producing a 0 on its output 1Q and through line 300 on input 1D of flip-flop 2U13B (FIG. 10C). The 1 on input 1D of 2U13B has no effect at this time.

When 1Q of 2U5A goes to 0 the trailing edge of the signal p25 at 1A triggers monostable multivibrator 2U7A through conductor 183 to produce p26, a 1, at its output 1Q and a 1 on input 2 of U16A. If at this time input terminal M DCF All 1's (FIG. 10A) does not have all 1's by reason that the scan of the pellet is within the electronic window (outside of D Table II), there is a 1 on input 1 of 2U16A through conductor 185 and a 0 on its output 3. There is a 1 on output 2U16B and a strobe; FIG. 13m, is transmitted through output terminal R, DUPDSTB, diameter update strobe, to update the diameter if the last diameter measured is higher than a maximum diameter measured earlier. The leading edge 170 of p26 produces this strobe. The trailing edge 172 of p26 is impressed on input 2A of retriggerable multivibrator 2U7B producing pulse p27 at its output 2Q. Pulse p27, FIG. 13n, is transmitted through output terminal 21, DCLR, to clear the counter 1079 of the last diameter measurement. Since multivibrator 2U7B is triggered by the trailing edge 172 of p26 and the update strobe is triggered by the leading edge, the update takes place before the counters are cleared.

To determine the diameter correction factor (DCF) the diameter of a calibration pellet longer than a fuel pellet is determined at the successive scan elements or addresses along the pellet and a correction factor is derived at each point. To derive the DCF data the calibration pellet is inserted by tweezers in the pellet seat 515 of the diameter-inspection station 127 (FIG. 1). During the measurement of this calibration pellet the grippers are set to idle. The calibration pellet is precisely machined and has to the extent practicable throughout its length the diameter of an ideal fuel pellet. The calibration pellet is scanned to determine its diameters element by element in the same way that a fuel pellet would be scanned and the data and address for each scanned element is recorded. For each face of the scanning prism there are 128 scanned elements of the pellet. For each scanned element the photo-diode array consisting of 1024 photo-diodes is scanned the number of lighted diodes is determined. The number 1024, of photo-diodes, should not be confused with the number 1024, of the total diameter elements scanned by the 8 scanning prisms.

For processing DCF the appropriate code (a binary 6) is impressed by the computer on input terminals L'D13, O'D14, O'D15 of decoder 11U3 (FIG. 36). A 0 is entered on its output Y6 and a 1 on output terminal 13. A 1 is entered on input 2D of flip-flop 2U5B through input terminal D (FIG. 10C). The command impressing the code on 11U3 is entered by the teletype to the computer. The memory of the computer now causes DCF DAT STB to be produced at output terminal R (FIG. 36) and input terminal 6 of FIG. 10. The strobe serves as a clock signal for 2U5B. Its output 2Q has 1 level and its output 2$\overline{Q}$ has a 0 level. There is a 1 on conductor 158 DCFCTEN, DCF count enable; and a 1 on conductor 172. On conductor 156 MEASCTEN there is 0.

There is a 1 on input 12 of NAND 2U10D conditioning the NAND to pass counts. The diameter at each address of the calibration pellet is determined during the DMEASEN interval. As for the fuel pellet, conductor 152 is 1 during this interval and clock pulses are transmitted through NAND 2U6C through input terminals 20 and X, DRETCK, with appropriate 1 signals on input terminals 19 and W, DRETVID. NAND 2U6C is enabled by the 1 on its input 11 and it passes the Reticon clock pulses, gated or modulated by the Reticon video, to input 13 of 2U10D. The gated DCF count is transmitted through output terminal V DCFCT, DCF count.

When the end-of-line signal p23 (FIG. 13k) is impressed at input terminals 17 and U DRETEOL and $\overline{\text{DRETEOL}}$, pulse p26 is produced at output 1Q of multivibrator 2U7A. At this point input terminal M, DCF ALL 1's is at 1 level. A 1 is delivered through output terminal R, DUPDSTB, diameter update strobe. Input 2 of 2U2A (FIG. 10D) is raised to 1 through conductor 187 by the leading edge 170 of p26. Input 1 of this NAND is also at 1. Input 12 of exclusive OR 2U9D is 0; input 13 is also 0 because there is a 0 on input terminal F, DCF DNLD STB, DCF down load strobe. Output 11 of 2U9D is 0. Terminal 12 $\overline{\text{DCF}}$ $\overline{\text{MEM}}$ $\overline{\text{WE}}$, DCF memory write enable, receives a write signal so that the DCF count at output terminal V can be written in. Input 5 of exclusive OR 2U9B is 0 because conductors 156 and 178 are at 0. Input 4 is also 0 because conductor 180 (DCFDNLD STB) is 0. Output 6 of 2U9B and input 9 of 2U9C are 0. At the instant when the leading edge 170 of p26 is impressed, output 11 of 2U9D and input 10 of 2U9C are also 0. Output 8 of 2U9C is 0 and terminal 13 $\overline{\text{DCF MEM CS}}$, DCF memory chip select, is enabled to transmit a signal to select a chip into which the intelligence on raw and fixed DCF is written in.

Also when the leading edge 170 of p26 is impressed on input 2 of 2U2A and conductor 167 is 0 because output 11 of 2U9D is 0. Output 6 of NAND 2U12B is 1 so that inputs 9 and 2 of NAND 2U12C and 2U12A are 1. At this time conductor 172 and input 10 of 2U12C is also 1. Output 8 of this NAND is 0. The enabling signal for DCF measurement is transmitted through terminal 8 $\overline{\text{MDCFEN}}$, measurement DCF enable. The signal at output terminal 8 enables the DCF measurement and the signal at terminal 12 causes this intelligence to be written into the selected chips.

At this time the signal on conductor 180 from input terminal F, DCF DNLD STB, DCF download strobe, is 0 so that there is no enabling signal through terminal J $\overline{\text{CDCFEN}}$, count DCF enable. These counts are the raw data which is later fixed and added to the measurements of the diameters of the fuel pellets. During this part of the process, input terminal K is 1. There is a 1 on input 2 and a 0 on input 1 of exclusive OR 2U9A. There is a 0 on output terminal N, DCFAD/$\overline{\text{SWA}}$. The control is set for $\overline{\text{SWA}}$.

At the end of DMEASEN, the control shown in FIG. 10 is reverted to measurement. Through decoders 11U3 and 11U2 (FIG. 36), a 0 level is impressed on input terminal D and a strobe on terminal 6 of FIG. 10. Terminal K, $\overline{\text{DCF DATA}}$ remains at 1 throughout this part of the operation.

Input terminal K $\overline{\text{DCF DATA}}$ controls the flow of DCF data and the corresponding SWA, scan word addresses. To enable $\overline{\text{DCF DATA}}$ input terminal K is set at 0.

The appropriate code (a binary 5) is impressed by the computer 105, as commanded by its program, on O'D13, O'D14, and O'D15 of 11U3 (FIG. 36) for $\overline{\text{DCF DATA}}$. There is a 0 on Y5 (FIG. 36) and a 0 on input terminal K (FIG. 10). There is a 0 on input 2 of exclusive OR 2U9A. There is also a 0 on input 1 because DCF DNLD ST, DCF down-load strobe, is 0. There is a 0 on inputs 12 and 13 of NAND 2U12D and a 1 on output terminal N, DCFAD/$\overline{\text{SWA}}$, DCF address or $\overline{\text{SWA}}$. Terminal N is set for DCF AD.

The logic shown in FIG. 11 is supplied the data from measurement of the diameters of a calibration pellet and of each fuel pellet at each scan address and the corresponding addresses. It transmits the calibration data to the computer 105 for computation of the diameter correction factor (DCF) for each address. On the entry of DCF DNLD STB the computer each DCF is transferred from computer 105 to the assigned address slot in the memory 1081 (FIG. 11C) by this logic. This logic applies the fixed DCF (Table II) to the fuel pellet measurement at each scan address to correct this measurement.

Typical data which is injected and temporarily held in the apparatus shown in FIG. 11 is presented in the above Table I on the left under the heading Raw DCF Data. The first row entitled "Prism Face" gives the numbers of the faces, as identified by the apparatus shown in FIG. 9, of the scanning prism. The data appearing under each number represents the data derived from each of the 128 elements scanned. Only about 100 elements are shown in Table I.

Each number in Table I is the number of the scanned photo-diodes that are lighted by the scanning beam from a scanned element along the pellet. For example, 158 diodes are lighted by the beam from the 1st element scanned by face 1 of the scanning prism, 159 by the beam from the 2nd element, 158 by the beam from the 3rd element etc. Likewise the beam from the first element scanned by the 7th face lights 159 diodes. The 0's in the rows labelled B of Table I are derived during the sweep of the scanning prism in the region beyond each pellet not illuminated by the scanning beam. Each position in Table I where there is a number corresponding to a scan of the photo-diodes is identified by a unique scan-word address (SWA). Each address is in one-to-one relationship both with a particular face of the scanning prism and with a scanned position or diameter element along the axis of the pellet over which the scanning beam passes.

The counts for each diameter scanned element of the calibration pellet are derived from output terminal V with input terminal D of the logic of FIG. 10 at 1 during the DMEASEN (FIG. 13c) interval. For each scanned element Reticon clock pulses gated by the Reticon video signal impressed on input terminals 19 and W (FIG. 10) are transmitted through output terminal V of FIG. 10 and through input terminal V, DCFCT of FIG. 11, to inputs CT UP, count up, of counting elements or blocks 3U1, 3U2, 3U3 of counter 1079. The count of each burst (FIG. 13l) is entered on the A inputs of element 3U7 of buffer 1111 (FIG. 11C).

At the end of the burst there is an end-of-line pulse p23 through input terminals U and 17 of the logic of FIG. 10, 0 pulses on output terminal 8 (FIG. 10), $\overline{\text{MDCFEN}}$, on output terminal 12 $\overline{\text{DCF MEM WE}}$, and on output terminal 13 $\overline{\text{DCF MEM CS}}$.

The $\overline{\text{MDCFEN}}$ pulse from output terminal 8 of FIG. 10 is impressed through input terminal 17 of FIG. 11 enabling inputs 1EN and 2EN of buffer 3U7 causing the count in the A inputs to be entered in the Y outputs and then through conductors D0 through D7 and inputs I/O1 through I/O4 on elements 3U12 and 3U13 of memory 1081. All bursts of counts measuring the diameter elements of the calibration pellet are entered in this way. The memory elements 3U12 and 3U13 each has 1024×4 bits.

At the same time that the count for the scanned element was entered in counter 1079, the corresponding word address for this scanned element was entered on the A inputs of blocks 3U14, 3U15, 3U16 of multiplexer 1115 (FIG. 11B) through input terminals N, 12, P, 13, R, 14, S, 15, T, 16 (FIG. 11A) and conductor SWA0 through SWA9. At this point a 1 is impressed by command of the computer program on input terminal K, $\overline{\text{DCF DATA}}$ (FIG. 10). A 0 is entered on output terminal N DCFAD/$\overline{\text{SWA}}$, and on input terminal W (FIG. 11B) and input OUTSEL of multiplexer 1115. The address intelligence on the A inputs of the multiplexer is entered on its Y outputs and, through the conductors A0 through A9, on the A inputs of memory 1081. The 0 pulses on output terminals 12 and 13 of FIG. 10 are entered on input terminals 19 $\overline{\text{DCF MEM WE}}$, and 20, $\overline{\text{DCF MEM CS}}$ (FIG. 11). Through conductors 186 and 188 these enabling signals are impressed on inputs WE and CS of memory 1081 and the count on inputs I/0 through I/4 for each scan element is written into a slot having the address entered on the A inputs of this memory. The same process is repeated for the other bursts corresponding in number of counts of the lighted diodes of the diode array, 869, for each scan address and its corresponding address slot. The counter 1079 is cleared by a pulse from output terminal 21 (FIG. 10) through input terminal 21, DCLR (FIG. 13n).

Once the DMEASEN which loads memory 1081 is terminated the determination of the fixed DCF data is carried out. The computer 105 is programmed to enter each address automatically on the D inputs of the components or blocks 3U10 and 3U11 of address register 1117. The addresses are entered from the computer through input terminals O'D0 through O'D9 of the interface (FIG. 36) and through the output sockets numbered 1 through 10 and the input terminals numbered 0 through 9, FIG. 11B. Computer 105 then calls for the diameter count at each address impressed on the D inputs. A strobe is impressed from Y1 output of decoder 11U2, FIG. 36, on input terminal X, DCFADSTB, as programmed by the computer 105, and each address is entered on the Q outputs of the register 1117, on conductors DCFAD0 through DCFAD9 and on the B inputs of multiplexer 1115. A 0 is impressed on input terminal K $\overline{\text{DCF DATA}}$ (FIG. 10) and a 1 is entered on output terminal DCFAD/SWA (FIG. 10) on input terminal W (FIG. 11), and on input OUTSEL of the multiplexer 1115. The addresses are entered on the Y outputs of the multiplexer and then on the A inputs of memory 1081. The DCFAD addresses which are entered from the address register 1117 and the SWA addresses each identifies the same address for a diameter scan element of a pellet. The DCFAD addresses are entered from the memory of the computer 105 and the SWA addresses are derived from the logic shown in FIG. 9.

At this point a 0 is impressed on input terminal D (FIG. 10); $\overline{\text{MEAS}}$/DCF SEL and 1 pulse is impressed on input terminal 6 DCF DAT STB (FIG. 10). Output $2\overline{\text{Q}}$ of flip-flop 2U5B becomes 0 and 2Q becomes 1. At this time DCF DNLD STB, conductor 180 (FIG. 10), is 0. Output terminal 12, $\overline{\text{DCF MEM WE}}$ (FIG. 10) is at 1; meaning "do not write", and output terminal 13 $\overline{\text{DCF MEM CS}}$ is 0, meaning "read". Memory 1081 is enabled to read the diameter count for each address called for by computer 105 into the A inputs of buffer 3U9. On the impressing of a 0 on input terminal Y $\overline{\text{DCF DATA}}$, the data on the A inputs of 3U9 is entered into the Y output and thence to the computer for processing through conductors INBS2 through INBS9. The output terminals INBS2, in bus, through INBS9 supply their intelligence through input terminals DW2 through DW9, of the multiplex board FIG. 37.

The computer 105 is programmed to compute the fixed DCF data. The fixed DCF data which is computed is shown in above Table II. The items of the rows of this Table II at the top and bottom which contain single-digit numbers are derived by subtracting the lowest raw DCF count in Table I from each raw DCF count. The remainder constitutes the fixed DCF and is reloaded into memory 1081 at the same SWA address as the corresponding raw DCF count. For example, the lowest count in Table I (scanning prism 1) is 154; the count in the top row of column 1 is 158. Thus, the fixed data for the top item of column 1 is 4. The single-digit numbers are used for purposes of illustration. The DCF's are not confined to single-digit numbers.

In addition to the fixed DCF data, an electronic window is loaded into memory 1081. This electronic window consists of eight 1 bits at certain SWA addresses. The boundaries of the window is determined with reference to the regions A (Table I), where the scan is entering the dark region B; and C, where the scan is leaving the dark region B. The upper boundary of region D in Table II is located 6 rows upwardly from the first row of region A which contains at least 5 counts of 0. The lower boundary of region D in Table II is located 6 rows downwardly of the first row in region C containing at least 5 non-0 counts. All counts in the window are 255 produced by jamming 1's into the SWA addresses which represent the signal in which undesirable diameters might be measured.

After the computer 105 computes the fixed data, the computer is programmed to enter each address on the D inputs of address register 1117. When a 1 is impressed on input terminal X, DCFAD STB by a code (binary 2) on decoder 11U2 (FIG. 36), for each address, the address is entered on the Q outputs of register 1117 (FIG. 11B). Through DCFAD0 through DCFAD9 each address is entered on the B inputs of multiplexer 1115. A 1 is impressed on input terminal K, FIG. 10, $\overline{\text{DCF DATA}}$. Up to this point there was a 0 on input terminal F, DCF DNLD STB, now a 1 is impressed on this input terminal F. Bearing in mind that input terminal D, $\overline{\text{MEAS}}$/DCF SEL of the logic of FIG. 10 is now 0, $\overline{\text{MEAS}}$, the entry of a 1 on input terminal K and on input terminal F results in the following entries for the logic of FIG. 10:

a 1 on terminal N, DCFAD
a 0 on terminal J, $\overline{\text{CDCFEN}}$
a 0 on terminal 12, $\overline{\text{DCF MEM WE}}$
a 0 on terminal 13, $\overline{\text{DCF MEM CS}}$.

The 0 on terminal J, FIG. 10, is impressed on input terminal U, FIG. 11, and through it on 1EN and 2EN of buffer 3U8. The fixed data on the A inputs of 3U8 is entered on the Y outputs of 3U8 and on the conductors D0 through D7 and on data inputs I/O1 through I/O4 of memory 1081. The 1 on output terminal N is entered on input terminal W of FIG. 11 and through it on OUTSEL of multiplexer 1115. The address on the B inputs of the multiplexer is entered on its Y outputs, on the A (address) conductors and on the A inputs of memory 1081. The corresponding fixed data for each address as it is entered is impressed by the computer (diamond terminal 0-9) on conductors OUTBS0, out bus, to OUTBS9 and through these conductors is entered on the A inputs of buffer component 3U8. The DCF fixed data is impressed by the computer 105 through input terminals O'D0 through O'D9 and through sockets 1 through 10 of the interface, FIG. 36. The 0's on output terminals 12 and 13, FIG. 10, are entered on input terminals 19, $\overline{\text{DCF MEM WE}}$, and 20, $\overline{\text{DCF MEM CS}}$ (FIG. 11). This causes the fixed DCF data to be written in the respective address slots assigned to this data. This same process is repeated for all 1024 elements scanned by the 8 faces of the scanning prism. The fixed data has now been entered in the memory 1081.

During the inspection of fuel pellets, conductor 156, FIG. 10, MEASCTEN, and output terminal DCT PRL 3 are 1. Input terminal 3, FIG. 11, DCT PRL is 1. When a 0 strobe $\overline{\text{DRLDCT STB}}$ is impressed from output terminal 2, FIG. 10, on input terminal (boat-shaped) 2, counter 1079 is loaded with 511 counts. The first burst of counts from the Reticon corresponding to the lighted diodes for the first scanned element of the fuel pellet, is now impressed through input terminal 18, FIG. 11, MEAS CT, on input CT DN, countdown, of the counter 1079. The counter counts down from 511 by the number of counts in the burst. The net count is entered on the Q outputs of the counter and, through conductors DCT0 through DCT9, on the B inputs of adder 1083 (FIG. 11C).

At the same time the address for this first count is entered from terminals 16, T, 15, S, 14, R, 13, P, 12, N of sheet through SWA0 through SWA9 into the A inputs of multiplexer 1115. Simultaneously with the impressing of the first counts, a 1 is impressed on input terminal K, FIG. 10, $\overline{DCF}$ $\overline{DATA}$. A 0 is entered in input terminal W, FIG. 11, and on OUTSEL of multiplexer 1115. The address is then entered on the address A conductors and on the A inputs of the memory 1081. At this time there is a 0 on input 1 of NAND 2U2A, FIG. 10, and through it a 1 on input 12 of exclusive OR 2U9D. There is a 0 on input 13 of this OR. Terminal 212 $\overline{DCF\ mem\ WE}$ is 1. There is a 1 on input 5 of exclusive OR 2U9B through conductor 156. There is a 0 on input 4 of this OR. There is a 1 on input 9 of exclusive OR 2U9C and there is a 1 on input 10 of this OR from output 11 of 2U9D. Output terminal 13, $\overline{DCF\ MEM\ CS}$ is 0. The fixed DCF data at the address entered on the A inputs from the I/O outputs are read through the D conductors into the A inputs of adder 1083. The addition of the diameter count (DCT0-DCT9) from counter 1079 and the diameter correction factor (DCF) from memory 1081 is automatically performed and is entered into output terminals B through L of the adder. The above described procedure is repeated for each scanned element of a fuel pellet.

Outside of the electronic window, where the fixed count, a binary 255, eight ones (Col. II, D rows) there is 0 on output 8 of NAND 3U17 and on output terminal M, FIG. 11. This 0 is entered on input terminal M, FIG. 10. During the interval when the 255's is the fixed data (during the window), output terminal R (FIG. 10) DUPD STB, is 0 and there can be no update of the diameter data.

FIG. 12 shows how the diameter count data developed by the logic shown in FIG. 11 is processed. Each diameter count produced by the adder 1083 is impressed on the A inputs of maximum-diameter comparator 1087 including blocks 4U7, 4U8, 4U9 of FIG. 12 through input terminals B through L. The maximum-diameter count for the earlier scan element measurements was entered on the B inputs of this comparator through conductors MXDCT 0 through MXDCT 8. The A and B entries in the comparator are compared and a determination is made of A>B, A=B, or A<B. The determination of a difference between A and B is based on a difference between the most significant bits at which the two counts differ. For example, if the A's are all 1's and the B's are all 1's except for a 0 at the 3rd from the most significant bit, A=1023 and B=895 and A>B. If the A's and 1's except for the 4th from the most significant bit and B's are 1's except for the third from the most significant bit, A=959 and B=895, A>B. If A<B or A=B there is no signal at output 5 of block 4U7. If A>B there is a 1 level at this output 5. This 1 remains until the data supplied to the comparator changes. The count which is entered on the A inputs of the maximum-diameter comparator 1087 is also entered in the D inputs of storage register 1085 (FIG. 12C) including blocks 4U10, 4U11 through conductors CDCT0 through CDCT8. If A>B there is a 1 on input 1 of NAND 4U6A, and when pulse p26 is impressed on DUPDSTB through input terminal R, there is also a 1 on input 2 of this NAND. There is a 0 on output 3 of this NAND and a 1 on output 6 of NAND 4U6B. Register 1085 is clocked and the count, a new maximum diameter count, is entered on the Q outputs of register 1085. This new count replaces the former maximum-diameter count in the register and also, through conductors MXDCT0 through MXDCT8, is entered on the D inputs of maximum-diameter output latch 4U14. For a 1 on the input ENABLE of this latch, the count on the D inputs is entered on the Q outputs. So long as there is a 1 on ENABLE, the Q output count can be changed by entering different counts on the D's. When the input 1 on ENABLE subsequently goes to 0, the count on the Q outputs is latched in. The maximum-diameter count requires 9 bits. The 2 least significant bits are taken from the output latch 4U15 which records the number of times that the measured diameter count exceeds a preset minimum count. This data requires only 6 bits. The new maximum count also replaces the previous maximum count in the B inputs of maximum-diameter comparator 1087 through branches of conductors MXDCT0 through MXDC8.

During DMEASEN, impressed through terminal P, each new maximum diameter count is entered onto latch 4U14 and it replaces the earlier lower-diameter count. At the end of DMEASEN (FIG. 13B) the last maximum diameter count impressed remains in latch 4U14. It is latched in when DMEASEN goes to 0. Maximum diameter storage register 1085 is cleared by a 0 signal on conductor $\overline{CTLCLR}$ through input terminal Y from the Y output terminal of FIG. 10. By way of further explanation, input 12 of 4U6D is 0 with 1099 quiescent or A≦B. In this case 10 of 4U6C is 1, since 9 is also 1, 8 is at 0 level. When A>B and 12 of 4U6D is at 1 level, strobe p26 instantaneously drops 11 of 4U6D to 0 raising 8 of 4U6C to 1 and clocking counter 1093.

The minimum-diameter limit count is entered by the comparator 105 on the D inputs of minimum-diameter limit register 1091 including blocks 4U1, 4U2, through conductors DMNLM0 through DMNLM9. This intelligence is impressed through the interface, FIG. 36. Computer 105 enters the minimum-diameter limit on input terminals O'D0 to O'D9 (FIG. 36). Through these terminals the limit is entered on output connections 1' through 10', FIG. 36, which are connected to input terminals, FIG. 12, DMNLM0 through DMNLM9, diameter minimum limit. A 1 strobe, DMNLMSTB, diameter minimum-limit strobe, impressed on input terminal X, FIG. 12, enters the minimum-diameter limit count on the Q outputs of this register 1091 and on the A inputs of minimum-diameter limit comparator 1089 which includes the blocks 4U3, 4U4, 4U5. The strobe is derived from the output terminal T of the interface (FIG. 36) through decoder 11U2 when a code (a binary 3) and strobe P51 are entered by the computer on the inputs of 11U2.

Each diameter count is entered on the B inputs of comparator 1089. The actual count for the diameter involved was entered on the A inputs through conductors CDCT0-CDCT8. If A is greater than B there is a 1 on output 5 of this comparator 1089 and on input 12 of NAND 4U6D. When the DUPDSTB is impressed there is also a 1 pulse, p26, on input 13 of 4U6D and a 0 pulse at its output 11 and on input NAND 4U6C. A 1 pulse is impressed on the clock inputs CK of blocks 4U12 and 4U13 of counter 1093. Counter 1093 can only be clocked by a rising edge of a pulse. If there is a 1 on input 9 of 4U6C when p26 is impressed, the output 8 of 4U6C becomes 0 and a count is recorded. There is no pulsation to clock counter 1093 if there is at the time p26 is impressed, a 0 on input 9 of 4U6C or input 12 of 4U6D. There is a 0 on input 12 of 4U6D for A<B or A=B. There is a 0 on input 9 if there are 1's on inputs 1 through 6 of NAND 4U16; in other words if the counter 1093 has counted up to 63. Once this counter has counted up to 63, it can no further be clocked and accepts no more counts.

The count in counter 1093 is entered in the Q outputs of this counter, and, through conductors DGTMN0 through DGTMN5, diameter greater than minimum limit, on the D inputs of latch 4U15. This data is entered into latch 4U15 while input ENABLE is positive during DMEASEN. At the end of DMEASEN the highest number of counts is latched in 4U15. The latches 4U14 and 4U15 are caused to enter their final counts on their Q outputs by a $\overline{DSELD}$, data select diameter, on the OUT CTL, output control, inputs of these registers. The entries on the Q outputs, are processed by computer 105. The $\overline{DSELD}$ signal is generated by decoder 11U3 on command of computer 105 and is transmitted through output terminal 15, $\overline{DSELD}$, FIG. 36. When 11U3 is coded by computer 105 at the appropriate time, latches 4U14 and 4U15 are not of the type that are required to be cleared. New input data replaces previously entered data in the same way as a new recording replaces an old recording on a magnetic tape.

DUPDSTB is a pulse derived from the apparatus shown in FIG. 10 which causes the counters 1085 and 1093 to be updated. This strobe is not impressed during the interval D, Table II, for $\overline{DCFALL}$ 1's on input terminal M, FIG. 10.

For the purpose of determining whether or not there is a pellet in the diameter station 127, the logic shown in FIG. 12 includes NOR's 4U18, 4U19 and 4U20. Output 1 of NOR 4U20 is connected to output terminal AA. A 1 on output terminal AA manifests the absence of a pellet in the diameter station; a 0 indicates that a pellet is present. Input 9 of NOR 4U20 is connected to MXDCT8 (diameter count 256). A 1 on MXDCT8 produces a 0 on output 8 and on output terminal AA and manifests the presence of a pellet regardless of the signals entered on inputs 9 and 11. The purpose of NOR's 4U18 and 4U19 is to check for the proper setting or operation of the mechanical system 101. In the absence of a pellet, there should be a lower limit for the lighted photo-diodes of the array 869 (FIG. 6). If there is a 1 on MXDCT7 (64), there is a 1 on inputs 13, 1 and 2 of NOR 4U18 and through output 12, a 0 on input 11 of 4U20. Likwise, if there is a 1 on conductors MXDCT6, MXDCT5 and MXDCT4, a 0 is entered on input 10 of 4U20. Entry of 0's on input 9, 10 and 11 of 4U20 indicates that the apparatus is operating properly but that there is no pellet in the diameter station 127. Entry of a 1 on inputs 10 and/or 11 of 4U20 but not on 10 indicates that there is maloperation because the 0 on MXDCT8 indicates the absence of a pellet but the 0 on MXDCT7 or on MXDCT6, MXDCT5, and MXDCT4 reveals lighted photo diodes where diodes should not be lighted.

To signal this maloperation, inverter 4U21, AND's 4U22 and 4U23 and OR 4U24 are provided. A 0 on MXDCT8 produces 1's on inputs 2 and 3 of AND's 4U22 and 4U23. If there is a 1 either at output 12 of NOR 4U18 or at output 6 of NOR 4U19, there is a 1 on output 5 of AND 4U22 or on output 6 of AND 4U23. In either case, there is a 1 on input 7 or 8 of OR 4U24 and indicator 1086 is enabled.

FIGS. 15 and 16 show graphically the manner in which the diameter correction is effected. In each, scan address (from 0 to 1024) for the diode array is plotted horizontally and count of lighted diodes at each address is plotted vertically. In FIG. 15 the apparent image 1131 of the calibration rod is shown and in FIG. 16 the apparent image 1133 of a fuel pellet P is shown. The slope of the lower boundary of image 1131 is caused by aberration; the calibration rod is of uniform diameter. Since the calibration rod is longer than the pellet, block 1131 is longer than block 1133. The counts 90 and 100 for lighted diodes at two addresses of the calibration pellet or rod are indicated in FIG. 15. This count is up from 0. The 90 and 100 is raw DCF. Assuming 90 to be the lowest measurement, the fixed DCF is 10. The count of the lighted diodes at the same addresses for the fuel pellet are indicated in FIG. 16 as 421 and 411. This count is down from 511. At the address on the left, 0 is added to 421 and at the address on the right 10 is added to 411. Both corrected counts are 421.

As shown in FIGS. 17 and 20, a beam 961 which serves to measure the length of the fuel pellet is in the shape of the sharp end of a chisel which engages the work or of a thin horizontal sheet of small vertical thickness having sharp boundaries on the right and left. As described in Wilks application, the beam is derived from a laser and is expanded into a horizontal sheet (Wilks FIG. 61). In this form, the beam is reflected by a dove prism 303 (FIG. 17) and is incident axially on the pellet P extending beyond the ends of the pellet. The image produced by the pellet is imaged by lens 963 and diode array 965. Screen 967 suppresses stray light. The array is scanned electronically under the control of Reticon board 966. The width of the beam should be such that it extends across all 1024 diodes of the array.

Figure 19:
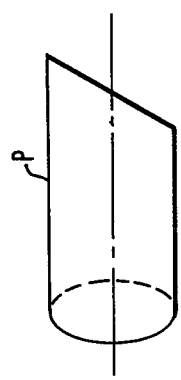
FIG. 19 is a view in side elevation of the pellet of FIG. 17 taken in the direction of the arrow XIX with the departure of the ends from the perpendicular to the axis exaggerated.
Figure 18:
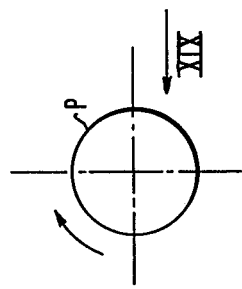
FIG. 18 is a view in end elevation of a pellet inspected in the practice of this invention.

As shown exaggerated in FIGS. 18 and 19, the ends of the pellet P may not be square. The length is defined as the length of the central axis of the pellet between its intersecting with the end surfaces.

The pellet is disposed for measurement on rotating rolls (Wilks 267 and 269, FIG. 60) in the length station 131 (FIG. 1). FIG. 20b shows the development of the shadow of a pellet as it is rotated by the rolls, and scanned mechanically, line by line, by the beams 961 through one revolution. The angle of rotation is plotted horizontally and the length of the electronic scan of the diode array at each angle of the mechanical scan is plotted vertically. The part of the electronic scan which passes through the shadow or the shadowed diodes, at each point of the mechanical scan is shown hatched. The boundaries of the hatched area has the form of full-wave rectified alternating current. The unhatched areas on both sides of the hatched area represent lighted diodes. The length, which is measured in counts, is the total count over the diode array less the counts for L1MAX+L2MAX.

The apparatus shown in the block diagram of FIG. 21 includes the control logic 1135, the L1 counter 1136, the L2 counter 1138 and the comparison unit 1137. The control logic 1135 is shown in detail in FIG. 22 and the counters 1136 and 1138, comparison unit 1137, and latch 1171 in FIG. 23. The MEASEN pulse p100 is entered into the control logic through line 1139. The starting trigger signal LRETSTRT, length Reticon start, is entered through line 1141, the continuous train of pulses LRETCK, length Reticon clock, through line 1143, the video LRETVID, length Reticon video, through line 1145 and the end-of-line signal LRETEOL, length Reticon end of line, through line 1147. These signals are entered from the Reticon board 966.

The comparison unit 1137 includes storage register 1151 and a comparator 1153 for L1 and a storage register 1155 and a comparator 1157 for L2. The registers 1151 and 1155 are strobed by signals from the associated comparators 1153 and 1157 on lines 1159 and 1161 if a comparator 1151 or 1155 shows an increased L1 or L2. There is an adder 1163 which addes L1MAX plus L2MAX for processing in computer 105. There is also a no-pellet detector 1165 which is actuated by the output of the L1 counter if the count is so large as to indicate that there is no pellet at station 131. The adder enters its data in latch 1171 and the highest magnitude latched at the end of MEASEN is retained.

Figure 22B:
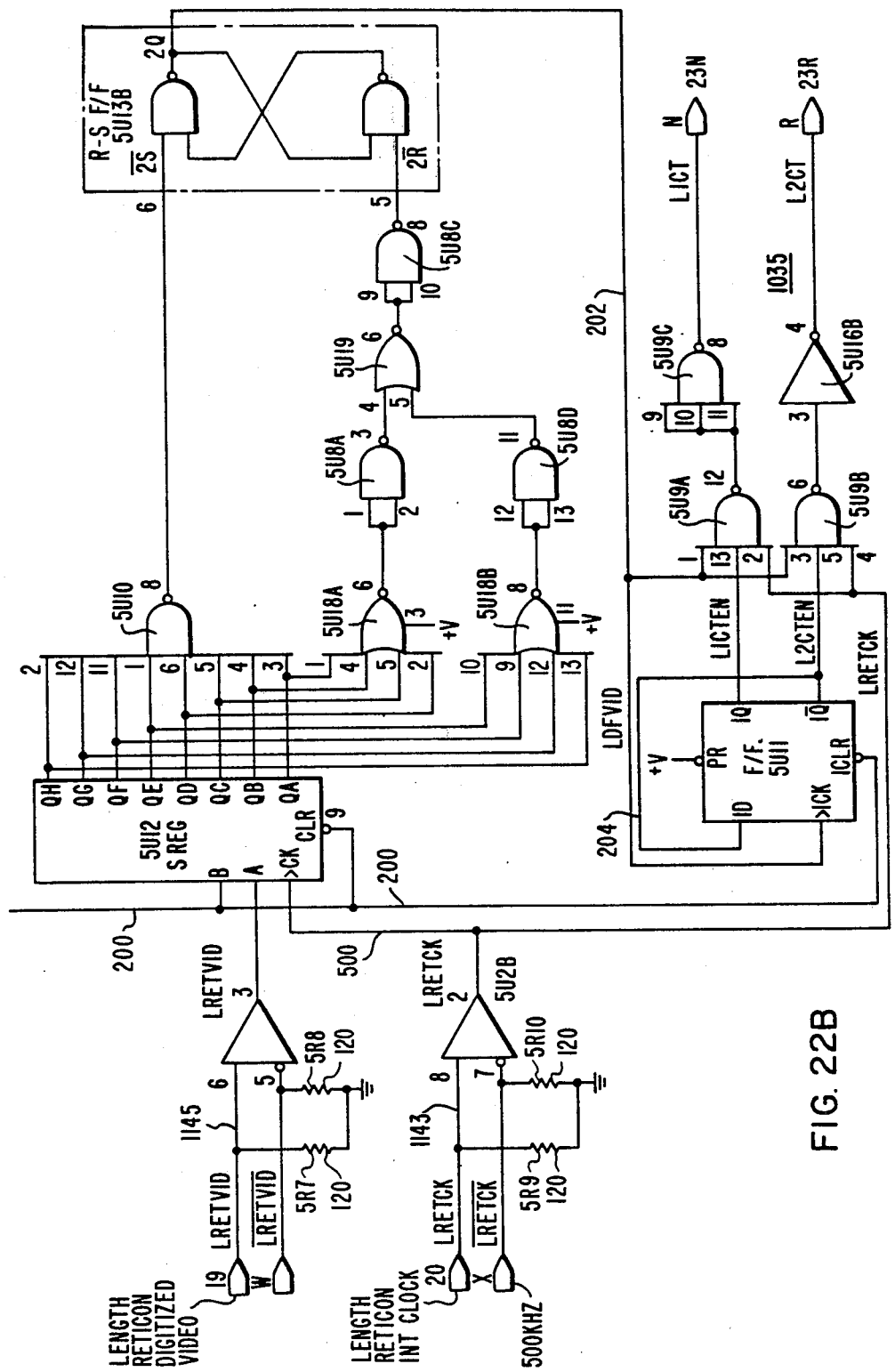

FIGS. 22 and 23, which show the details of the control logic 1135, counters 1136 and 1138, comparator unit 1137 and latch 1171 will here be explained with reference to FIGS. 24a through 24d and FIGS. 25a through 25i. In each of these views, time is plotted horizontally and magnitude 1 or 0 vertically. The points of intersection of all time axes in each graph by a vertical line identifies the same time interval.

Typically, the pellet is rotated at a velocity of 600 rpm. It completes one revolution in 100 ms. The minimum MEASEN interval (FIG. 24a) is 100 ms.

It is desired that 40 length measurements be taken on a rotating pellet during the MEASEN period. A Reticon electronic scan of the diode array 965 should start every 2.5 ms. The required internal clock frequency produced by Reticon 966 is based on a minimum count of 8 between start pulses plus 1024 for the elements in the array 965.

Minimum count = 1024 + 8 = 1032

Let f = frequency of the electronic scanning pulses produced by Reticon 966. The period of these pulses is:

$1032 \times 1/f = 2.5$ ms $f = 412$ kHz

The clock rate is typically set at 500 kHz; this is a clock period of 2 μs. This higher clock period assures the complete electronic scan of the photo-diodes for separated elements of the optical scan. The blanking period between the last element or pulse of an electronic scan and the first element or pulse of the next scan should be set to achieve the 2.5 ms scan period.

Blanking count determination:

| | | |
|---|---|---|
| 1024 × 2 μs | = | 2.048 ms |
| 2.5 ms − 2.048 ms | = | 0.452 ms |
| 0.452 ms / 2 μs/count | = | 226 counts |

The switches of the Reticon 966 which control the frequency of the waves of the electronic scan should be set for (1024+226)−1=1249.

The logic shown in FIG. 22 will now be described. During standby the photo-diode array 965 (FIG. 21) is scanned automatically at the appropriate rate 2.5 ms. For each scan a start pulse LRETSCST, length Reticon scan start, is impressed on input terminals 16, LRETSTRT, and T, $\overline{\text{LRETSTRT}}$. The start pulses are a train of pulses (FIGS. 24d, 25a). They are transmitted through amplifier 5U1A to produce pulses p30, along conductor 1172, LRETSCST. Typically each pulse p30 is of 2 μs duration and the period between pulses is 2.5 ms. At the end of each scan of the diode array an end-of-line pulse (FIGS. 24b, 25b) is produced. Each pulse is impressed an input terminals 17, LRETEOL, and U, $\overline{\text{LRETEOL}}$. The EOL pulses are amplified by amplifier 5U1B and shaped by retriggerable monostable multivibrator 5U17 producing pulses p31.

In the absence of a MEASEN pulse p100 on input terminal 21, NANDS 5U3A and 5U3D operate as gates to block the passage of p30 and p31. At this time counter 5U7 is reset at RST having been reset by the trailing edge of the preceding MEASEN pulse p100, inverted by inverter 5U16. After p100 is impressed, inputs 1 and 2 of NAND 5U3A both become 1 on the entry of p31 (EOL) on input 1. Inputs 4 and 5 of NAND 5U3B become 0 and output 6, 1. The leading edge of the pulse at output 6 clocks flip-flop 5U4, producing a 1 level p33, at 2Q. There is a 1 on input 2 of NAND 5U6A so long as level 1 at 2Q remains. When pulse p30 (start) is entered on input 1 of NAND 5U6A, there is a 0 at its output 3. Counter 5U7 is clocked by the leading edge of the pulse p34 from output 6 of 5U6B and counts.

Counter 5U7 counts 1 for each end-of-line pulse; i.e., for each scan of the photo-diode array. When 5U7 counts up to 32, a 1 is entered at input 10 of NAND 5U6C from output VO6 of 5U7 through amplifier 5U20A. Counter 5U7 then counts an additional 8. On this latter count a 1 is entered on input 9 of 5U6C. There is a 0 at its output 8 and on 2CLR of 5U4, reducing level p33 to 0. There have at this point been 40 measurements of the length of the pellet on the roller seat. The 0 is a level and remains on output 8 of 5U6C and flip-flop 5U4 continues to be clear until counter 5U7 is reset by the trailing edge of the MEASON signal p100 when it is terminated. Level p33 is also impressed on output terminal L, LSC WND, length-scan window (FIG. 24c) through conductor 1173. During the length-scan window the length data is stored and processed.

Level p33 impresses a 1 on input 13 of NAND 5U6D. On the entry of a succeeding start pulse p30 on input 12 of this NAND, there is a 0 on output 11 and a 1 appears on output 1Q of flip-flop 5U13A and on conductor 200, LSMPLEN, length sample enable (FIGS. 24e, 25c). Before the signal from 5U6D was impressed, there was a 0 at 1Q of 5U13A. Shift register 5U12 and flip-flop 5U11 were maintained clear by 0 level on ICLR through conductor 200. The 1 on 1Q of 5U13A and on conductor 200 conditions 5U12 to be enabled to count 1's with a 1 on input A and 0's with a 0 on input A. Shift register 5U12 is enabled by a 1 impressed on input B.

Clock pulses are impressed continuously from the Reticon 966 on input terminals 20, LRETCK and X $\overline{\text{LRETCK}}$, length Reticon clock. These pulses are of 200 ns duration and are impressed at intervals of 2 μs. These pulses are impressed through amplifier 5U2B as clock pulses on shift register 5U12 and as gating pulses on NANDS 5U9A and 5U9B. It is assumed that outputs QA through QH of shift register 5U12 are initially 0. The clock pulses on shift register 5U12 have no effect until a 1 is entered on A input so that 1's can be counted.

A signal is entered through input terminals 19, LRETVID, length Reticon video, and W, $\overline{\text{LRETVID}}$, during the interval that lighted photo-diodes are being scanned. It is assumed that the length L1 is being scanned. This signal LRETVID is entered as 1 level on input A of 5U12 through amplifier 5U2A. Shift register 5U12 is now enabled and as the clock pulses are impressed. 1's appear on output QA through QH and on inputs 1 through 6, 11 and 12 of NAND 5U10. At the appearance of the eighth 1 on QH, output 8 of 5U10 becomes 0 producing a level 1 on output 2Q of flip-flop 5U13B and on conductor 202, LDFVID, length digital filter video (FIG. 25e). The 1 on conductor 202 conditions NAND 5U9A to be enabled to pass Reticon clock pulses. The leading edge of the change of level on output 2Q of flip-flop 5U13B also clocks flip-flop 5U11 to enter a 1 on 1Q and a 0 on $1\bar{Q}$. The clock counts (FIG. 25k), exceeding the first 8, corresponding to the lighted region L1 are impressed as counts on output terminal N through 5U9C and impressed on input terminal N of the comparison unit (FIG. 23). The purpose of shift register 5U12 and NAND 5U10 is to filter out the counts in the twilight zone where the scanner enters the lighted region (FIG. 25e). The 8 pulses produced by NOR's 5U18A and 5U18B enabled the scanning to pass through the twilight zone from light to dark (FIG. 25e).

When the photo-diode array scanner enters the shadow or dark area, the input A on shift register 5U12 is 0 and the clock pulses enter successive 0's on QA to QH. When 0's are entered on QA through QD and on inputs 1, 4, 5, 2 or NOR 5U18A, output 6 of this NOR becomes 1, output 3 of NAND 5U8A becomes 0 and a 0 is entered on input 4 of NOR 5U19. When outputs QE through QH becomes 0, inputs 10, 9, 12, 13 or NOR 5U18B becomes 0, a 1 is entered on inputs 12, 13 of NAND 5U8D and input 5 of NOR 5U19 becomes 0. Output 8 of NAND 5U8C and reset input $2\bar{R}$ of flip-flop 5U13B become 0 and a 0 appears an output 2Q of this flip-flop and on conductor 202. A clock pulse is impressed on flip-flop 5U11 by the trailing of the 1 level that was entered at 2Q of flip-flop 5U13B.

Up to this time there was a 1 on output 1Q, LICTEN, L1 count enable, of flip-flop 5U11 (FIG. 25f). There was a 0 on $1\bar{Q}$ and through conductor 204, a 0 on input 1D of 5U11. On the impressing of the clock pulse through conductor 202, output 1Q of 5U11 becomes 0 and output $1\bar{Q}$, L2CTEN, L2 count enable, becomes 1 (FIG. 25g).

The scanning continues through the shadow region (FIG. 25d, e) and then passes into the lighted region. Once the lighted region is reached, shift register 5U12 filters out the first 8 counts. Thereafter the counting continues (FIG. 25i) through NAND 5U9B which is now enabled by 1's on its inputs 3 and 5. The 0 pulses derived from NAND 5U9B are converted into 1 pulses by inverter 5U16B and transmitted for processing through output terminal R.

At the end of each sample the p31 impresses a 0 ($\overline{EOL}$)on the $1\bar{R}$ reset input of flip-flop 5U13A through inverter 5U16A. Output 1Q becomes 0 and the trailing edge 206 of the terminating 1 level on 1Q is impressed on input 1A of retriggerable monostable multivibrator 5U5 producing a pulse at 1Q and an output terminal 13, LUPDSTB, length up-date strobe (FIG. 24f). The data stored is updated so that ultimately the maximum length is stored. During the MEASEN interval, each start pulse LRETSCST (FIG. 24d) through 5U3D, produces a pulse p61, LECTCLR, length count clear (FIG. 24g), which is transmitted through output terminal F (FIG. 22) to input terminal F (FIG. 23) to clear the comparison unit. The relationship between the pellet and the video is shown in FIG. 26. The counting continues until 40 sample counts of length have been taken when 5U4 is cleared.

The comparison unit 1137 shown in FIG. 23 will now be described. The L1 counts (FIG. 25k) are clocked into the Q outputs of counter 1136 through input terminal N and the L2 counts (FIG. 25i) into the Q outputs counter 1138 through input terminal R. Counter 1136 includes the blocks 6U1, 6U2, 6U3 and counter 1138 includes the blocks 6U9, 6U10, 6U11.

The L1 count in counter 1136 is entered in the A inputs of comparator 1153 including blocks 6U5, 6U6, 6U7. The L2 count in counter 1138 is entered in the A inputs of comparator 1157 including the blocks 6U13, 6U14, 6U15. The L1 counts of counter 1136 are also entered on conductors L1CT0 through L1CT9 and through these conductors in the D inputs of storage register 1151. The L2 counts are entered on conductors L2CT0 through L2CT9 and through these on the D inputs of storage register 1155. Storage register 1151 contains the maximum L1 length count derived from earlier scans. This maximum count is entered on conductor L1MXCT0 through L1MXCT9 and through these conductors on the B inputs of comparator 1153. If the A count on this comparator is greater than the B count, a 1 level is entered from output 5 on input 1 of NAND 6U20A. When the update strobe (FIG. 24f) is impressed on input terminal 13 at the end of the electronic scan, a 1 is entered on input 2. A0 is entered on inputs 4 and 5 of NAND 6U20B and a 1 pulse is entered on clock input CK of register 1151. The D inputs are clocked to the Q outputs setting up a new L1MAX count. Likewise if the A count is greater than the B count in comparator 1157, the D inputs of storage register 1155 are clocked to the Q output through NAND's 6U20D and 6U20C.

The L1MAX counts as they are produced are entered into the B inputs of adder 1163 through conductors L1MXCT0 through L1MXCT9. This adder includes blocks 6U17, 6U18 and 6U19. The L2MAX counts, as they are produced, are entered in the A inputs of adder 1163 through conductors L2MXCT0 through L2MXCT9. The sums are entered in the Σ outputs of the adder. The operation of the adder is such is to permit new maximum counts and sums to replace earlier lower maximum counts. The sums are entered through conductors LSMXCT0 through LSMXCT9 in the D inputs of output latch 1171 including blocks 6U21 and 6U22. This latch is enabled to receive the sums during the length scan window LSCWND, (FIG. 24c) which is entered in its inputs ENABLE from input terminal L. Input terminal L receives the window pulse from output terminal L, FIG. 22. As the sums change, the new sums replace the older sums in the D inputs of latch 1171. At the end of LSCWND, i.e., on the completion of 40 scans of a pellet, when LSCWND becomes 0, the sum then in the inputs D is latched into the latch 1171. After MEASEN, computer 105 as programmed in the appropriate sequence, enters the appropriate code (binary 3) on decoder 11U3 (FIG. 36) and a 0 level, $\overline{DSELL}$, data select length, is entered on inputs $\overline{OUT}$ $\overline{CTL}$, out control, of the latch 1171. This signal causes the highest sums then in the latches to be entered on the output terminals DWL0 through DWL9 for processing by computer 105.

Figure 23A:
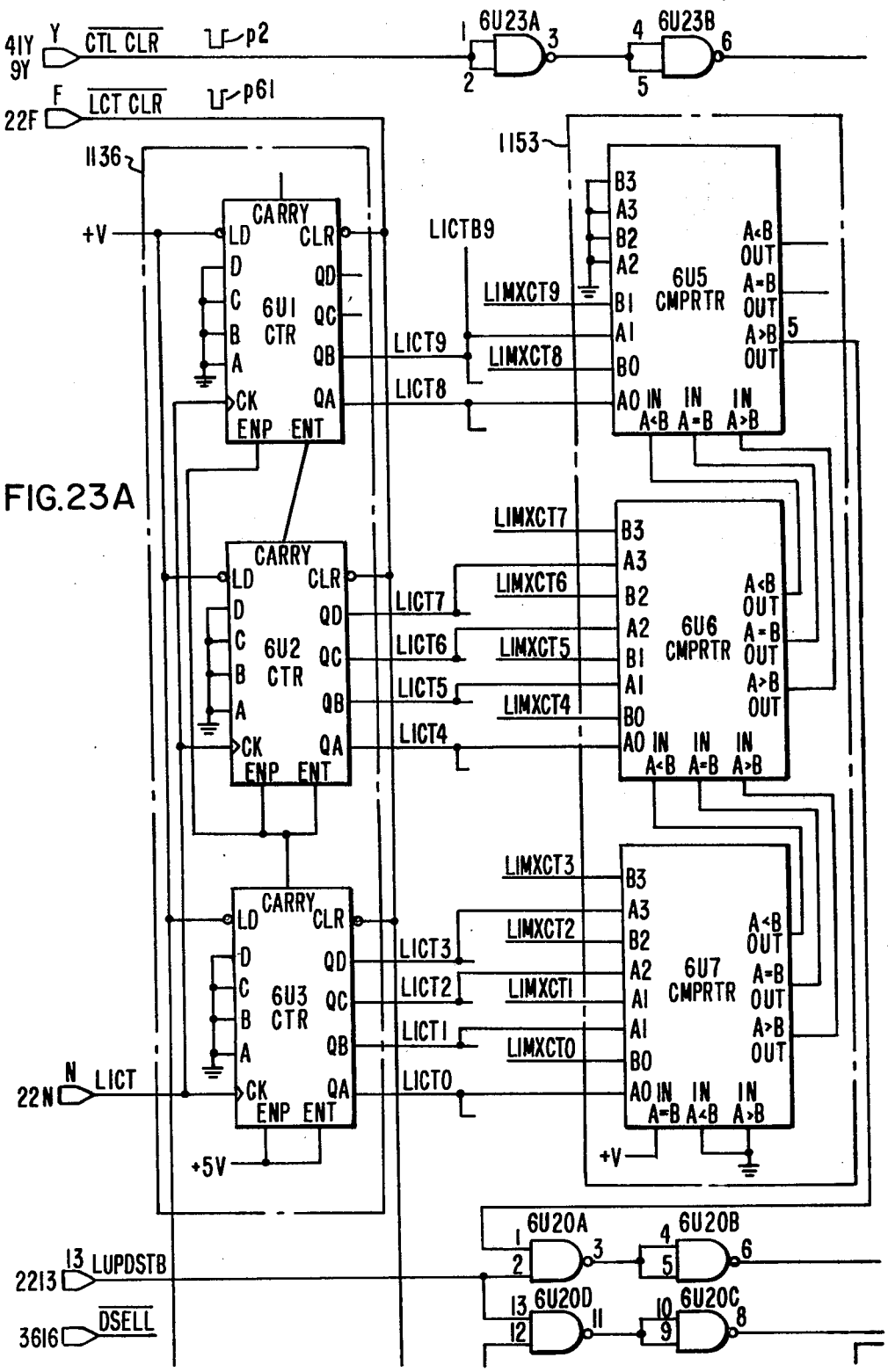
FIGS. 23A, 23B, 23C, 23D together are the logic schematic for count and comparison in the measurement of length of a pellet.
Figure 23B:
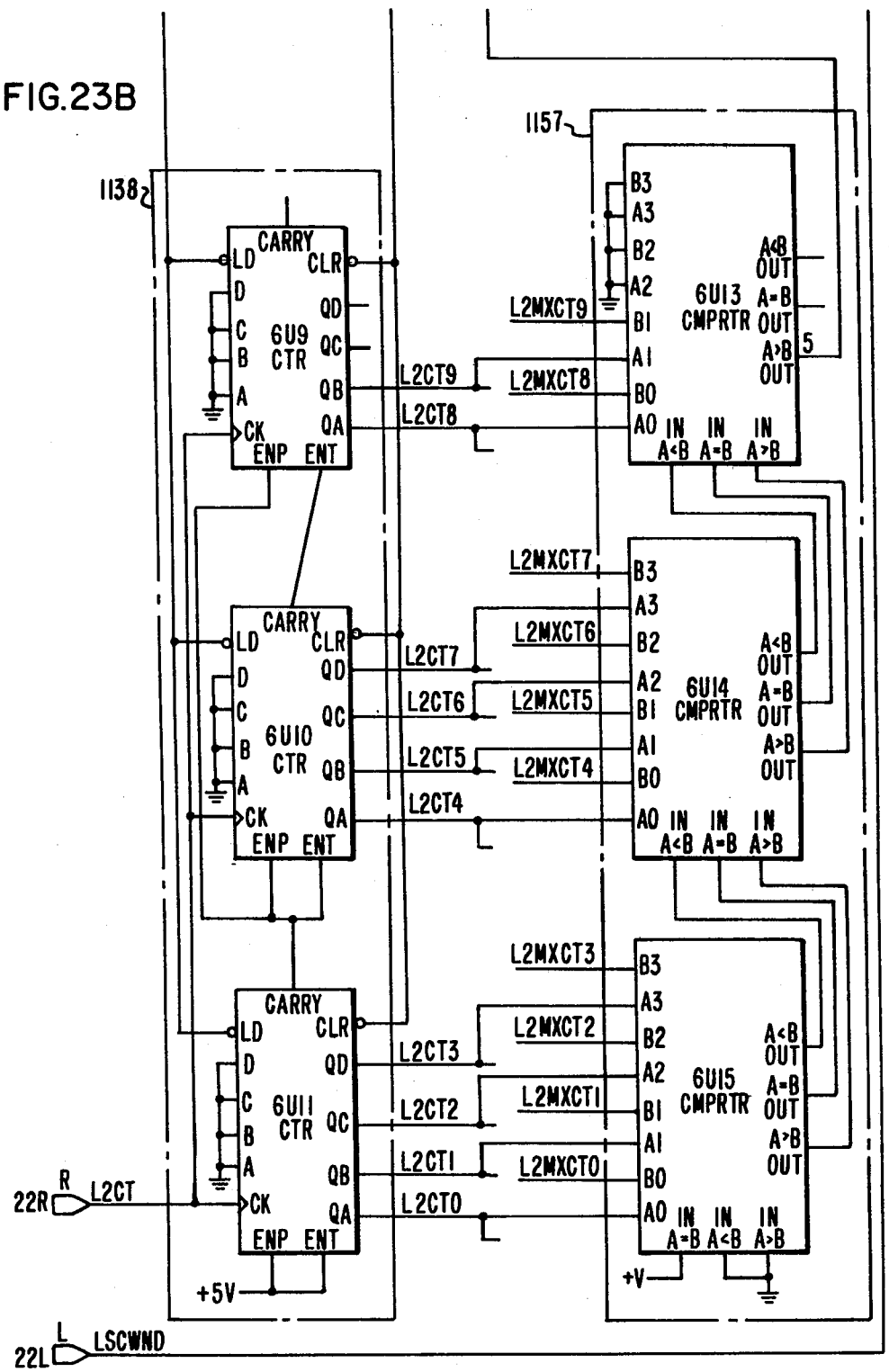
Figure 23C:
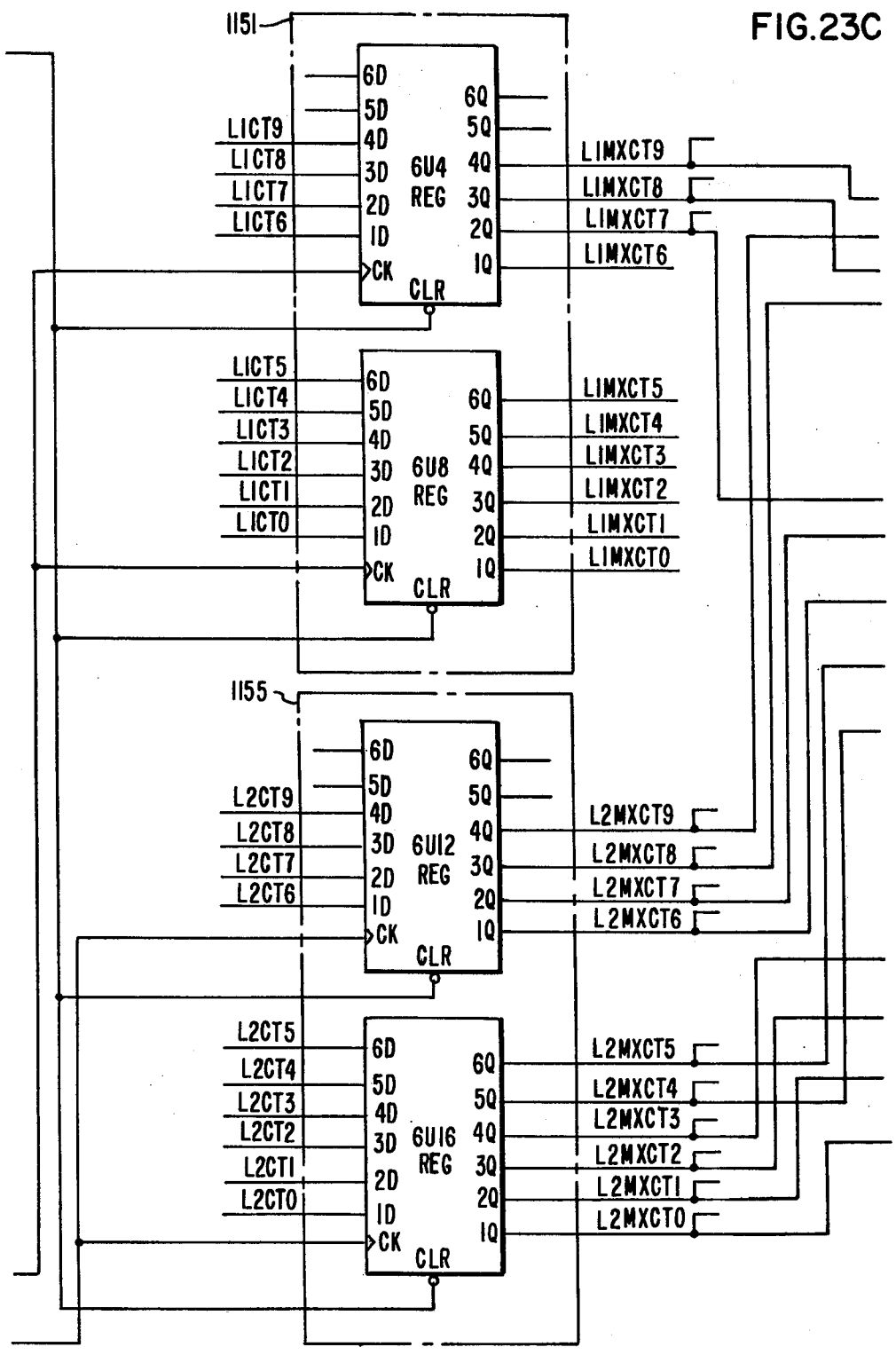
Figure 23D:
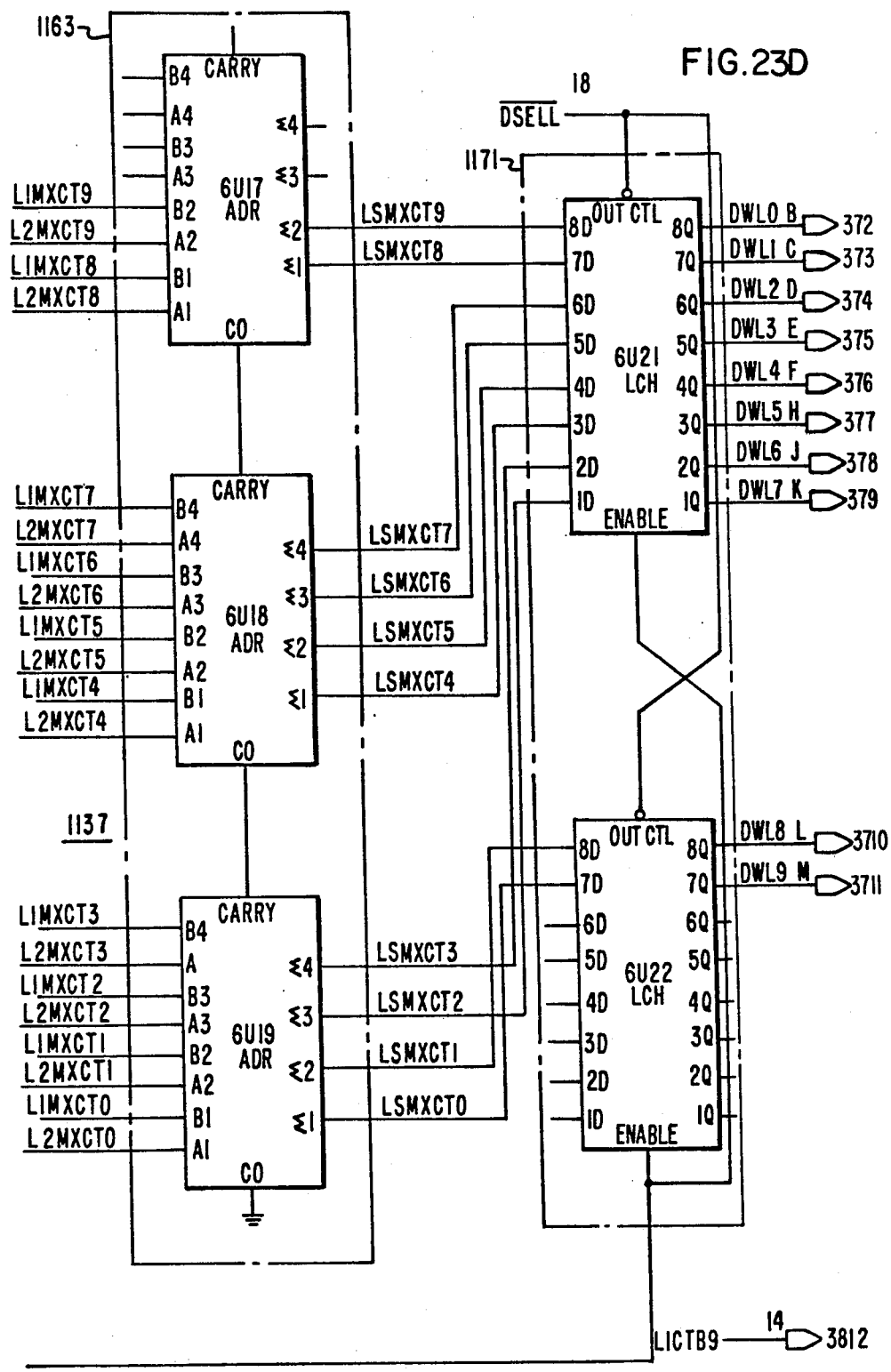

The ninth bit of the L1 counter 1136 is connected through conductor L1CTB9, L1 count bit 9, to output terminal 14 (FIG. 23D). Output terminal 14 is connected to input terminal 12 of the logic shown in FIG.

38. A 1 on the ninth bit during the count of any scan indicates that there is no pellet at station 131. The logic shown in FIG. 38 produces the appropriate response to the absence of a pellet.

At the beginning of each electronic diodearray scan LRETSCST, causes pulse p61, $\overline{\text{LCTCLR}}$, length count clear (FIG. 22A), to be generated (FIGS. 24d and g). $\overline{\text{LCTCLR}}$ is impressed through input terminal F (FIG. 23A) to clear counters 1136 and 1138. At the beginning of each new MEASEN, pulse p2, $\overline{\text{CTLCLR}}$, is generated as shown in FIG. 41. $\overline{\text{CTCLR}}$ is impressed, through input terminal Y, (FIG. 23A), buffer NAND 6U23A and inverter NAND 6U23B, on the CLR inputs of storage registers 1151 and 1155 to clear these registers.

FIG. 27 is a fragment of FIG. 63 of Wilks application and shows a portion of the flaw-detection optical system. The description of this portion is presented here as an aide to the understanding of the invention described in this application. The converging beam 911 is swept horizontally by a rotating scanning prism (not shown—but shown at 907 in Wilks FIG. 63). The beam 911 is incident on beam splitter 919. The beam splitter reflects a portion 921 of the beam on a grating 941 on which it is focused. There is a photocell unit 943 including a photo diode and op amp (not shown in detail) behind the grating 941. The unit 943 converts the light pulsations produced by the beam as it sweeps across the grating into squarewave electrical oscillations (230, FIG. 31C) which serve as clock pulses in evaluating the flaws on the surface of pellet P. The other portion 341 of the beam is reflected by mirror 327 and is focused on the surface of pellet P sweeping over the length of the surface of the pellet. The pellet is disposed for inspection on rollers 367 and 369 in station 129 (FIG. 1). The rollers rotate, rotating the pellet. The optical distance between the surface of the grating 943 where the beam 921 is incident and the point where the optic axis intersects the beam splitter 919 is equal to the distance between the point where the optic axis of the beam intersects the beam splitter and the surface of the pellet P on which the beam is incident.

The beam 343 reflected by the pellet is focused by lens 925 on a photocell unit 929. A screen 927 suppresses stray radiation. The unit 929 includes a photodiode and an op amp. This unit converts the changes in reflected light from the pellet P into electrical signals. In each cases the op amp buffers into photocell output, increases the reference speed and produces a voltage proportional to the photo-diode current which is proportional to the light incident on it.

Figure 30:
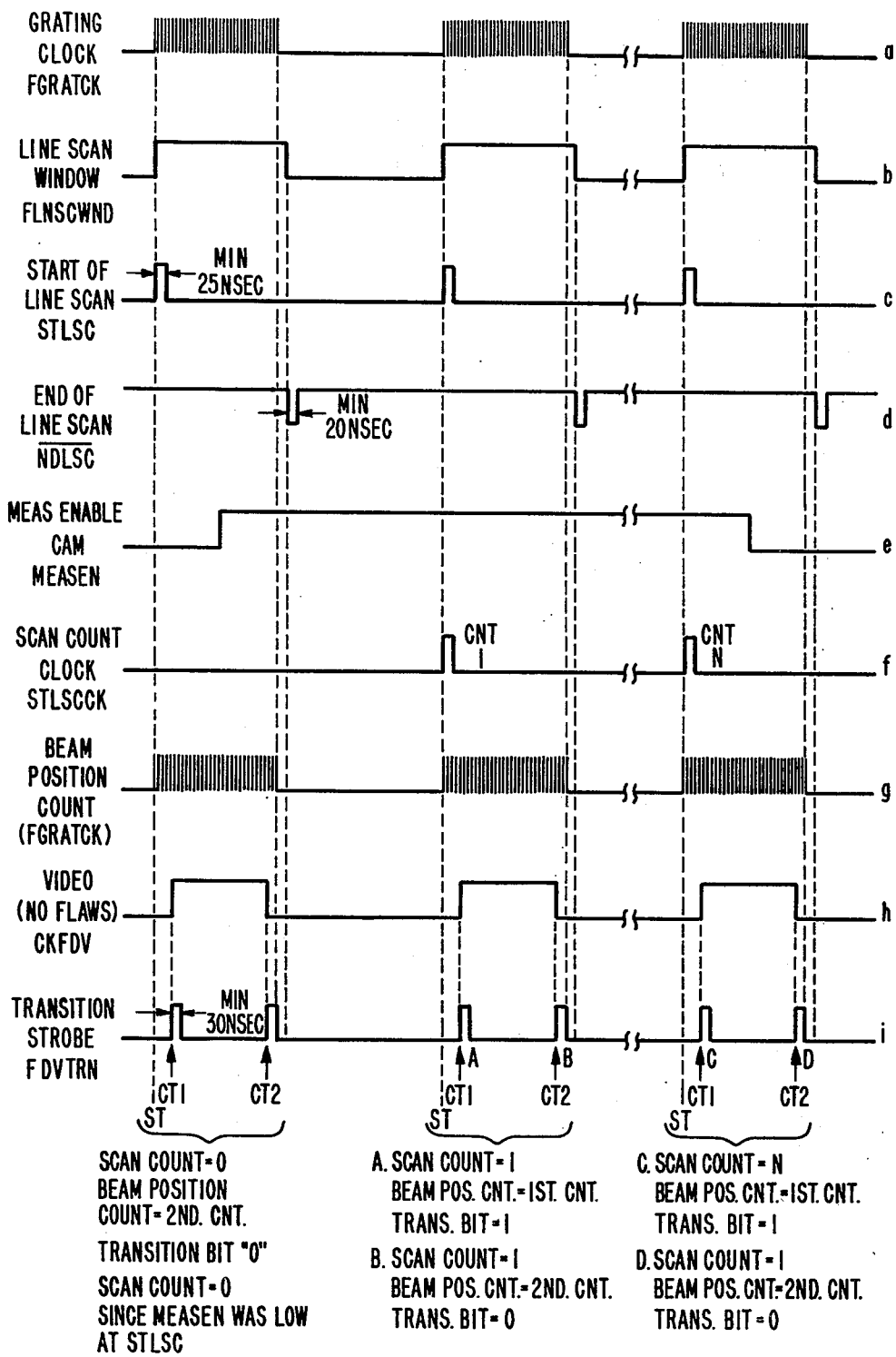
FIG. 30 is a graph showing the pulses which take part in the detection of surface flaws, their timing function and their relationships.

The operation of the flaw detection apparatus shown in FIGS. 28 and 29 will be explained with reference to FIGS. 30a through i and FIGS. 31a through h. In FIG. 30, time is plot horizontally and magnitude, 1 or 0, vertically. The points of intersection of a vertical line with all time axes represent the same instant of time. FIG. 30a shows the grating clock pulses FGRATCK, flaw grating clock, during the scan of a pellet before MEASEN (FIG. 30e) starts, during the first scan after MEASEN starts and during the Nth scan during which MEASEN ends. FIG. 30b shows the corresponding flaw line scan window, FLNSCWND, during which the count measuring flaw area, if any, is produced. FIG. 30 is based on a pellet which has no flaws (FIG. 30h). FIGS. 30c and d show the corresponding pulses at start of the line scan, STLSC, and at the end of the line scan, $\overline{\text{NDLSC}}$. These are short pulses; STLSC has a duration of 24 ns and $\overline{\text{NDLSC}}$ 20 ns. FIG. 30f shows the corresponding pulses which count the scans; there are N scans. FIG. 30g shows the beam position counts along the pellet. FGRATCK pulses produce the beam position counts and FIG. 30g is the same as FIG. 30a. FIG. 30h shows the corresponding clock flaw digitized video CKFDV. Transitions in signals occur as the scanning beam passes onto and off of the pellet and as it enters and leaves a flaw. A transition from dark to light is positive. This happens when the beam moves from off the pellet onto the pellet or from a flawed part of the surface to an unflawed part of the surface. A transition from light to dark is negative. This happens when the beam moves off the pellet or from an unflawed part of the surface to a flawed part of the surface. The transition strobes, FDVTRN, flaw digitized video transition, are shown in FIG. 30i.

FIGS. 31a through h are a plot showing the manner in which flaw inspection is carried out. The count, FGRATCK, produced by the photo-diode 943 (FIG. 27) is plotted horizontally (FIG. 31c) and magnitude 1 or 0 vertically. All points of intersection at the count axes with a vertical line through the graphs a through h identify the same count for all graphs. Graph 31a shows the surface of a pellet P which is being inspected unrolled. It is assumed that the pellet P has flaws F1 and F2. The pellet P is scanned by scan lines 220. Each scan line 220 typically has a width of 0.006". Each count also has a width of 0.006". Each element of the scan, PIXEL, picture element, is a square 0.006"×0.006". The scan lines 220 scan the surface of the pellet through one revolution of the pellet. The last scan line is separated from the first scan line by 0.006". The scanning extends beyond the end surfaces of the pellet. Positions along the pellet or along each scan line are determined by clock square waves p40 from the photo-diode 943. These square waves p40 are plotted in FIG. 31c as FGRATCK, flaw grating clock. The p40 square waves start and terminate beyond the end surfaces of the pellet P. The square waves open and maintain open a window, FLWSCWND, flaw line scan window, which is plotted in FIG. 31d.

As each scan line 220 scans the pellet it moves from dark areas to light areas and from light areas to dark areas. The resulting changes in the light level reflected by the pellet are manifested electrically by the photocell unit 929 (FIG. 27) as it is influenced by the beam 343. It is assumed that the beam sweeps from left to right with reference to FIG. 31. Before the beam reaches the left-hand end of pellet P, no light is reflected to photocell unit 929. At the left-hand edge of the pellet, light is reflected to the photocell unit. A positive electrical transistion is manifested by unit 929. This change is transmitted through input terminals 19, FDIGVID and W, FDIGVID (FIG. 28). The flaw F1 (FIG. 31) deflects the light from the beam 343 away from the photocell unit 929. There is at the entrance to the flaw a sharp decrease in the electrical signal delivered by the unit 929 through input terminals 19 and W. A negative transition is manifested at the left-hand boundary of the flaw. When beam 343 leaves the flaw F1 on the right, the light of the beam is again reflected to the photocell unit 929 and a positive transition is manifested at the right-hand boundary of flaw F1. Analogous transitions occur for flaw F2. A negative transition occurs at the right end of the pellet P. These changes, like the change at the left-hand end of the pellet, are entered into the apparatus shown in FIG. 28 through input terminals 19 and W.

The transition from dark to light, is designated as FDVPTRN, flaw digitized video positive transition (FIG. 31e). The transition from light to dark is designated FDVNTRN, flaw digitized video negative transition (FIG. 31f). Each pair of positive and negative transitions, other than the transitions at the ends of the pellet, define between them a video, FDIGVID, flaw digitized video (FIG. 31f) whose count is a measure of the length of a 0.006" wide element of a flaw along a scan line. By adding the 0.006"×0.006" squares, Pixel, encompassed by the flaw, the area of the flaw is determined. By counting the 0.006"×0.006" squares around the periphery of the flaw, the perimeter of the flaw is determined. The area and periphery serve to compute the criteria on which the acceptance or rejection of pellets because of flaws is based. The digitized video provides a clock pulse, CKFDV, clock flaw digitized video, (FIG. 31g), which identifies the sense or polarity of the transition. FIG. 31g is the same as FIG. 31b.

Figure 28A:
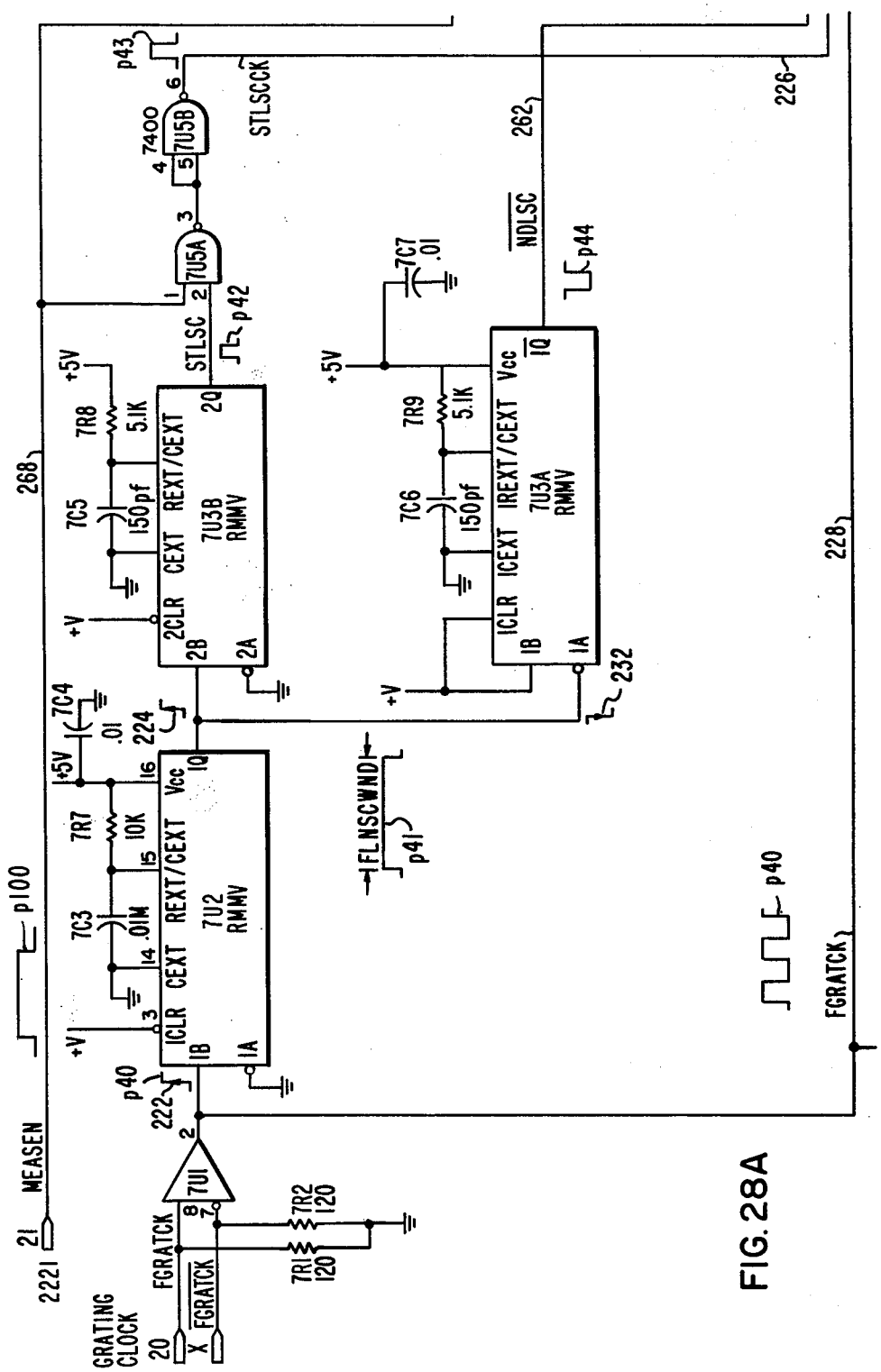
FIGS. 28A, 28B, 28C together are the logic schematic showing the flaw count control in inspecting a pellet for flaws.
Figure 28B:
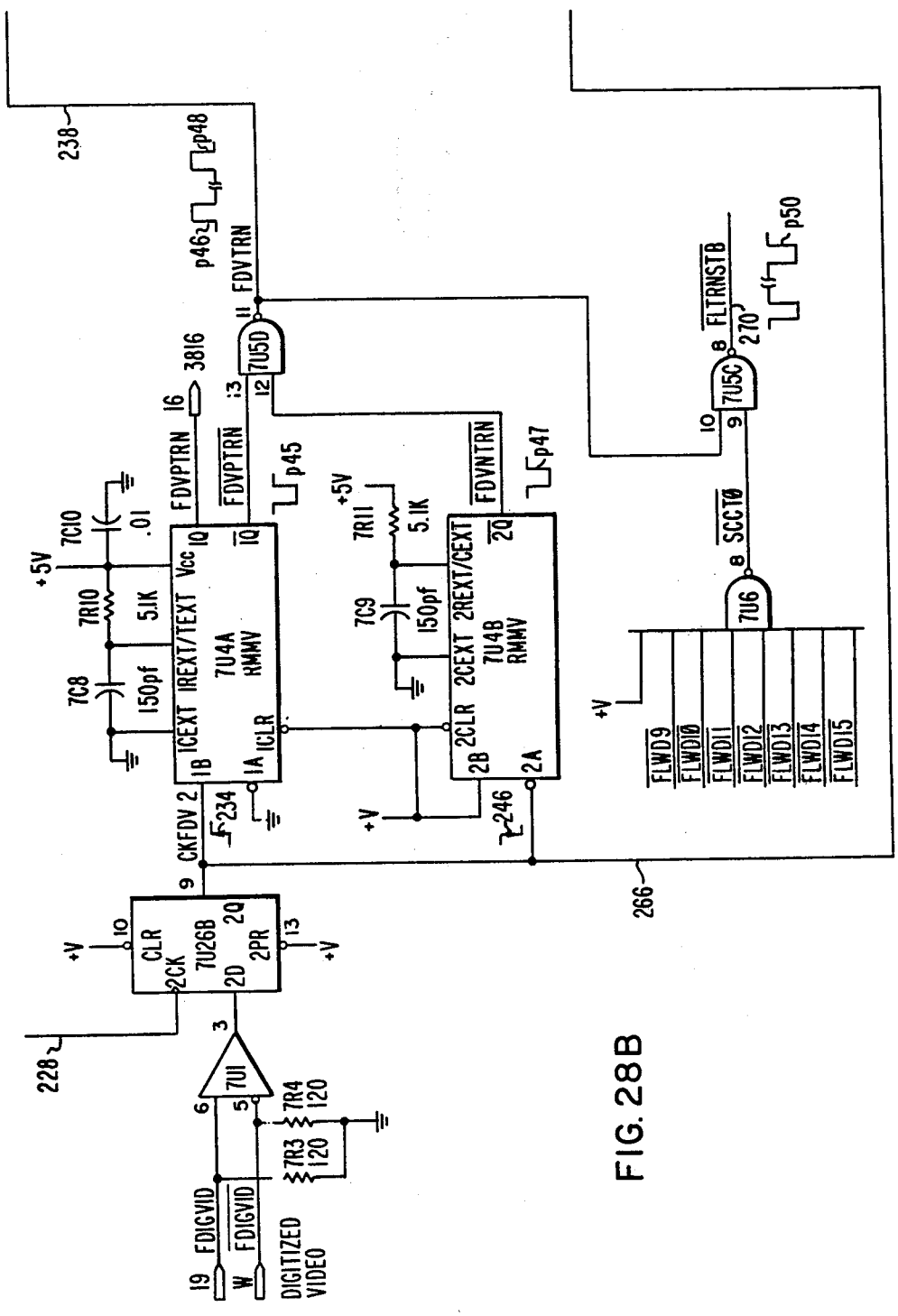

In the flaw count control schematic, FIG. 28, counter 1191 including blocks 7U7 and 7U8 counts the positions along each scan line of each elemental area under inspection. This counter produces the counts along each scan line between negative and positive transition along a flaw. It also produces the count between the ends of the pellet thus measuring its length. Counter 1191 transfers its counts to register 1193 including blocks 7U11 and 7U12 for further processing. Counter 1195 including blocks 7U9 and 7U10 produces counts of scan lines. This counter transfers its counts to register 1197 including blocks 7U13 and 7U14. Registers 1193 and 1197 contain the addresses encompassed by the flaw areas in terms of scan line and count along scan line.

Before the flaw measurement of a pellet P starts, the scanning prism (907, FIG. 63 Wilks) is rotating at full speed in synchronism with the rollers 367 and 369 at station 129 on which the pellet is seated. The pellet P is being scanned and the grating clock squarewaves FGRATCK (FIG. 31c) are being generated. The apparatus is in standby until the MEASEN pulse p100, FIG. 30e, is impressed on input terminal 21. Counts are being clocked into counter 1191 from input terminals 20 FGRATCK and X $\overline{FGRATCK}$, flaw generating clock, through amplifier 7U1 and conductor 228.

Pulse p100 enters a 1 on NAND 7U5A. The grating square waves are impressed on input terminals 20 and X. Square waves p40 are derived from amplifier 7U1. The leading edge 222 of each wave p40 is impressed on input 1B of retriggerable monostable multivibrator 7U2 entering a 1 at 1Q. The multivibrator is retriggered by leading edges of waves p40 before it can reset. The signal at 1Q is a 1 level p41, FLNSCWND, flaw-line scan window (FIG. 31D). A separate window is generated for each scan line. As shown, this window starts before the scan line is incident on the pellet. The leading edge 224 of each window is impressed on input 2B of retriggerable monostable multivibrator 7U3B producing a 1 pulse p42 at 2Q and a 1 on input 2 of NAND 7U5A. Since MEASEN pulse p100 is entered on input 1, there is for duration of p42 a 0 on inputs 4 and 5 of NAND 7U5B and a 1 pulse p43 at its output. Through conductor 226, p43 are impressed as clock pulses on counter 1195, which counts the first scanning line. The count is entered on a Q output of the counter 1195 and on a D input on the register 1197. The square waves p40 are also impressed as clock pulses on counter 1191 through conductor 228. These counters thus count the positions of the scanning beam along the pellet. MEASEN is not synchronized with the scan but only complete scan lines are produced. This happens because counter 1195 can only be clocked when pulse p42 is produced and pulse p42 can only be produced at the beginning of FLNSCWND p41. Counter 1195 is clocked independently of MEASEN and it counts complete scans.

At the end of the scan, the grating multivibrator 7U2 is retriggered for the last time by the last grating pulse and thereafter resets. This marks the end of level p41, FLNSCWND (FIG. 31d). The window p41 terminates after the last grating wave 230. The trailing edge 232 of the window p41 is impressed on input 1A of retriggerable monostable multivibration 7U3A producing a 0 pulse p44 at output 1Q. This pulse p44 is impressed on CLR inputs of counter 1191 to clear this counter. Subsequent scans are similarly produced and the grating pulses counted. During the counts of each scan over transition areas, such as a flaw, are transferred to the register 1193 as will now be described.

The digitized video is derived from the photocell unit 929 and is impressed through input terminals 19 FDIGVID, flaw digitized video, and W $\overline{FDIGVID}$. There is a change in level for any transition produced at the pellet P positive from dark to light, or negative from light to dark. The transition signals from input terminals 19 and W are impressed on input 2D of flip-flop 7U26B through amplifier 7U1 and are entered on 2Q on the first positive branch or leading edge of the grating wave p40 following the impressing of the transition signal. A 1 on 2D enters a 1 on 2Q; a 0 on 2D enters a 0 on 2Q. After a wave p40 clocks a signal from 2D to 2Q, subsequent waves have no effect until the signal on 2D changes. Thus the entry on 2Q is a 1 or 0 level depending on the duration of the level following the transition. The signal at Q controls retriggerable monostable multivibrators 7U4A and 7U4B. During standby there is a 1 on output 1$\overline{Q}$, FDVPTRN, digitized video positive transition, of 7U4A and a 1 on output 2$\overline{Q}$, FDVNTRN, digitized video negative transition, of 7U4B. A positive change in level 234 enters a 0 on 1$\overline{Q}$ of 7U4A and a negative change in level 236 enters a 0 on 2$\overline{Q}$ of 7U4B.

During standby inputs 12 and 13 of NAND 7U5D are 1 and its output 11 is 0. No change in level to clock registers 1193 or 1197 occurs until there is a transition. A positive transition occurs when the scan moves from the left of the pellet onto the pellet (FIG. 31a). When this occurs, output 1Q of 7U4A produces a positive pulse and output 1$\overline{Q}$ a negative pulse p45. Output 11 of 7U5D becomes 1 for the duration of the pulse p45 producing positive pulse p46 along conductor 238. Registers 1193 and 1197 are clocked. The counts on the Q outputs of the counters 1191 and 1195 and the D inputs of the registers are entered on conductors FLWD1 through FLWD8, and FLWD9 through FLWD15, flaw word. On conductors FLWD9 through FLWD15, the conjugates of the numbers on FLWD9 through FLWD15 are entered. During standby 0's are entered on FLDW9 through FLDW15 and 1's on FLWD9 through FLWD15. The intelligence in the register 1193 is the grating count marking in the left-hand end of the pellet P; the intelligence in register 1197 is the number of the scanning line. If the data is for the first scanning line a 1 is entered on FLWD15 and a 0 on $\overline{FLWD15}$. The transition at the left-hand end of the pellet is represented by the left-hand pulse 240 of FIG. 31e.

After pulse p45 is terminated, a 0 is again entered on conductor 238. Grating counts (p40) corresponding to the scanning of the pellet P from its lefthand end, now continue to be entered on the Q outputs of counter 1191 and on the D inputs of register 1193. As the scanning line (for example 220) enters the flaw area F1, at point 242, there is a negative transition represented by pulse 244 (FIG. 31*f*). The video level decreases from 1 to 0 as represented by the trailing edge 236 of level 248 (FIG. 31*b*). The trailing edge 236 of the level is impressed on input 2A of retriggerable monostable multivibrator 7U4B producing a negative pulse p47 at output 2Q̄. Input 12 of NAND 7U5D becomes 0 for the duration of the pulse, transmitting a positive pulse p48 along conductor 238. Register 1193 is clocked, entering the latest count on its Q outputs and on conductors FLWD1 through FLWD8. This count which corresponds to line 246 (FIG. 31*b*) is the count at the incidence of the scan line on the flaw area; it marks the start of the scanning of the flaw area.

On termination of the pulse p48, conductor 238 becomes 0 and counter 1191 continues to enter the counts of the square waves p40 on the Q outputs of the counters and on the D inputs of the register 1193. A positive transition represented by line 254 (FIG. 31*b*) takes place when the scan leaves the flaw area F1, for example at point 250. This transition is represented by pulse 252 (FIG. 31*e*). Input 13 of NAND 7U5D again decreases to 0, again producing pulse p46. Register 1193 is again clocked entering the latest count on its Q outputs and on conductors FLWD1 through FLWD8. The count between lines 246 and 254 (FIG. 31*b*) represents the width of the flaw F1 as measured by the scan line, for example 220.

The polarities of the transitions are entered on input 4D of block 7U13 of register 1197 through conductor 266. When output 2Q of flip-flop 7U26B becomes 1, a 1 is entered on input 4D. This 1 indicates a positive transition. It is clocked to output 4Q and conductor FLWD0 by pulse p46 through conductors 238 and 239 for use in further processing of the data. For a negative transition 2Q of 7U26B becomes 0. The 0 is entered on input 4D of 7U13 and is clocked to output 4Q and conductor FLWD0 by pulse p48. As indicated in FIG. 31*g*, the negative polarity of the part of the curve between lines 246 and 254 identifies a flaw.

The scan continues from point 250, passing through negative and positive transitions to derive a count for flaw F2. When the scan passes over the righthand end of the pellet P, there is a negative transition represented by pulse 256 (FIG. 31*b*) and line 258 (FIG. 31*b*). The count is entered on conductors FLWD1 through FLWD8 and identifies the end of the pellet. The length of the pellet P is given by the count between pulse 240 and line 260 and pulse 256 and line 258. This length is thus measured to an accuracy of ±0.003″. The separate length measurement with the pellet at station 121, as disclosed with reference to FIGS. 15 through 26, has an accuracy of ±0.0003″. A reasonably accurate measure of length can be derived by use of the flaw station (129 Wilks FIG. 1) alone and the length station (131) may under certain circumstances be dispensed with.

At the end of the scan the flaw line scan window, FLNSCWND, p41 is terminated (FIG. 31*d*). The trailing edge 232 of the window is entered on input 1A of retriggerable monostable multivibrator 7U3A, producing the end-of-line pulse p44 on conductor 262 and clearing counter 1191.

At the start of the next scan line another count is entered on the Q outputs of counter 1195. Thereafter counts corresponding to the grating pulses p40 are entered on counter 1191 similarly to the counts for the first scan line. These counts are transferred to conductors FLWD1 through FLWD8 in the same way as the counts for the first scan. This process is repeated, with counts of scan lines and counts of beam positions along scan lines, until the end of the MEASEN p100. At this point conductor 268 becomes 0 and counter 1195 and registers 1193 and 1197 are cleared. Counter 1191 was cleared before MEASEN became 0.

Conductors FLWD9 through FLWD15 are connected to the inputs 2 through 11 of NAND 7U6. Before a count is entered in counters 7U13 and 7U14, these inputs are 1 and output 8 $\overline{\text{SCCTO}}$, scan count 0, is 0. Input 9 of NAND 7U5C is 0 and output 8 of this NAND and its conductor $\overline{\text{FLTRNSTB}}$, flaw transition strobe, is 1, regardless of the signal on conductor 238. Once a line scan count is entered in register 1197, there is a 0 on an input of 7U6, a 1 on its output 8. Pulses p46 and p48 produces pulses p50 on conductor 270, $\overline{\text{FLTRNSTB}}$ which serve as transition strobes in the processing of the data.

On each 64th grating square wave count p40 a signal is derived from QC output of counter block 7U7 on conductor 272. This signal serves in combination with other signals to determine if there is a pellet in the flaw detection station 131.

The apparatus shown in FIG. 29 will now be described. The FIFO, first-in, first-out, buffer 1027 (FIG. 2), which includes the components or blocks 8U15, 8U16, 8U17, 8U18, receives the words from the registers 1193 and 1197 through the conductors FLWD0 through FLWD15 on each flawline transition. Each word includes a signal identifying the polarity or sense of the transition, whether it is positive or negative, the scan line and position on the line defining the address where the transition occurs. The intelligence as to polarity of transition is transmitted through conductor FLWD0, the scan line through FLWD8 through FLWD15 and the position through FLWD1 through FLWD7. The pulses p50 from output 8 of NAND 7U5C (FIG. 28) on conductor 270, $\overline{\text{FLTRNSTB}}$, flawline transition strobe, signals that a transition has occurred. This signal p50 is impressed on inputs 1 and 2 of NAND 8U23A through conductor 270.

A 1 level is normally entered on input terminal 9, (FIG. 29B) $\overline{\text{FIFRST}}$, FIFO reset from output terminal K of the interface (FIG. 36). This signal is derived through computer interface board FIG. 43. There is then a 1 level entered through inverters 8U22F and 8U22E on the MR, master reset, inputs of the buffer 1027 and the buffer is conditioned to receive intelligence. There is also a 1 level on input 10 of NAND 8U23C. If there is at this time a 0 on any of the input-ready conductors IRA through IRD, input ready, input 1D of flip-flop 8U24A is 0 through AND 8U19A and input strobes SIA through SID cannot be enabled. Output 1Q̄ of 8U24A is 1 and input 5 of NAND 8U25B is 1. Input 4 of 8U25B is also 1 through NAND 8U25A and there is a 0 on input 1D of flip-flop 8U26A. There is a 1 on output 1Q̄ of 8U26A and an output terminal 11. A pulse p50 on the occurrence of a transition cannot change this setting. If these are 0's on all conductors IRA through IRD, input 9 of NAND 8U23C is 1 through inverters 8U20A through 8U20D, NAND 8U21A and inverter 8U20E. There is a 0 on input 1CLR of 8U24A and this flip-flop is cleared. A 0 on any conductor IRA through IRD means that this input is not ready.

At the start of an operation, a 0 pulse is impressed on input terminal 9 by computer 105 through output terminal K of interface (FIG. 36). This signal is derived from output terminal B40, $\overline{\text{FIFRST}}$ of the computer interface board 108 (FIG. 43). It is entered by a code on decoder 15U10 and appears at the Y5 output. A 0 is then impressed on MR inputs of buffer 1027 through inverter-buffers 8U22F and 8U22E and conductor 1047 (FIG. 24A). The buffer 1027 then is reset; it is cleared of any intelligence which may have been left because the computer 105 did not accept data. This is indicated by a 0 on input terminal 13, $\overline{\text{WCEQO}}$, word count equals 0, from output terminal P of the interface (FIG. 36B) as signalled by computer 105. The 0 signal is derived from the interface of the computer (FIG. 43). It signifies that the input countdown for the computer is 0 and it will accept no more data. This 0 signal $\overline{\text{WCEQO}}$ blocks the flow of clock signals to flip-flop 8U24A on the occurrence of a transition. Normally, when the computer accepts data, input terminal 13, $\overline{\text{WCEQO}}$, is at 1. The 0 at output 10 of inverter 8U22E also presets flip-flop 8U26A to the extent that reset is required.

Figure 28C:
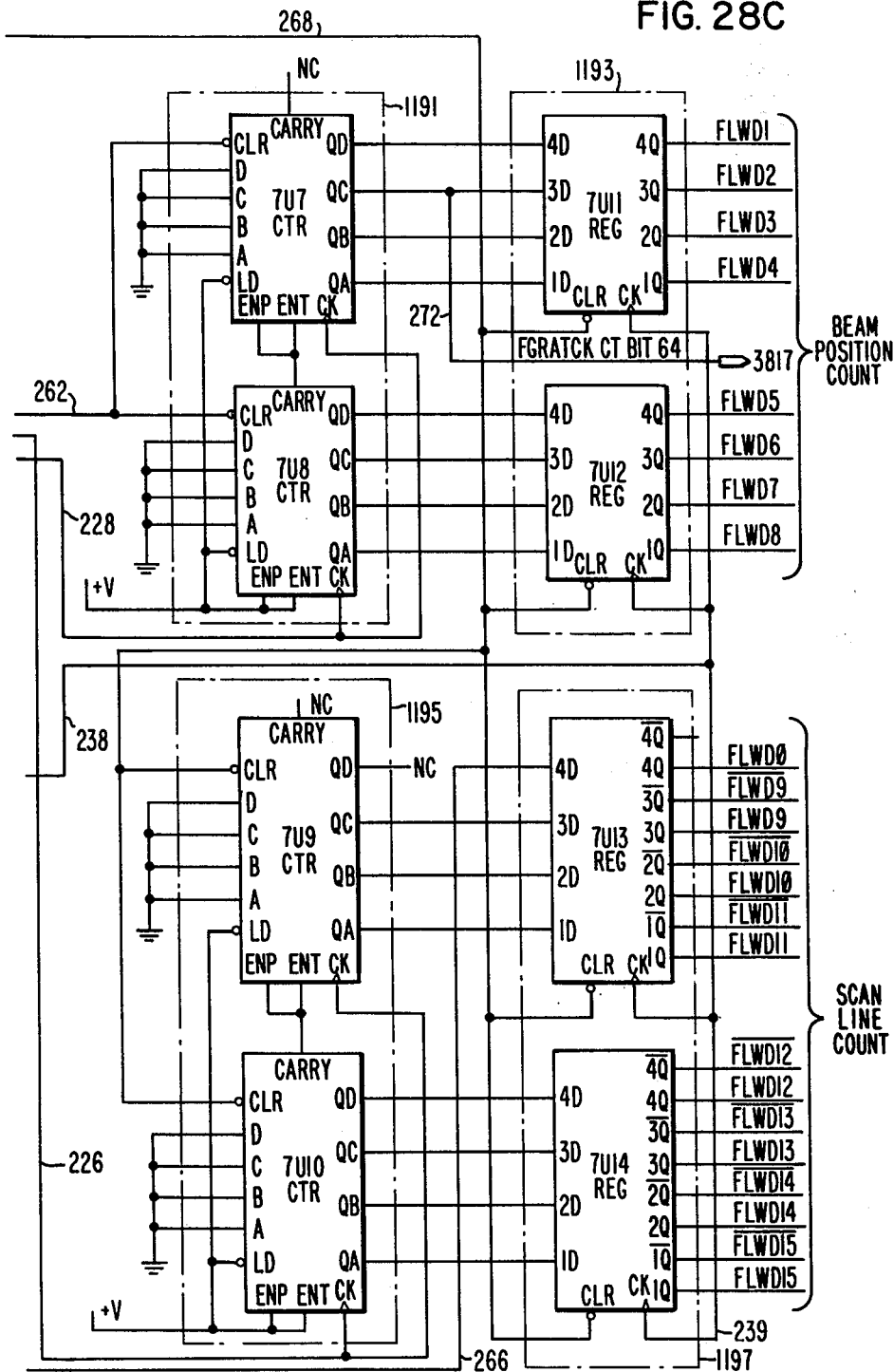

When the buffer 1027 is reset, a 1 is entered on all terminals IRA through IRD indicating that the buffer is ready to receive a word from registers 1193 and 1197 (FIG. 28C). There is a 1 on input 1D of flip-flop 8U24A through AND 8U19A and a 1 on input 1D of flip-flop 8U26A through NANDS 8U25A and 8U25B. It is assumed that computer 105 is ready to receive intelligence so that input terminal 13 is at 1 level. After the input 0 pulse resetting buffer 1027, input terminal 9 and conductor 1047 and MR are at 1 level. Input 10 of NAND 8U23C is also at 1 level but its input 9 is 0 through inverters 8U20A through 8U20D, NAND 8U21A, and inverter 8U20E. A clear signal to flip-flop 8U24A is blocked.

On the occurrence of a transition, pulse p50, through 8U23A, enters a positive going pulse on input 4 of 8U23B and a negative going pulse is produced at output 6 of 8U23B. The trailing edge of the pulse at output 6b of 8U23B clocks flip-flop 8U24A producing a 1 on input strobe conductors SIA through SID. Also flip-flop 8U26A is clocked by the leading edge of the pulse from 8U23A entering a 0 on $1\overline{Q}$ and terminal 11, FIFO FULL. This means that the FIFO buffer 1027 is not full. The flow of signals to input 1D of 8U26A is blocked by NAND 8U25B because a 0 is entered on its input 5 from output $1\overline{Q}$ of 8U24A.

When a 1 is entered on conductors SIA through SID, shift in, from 1Q of 8U24A, the word on registers 1193 and 1197 is strobed into buffers 1027. A 0 is then entered on all conductors IRA through IRD. Through inverters 8U20A through 8U20D, a 1 is entered on all inputs of NAND 8U21A and 0 is entered on CLR of flip-flop 8U24A through inverter 8U20E and NAND 8U23C. This flip-flop is cleared for another operation and its output 1Q is at 0. A 0 is entered on all conductors SIA through SID from 1Q of 8U24A. A 0 is then again entered on all conductors IRA through IRD and the buffer 1027 is set to receive another word on the occurrence of another transition. On the next transition, pulse p50 is again entered and the above process is repeated entering the count at the succeeding boundary. This continues for the complete sweep of the beam 343 (FIG. 27). The word received is impressed on the D inputs of the buffer 1027 and automatically passes to the Q outputs of this buffer. When the word is at the Q outputs ready to be transferred, a 1 is entered on all output-ready conductors, ORA through ORD. Before the 1's were entered there were 0's on these conductors so that flip-flop 8U24B was cleared by a 0 on 2CLR through inverters 8U22A through 8U22D and NAND 8U21B. Before the 1's were entered on ORA through ORD there is a 1 on $2\overline{Q}$ of flip-flop 8U24B and on input 9 of NAND 8U25C. The 1 on all conductors ORA through ORD enters a 1 on input 2D of flip-flop 8U24B through AND 8U19B. A 1 is also entered on output terminal 5, FIFOR, FIFO output ready, through NANDS 8U25D, and 8U25C. The logic is enabled to enter the flaw data by commands of the computer set by its program. The enabling signal is derived from output terminal 19 of the interface, FIG. 36. Normally this terminal is set, with a 1 at YO of decoder 11U3, for FLW/$\overline{\text{DAT}}$, data select, i.e., for enabling diameter, length and weight data to be entered in the computer. For entry of flaw data a binary code, 0, is entered on O'D13, O'D14 and O'D15. A 0 is entered on Y0 and a 1 on output terminal 19. A 1 is entered on input terminal W of the multiplex board, FIG. 37, and on 1D of flip-flop 12U5. On the entry of a binary code (6) on O'D0, O'D11, O'D12, (FIG. 36) a strobe FLW or DAT STB is entered on input terminal X (FIG. 37) from output terminal W. Flip-flop 12U5 (FIG. 37) is clocked, entering a 1 on output 1Q and an input 12 of NAND 12U6B. There is a 1 on input 13 of 12U6B from output terminal 5 of FIG. 29c, through input terminal W. There is a 0 on inputs 10 and 9 of NAND 12U6C and a 1 on output terminal 37, FIFOR; FIFO ready. This 1 is entered into computer 105 through terminal B51, FIG. 43, Schmidt NAND 15U9C and inverter 15U1E. Responsive to FIFOR, computer 105 initiates a signal, FIFSO, FIFO shift out, which is impressed on input terminal 7, FIG. 29. The leading edge of this signal clocks flip-flop 8U24B to produce a 1 on conductors SOA through SOD shift out. The word in buffer 1027 is strobed out. The data is entered through terminals B through U of the multiplexer board, FIG. 37B, into the B inputs of multiplexer 1019. With a 0 on inputs SEL of the multiplexer this flaw data is entered into the computer for processing through terminals O'0 through O'15 of the computer interface, FIG. 42B. A 0 is then entered on conductors ORA through ORD (FIG. 29C) and flip-flop 8U24B is cleared through inverters 8U22A through 8U22D and NAND 8U21B. On the entry of another word on the O outputs of the buffers 1027 this process is repeated.

The flaw data entered in the computer 105 includes the counts at the boundaries of the flaws. The computer determines from the data the area and perimeter of each flaw. The area for a flaw is determined by taking the sum of the difference between the counts at each positive and each negative transition. The polarity of the transition is entered in the computer through conductor FLWD 0. The perimeter is twice the number of the count of scan lines scanning a flaw plus the counts along any boundary along which a single scan line scans.

If at any time during an operation when IRA through IRD (input ready) should be 1, one or more of IRA through IRD is 0, (input not ready), a 0 is entered on input 1D of flip-flop 8U26A. When pulse p50 is entered on the sensing by beam 343 (FIG. 27) of a transition, a 0 is entered on 1Q of 8U26A and a 1 is entered on $1\overline{Q}$ and on output terminal 11, FIFFL, FIFO full, a 1 is entered on input terminal M of the interface FIG. 36. The 1 is entered into computer 105 indicating that a maloperation has occurred.

Figure 32:
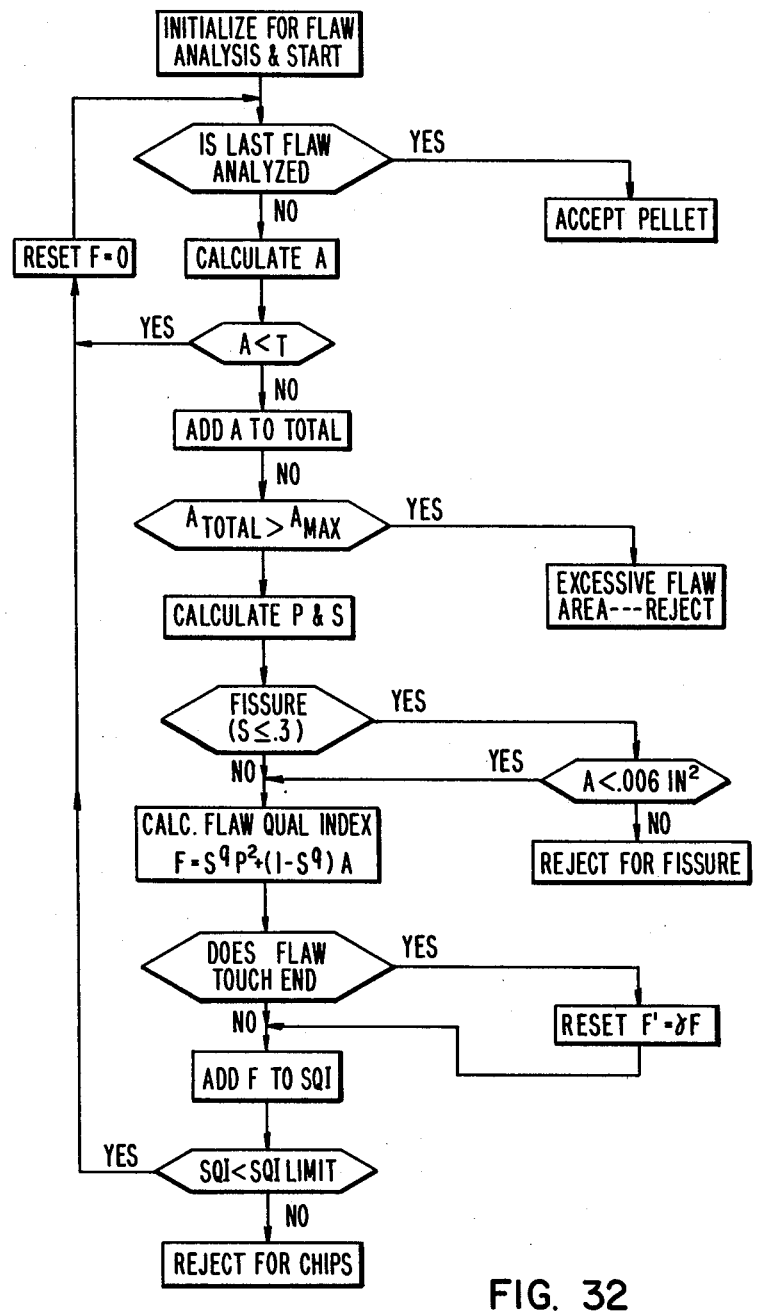
FIG. 32 shows the algorithm followed in reaching a decision to accept or reject a pellet because of surface flaws.

The algorithm shown in FIG. 32 presents the analysis carried out by computer 105 pursuant to its program. It is assumed that a pellet has been scanned and the crude or raw data entered in the memory of the computer. For the first flaw the answer to "Is last flaw analyzed?" is "No". The area A of the flaw is computed. If $A>T$, T being a minimum area which a surface defect must have to be considered a flaw, the pellet is rejected. If $A<T$, the process continues. For the first flaw, the area of the first flaw is the total. The perimeter P is computed and $S=A/P^2$ is computed. If $S>0.3$, A is computed. If $A>0.006$ in$^2$, the pellet is rejected. If not, the flaw quality index $$F = S^q p^2 + (1-S^q)A$$

is computed. In the equation for F, q is an empirically determined magnitude, p is the perimeter and A the area of a flaw. If the current flaw touches the end of a pellet $F'=2$ is calculated. 2 is an empirically determined factor greater than 1. SQI, surface quality index, is the quality factor which was determined by adding Fs or F's for flaws which were analyzed earlier. For the first flaw the F or F' for the first flaw is adopted. If at this point SQI(F or F')>SQI LIMIT, the acceptable limit, the pellet is rejected. If SQI<SQI LIMIT the above described process is repeated with F reset to 0. The F or F' for the second flaw is detected and the new F or F' is added to the first SQI. If new SQI<SQI LIMIT, the above process is repeated. All flaws for the pellet are analyzed in this way. If each of the A's are less than T or $A_{TOTAL} \leq A_{MAX}$, S for a fissure is less than or equal to 0.3 or this $S>0.3$ but $A<0.006$ in$^2$, and the last SQI<SQ LIMIT, the pellet is acceptable (for flaws). If any one of the above criteria is not met the pellet is rejected.

The apparatus for weighing the pellets will now be described with reference to FIGS. 33, 34, 35. The weight sensor 381 (Wilks application FIGS. 9, 9A) is interconnected with the weighing electronics and digital voltmeter unit 1201 (FIG. 33) shown in detail in Figure 34. The binary coded decimal output of digital voltmeter 1203 (FIG. 34) of this unit is enabled in the appropriate sequence by DSELW, data select weight, signal from output terminal 17 of the interface, FIG. 36. Computer 105 is programmed to enter a binary code (4) on inputs O'D13, O'D14, O'D15 on decode 11U3. A 1 is impressed on output terminal 17, DSELW, data select weight, through inverter 11U4B. This signal is entered on input terminal V (FIG. 34) and enables the binary coded decimal output of digital voltmeter 1203 to be read.

The DSELW enabling signal is activated only during the last cycle of the long weighing interval. During this cycle the grippers are conditioned to be actuated. During the Pick-Up Dwell (FIG. 3) of this last cycle, the pellet, which is in the weighing station, is picked-up and during the Release Dwell of the next cycle, this pellet is deposited in the sorter 137.

The operation is illustrated in FIGS. 35a through e. Typically three pellets per second are inspected for diameter, length and flaws. Every sixth pellet is typically checked for weight. The weighing operation can typically consume 2 seconds. In FIG. 35 time is plotted horizontally and magnitude vertically. As for the other graphs the intersections of a vertical line with the time axes identifies the same instant of time. The grippers 515–523 (FIG. 1) move through one complete cycle typically in one-third second. As indicated for the first 1 and 0 period on the left of FIG. 35a each such full cycle has a period of 333 ms. During the first part of the cycle the MEASEN pulse p100 of duration 100 ms is produced. During the weighing operation gripper 523, indicated as activated in FIG. 35b, carrying a pellet, as it does during the intervening cycles, deposits the pellet on the weighing pan in station 133. As shown in FIG. 35b this gripper 523 and the others complete the opening operation about 20 ms after MEASEN. But instead of closing and opening as they do during the intervening cycles, the grippers remain open during the whole weighing operation as shown in FIG. 35b. The MEASEN pulses p100 continue to be produced and at the start of each MEASEN, the CTL CLR pulse (p 1, FIG. 41) is produced as shown in FIG. 35c. Each CTL CLR pulse initiates a read pulse p80 (FIG. 34B) in the digital voltmeter 1203. The digital voltmeter 1203 reads the weight as the scale becomes stabilized. The meter is read at the rate of the 30 readings per second reading about 3 times during and at the end of each 80 ms read interval. Near the end of the 2 second interval, DSELW pulse p81 (FIG. 35e) is impressed from output terminal 17 of interface, FIG. 36, on input terminal V and the data on the meter, which is read during the last reading, is entered for processing in computer 105 through the multiplexer board, FIG. 37.

In the apparatus 1201 shown in FIG. 34, the DVM is energized from a commercial alternating current supply, 50–60 Hertz, on the closing of a power switch and actuation of a relay. The leading edge of the CTL CLR pulse p1 entered on input terminal Y, triggers a retriggerable monostable multivibrator 9U1A, producing the read pulses p80 at its output. The DVM 1203 reads the weight several times during the interval of each pulse p80. Pulse p1 also enters a 0 pulse on 1 CLR of flip-flop 9U3, clearing this flip-flop. If the reading on the meter 1203 is 100 or greater, indicating a weight on the scale of at least 100 mg, a 1 is entered on any of inputs 1 through 5 of NOR 9U4B or 9 through 13 of NOR 9U4A. A 0 is entered on at least one of the inputs of NAND 9U5 and a 1 is entered on input ID of 9U3. When the conversion is complete the READY output of the meter 1203 goes to 1 level. The leading edge 1207 of the signal from Ready, triggers retriggerable monostable multivibrator 9U1B, producing a 1 pulse p82 at output 2Q and a 0 pulse p83 at output 2Q̄. Pulse p82 produces a 1 at input 6 of NOR 9U2B, a 0 at inputs 8 and 9 of NOR 9U2C and a 1 on input BCD EN, binary coded decimal enabled. The meter is enabled to output its reading. Pulse p83 clocks flip-flop 9U3. If there is a 1 on input 1D of 9U3, a 1 is entered on output 1Q and on output terminal 17. The 1 is entered on input 7 of the logic of FIG. 38 indicating that a pellet is present in the scale. A 1 pulse p81 is impressed in the proper sequence on input terminal V, DSELW. Pulse p81 is impressed after pulses p82 and p83 have terminated indicating that the computer 105 is ready to take a weight reading. A 1 is now entered on BCD EN through 9U2B and 9U2C and the reading on the binary-coded decimals of the meter is entered in computer 105 for processing through the interface multiplex board, FIG. 37.

The structure and function of the control interface, FIG. 36, has been to a large extent described above. Additional description and explanation appears desirable. This interface receives control commands or control words and intelligence words from computer 105 and produces operations responsive to the commands and distributes the intelligence words. The control commands are received on conductors O'D0 through O'D3 and O'D6 through O'D9. Each conductor corresponds to a bit in the computer. The following Table III shows the relationship between the O'D conductors or their corresponding bits and the commands. The numbers in the left-hand column of Table III under "Bit" are the respective numbers after the letters O'D. For example, a 1 on O'D1 commands feeder-power "on"; a 0, feeder-power "off". Feeder power is the power for the pellet-feeder drive 121. Conductors O'D0 through O'D4 are each connected to a 5V terminal through a corresponding inverter 11U5A through 11U5E and a corresponding light-emitting diode 11LED0 through 11LED4. Conductors O'D5 through O'D9 are each connected to a 5 volt terminal through a corresponding inverter 11U6A through 11U6E and a corresponding light-emitting diode 11LED6 through 11LED9. When there is a 1 on any conductor O'D0 through OD9, the corresponding LED is energized indicating that the command is impressed. The intelligence which consists of the fixed diameter correction factors (DCF) and their corresponding addresses are received on conductors O'D0 through O'D9 and are transferred in sequence to OUTBS0 through OUTBS9 (FIG. 11) through sockets 1 through 10 (FIG. 36). The minimum diameter data is also received on input conductors O'D0 through O'D9 and transferred through sockets 1' through 10' to the input terminals labelled DMNLM0 through DMNLM9 of the logic, FIG. 12.

TABLE III

| WORD, CONTROL | |
|---|---|
| BIT | FUNCTION |
| 0. | *Control Power On/Off |
| 1 | *Feeder Power On/Off |
| 2 | *Transfer Drive Power On/Off |
| 3 | *Grippers Activate/Open |
| 4 | |
| 5 | |
| 6 | *Emergency Stop/Reset |
| 7 | *Accept Sort Command |
| 8 | *Hold Sort Command |
| 9 | *Alarm Activate/Reset |
| 10 | *Strobe: CTL PWR, FDR PWR, XDR PWR, GRP PWR, SORT =PWRSTB |
| 11 | Strobe: Diameter Correction Factor (DCF) Address |
| 12 | Strobe: Diameter Correction Factor (DCF) Data |
| 13 | Data Multiplex Address - Bit "4" |
| 14 | Data Multiplex Address - Bit "2" |
| 15 | Data Multiplex Address - Bit "1" |
| | *Data Out Latched With PWRSTB |

Binary codes for enabling the strobes for the functions are entered from computer 105 as preset by its program on conductors O'D10, O'D11, O'D12. Depending on the status or function selected 0's or 1's may be entered on these conductors. O'D10 is the most significant bit and O'D12 the least significant bit. Each of the conductors O'D10, O'D11, O'D12 is connected to a 5 volt terminal through an inverter 11U7A, 11U7B, 11U7C, and a corresponding LED, 11LED10, 11LED11, 11LED12. The LED's indicate on which of the conductors a 1 is entered.

The entries on conductors O'D10, O'D11, O'D12 are impressed on inputs A, B, C of the decoder 11U2. The Y outputs of this decoder are 1 normally or during standby. A pulse p51 is impressed from computer 105 through input terminal 21, CTL STB, control strobe, on the enable input GI EN of the decoder 11U2 to decode the input and enter 0's on the Y outputs corresponding to the code. The numbers following the Y's are the numbers of the binary code. For example, a 1 on O'D12 and 0's on O'D11 and O'D10 causes a 0 to be entered on Y1, a 1 on O'D11 and 0's on O'D12 and O'D10 causes a 0 to be entered on Y2, a 1 on O'D10, O'D11, and O'D12 causes a 0 to be entered on Y7. In each case, the other Y outputs remain 1's. For the duration of the control strobe, a 1 pulse is transmitted through the inverters 11U1A through 11U1F in series with and through the selected one of the output terminals F, DCF DNLD STB, DCF download strobe, W, FLW OR DAT STB, either flaw or data strobe, U, PWR STB, power strobe, T, DMNLMSTB, diameter minimum-limit strobe, S, DCF AD STB, DCF address strobe, R, DCF DAT STB, DCF data strobe. Each of the above functions commanded by a word is put into effect by a strobe. The same strobe, FLW or DATA STB, enables transmission of either flaw or data depending on the command, a 1 or 10, entered by the computer on output terminal 19. The strobe through terminal F is supplied to input terminal F, DCF DNLD STB of the logic shown in FIG. 10. The strobe through terminal W is supplied to the input terminal X, FLW DAT STB, of FIG. 37. The strobe through output U is supplied to input terminal U of FIG. 39. By this strobe, those functions are enabled which are selected by the entry of 1 signals on the conductors O'D0 through O'D9 and the corresponding bits as listed in Table III. For example, if there is a 1 on conductor O'D1, the feeder-power is turned on when the strobe is impressed on U. Several of the functions may be enabled simultaneously. The strobe through output terminal T is entered on input terminal X of FIG. 12. DMNLM STB. The strobe on output terminal S is entered on input terminal X, DCFAD STB of FIG. 11. The strobe on output terminal R is entered on input terminal 6, DCF DAT STB, of FIG. 10.

Table IV shows the relationship of the bits and the other intelligence for DCF address words. The word includes bits (0, 1, 2) identifying the scanning prism face and bits (3 through 9) identifying the scan portion on each prism. As indicated the data is strobed in by a 1 on bit 11. This is a binary 2 corresponding to Y2.

TABLE IV

| WORD, DCF ADDR | | |
|---|---|---|
| BIT | FUNCTION | |
| 0 | Scanning Prism Face Bit "4" | SWA9 |
| 1 | Scanning Prism Face Bit "2" | SWA8 |
| 2 | Scanning Prism Face Bit "1" | SWA7 |
| 3 | Scanning Beam Position Count Bit "64" | SWA6 |
| 4 | Scanning Beam Position Count Bit "32" | SWA5 |
| 5 | Scanning Beam Position Count Bit "16" | SWA4 |
| 6 | Scanning Beam Position Count Bit "8" | SWA3 |
| 7 | Scanning Beam Position Count Bit "4" | SWA2 |
| 8 | Scanning Beam Position Count Bit "2" | SWA1 |
| 9 | Scanning Beam Position Count Bit "1" | SWA0 |
| 10 | | |
| 11 | Strobe | |
| 12 | | |
| 13 | | |
| 14 | | |
| 15 | | |

The following Table V is the bit relationship for the fixed DCF data. This data is strobed in by a binary 1 as indicated by the word "strobe" at bit 12.

TABLE V

WORD, DCF DATA

| BIT | FUNCTION |
| --- | --- |
| 0 | Diameter Correction Factor Bit "128" |
| 1 | Diameter Correction Factor Bit "64" |
| 2 | Diameter Correction Factor Bit "32" |
| 3 | Diameter Correction Factor Bit "16" |
| 4 | Diameter Correction Factor Bit "8" |
| 5 | Diameter Correction Factor Bit "4" |
| 6 | Diameter Correction Factor Bit "2" |
| 7 | Diameter Correction Factor Bit "1" |
| 8 | |
| 9 | |
| 10 | |
| 11 | |
| 12 | Strobe |
| 13 | |
| 14 | |
| 15 | |

The following Table VI presents the bit relationship for minimum diameter. As indicated, this data is strobed in by a binary 3. In all Tables III through VI the bit number is the same as the number following the O'D which identifies the conductors.

TABLE VI

WORD, MINIMUM DIAMETER LIMIT

| BIT | FUNCTION |
| --- | --- |
| 0 | DMNLM0 Bit "512" (Not Used in Comparison With CDCT) |
| 1 | DMNLM1 Bit "256" |
| 2 | DMNLM2 Bit "128" |
| 3 | DMNLM3 Bit "64" |
| 4 | DMNLM4 Bit "32" |
| 5 | DMNLM5 Bit "16" |
| 6 | DMNLM6 Bit "8" |
| 7 | DMNLM7 Bit "4" |
| 8 | DMNLM8 Bit "2" |
| 9 | DMNLM9 Bit "1" |
| 10 | |
| 11 | Strobe |
| 12 | Strobe |
| 13 | |
| 14 | |
| 15 | |

The binary code for the power is entered on the teletype 1015 (FIG. 1) of the dedicated computer 105. The codes of the other strobes are entered automatically on the entry of single command on the teletype.

On conductors O'D13, O'D14, O'D15, the computer 105 enters 1 or 0 levels as binary codes to multiplex the flaw or other data into the computer and to determine the status of the apparatus. Each of the conductors O'D13, O'D14, O'D15 is connected to a 5 volt terminal through an associated inverter 11U7D, 11U7E, 11U7F, and through an associated LED, 11LED13, 11LED14, 11LED15. The codes are decoded by decoder 11U3. Unlike 11U2, the decoded command is entered on the Y outputs when the code is entered on the inputs without a strobe because GIEN is connected to 5 volts. The numbers after the Y's correspond to the binary code entered or initially on the conductors O'D13, O'D14, O'D15.

Normally there are 0's on three conductors O'D13, O'D14, O'D15. There is a 0 on output Y0 of decoder 11U3 and 1 on the other Y's. Through inverter 11U4C there is a 1 on output terminal 19 and on input terminal W of the multiplexer board (FIG. 37). There is a 1 on input 10 of flip-flop 12U5. On the entry of a strobe on input terminal X (FIG. 37) from output terminal W (FIG. 36), a 1 level is entered on output 1Q and on inputs SEL of multiplexer 1019. The data at inputs DWFL0 through DWFL15, data word flaw, which is the flaw data, is selected for entry into computer 105. This data is delivered at the output of the buffer 1027 (FIG. 29) when ready on the entry of a 1 on output terminal 5 (FIG. 29), FIFOR, FIFO ready. This 1 signal is entered on input terminal V, FIFOR, (FIG. 37), and, through V, on input 13 of NAND 12U6B. There is also at this time a 1 on input 12 of 12U6B and a 0 on its output 11 and on inputs 9 and 10 of NAND 12U6C. There is then a 1 on the FIFOR' output terminal 37 to the computer 105 which is entered in the computer through the DMA 106. The data from the buffer which is ready is then entered in the computer through the multiplexer 1019. This continues until all flaw data is entered in the dedicated computer 105. This data is entered during the MEASEN interval. The status, diameter, length and weight data are entered after the MEASEN interval when the DRDY (FIG. 4d) is entered.

There can only be one decoded signal, 0 level, on only one of the Y terminals of decoder 11U3 at a time. When any other code than 0 is impressed on the conductors O'D13, O'D14, O'D15, a 1 is entered on Y0 and a 0 on output terminal 19. The apparatus is set for $\overline{\text{DAT SEL}}$; i.e. to enter status diameter, length and weight data into the computer.

Figure 37A:
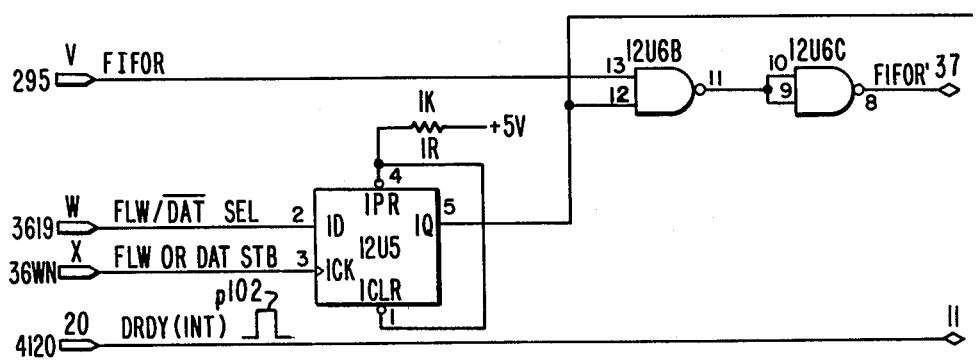
FIGS. 37A, 37B together are the logic schematic of the interface of the electronics showing the multiplexing of the transmission of intelligence to the computer.
Figure 37B:
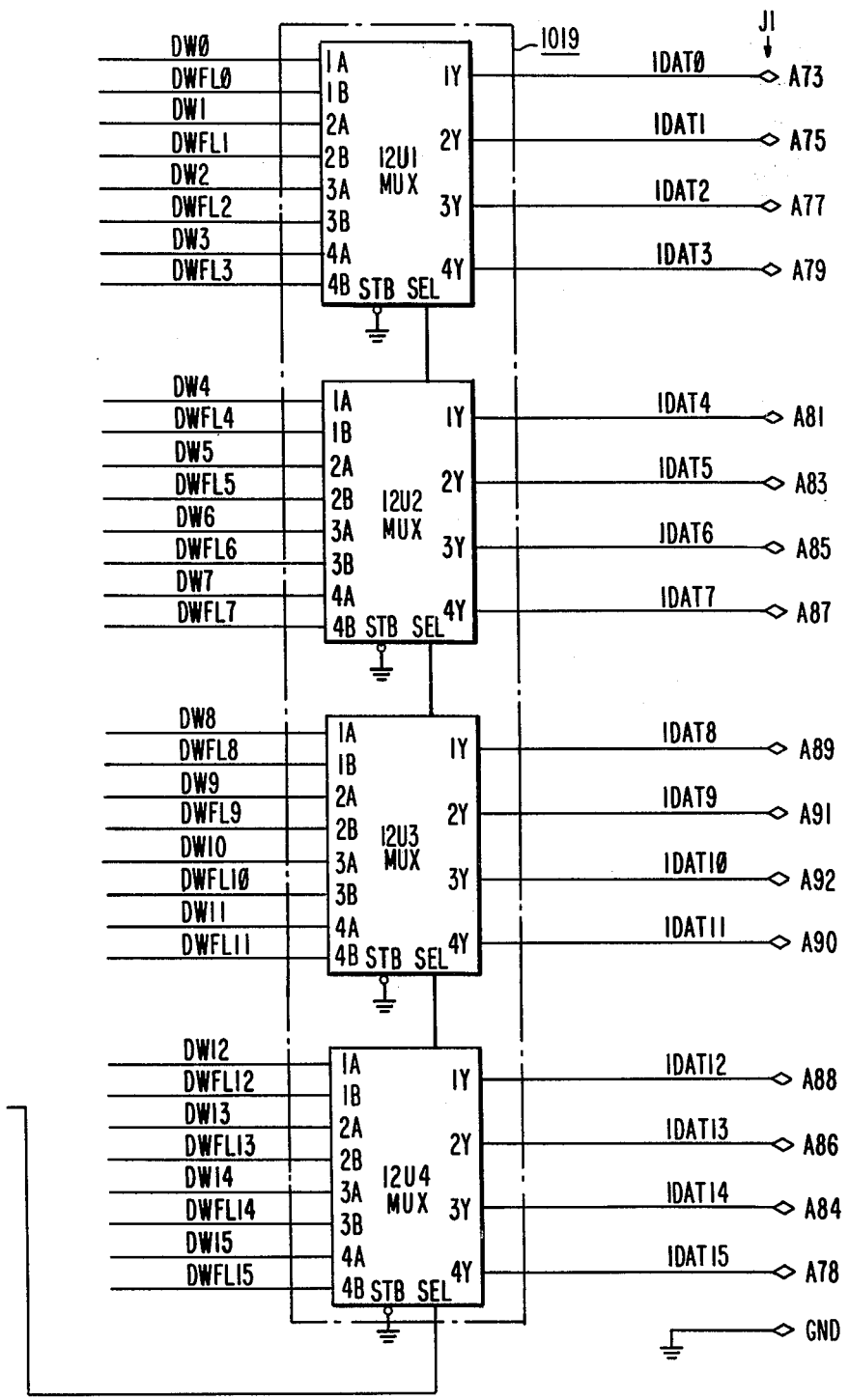

With 1 on Y0 a 0 is then entered on output terminal 19 on input W of FIG. 37A and on input 1D of flip-flop 12U5. With this setting a 0 is entered on output 1Q when the flaw or data strobe is impressed through output terminal W (FIG. 36) and through input terminal X on 1CK. A 0 is entered on input SEL of the multiplexers 1019 (FIG. 37) through 12U5. The data in the B inputs of these multiplexers is entered on the Y outputs and on conductors IDAT0 to IDAT15 for transmission to the computer 105. The FIFOR signal cannot pass through NAND 12U6B since there is a 0 on its input 12.

The data on the B inputs of the multiplexers 12U1 through 12U4 (FIG. 37) is derived from terminals 2 through 9 and 10 through 17 through conductors DW0 through DW15, data word, and includes selectively the status word, the diameter count, the length count or the weight count. Diameter count is selected by entering a binary 2 on conductors O'D13, O'D14, O'D15. A 0 is entered on Y2 and on output terminal 15 $\overline{\text{DSELD}}$. Length count is selected by entering a binary 3 on O'D13, O'D14, O'D15 'A 0 is entered on Y3 and on terminal 16, $\overline{\text{DSELL}}$. Weight is selected by entering a binary 4 on these conductors, a 0 on Y4 and a 1 through inverter 11U4B to output terminal 17. The 0 on output terminal 15 is entered on input terminal 18 of FIG. 12; the 0 on terminal 16 is entered on input terminal 18 of FIG. 23; the 1 on terminal 17 is entered on input terminal V of FIG. 34.

Output terminal 13, $\overline{\text{MEAS/DCF SEL}}$, measurement or, DCF select, is connected to input terminal D of FIG. 10. During stand-by a 0 is entered on terminal 13 through inverter 11U4A. The mechanical handling system 101 (FIG. 1) is set for measurement of fuel pellets. When DCF is to be determined with a calibration pellet, a binary 6 is impressed on conductors O'D13, O'D14, O'D15 of decoder 11U3. A 0 level is entered on output Y6 and a 1 on output terminal 13 and the apparatus is set for DCF.

Output terminal 18, $\overline{\text{DCF DATA}}$, is connected to input terminal K of FIG. 10. When the DCF data is to be transmitted a binary 5 is entered on O'D13, O'D14, O'D15. A 0 is entered on output Y5 and the DCF data is enabled.

Output terminal 14, $\overline{\text{DSELS}}$, data select status, is connected to input terminal 18 of FIG. 41. When the status of the functions and settings tabulated in the following Table VII is to be determined, a binary 1 is entered on conductors O'D13, O'D14, O'D15. A 0 is entered on output terminal 14 (FIG. 36) and the status determination is enabled. For example, a 1 on bit 2 indicates that a pellet is in the diameter station, a 0 on bit 11 indicated that data is ready.

TABLE VII

| BIT | WORD, STATUS FUNCTION |
|---|---|
| 0 | Control Mode: "0" = MAN; "1" = AUTO |
| 1 | Pellet At Escapement Pick-Up Point |
| 2 | Pellet In Diameter Station |
| 3 | Pellet In Flaw Station |
| 4 | Pellet In Length Station |
| 5 | Pellet In Weighing Station |
| 6 | Pellet Released Into Sorter |
| 7 | Accept Gate Actuated |
| 8 | Hold Gate Actuated |
| 9 | Sort Parity/$\overline{\text{Error}}$ |
| 10 | Escapement Empty |
| 11 | GRP/$\overline{\text{DRDY}}$ |
| 12 | Feeder Bowl Empty |
| 13 | Normal Feed |
| 14 | Emergency Stop |
| 15 | Collection Bins In Position |

The $\overline{\text{DSELS}}$ is enabled after MEASEN on the entry of DRDY (FIG. 4a, FIG. 4d). The enabling signal is derived from output terminal 20 of FIG. 41 and is entered into the computer 105 through input terminal 20 of the interface multiplexer board (FIG. 37). The code for Y6 of decoder 11U3 is entered through the teletype 1015 (FIG. 1) when the mechanical system 101 is set for DCF calibration. The other codes are set by the computer 105 as commanded by its program.

With decoder 11U3 set for $\overline{\text{DAT SEL}}$ (1 on Y0) and $\overline{\text{DSELS}}$ enabled (0 on Y1), the status data is entered from the control logic schematics (FIG. 41) on input terminals 2 through 17 and on the A inputs of the multiplexer 1019 of the multiplexer board (FIG. 37) and transferred to the computer 105 through this multiplexer. The diameter data is likewise entered on input terminals 2 through 17 and transmitted through multiplexer 1019 with a 0 on Y2 of 11U3. The same occurs for the length data and for the weight data with 0's on Y3 and Y4. The 0's are entered and enable $\overline{\text{DSELS}}$, $\overline{\text{DESLD}}$, $\overline{\text{DSELL}}$, in sequence. DSELW is enabled during a weighing operation which occurs typically for every 6th pellet.

FIG. 38 shows the logic schematic for the control for determining if pellets are in the stations where they are to be subject to measurement and for indicating on the panel board the status of the pellets. The determination and the indicating takes place when DHLD, data hold, is impressed on input terminal 19. DHLD is derived from output terminal 19 of the control logic shown in schematic FIG. 41. It is entered at the end of MEASEN. DHLD is entered as a clock signal on CK of register 16U8 and on $\overline{\text{CK}}$ of register 16U14. This register is cleared by $\overline{\text{CTL CLR}}$ pulse which is impressed at the beginning of MEASEN on input terminal Y from output terminal Y of the control, FIG. 41. DHLD, as may be inferred from its name, is the signal which holds the data including status, diameter, length and weight, but not flaw, until the determination is made.

Normally output terminal 2, ESCMT, escapement empty, FIG. 38, is 1 since $1\overline{Q}$ of 16U14 is 1. If either the upstream photocell PC1 or the downstream pellet PC2 detects a pellet, or both detect a pellet there is a 0 on input 9 or input 10 or both of NAND 16U13C. There is a 1 on input 1D of register 16U14. On the entry of DHLD, a 0 is entered on $1\overline{Q}$ of 16U14 and on output terminal 2 indicating that the escapement 125 (FIG. 1) is not empty. If both PC1 and PC2 detect a pellet there are 0's at inputs 5 and 6 of NOR 16U10B, there is a 1 on input 1D of register 16U8. On the entry of DHLD, a 1 is entered on 1Q of 16U8 and on output terminal 3, PEL AT ESC, pellet at escapement.

Output $1\overline{Q}$ of register 16U8 is 0 with a 1 clocked on output 1Q. There is a 1 on output 11 of NAND 16U9D and a 0 on output 8 of NAND 16U9C and on conductor, FEED STOPPAGE. There is a 0 on output 3 of NAND driver 16U7 and on output R $\overline{\text{FD}}$ $\overline{\text{STPG}}$ $\overline{\text{IND}}$, feed stoppage indicator. Feed stoppage is not indicated on the panel since no current flows through R.

There is also a 1 on input 1 of NAND 16U9A. If the feed bowl 163 (FIG. 1) is not empty, there is a 0 on input terminal 14 from the circuit of the table of the mechanical handling system 101. There is a 0 on inputs 4 and 5 of NAND 16U9B and a 1 on conductor 1233 and on output terminal 15, NOR FD, normal feed. There is also a 1 on input 7 of OR driver 16U5 and on output terminal P, $\overline{\text{FD}}$ $\overline{\text{LOW}}$ $\overline{\text{IND}}$, feed low indicator. This indicator is not enabled.

There is also 1 on conductor 1235 from output 1Q of 16U8 and on input 1 of OR driver 16U5. There is a 1 on output terminal L, ESC MT IND, escapement empty indicator. This indicator is not enabled.

There is also a 1 on input 1 of NAND driver 16U6. MEASAN is terminated and input terminal 21 is 0. Through NAND 16U13A, there is a 1 on input 2 of this driver. There is a 0 on $\overline{\text{ESC}}$ $\overline{\text{OCC}}$ $\overline{\text{IND}}$, escapement occupied indicator and on output M. There is current through this indicator and it is enabled.

There is a 1 on input 7 of NAND driver 16U6 and a 1 on input 6 from conductor 1237 EN. There is a 0 on its output 5 and an output N, $\overline{\text{FD}}$ $\overline{\text{NOR}}$ $\overline{\text{IND}}$, feed normal indicator. This indicator is enabled.

If either PC1 or PC2 is energized, i.e., is not interrupted by a pellet, there is a 0 on input 1D of register 16U8. On the entry of DHLD the 0 remains on 1Q and the 1 remains on $1\overline{Q}$. There is a 0 at output terminal 3 which indicates that the pellet is not (properly) at the escapement 125. There is a 0 on input 1 of NAND 16U9A, a 1 at its output 3 and a 0 on conductor 1233. There is a 0 on output terminal 15 indicating that the feed is not normal. There is a 0, through conductor 1239, on input 6 of OR driver 16U5 and also a 0 on conductor EN from output 6 of NAND 16U9B. There is a 0 at output 5 and an output terminal P indicating that the feed is low. There is a 0 on input 7 of NAND driver 16U6 and a 1 on its output 5 and on output terminal N. The feed normal indicator is not enabled.

There is a 0 on conductor 1235 from 1Q of 16U8. There are 0's at inputs 1 and 2 of OR driver 16U5. There is a 0 on output L indicating that escapement 125 (FIG. 1) is empty. There is a 0 on input 1 of NAND driver 16U6 and 1 on its output 3 to indicate that the escapement 125 (FIG. 1) is not occupied.

There is a 1 on input 13 of NAND 16U9D. With no pellet in the escapement 125. If the feed bowl 163 is not empty, there is a 1 on input 12 of 16U9D. There is a 1 on conductor 1231 and on input 1 of NAND driver 16U7 and 0 on output 3, enabling the feed stoppage indicator.

If the feed bowl is empty, there is a 0 on input 12 of NAND 16U9D and on conductor 1231. There is a 1 on output 3 of NAND driver 16U7. The feed stoppage indicator is not enabled. If the feed bowl is empty there is a 0 on conductor 1233. There is a 0 on output terminal 15, indicating that the feed is not normal, the feed-low indicator is enabled through output terminal P, and the feed normal indicator is not enabled.

A 1 on output 8 of NOR 4U20 (FIG. 12C) indicates absence of a pellet in the diameter position 127. In this event a 1 is entered on input 1D of flip-flop 16U11A from terminal AA (FIG. 12C) through terminal 9 (FIG. 38A). The DUPDSTB pulse from output terminal P of the diameter logic, FIG. 10, clocks 16U11A to enter a 0 on output 1$\bar{\text{Q}}$ and on input 2D of register 16U8. When DHLD (FIG. 4c) is entered on input terminal 9, a 0 is entered in output 2Q on conductor 1234 and on output terminal 4, PEL IN DIA STA signifying no pellet in diameter station 127.

With a 0 on conductor 1234 there is a 0 on input 1 of OR driver 16U1. There is also a 0 on input 2 from conductor 1239. There is a 0 on output 3 of OR driver 16U1 and $\overline{\text{DMT IND}}$, diameter empty indicator is enabled. There is a 0 on input 1 of NAND driver 16U2. There is a 1 on output 3 of 16U2 and $\overline{\text{DOCC IND}}$, diameter occupied indicator is not enabled.

For a 0 on input terminal 9, DHLD clocks a 1 on conductor 1234. There is a signal indicating the presence of a pellet in the diameter station 127 and the indicators are set correspondingly.

A reliable determination of a pellet present in the length station 131 (FIG. 1) is made by the cooperation of flip-flop 16U11B and NOR's 16U10C and 16U10D. After 16U11B is cleared by $\overline{\text{CTL}}$ $\overline{\text{CLR}}$ there are 0's on inputs 8 and 9 of 16U10C and a 0 on input 2D of 16U11B through NAND 16U10D. If L1 does not reach the count of 256 (bit 9) before a 1 is entered on input terminal 13 LUPDSTB, length update strobe, from output terminal 13 of the length control (FIG. 22), LUPDSTB clocks flip-flop 16U11B and a 0 is entered on 2Q and a 1 on 2$\bar{\text{Q}}$ and on input 3D of register 16U8. When DHLD is entered, there is a 1 on 3Q of 16U8 and on output terminal 5, PL IN LNG STA, pellet in long station. This indicates that there is a pellet in the length station. There is a 1 on conductor 1241 and on input 1 of OR driver 16U3. There is a 1 on output 3 of this driver. The $\overline{\text{LMT IND}}$, L empty indicator is not enabled.

There is also a 1 on input 1 of NAND driver 16U4 and a 1 on input 2 from conductor 1237. There is a 0 on output 3 of the driver 16U4 and on output terminal H, $\overline{\text{LOCC IND}}$, length occupied indicator, and this indicator is enabled.

If L1 reaches the count of 256 before LUPDSTB is impressed, indicating that there is no pellet in the length station, a 1 is impressed on input terminal 12, LICT B9, L1 count, bit 9, and on input 8 of NOR 16U10C. A 0 is entered on output 10 and on inputs 11 and 12 of NOR 16U10D. When LUPDSTB clocks flip-flop 16U11B a 1 is entered on 2Q and a 0 on 2$\bar{\text{Q}}$. The 1 on 2Q is also entered on input 9 of 16U10C. When DHLD is entered on input terminal 19, a 0 is entered on 3Q of 16U8.

There is a 0 on output terminal 5, PEL IN LNG STA, indicating no pellet in the length station 131. There is also a 0 on conductor 1241. $\overline{\text{LMT IND}}$ is enabled through output terminal F. A 1 is entered on terminal H, $\overline{\text{LOCC IND}}$, and there is no signal that the length station is occupied. Through the conductor 1243 between output 2Q of flip-flop 16U11B and input 9 of 16U10C, the flip-flop is locked in either with a 0 or with a 1 on input terminal 12.

The determination and signalling of a pellet P in the flaw station 129 (FIG. 1) is carried out with the aid of flip-flops 16U12A and 16U12B. These flip-flops are cleared by the impressing of the $\overline{\text{CTL}}$ $\overline{\text{CLR}}$ pulse on their 1 CLR and 2 CLR inputs respectively. If there is a pellet in the flaw station, flip-flop 16U12A is clocked by the flaw digitized video positive transition, FDVPTRN, when the scanning light beam is incident on the pellet. This signal is impressed on input terminal 16 from output terminal 16 of the flaw logic (FIG. 28). A 0 is entered on output 1$\bar{\text{Q}}$ of 16U12A and on input 2D of 16U12B. On the entry of the 64th, grating clock pulse, FGRATCK count, (FIGS. 30a, 31c) for the scan, flip-flop 16U12B is clocked and 1 is entered on output 2Q of the flip-flop and on input 4D of register 16U8. The 64th FGRATCK count, is impressed from output terminal 17 of the flaw logic (FIG. 28C) on input 17. When register 16U8 is clocked by DHLD, a 1 is entered on output 4Q of the register. The 1 is impressed on output terminal 6, PEL IN FLW STA, indicating that a pellet is in the flaw station. A 1 is also entered on conductor 1245 and on input 7 of OR driver 16U1. A 1 is entered on output terminal D $\overline{\text{FMT IND}}$, flaw empty indicator. This indicator is not enabled. From conductor 1245 a 1 is also entered on input 7 of NAND driver 16U2. A 0 is entered on output terminal E, $\overline{\text{FOCC IND}}$, and the indication that the flaw station is occupied is enabled.

If by the 64th grating-clock pulse there has been no digitized video positive transition, there is, when the 64th count is impressed, a 1 on 1$\bar{\text{Q}}$ of flip-flop 16U12A and on input 2D of flip-flop 16U12B. On the occurrence of the 64th FGRATCK count, output 2$\bar{\text{Q}}$ of 16U12B goes to 0. Input 4D of 16U8 is 0 and on the occurrence of DHLD, 4Q is 0. A 0 is entered on output terminal 6 indicating no pellet in flaw station 129. A 0 is entered on conductor 1245. A 0 is impressed on output terminal D, $\overline{\text{FMT IND}}$, through OR driver 16U1 enabling the indication that the flaw station is empty. A 1 is impressed on output terminal E. The indication that the flaw station is occupied is not enabled.

If the weight logic (FIG. 34) indicates 100 mg on the scale 381 (FIG. 33), at the weight station 133 (FIG. 1) a 1 is impressed from output terminal 17 (FIG. 34) on input terminal 7, PEL IN WT STA, and on conductor 1247. A 1 is impressed through OR driver 16U3 on output terminal J, $\overline{\text{WMT IND}}$, weight empty indicator, and the indication that the weight station is empty is not enabled. A 0 is impressed on output terminal, $\overline{\text{WOCC IND}}$, enabling indication that the weight station is occupied. If there is a 0 on input terminal 7, there is a 0 on conductor 1247, a 0 on output terminal J enabling the indication that the weight station 133 is empty, and a 1 on output terminal K indicating that the weight station 133 is not occupied.

Figure 39A:
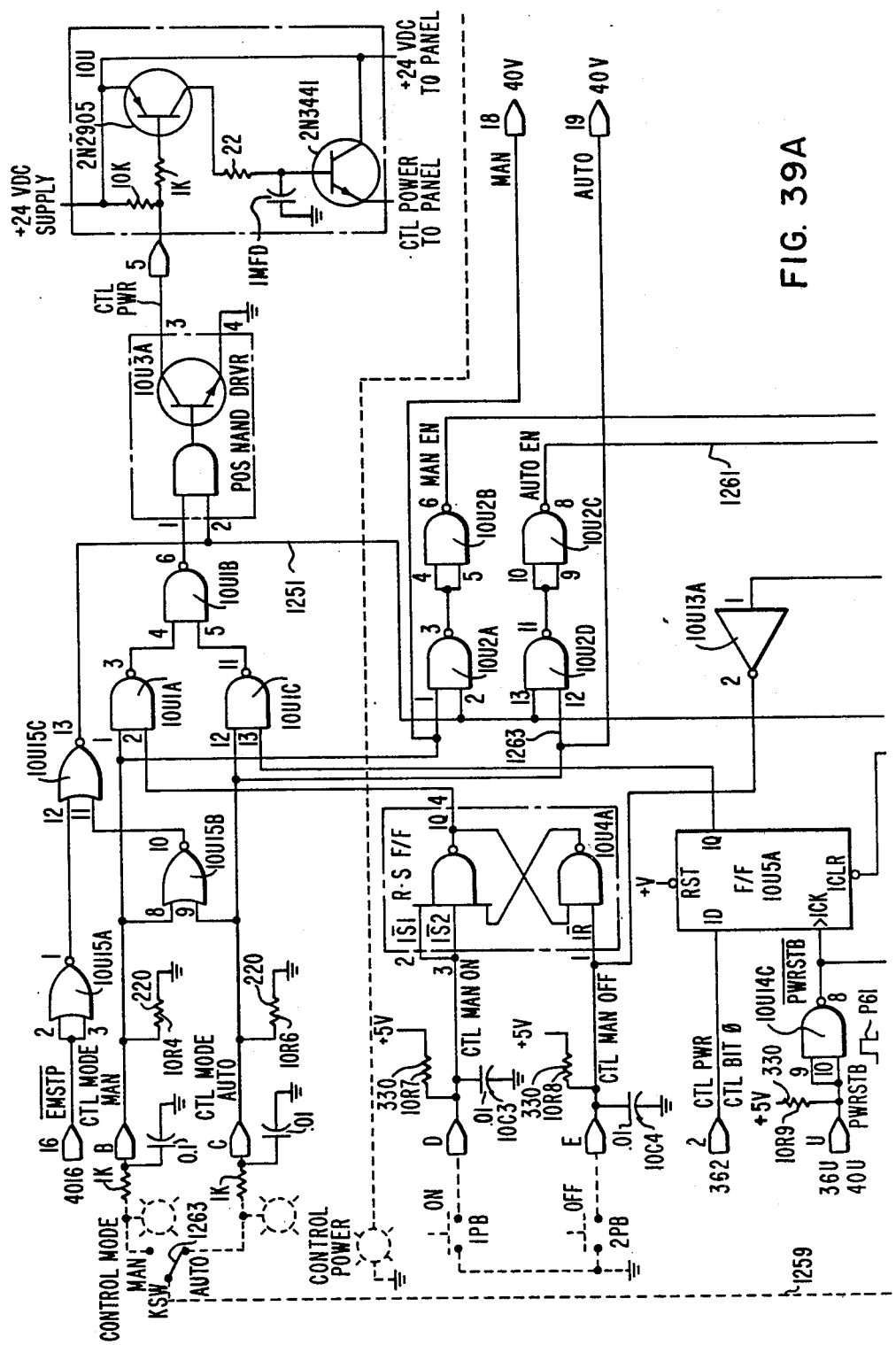
FIGS. 39A, 39B, 39C together are the logic schematic of the control responsive to the settings of the manual switches of the control system.
Figure 39B:
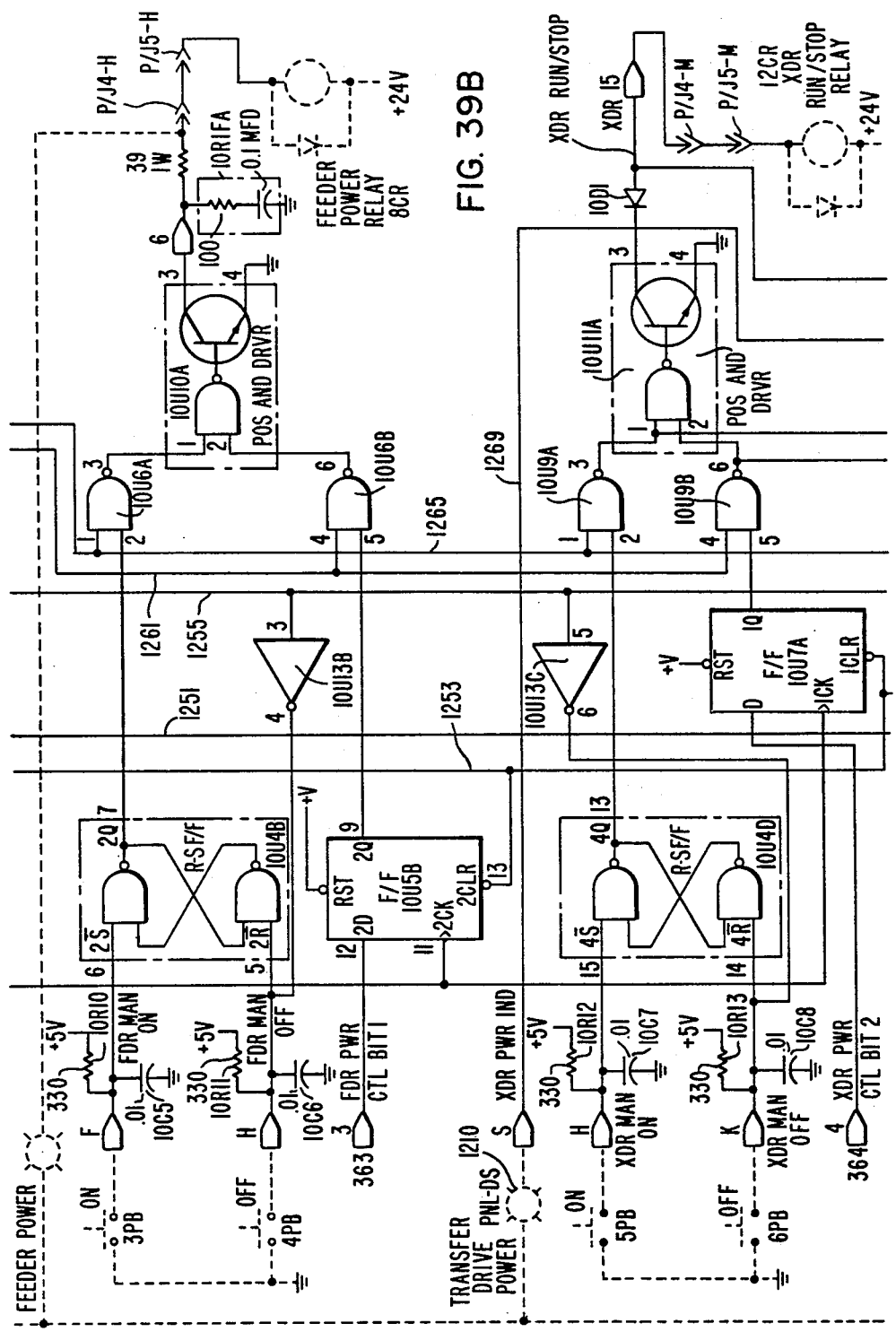
Figure 39C:
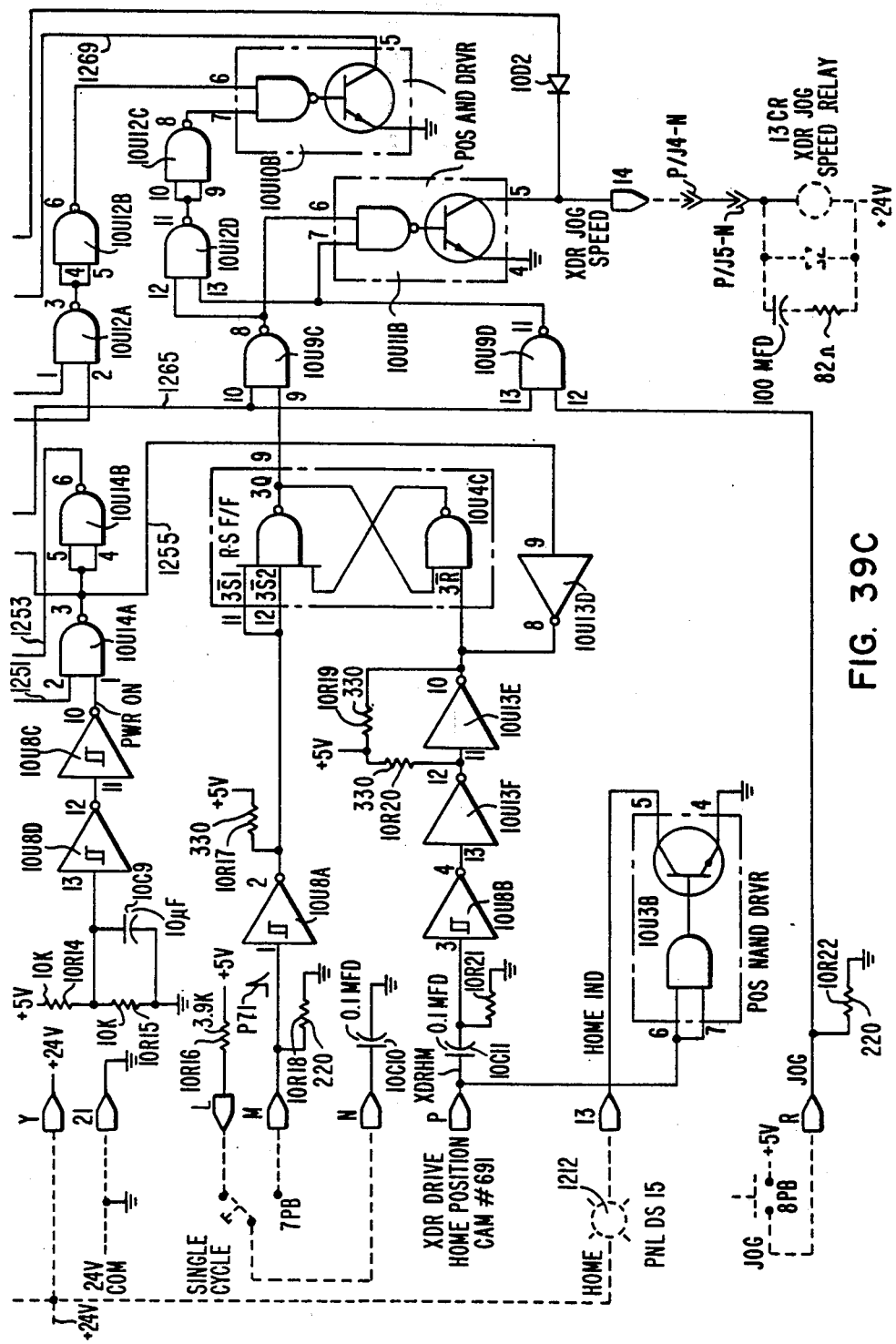
Figure 40A:
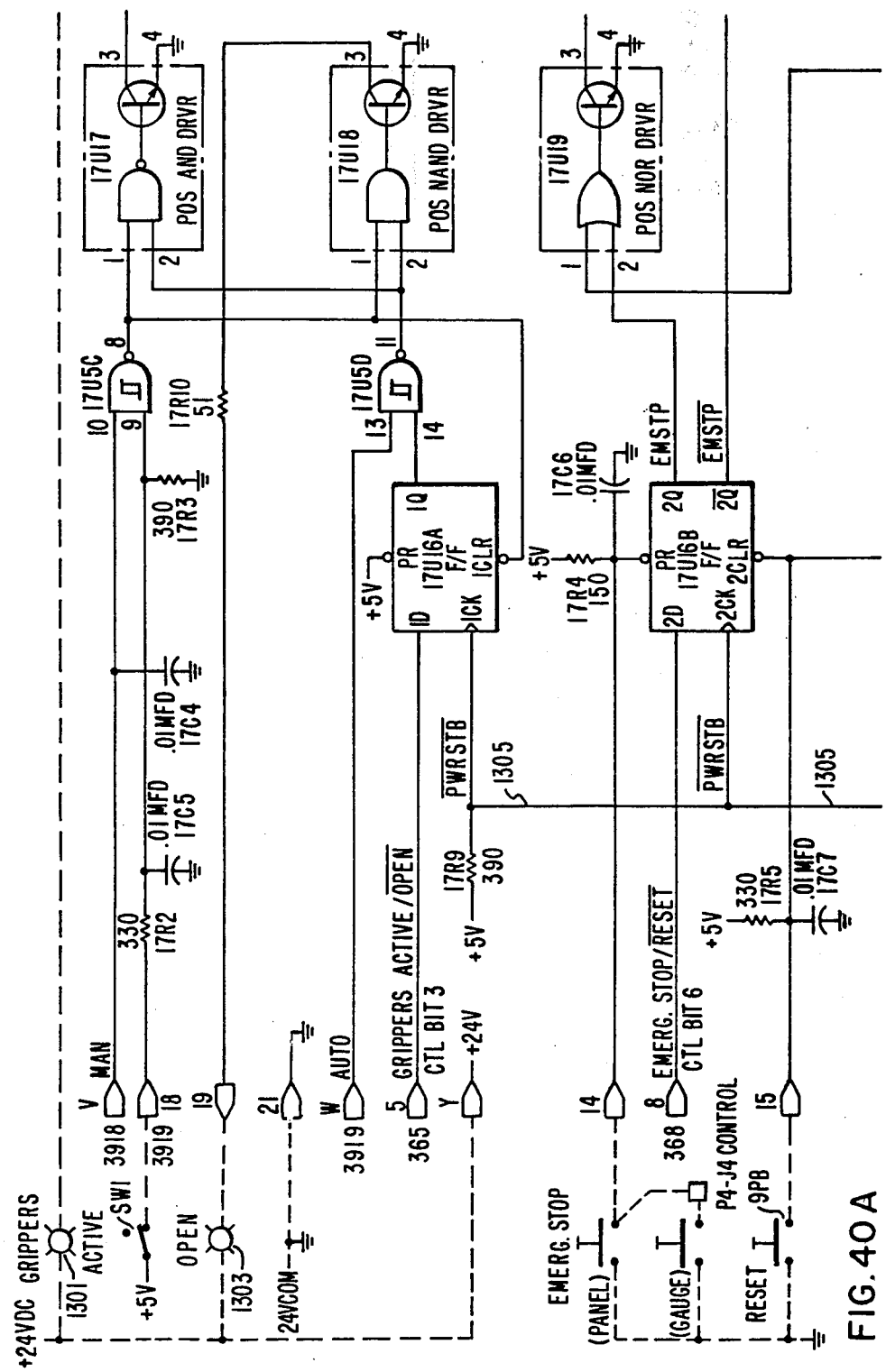
FIGS. 40A, 40B, 40C, 40D together are the logic schematic of the control of the mechanisms of the mechanical handling and gauging system.
Figure 40B:
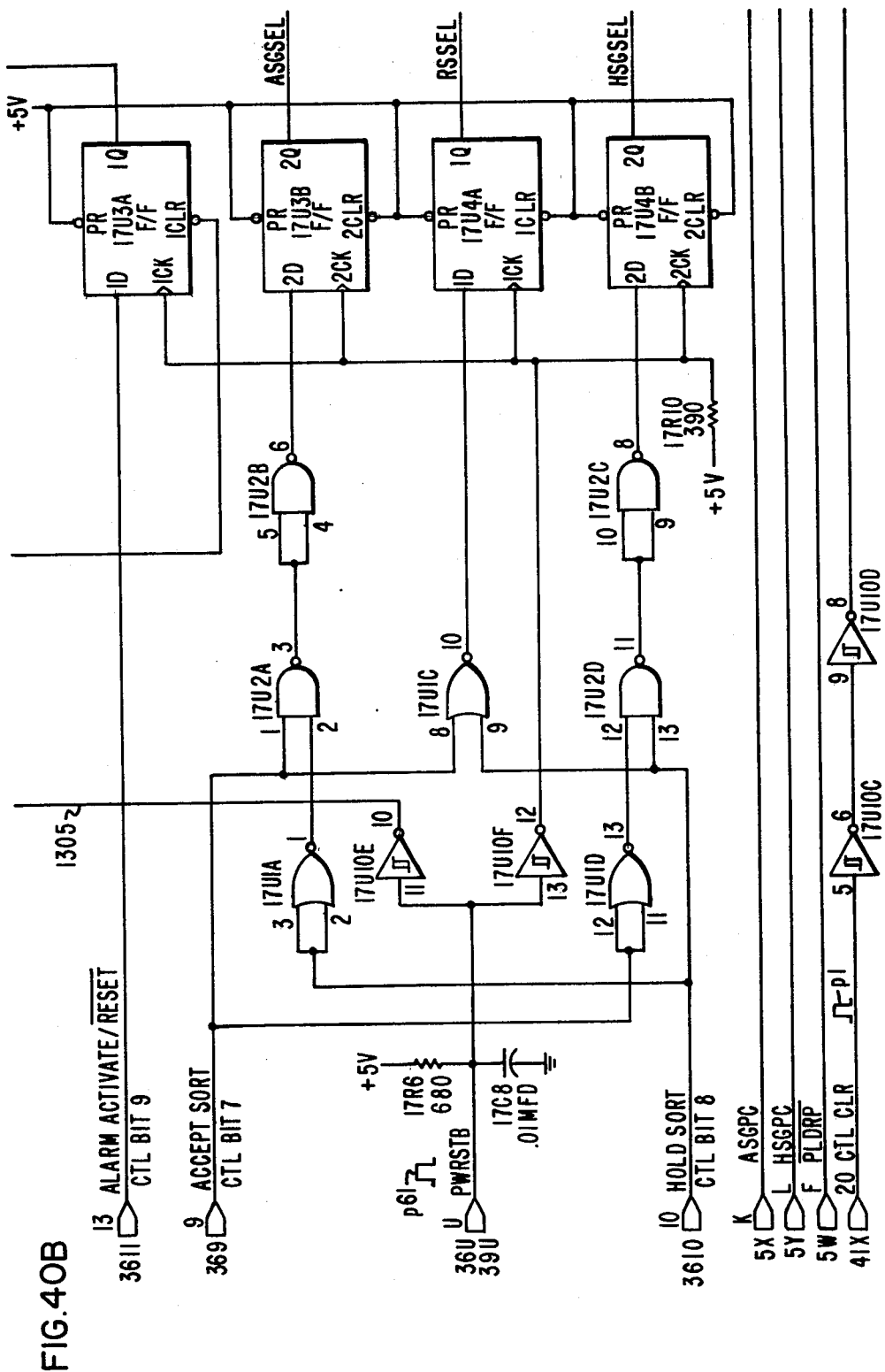
Figure 40C:
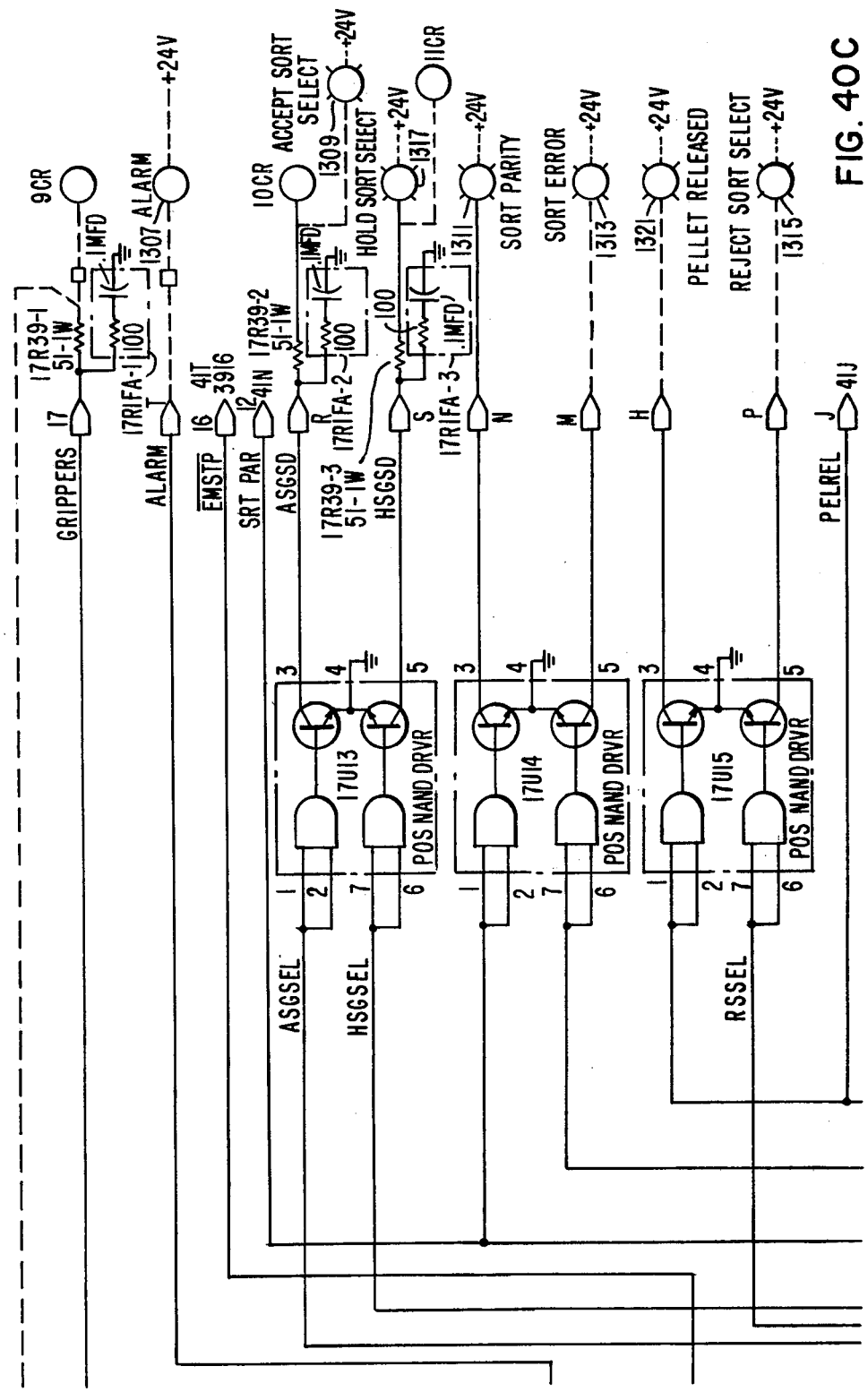
Figure 40D:
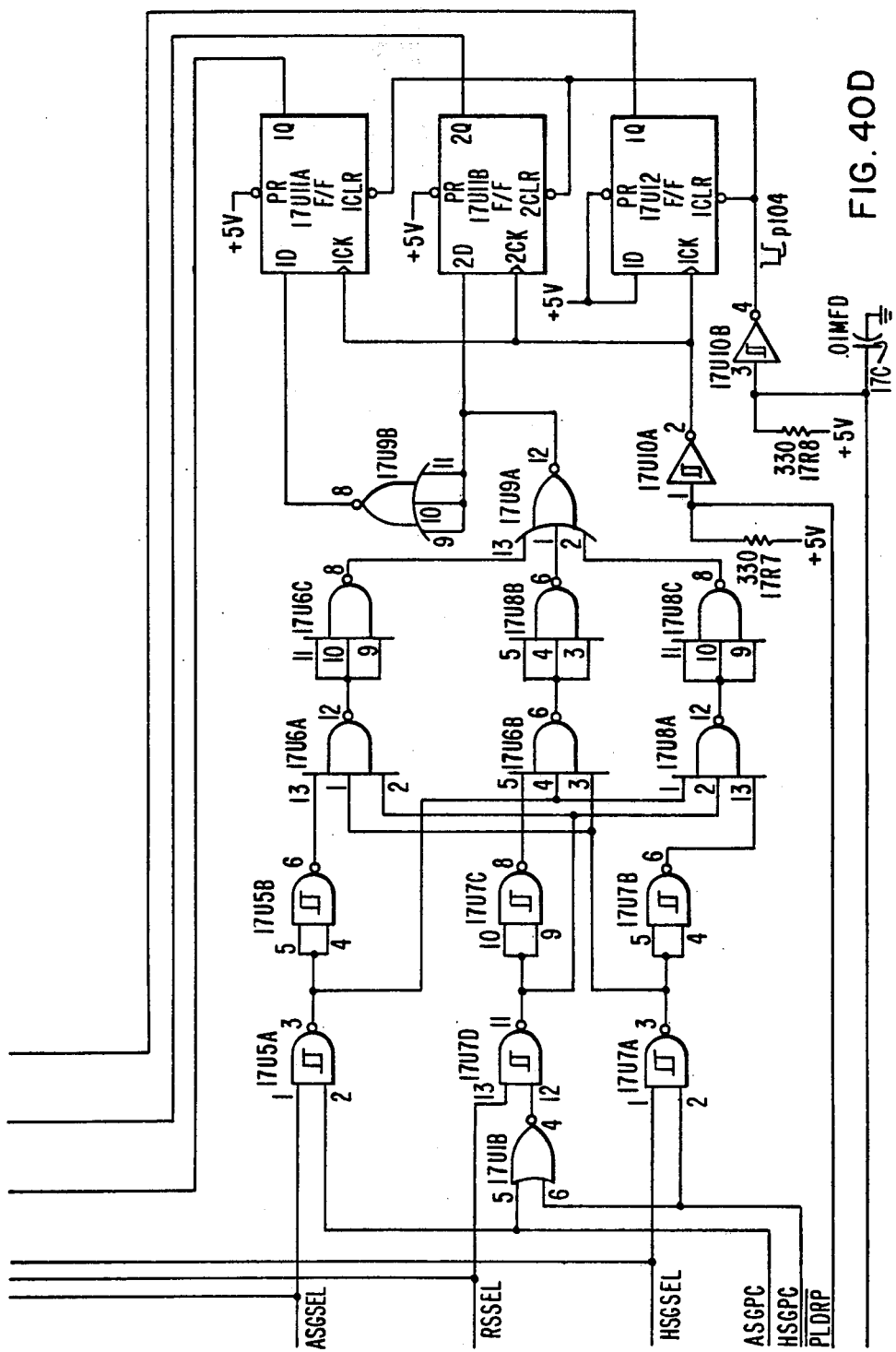

FIG. 39 shows the control components and their mode of operation. The conductors and other elements shown in broken lines represent the components on the panel of the apparatus. When power is turned on, 5 volts is applied across the network including resistors 10R14, 10R15 and capacitor 10C9 (FIG. 39C). Initially capacitor 10C9 acts as a short circuit and input 13 of Schmidt trigger 10U8D is momentarily 0. Output 12 of 10U8D and input 11 of Schmidt trigger 10U8C are 1 and output 10 PWR ON, power on, is 0. Output 3 of 10U14A is 1 and output 6 of 10U14B is 0. There is a 0 pulse on conductor 1253 and flip-flops 10U5A, 10U5B and 10U7A are cleared. There is a 1 on conductor 1259 from output 3 of NAND 10U14A and flip-flops 10U4A, 10U4B, and 10U4D and 10U4C are reset through inverters 10U13A through 10U13D. The Schmidt triggers introduce a short delay between the turning on of power and the pulse which clears or resets the flip-flops.

It is initially assumed that $\overline{EMSTP}$ is not enabled. A 1 is entered on input terminal 16 from output terminal 16 of the control logic, FIG. 40. The switch KSW is closed to the manual or automatic control-mode position. There is a 1 on inputs 8 or 9 of NOR 10U15B and a 0 on input 11 of NOR 10U15C. Through NOR's 10U15A and 10U15C, a 1 is entered on conductor 1251. Conductor 1251 is connected to input 2 of NAND 10U14A. If an emergency-stop 0 is entered on input terminal 16, conductor 1251 becomes 0, output 3 of 10U14A is 1 and output 6 of 10U14B and conductor 1253 are 0. All flip-flops 10U5A, 10U5B and 10U7A in whatever setting they then happen to be in are cleared and likewise all flip-flops 10U4A through 10U4D are reset through conductor 1250 and the inverters 10U13B, 10U13C, 10U13D.

It is assumed that the switch KSW is set on AUTO, automatic. There is a 1 on input terminal C, CTL MODE AUTO, control mode, automatic, from the 24 volt line 1259 and on input 12 of NAND 10U1C. Before computer 105 enters a 1 on input terminal 2, CTL PWR, control power, from output terminal 2 of the interface, FIG. 36, and a 1 pulse p61 on input terminal U, $\overline{PWRSTB}$, power strobe, from output terminal U, FIG. 36, there is a 0 on input 13 of 10U1C. There is also a 0 on input terminal 1 of NAND 10U1A since switch KSW is open at MAN. There are 1's on inputs 4 and 5 of NAND 10U1B and a 0 on input 1 of NAND driver 10U3A. There is a 1 on output 3 of driver 10U3A and control current is not conducted through this driver. Computer 105 enters a 1 on input terminal 2 and on input 1D of flip-flop 10U5A. It also enters a binary 4 on input conductors 0'D10, 0'D11, 0'D12 of the interfaces, FIG. 36, and a power strobe is entered on input terminal U. Through inverting NAND 10U14C, flip-flop 10U5A is clocked entering a 1 on input 13 of 10U1C. There is now a 0 on input 5 of 10U1B and a 1 on input 1 of NAND driver 10U3A. There is also a 1 on input 2 at this driver from conductor 1251. There is a 0 on output 3 of driver 10U3A. The cascaded transistor amplifier 10U conducts control power to the panel.

As commanded by computer 105, a 1 is also impressed on input terminal 3, FDR PWR, feeder power, from output terminal 3 of the interface, FIG. 36A. A 1 is entered on input 2D of flip-flop 10U5B. When the power strobe is impressed, a 1 is entered on 2Q and on input 5 of 10U6B. Input 4 of 10U6B is connected to conductor 1261 which is controlled by NAND's 10U2D and 10U2C. In the absence of emergency stop there is a 1 on input 13 of 10U2D from conductor 1251. There is also a 1 on input 12 from input terminal C through conductor 1263. There is a 0 on inputs 9 and 10 of 10U2C and 1 on conductor 1261 and on input 4 of NAND 10U6B. There is a 0 on input 1 of AND driver 10U10A and a 0 on its output 3. Feeder-power relay 8CR is actuated and there is feeder power for the pellets P. In a similar manner, relay 12CR, XDR, transfer drive, RUN/STOP, is actuated through AND driver 10U11A. When a 1 is impressed from computer 105 through output terminal 4 of the interface, FIG. 36, through input terminal 4 to 1D input of flip-flop 10U7A, and a PWR STB is impressed on input terminal U, flip-flop 10U7A output 1Q impresses a 1 on input 5 of NAND 10U9B. Relay 12CR is actuated through diode 10D1.

With 1's on inputs 4 and 5 of NAND 10U9B, there is a 0 on input 2 of NAND 10U12A, a 1 on inputs 4 and 5 of NAND 10U12B, a 0 on input 6 of AND driver 10U10B and a 0 on its output 5. Through input terminal S, XDR PWR IND, transfer drive power indicator, this indicator 1210 is enabled.

When switch KSW is moved between AUTO and MAN, there is a short interval during which its blade 1263 is disconnected from its fixed contacts. During this interval there are 0's on inputs 8 and 9 of NOR 10U15B. There is momentarily a 1 on input 11 of NOR 10U15C and a 0 on conductor 1251. There is a 0 on input 1 and NAND driver 10U3A and 1 on its output 3. Current flow through amplifier 10U is interrupted. CTL POWER to panel is interrupted. There is also a momentary 0 on conductor 1265, MAN EN, manual enable, through NAND's 10U2A and 10U2B. There is also a 0 on conductor 1261 through NAND's 10U2D and 10U2C. There are 1's on inputs 1 and 2 of AND driver 10U10A and 1 on output 3. Relay 8CR is deenergized.

Likewise there are 1's on inputs 1 and 2 of AND driver 10U11A and relay 12CR is deenergized. Because there is a 0 on conductor 1251, there is a 1 on conductor 1255 and flip-flops 10U4A, 10U4B, 10U4D and 10U4C are reset. The apparatus is thus completely reset in the short hiatus between the opening of AUTO and the closing of MAN or the opening of MAN and the closing of AUTO.

When switch KSW is closed on MAN, there is a 1 on input 8 of NOR 10U15C and a 0 on input 11 of 10U15B. There is a 1 on conductor 1251 and on input 2 of NAND driver 10U3A. There is a 1 on input 1 of 10U1A from input terminal B. When "ON" pushbutton 1PB is closed, a 1 is entered on output 1Q of 10U4A and there is a 1 on input 2 of 10U1A. There is a 0 on input 4 of 10U1B and a 1 on input 1 of NAND driver 10U3A. There is also a 1 on input 2 of this driver from conductor 1251. There is a 0 on output 3 of this driver and the panel is supplied with control power. The operation of 1PB is momentary but the control power remains enabled until flip-flop 10U4A is reset by closing OFF pushbutton 2PB.

There is a 1 on input 1 of NAND 10U2A from input terminal B. There is a 1 on input 2 of this NAND from conductor 1251. Through NAND 10U2B there is a 1 on input 1 of NAND 10U6A. When "ON" pushbutton 3PB is actuated, there is a 1 on output 2Q of flip-flop 10U4B and on input 2 of NAND 10U6A. There is a 0 on input 1 of AND driver 10U10A and a 0 on its output. The feeder-power relay 8CR remains actuated. It remains actuated until "OFF" pushbutton 4PB is closed resetting flip-flop 10U4B. The transfer drive power is likewise enabled by actuation of relay 12CR, in the circuit including 5PB, flip-flop 10U4D, NAND 10U9A, AND driver 10U11A.

Single cycle operation can be carried out only with the aparatus set for manual. Under these circumstances there is a 1 on conductor 1265. Pushbutton 7PB during standby is connected between output terminal L and input terminal N. Capacitor 10C10 is charged through resistor 10R16. To carry out single cycle operation, pushbutton 7PB is actuated to connect input terminal M to input terminal N. Capacitor 10C10 is discharged through resistor 10R18 producing a pulse p71. This pulse is inverted by 10U8A and impressed on inputs 11 and 12 of flip-flop 10U4C producing a 1 level at output 3Q and on input 9 of NAND 10U9C. From conductor 1265, there is a 1 on input 10 of 10U9C. There is a 0 on input 6 of AND driver 10U11B and on output 5 of this driver. Two events occur: relay 13CR is actuated to set the transfer-drive motor 145 (FIG. 1) to a reduced speed and relay 12CR is actuated through diode 10D2 to energize the transfer drive motor. In addition there is a 0 on input 12 of NAND 10U12D, a 1 on inputs 10 and 9 of NAND 10U12C, a 0 on input 7 of AND driver 10U10B and a 0 on output 5 of this driver. The transfer drive power indicator 1210 is enabled through conductor 1269. Cam 961 (FIG. 14) is rotated by the transfer-driven motor 145 causing light to impinge on photo transistor 705 (FIG. 5). An electrical pulse is impressed through input terminal P, XDR DRIVE HOME POSITION. This pulse is transmitted to reset input $3\overline{R}$ of flip-flop 10U4C through Schmidt trigger 10U8B, inverter 10U13F and inverter 10U13E. A 0 is entered on output 3Q of this flip-flop deenergizing relays 12CR and 13CR and disabling the transfer drive indicator 1210. The pulse through the photo transistor 705 (FIG. 5) also impresses a 1 on inputs 6 and 7 of NAND driver 10U3B. A 0 is entered on output 5 and the HOME IND, indicator 1212, is enabled through input terminal 13.

The logic schematic shown in FIG. 40 discloses features of the control in addition to those disclosed in FIG. 39. Output terminal 18 of the logic schematic shown in FIG. 39 is connected to input terminal V MAN, manual. With a 1 on input terminal V, there is a 1 on input 10 of Schmidt NAND 17U5C. With switch SW1 closed, there is also a 1 on input 9 of this NAND. There is a 0 on input 1 of AND driver 17U17 and a 0 in its output 3. Relay 9CR is actuated. Actuation of relay 9CR energizes solenoid 771 shown in Wilks application FIGS. 19, 20. With solenoid 771 energized, the grippers 517 through 523 (FIG. 1) are actuated to close and open to engage and disengage pellets. Indicator 1301 indicating grippers active is also enabled through AND driver 17U17. With switch SW1 closed there is also a 0 on input 1 of NAND driver 17U18. There is a 1 on output 1 and indicator 1301 for indicating grippers open is not enabled. With switch SW1 open there is a 0 on input 9 of Schmidt NAND 17U5C and 1 on inputs 1 of AND driver 17U17 and NAND driver 17U18. There are also 1's on inputs 2 of these drivers because of a 0 input terminal W, AUTO, and on input 13 of Schmidt NAND 17U5D. In this case relay 9RC is unactuated, the grippers are open, indicator 1301 is disabled and indicator 1303 is enabled.

With the control set in automatic, the setting of the grippers depends on the commands on input terminal 5 from output terminal 5 of the interface, FIG. 36. A 1 is entered on input terminal 5 for GRIPPERS ACTIVE and a 0 for GRIPPER OPEN or idling. The commands are entered by computer 105 on input terminal 0'D3 of the interface (FIG. 36) in accordance with the program in the memory of the computer 105. Typically during normal operation, a 1 is entered on 0'D3 during the gripper cycles during which the pellets are inspected at the rate of 3 per second for diameter, flaws and length and a 0 is entered during the 2 seconds during which 1 pellet in 6 is weighed. When a defect in weight is encountered, the 1 is entered for one gripper cycle every 2 seconds; for the intervening gripper cycles a 0 is entered.

With the control set for automatic, there is a 1 on input 13 of Schmidt NAND 17U5D. At the start of the GRIPPER ACTIVE cycles a 1 is entered on input 1D of flip-flop 17U16A and this flip-flop is clocked by the trailing edge of $\overline{PWRSTB}$, power strobe pulse. The $\overline{PWRSTB}$ pulse p61 is derived from output terminal U of the interface, FIG. 36, and is impressed through input terminal U. The pulse p61 is impressed on conductor 1305 through Schmidt trigger 17U10E and through conductor 1305 on clock input 1CK of 17U16A. A 1 is entered on output 1Q of 17U16A and an input 12 of 17U5D. A 0 is entered on inputs 2 of AND drives 17U17 and of NAND driver 17U18. A 0 is entered on output 3 of driver 17U17 and relay 9CR is actuated and indicator 1301 is enabled. Through NAND driver 17U18, on whose output 3 a 1 is entered, indicator 1303 is disabled. For each 6th pellet, a 0 is entered from computer 105 on input 5 and on input 1D of flip-flop 17U16A and is clocked in by the $\overline{PWRSTB}$. A 0 is entered on 1Q of 17U16A and on input 12 of Schmidt trigger NAND 17U5D and a 1 on inputs 2 of drivers 17U17 and 17U18. On inputs 1 of these drivers, 1's are entered from output 8 of NAND 17U5C. There is a 1 on output 3 of driver 17U17 and 0 on output 3 of 17U18. Relay 9CR is deenergized and indicator 1301 is disabeled and indicator 1303 is enabled.

Flip-flop 17U16A is cleared by a 0 on 1CLR if the control is set for manual and SW1 is closed and so long as these settings remain. This precludes control from input terminal 5 in the manual setting.

If an event occurs which requires enabling of EMERG STOP, emergency stop, a 1 is entered on input 8 by computer 105 through 0'D6 and output 8 of the interface, FIG. 36, and in addition a power strobe is entered on input terminal. Output 2Q, EMSTP, of 17U16B becomes 1 level and output $2\overline{Q}$ $\overline{EMSTP}$ becomes 0 level. The 0 level is entered on input terminal 16 of the control logic, FIG. 39, disabling all drives and other mechanisms. The 0 level is also entered on control logic, FIG. 41, for transmission of the intelligence of the emergency state to computer 105. The 1 on 2Q of 17U16B is entered on input 1 of NOR driver 17U19 producing a 0 at output 3 and enabling the alarm 1307. The alarm 1307 can be enabled independently of emergency stop by entering a 1 on input terminal 13. This 1 is entered by computer 105 through input terminal 0'D9 and output terminal 11 of the interface board, FIG. 36. By entering a power strobe on input terminal U, a 1 is entered on output 1Q of flip-flop 17U3A and on input 1 of NOR driver 17U19. A 0 is produced on output 3 of this driver and the alarm is enabled.

The control can be reset from the emergency-stop state by the computer by entering a 0 on input terminal 8 through 0'D6 and output terminal 8 (FIG. 36) and entering a power strobe on input terminal U. A 0 is produced on output 2Q and a 1 on output $2\overline{Q}$ of flip-flop 17U16B. This 1 on $2\overline{Q}$ is entered on input 16 of the control, FIG. 39, conditioning the drivers and other mechanisms to be operated on appropriate commands. A 0 is entered on input 2 of NOR driver 17U19. To disable the alarm 1307, it is also necessary that a 0 be entered on input 1 of driver 17U19. This occurs if a 0 is entered on input terminal 13 and a power strobe is entered on input terminal U by computer 105. Emergency stop and alarm 1307 can also be disabled by closing pushbutton 9PB impressing a 0 on 2CLR of 17U16B and on 1CLR of 17U3A. 0's are entered on inputs 1 and 2 of NOR driver 17U19 and 1 is entered on output terminal 16 from output 2Q of 17U16B.

The sorting station 137 (FIG. 1) is normally set for reject. The memory of computer 105 contains the data on whose basis each pellet is classified. As each pellet reaches sorting station 137 a 1 is entered by the computer on 0'D7, FIG. 36, if the pellet is to be accepted and a 0 is entered on 0'D8. If the pellet is to be held for reprocessing, a 1 is entered on 0'D8 and a 0 on 0'D7. If the pellet is to be rejected 0's are entered on O'D7 and 0'D8. In each case a power strobe p62 is entered by the computer.

Assume first that the pellet is acceptable. A 1 is entered on input terminal 9, Accept SORT, from output terminal 9 of the interface, FIG. 36. A 1 is entered on input 1 of NAND 17U2A. Since there is a 0 on input terminal 10, HOLD SORT from the computer through 0'D8, FIG. 36, there is a 1 on input 2 of 17U2A through NOR 17U1A. There is a 0 on inputs 4 and 5 of NAND 17U2B and a 1 on input 2D of flip-flop 17U3B. On the entry of the power strobe 1061 on U input terminal, a 1 is entered on 2Q of 17U3B and on conductor ASGSEL, accept sort gate select. A 1 is entered on inputs 1 and 2 of NAND driver 17U13 and a 0 on its output 3. The Accept Sort gate relay 10CR is actuated energizing the accept solenoid (Wilks application FIGS. 30, 31) and swinging the sort gate so as to deposit the pellet in accept bin 153 (FIG. 1). The accept indicator 1309 is also enabled.

The moving of the accept gate also causes PC4 (FIG. 5) to be energized entering a 1 on input K, ASGPC, accept sort gate photo cell. A 1 is entered on input 2 of Schmidt NAND 17U5A. There is a 1 on input 1 of this NAND. A 0 is entered on inputs 4 and 5 of Schmidt NAND 17U5B and a 1 on input 13 of NAND 17U6A. When the power strobe is entered, there is a 0 on input 2D of flip-flop 17U4B from input terminal 9, through NOR 17U1D, NAND 17U2D, NAND 17U2C. A 0 is entered on 2Q. There is a 0 on conductor HSGSEL, hold-sort-gate select, and on input 1 of Schmidt NAND 17U7A. There is also a 0 on input 2 from input terminal L, HSGPC, hold sort gate photo cell. There is a 1 on output 3 of 17U7A and on input 1 of 17U6A. From input terminal 9, there is a 1 on input 8 of NOR 17U1C. There is a 0 on output 10 and on input 1D of flip-flop 17U4A. The power strobe enters a 0 on 1Q of 17U4A, on conductor RSSEL, reject sort select, and on input 13 of Schmidt NAND 17U7D. There is a 1 on input 5 of NOR 17U1B from input terminal K. There is a 0 on output 4 of this NOR and on input 12 of 17U7D. There is a 1 on input 2 of NAND 17U6A. There is a 0 on output 12 of 17U6A and on inputs 9, 10, 11 of NAND 17U6C. There is a 1 on output 8 of 17U6C and on input 13 of NOR 17U9A. There is a 0 on output 12 and on inputs 9, 10, 11 of NOR 17U9B and a 1 on input 1D of flip-flop 17U11A. From output 12 of 17U9A there is a 0 on input 2D of flip-flop 17U11B.

The accept gate is set before the pellet is deposited by the grippers into the gate. When the pellet is deposited the current through cells PC3 is interrupted and a 0 is entered from output terminal W, FIG. 5, on input terminal F, $\overline{PLDRP}$, pellet drop. A resulting pulse is impressed, through Schmidt inverter 17U10B, as clock signals on 1CK of flip-flop 17U11A and 17U12 and on 2CK of 17U11B. Since there is a 1 on 1Q of 17U11A from 17U9B, 1 is entered on ouput 1Q of 17U11A and on output terminal 12, SRT PAR, sort parity. A 1 is entered on inputs 1 and 2 of NAND driver 17U14. A 0 is entered on output 3 of this driver and SORT PARITY indicator 1311 is enabled indicating sorting is correct. A 0 is entered on output 2 of flip-flop 17U11B and a 1 is entered on output 5 of NAND driver 17U11B and SORT ERROR indicator 1313 is not enabled.

It is emphasized that the entry of a 1 on input 13 of 17U9A depends not alone on the entry of a 1 on input terminal 9, ACCEPT SORT. It also depends on the entry of a 0 on input terminal 10, HOLD SORT, and on the entry of a 1 on input 8 of NOR 17U1C. Unless this logic is correct for accept, hold and reject, there are no 1's on inputs 13, 1 and 2 of 17U6A, a 0 on inputs 9, 10, 11 of NAND 17U6C and a 1 on input 13 of NOR 17U9A. In the absence of this 1 on input 13 17U9A, there is a 1 on input 2D of flip-flop 17U11B. There is also necessarily a 0 on input 1D of flip-flop 17U11A. On entry of $\overline{PLDRP}$ pulse, there is a 0 on output terminal 12, SRT PAR. There is a 1 on inputs 6 and 7 of NAND driver 17U14 and the SORT ERROR indicator 1313 is enabled.

The HOLD SORT operation is similar to the ACCEPT SORT operation. When a pellet is found by inspection to be of acceptable length and density (weight) but as having a diameter greater than the acceptable limit, computer 105 enters a 1 on input 0'D8, FIG. 36. A 1 is entered on input terminal 10, HOLD SORT, and 0 on input terminal 9, ACCEPT SORT. The power strobe is also entered, clocking flip-flops 17U3B, 17U4A and 17U4B. Through NOR 17U1A and NAND's 17U2A and 17U2B, 0's are entered on 2D and 2Q of 17U3B and on conductor ASGSEL. Relay 10CR is not actuated and indicator 1309 is not enabled. Through NOR 17U1C, 0's are entered on 1D and 1Q of 17U4A and in conductor RSSEL, reject sort enable. REJECT SORT SELECT indicator 1315 is not enabled because there is a 1 on output 5 of NAND driver 17U15. Through NOR 17U1D and NAND's 17U2D and 17U2C, 1's are entered on 2D and 2Q of 17U4B and on conductor HSGSEL, hold-sort-gate select. A 1 is impressed on output 5 of NAND driver 17U13. Relay 11CR is actuated energizing the hold-sort solenoid (Wilks application FIGS. 30, 31) and also enabling HOLD SORT SELECT indicator 1317. The pellet is deposited in hold bin 149 (FIG. 1). The intelligence as to SORT PARITY is entered through NAND 17U8A. A 1 is entered on input 13 of this NAND through NAND's 17U7A and 17U7B. A 1 is entered on input 1 of this NAND 17U8A through NOR 17U1B and NAND 17U7D. A 1 is entered on input 1 of this NAND 17U8A through NAND 17U5A. Through NAND 17U8C and NOR 17U9A a 0 is entered on 2D of flip-flop 17U11B and on 2Q of flip-flop 17U11B when the pellet is dropped and pulse $\overline{PLDRP}$ clocks the flip-flop. Indicator 1313 is disabled. Through NOR 17U9B, a 1 is entered on 1D of flip-flop 17U11A, and, when the $\overline{PLDRP}$ pulse is produced, on 1Q of this flip-flop. There is a 1 on output terminal 12, SRT PAR, and a 0 on output 3 of NAND driver 17U14. Indicator 1311 is enabled.

For a pellet which is non-acceptable and which is not to be held, 0's are entered on inputs 8 and 9 of NOR 17U1C. A 1 is entered on input 1D of flip-flop 17U4A and 0's on inputs 2D of flip-flops 17U3B and 17U4B. On the entry of the power strobe, a 1 is entered on conductor RSSEL. A 1 is entered on inputs 6 and 7 of NAND driver 17U15. A 0 is entered on output 5 and REJECT SORT SELEC indicator is enabled. Through NOR 17U1B there is a 1 on input 12 of Schmidt NAND 17U7D. Through Schmidt NAND 17U7C, there is a 1 on input 5 of NAND 17U6B. Through NOR 17U1A, NAND's 17U2A and 17U2B and flip-flop 17U3B, there is a 0 on conductor ASGSEL. Relay 10CR is unactuated and indicator 1309 disabled. Through Schmidt NAND 17U5A, there is a 1 on input 4 of 17U6B. Through NOR 17U1D, NAND's 17U2D and 17U2C and flip-flop 17U4B, there is 0 on conductor HSGSEL and relay 11CR remains unactuated and indicator 1317 disabled. Through Schmidt NAND 17U7A there is a 1 on input 3 of 17U6B. As for ACCEPT SORT and HOLD SORT, a 1 is entered on output terminal 12, SRT PAR, when flip-flop 17U11A is clocked by $\overline{PLDRP}$ and indicator 1311 is enabled.

The $\overline{PLDRP}$ pulse also clocks flip-flop 17U12. A 1 is impressed on inputs 1 and 2 of NAND driver 17U15. A 0 is entered on output 3 and the PELLET RELEASED indicator 1321 is enabled. A 1 is also impressed on output terminal J, PEL REL, pellet release.

Flip-flops 17U11A, 17U11B, 17U12 remain as set until the start of the succeeding MEASEN interval. At this point CTL CLR pulse p1 (FIG. 4b) is impressed through input 20. Through Schmidt trigger inverter 17U10B, the $\overline{CLR\ DLY}$, clear delay, pulse 104 (FIG. 4h) is impressed on 1CLR of 17U11A and 17U12 and on 2CLR of 17U11B, clearing these flip-flops.

It is of interest to consider the operation which takes place on the entry of erroneous signals. Assume that 1's are entered both for ACCEPT SORT on input terminal 9 and for HOLD SORT on input terminal 10. In this case, a 0 is entered on input 2 of NAND 17U2A through NOR 17U1A and a 0 is also entered on input 12 of NAND 17U2D through NOR 17U1D. There are 0's on inputs 2D of 17U3B and 2D of 17U4B. A 0 is also entered on input 1D of flip-flop 17U4A. On the entry of the power strobe, 0's are entered on 2Q of 17U3B and 17U4B and on 1Q of 17U4A and on conductors ASGSEL, RSSEL, HSGSEL. Relays 10CR and 11CR are not actuated and the associated indicators are not enabled. These are 0's on inputs 13 of 17U6A and 17U8A and on input 5 of 17U6B disabling these gates.

There is a 0 on input 1D of flip-flop 17U11A and a 1 on input 2D of 17U11B. On the entry of the $\overline{PLDRP}$ pulse, a 0 is entered on output terminal 12 SRT PAR and on output 3 of NAND driver 17U14 disabling indicator 1311. A 1 is entered on 2Q of 17U11B and on inputs 6 and 7 of driver 17U14. A 0 is entered on output 5; indicator 1313, SORT ERROR, is enabled.

It is emphasized that in the practice of this invention changes can be made in the control logic shown in FIG. 40. For example, the $\overline{2Q}$ and $\overline{1Q}$ outputs of the flip-flops can be used. In this case a 0 would be entered for a defective property and 1's for the other properties. NAND's 17U6A, 17U6B, 17U8A could be replaced by NOR's. In this case, 0's on each of the inputs instead of 1's would correspond to proper operation.

The control logic schematic shown in FIG. 41 can conveniently be discussed with reference to FIG. 3 and in connection with FIG. 38. If the control is set in manual, there is a 1 on input terminal B, MAN, and on input 1 of NOR 18U6. There is a 0 on 2A4 of buffer 18U3 and when computer 105 enters a 0 on input terminal 18 $\overline{DSELS}$ from output terminal 14 of decoder 11U3 (FIG. 36), the $\overline{DSELS}$ signal causes the signal at 2A4 to be entered on 2Y4. A 0 is entered into the computer through DWSO and input terminal 2 of the multiplexer board, FIG. 37A. This indicates that the apparatus is not in a state for normal automatic operation. The same occurs if there is a 1 on input terminal W, PNL SWT, panel switch. There are switches on the panel for turning "on" or "off" the various components of the mechanical system 10 or the control, such as the lasers, the motors, and the like. If any one of these switches is not "on", there is a 1 on input terminal W and the apparatus is held not conditioned for operation by computer 105. When the control is set for automatic, NOR 18U6 enters a 1 on 2A4 and in this case entry of a 0 on $\overline{DSELS}$ produces a 1 on 2Y4 indicating to computer 105 that the comprehensive control and the mechanical handling system 101 (FIG. 1) are set for normal automatic operation.

During normal operation, the processing of the intelligence on, and data from, the pellets are controlled by buffers 18U3 and 18U4. It is desirable that the manner in which these buffers receive their intelligence during normal operation be described. The status of the pellet in the escapement 125 (FIG. 1) or in any of the stations 127, 129, 131 is derived from output terminals 1 through 6 and 15 of the control logic schematic shown in FIG. 38. Output terminals 2, 3, 4, 5, 6 and 15 (FIG. 38) are connected respectively to input terminals M, C, D, E, F and S (FIG. 41). The intelligence as to presence in, or absence of, a pellet from one of the stations 127, 129, 131, which is received in input terminals D, E, F, is stored in register 16U8 of the logic shown in FIG. 38. This data is derived during MEASEN. The intelligence PEL AT ESC and NOR FD, which are entered in input terminals C and S, is also stored in register 16U8. The intelligence ESCMT is stored in register 16U14 (FIG. 38). The intelligence PEL AT ESC and ESCMT is derived from photocells PC1 and PC2. The intelligence NOR FD is derived from the feed-bowl paddle switch (not shown). All of this data is strobed by entry of the DHLD pulse p101 (FIG. 4c) into output terminals 1 through 6 and 15 (FIG. 38) and through them and input terminals C, D, E, F, H, M into the A inputs of the buffers 18U3 and 18U4 at the end of MEASEN p100. The DHLD pulse p101 clocks registers 16U8 and 16U14. During each cycle the presence or absence of a pellet in stations 127, 129, 131 is fully determined before this intelligence is clocked in. The intelligence of the presence or absence of a pellet in the weight station 133 is entered directly from output terminal 17 of the weight logic, FIG. 34. The intelligence FDBLMT and COLBN are entered from the machine. EMSTP is entered from the control logic, FIG. 40.

Now assume that the first pellet is at escapement 125 at the start of the first cycle of normal operation. The transfer drive 659 (FIG. 1) is in full operation and a MEASEN signal (FIG. 4a) is entered on input terminal V (FIG. 41) from output socket Z connected to photocell PC6. At the end of MEASEN, DHLD pulse 101 (FIG. 4c) is entered. If the pellet is properly positioned, a 1 is entered on input terminal C from output terminal 3 of the logic schematic shown in FIG. 38. This 1 is entered on input 2A3 of buffer 18U3. There is also a 0 on input terminal M, ESCMT, and on input 2A3 of buffer 18U4. If there are pellets in the feed bowl 163 (FIG. 1) there is a 0 on terminal R, FDBLMT and on input 1A4 of buffer 18U4. If the feed is operating normally, there is a 1 on input terminal S, NOR FD, and on input 1A3 of 18U4. In the absence of emergency stop, there is a 1 on input terminal T, $\overline{\text{EMSTP}}$ and on 1A2 of 18U4. With the collector bins 149, 151 and 153 properly positioned, there is a 1 on input terminal U and on input 1A1 of 18U4. The grippers 515 through 523 are in normal operation. Since there are no pellets in the diameter, flaw, length and weight stations 127 through 133, there are 0's on input terminals D, E, F and H but computer 105 is programmed to take this into consideration.

DRDY pulse 103 (FIG. 4d) is generated by the trailing edges 1065 of DHLD. The DRDY pulse is entered in computer 105 through the multiplexer board, FIG. 37. It tells the computer that the data is ready to be read. The computer sets output terminal 19, FLW/$\overline{\text{DAT}}$ SEL (FIG. 36) and enters the FLW OR DATA STB of the output terminal W (FIG. 36) on input terminal 18. The intelligence is read. The READ DATA pulse, FIG. 4e, symbolizes this reading. Actually the computer impresses codes on decoder 11U3 (FIG. 36) to enable FLAW/$\overline{\text{DAT}}$ SEL, then in sequence $\overline{\text{DSELS}}$, $\overline{\text{DSELD}}$, $\overline{\text{DSELL}}$, DSELW. At this point with a pellet only in the escapement 125, only $\overline{\text{DSELS}}$ is effective. A 0 is entered on input terminal 18. Buffers 18U3 and 18U4 are enabled by 0's on 1EN and 2EN. The intelligence on the A inputs of these buffers is entered into the Y outputs. Through the input terminals 2 through 27, DW0 through DW15, at the multiplexer board, FIG. 37, this intelligence is entered into the A inputs of the multiplexer 1019, FIG. 37. This enables the data on the FLW/$\overline{\text{DAT}}$ SEL inputs of multiplexer 1019 to be clocked into computer 105 when the FLW OR DAT STB is entered on 1CK of flip-flop 12U5 (FIG. 37). This computer makes a determination based on the intelligence strobed into the memory from 18U3 and 18U4. It also sets the FLW/$\overline{\text{DAT}}$ SEL for FLW at output terminal 19 of the interface (FIG. 36) and enters the FLW OR DAT STB on output terminal 18. Flip-flop 12U5 (FIG. 37) sets buffer 1019 to read flaw data if any is entered. If the status of the apparatus is proper, computer 105 enters a command to enable the grippers 515 through 523 to pick up and transfer the first pellet to the diameter station 127 (FIG. 1). The second pellet enters the escapement 125.

With the deposit of the first pellet in diameter on RELEASE DWELL (FIG. 3), a second cycle is started. At the start of MEASEN of this second cycle CTL CLR p1 (FIG. 4b) is entered. CTL CLR clocks register 18U5. This pulse also generates $\overline{\text{CLR}}$ $\overline{\text{DLY}}$ (FIG. 4h). This has no effect on flip-flops 17U11A, 17U11B and 17U12 (FIG. 40) since they have not as yet been in operation. However, p1 $\overline{\text{CTL}}$ $\overline{\text{CLR}}$ initiates the diameter measurement of the first pellet during DMEASEN (FIG. 9). $\overline{\text{CTL}}$ $\overline{\text{CLR}}$ also clears the counters 1136 and 1138 and the registers 1151 and 1155 of the length measurement logic (FIG. 23) but at this point this has no effect. $\overline{\text{CTL}}$ $\overline{\text{CLR}}$ also clears registers 1085 and 1093 (FIG. 12). At the end of MEASEN, DHLD (FIG. 4c) is generated. The intelligence as to the position of the two pellets now both in the escapement 125 and the diameter station 127, the condition of the feed bowl, the feed, etc. is entered in the appropriate A inputs of buffers 18U3 and 18U4. Next DRDY (FIG. 4d) of the second cycle, is entered into the memory of computer 105. Output 19, FLW/$\overline{\text{DAT}}$ SEL, of the interface, FIG. 36, is set for $\overline{\text{DAT}}$. After DRDY (FIG. 4d), during READ DATA (FIG. 4e), $\overline{\text{DSELS}}$ is again entered on input 18 and the intelligence received by the A inputs of 18U3 and 18U4 are clocked into the computer. Next the 0 pulse $\overline{\text{DSELD}}$ from output terminal 15 of the interface (FIG. 36) is entered on input 18 of the diameter comparison logic schematic, FIG. 12. The diameter data or word for the first pellet is entered from output terminals B through U of the diameter comparison logic, FIG. 12, in the A inputs of buffer 1019 (FIG. 37) through the input terminals 1 through 17. This data includes the maximum diameter measurement as corrected by the DCF on the entry of DCFDNLD STB from output terminal F of the interface FIG. 36, and the number of times that the diameter scan elements counted exceeds the minimum diameter limit. The multiplexer board FIG. 37 is set for $\overline{\text{DAT}}$ and the diameter data is processed into the memory of computer 105.

The computer makes a decision on the data which it now contains and after that resets output terminal 19, FIG. 36, to FLW. If the conditions are proper, the grippers pick up the first and second pellets during PICK UP DWELL, FIG. 3, and deposit the first pellet in the flaw station 129 and the second pellet in the diameter station 127. A third pellet now enters the escapement 125 (FIG. 1) and the third cycle is started.

At the start of MEASEN of this cycle, CTL CLR pulse p1, $\overline{\text{CLR}}$ $\overline{\text{DLY}}$ and $\overline{\text{CTL}}$ $\overline{\text{CLR}}$ are entered and they perform their above-described functions. During MEASEN the flaw data is entered into the memory of the computer 105 from the output terminals B through U of F1F0 buffer 1027, FIG. 29, through input terminals B through U of the multiplexer board, FIG. 37, and the multiplexer 1019. At the end of MEASEN, DHLD is entered in input terminal 19 of control logic, FIG. 38. The intelligence, including PEL IN FLW STA, is entered in the A inputs of buffer 18U3 and 18U4. On the entry of DRDY, output terminal 19 of the interface, FIG. 36, is set for $\overline{\text{DAT}}$ and the FLW OR DATA STB is entered setting multiplexer 1019 (FIG. 37) for data. $\overline{\text{DSELS}}$ (FIG. 36) is now enabled. The intelligence in buffers 18U3 and 18U4 is entered into the memory of computer 105. Next $\overline{\text{DSELD}}$ is enabled and the diameter data is entered into the memory through buffer 1019 (FIG. 37). Computer 105 now has the intelligence as to the status and the data for diameter and flaw. It arrives at a decision and then resets output terminal 19 (FIG. 36) for FLW and enters the FLW OR DAT STB setting buffer 1019 for transmission of flaw data to the computer memory.

Figure 41B:
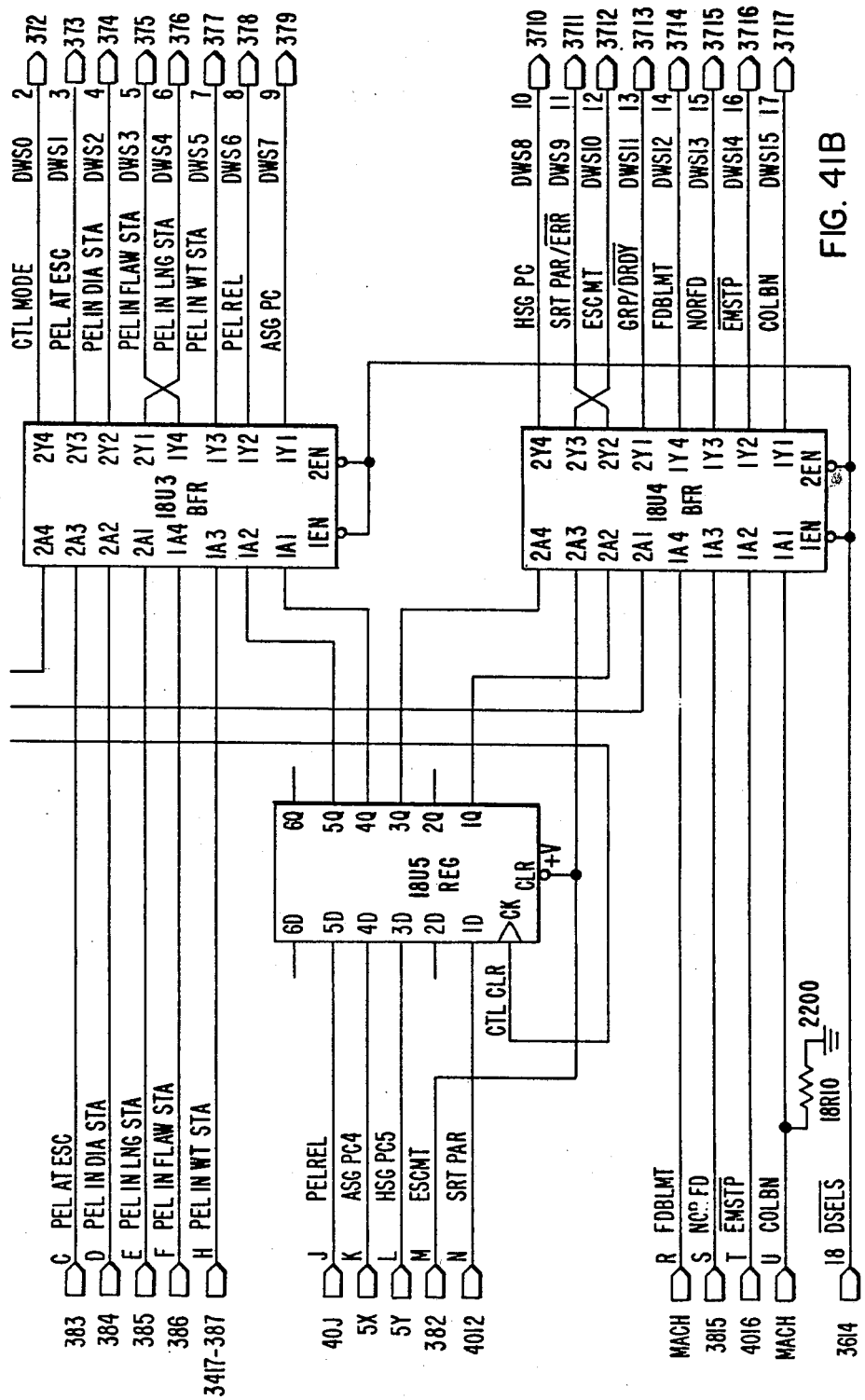

If the operation is proper, the grippers advance the first pellet to the length station 131, the second pellet to the flaw station 129 and the third pellet to the diameter station 127. The above process is repeated. However, in this case the entry of $\overline{\text{DSELL}}$ on latch 1171 (FIG. 23D) after $\overline{\text{DSELS}}$ and $\overline{\text{DSELD}}$ are entered, causes the length data to be entered in its turn into the memory of the computer. As to the first pellet, the decision made by computer 105 is based on the length data as well as the diameter and flaw data The interface output terminal 19 and buffer 1019 are reset for flaw. If the operation is proper, the pellets are advanced. The first pellet is in the weight station 133. It is assumed that the first pellet is one of the pellets which is weighed for an interval of 2 seconds. Computer 105 is programmed to command this operation. The grippers are set to idle during 6 cycles. However, the inspection of the second, third and fourth pellets respectively in the length station 131, the flaw station 129, and the diameter station 127 takes place during each cycle. The measurements during the sixth cycle (the tenth cycle of operation here) are adapted for evaluation. Following the entry of the data for the last cycle into the memory of computer 105, a decision is made as to the disposition of the pellet. This decision, if it requires a change from REJECT SORT in the sorter, is entered in input terminals O'D7 and O'D8 of the interface, FIG. 36, and through the input terminals 9 or 10 of the control logic (FIG. 40). If the decision is to reject, 0's remain on O'D7 and O'D8. As shown in FIG. 40 if there is an accept or hold command, the accept or hold solenoid (FIGS. 30, 31, 32 of Wilks application) is actuated. A sort solenoid, once energized, remains energized until there is a command to change the sorting bin. If the accept solenoid is actuated, a 1 is entered on input terminal K and input 4D of register 18U5 from photocell PC4 (FIG. 4). If the hold solenoid is actuated, a 1 is entered on input terminal L and on input 3D from photocell PC5. The grippers pick up the pellets and advance each one station. The first pellet is dropped into the sorting station 137 (FIG. 1). If the sorting is correct, a 1 is entered on output terminal 12 of the control logic, FIG. 40C and on input terminal 12 SRT PAR and input 1D of 18U5 (FIG. 41B). Photocells PC3 (FIG. 5) also enter a 1 on output terminal J of control logic, FIG. 40C, and through input terminal J, PELREL, on input 5D of 18U5. At the beginning of MEASEN of the next cycle (the 11th) CTL CLR clocks whatever intelligence there is on 1D, 3D, 4D, 5D of register 18U5 into the Q outputs and in 2A2 and 2A4 of 18U4 and 1A1 and 1A2 of 18U3. This intelligence is entered in the memory of computer 105 when $\overline{\text{DSELS}}$ is entered and is verified by the computer. The operation now continues in line with the above description. Unless the first pellet was found unacceptable for weight, the next 5 pellets are weighed during only 1 cycle and no weight measurement is entered in the computer. No decision is made as to weight except for the presence or absence of the pellet in the weight station 133.

It is instructive to describe the role which the supervisory computer 107 (FIG. 1) and the dedicated computer 105 play in the operation of the apparatus. The flow of the pellets is controlled by a PELLET program.

The PELLET program interacts with the mechanical system 101 (FIG. 1) and the control system 103 in several ways. First, it interacts with the operator by reading his commands and printing back prompts or messages. Second, it interacts with the electronic control system 103 by reading measurement data and timing signals and by sending control signals to the control system 103. Finally, it receives information from, and sends information to, the supervisory computer 107.

The interaction with the operator is through a teletype 1015 which is connected directly to dedicated computer 105 or through a CRT (not shown) which is connected to the supervisory computer 107 and only through it communicates with the computer 105. The control language is identical whether the point of control is at the dedicated or the supervisory computer. The commands have three letter mnemonics and some of them require additional arguments.

Typical commands enable the operator to operate selectively sections of the mechanical system 101 (grippers, sorting gates, etc.), start and stop processing pellets, start calibration procedures, display and change processing parameters, display statistics information, etc.

Figure 44:
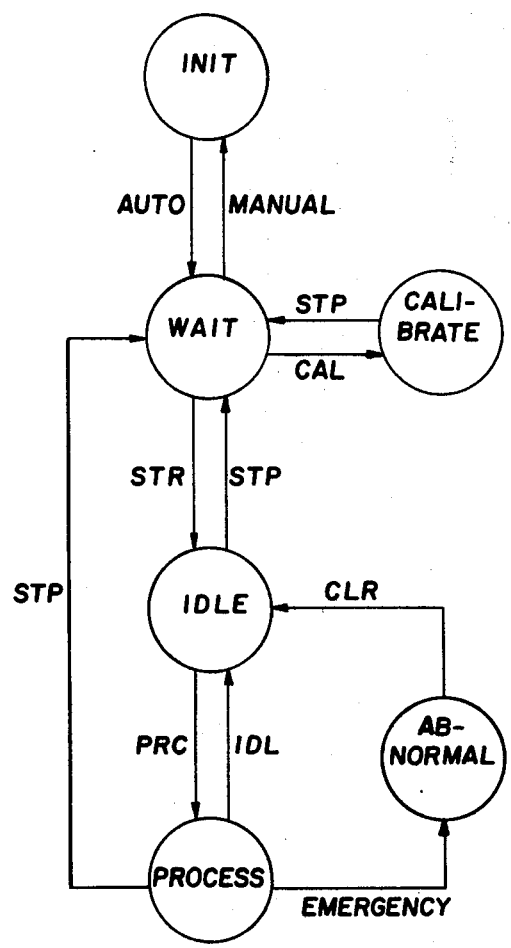
FIG. 44 presents a diagram showing the internal states of the apparatus according to this invention, the relationship between the states and the mnemonics which are entered to produce the states or to cause transitions between the states.

The main program resides on a disc or discs in the supervisory computer. Before operation can start, the program has to be down line loaded into the dedicated computer 105 and the supervisory program has to be started. The program is written in FORTRAN and uses multi-tasking to perform several tasks in parallel. In particular, the system processes pellets and keyboard commands simultaneously. Not all the combinations of commands are legal (can be carried out) in the system. For instance, when the system is processing pellets it cannot respond to calibration requests. The user need not remember which commands are allowable. If an illegal command is typed, the system prints an error message and ignores the command. To keep track of the permissible command string, the computer system uses special variables to designate its internal state. FIG. 44 shows the state diagram and the various commands which cause transitions among the states. In each state, only a subset of the possible commands is permissible and some commands may cause a transition to a new state. There are six possible states, identified by mnemomies entered in the computer, as follows: INIT, WAIT, IDLE, PROCESSING, CALIBRATING, and ABNORMAL.

INIT is an intermediate state in which the system waits for the AUTO/MANUAL switch to be set into AUTO. WAIT is a starting state in which individual parts in the system (grippers 517 to 523, FIG. 1, transfer drive 145, etc.) can be exercised. IDLE is an idling state either before processing starts, during processing or after ABNORMAL state. In IDLE, the transfer drive is active but the grippers are open. In the PROCESSING state, the system processes pellets at a normal rate, takes measurements, sorts and sends data to the computers. In the CALIBRATING state, the system processes a fixed number of known pellets and updates the calibration data. The ABNORMAL state is a special state which can only be reached by some external hardware events. In particular, if a pellet is missing during processing, the system goes to the abnormal state, and a special command is required to get it out of this state.

The commands which are entered on the teletype 1015 of the computer 105 and their functional meanings are as follows:

IDL—Makes a transition from the PROCESSING state into the IDLE state. The transfer drive stays on but the grippers are open.

CAL—Start calibration procedure. Can be given without arguments, or with one of the following: DIA, LNG, WGT, FLW, DCF. The argument follows the first 3 letters, CAL. If given without arguments, calibration is made for diameter, length and weight simultaneously. If one argument is given, then calibration is made for diameter, length, weight, surface flaw or diameter correction factors. For diameter length and weight, a group of 30 pellets typically are divided into two size groups—small pellets and large ones (in diameter or length). For each group, the mean and standard deviation are calculated and the results are displayed. The average measurements are entered into the parameter field for calibration purposes.

STR—Makes a transition from the WAIT state to the IDLE state, gets ready for processing and initializes statistics.

STP—Makes a transition from the CALIBRATING, IDLE, or PROCESSING STATE into the WAIT state, and turns all power down.

XCG—Exchanges the point of control. Upon start up the point of control is the local teletype. XCG relinquishes control to the supervisory computer CRT. Control can be transferred back only by executing the XCG command at the supervisory CRT.

DSP—Displays the current parameter file. Typically this file contains calibration data, minimum and maximum acceptance limits and other parameters like the number of idle cycles for weighing, etc. DSP can be given without arguments, in which case the whole parameter file will be displayed. Or, it can be followed by one of DIA, LNG, WGT, FLW, DCF or DNS. In this case, only items relevant to diameter, length, weight, surface flaw, diameter correction factors or density will be displayed.

CHG—Enables the operator to make changes in the parameter file. The syntax is the same as for the DSP command, except that when no argument is given, the program requests it specifically. For each item to be changed, its current value is displayed and the operator types in the new value. If no change is wanted, then a carriage return should be typed in. After all the changes have been made, the new parameter file is displayed in the same format as for the DSP command.

HLP—The HLP command prints on the console some helpful information for the user who is not familiar with the system. The various commands with their corresponding states are typical such information.

INT—Initializes the whole system as if it has been started for the first time.

PTL—Loads the parameter file from paper tape.

PTP—Punches the parameter file onto a paper tape.

PRC—Process. If given in the IDL state, transfers the system to the PROCESSING state. Starts the grippers operation and resume data acquisition, updating statistics and sending data to the supervisory computer.

INF—Print current statistics: number of pellets processed, number of accepted, rejected and oversized pellets, and the number of active gripper cycles.

DGN—Initiates diagnostic procedures to determine why there has been a malfunction.

CLR—Clears all the pellets from the stations and goes to the IDLE state. Usually this command is given to exit from the ABNORMAL state.

FDR—Accepts the arguments ON or OFF. Used to turn the feeder bowl on or off.

XDR—Similar to FDR, except that it is used to turn the transfer drive on or off.

CTL—Similar to FDR and XDR; used for the control power.

GRP—Similar to FDR, XDR and CTL but used to control the grippers. Uses the arguments ACT (active) and OPN (open) instead of ON or off.

Typically the PELLET program resides on discs in the supervisory computer 107. To start this program the following steps are taken.

1. Turn the dedicated computer 105 on.
2. Set the switches on the front panel to 100037 octal. (switch 0,11,12,13,14,15 up) (switches not shown)
3. At the supervisory computer console type SNDPLT.

The program to be sent through the serial link at typically 4800 band. The transfer typically takes 2-3 minutes, after which the program starts executing with the point of control at the dedicated computer 105. The program first asks the user if he wishes the parameter file to be typed out. After (optionally) typing the parameter file and initializing, the program prints out the prompt sign and waits for user commands.

The program is written mostly in FORTRAN and uses the multi-tasking facility in the Real Time Operating System (RTOS). Several tasks operate concurrently and share the CPU in such a way that when one task is waiting for external event (typically an interface operation), another task is executing.

Figure 45:
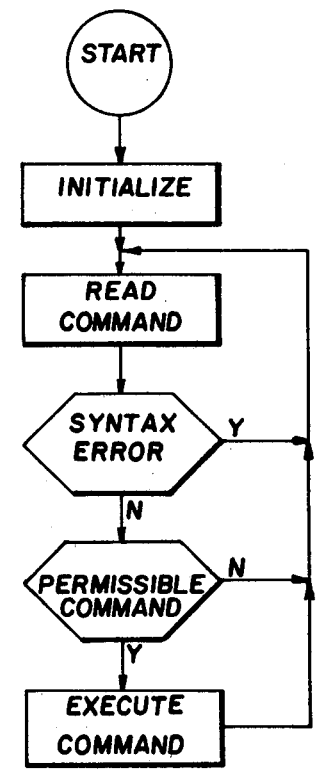
FIG. 45 is the flow chart for the main program, i.e., the task which communicates with the operator, in the practice of this invention.
Figure 46:
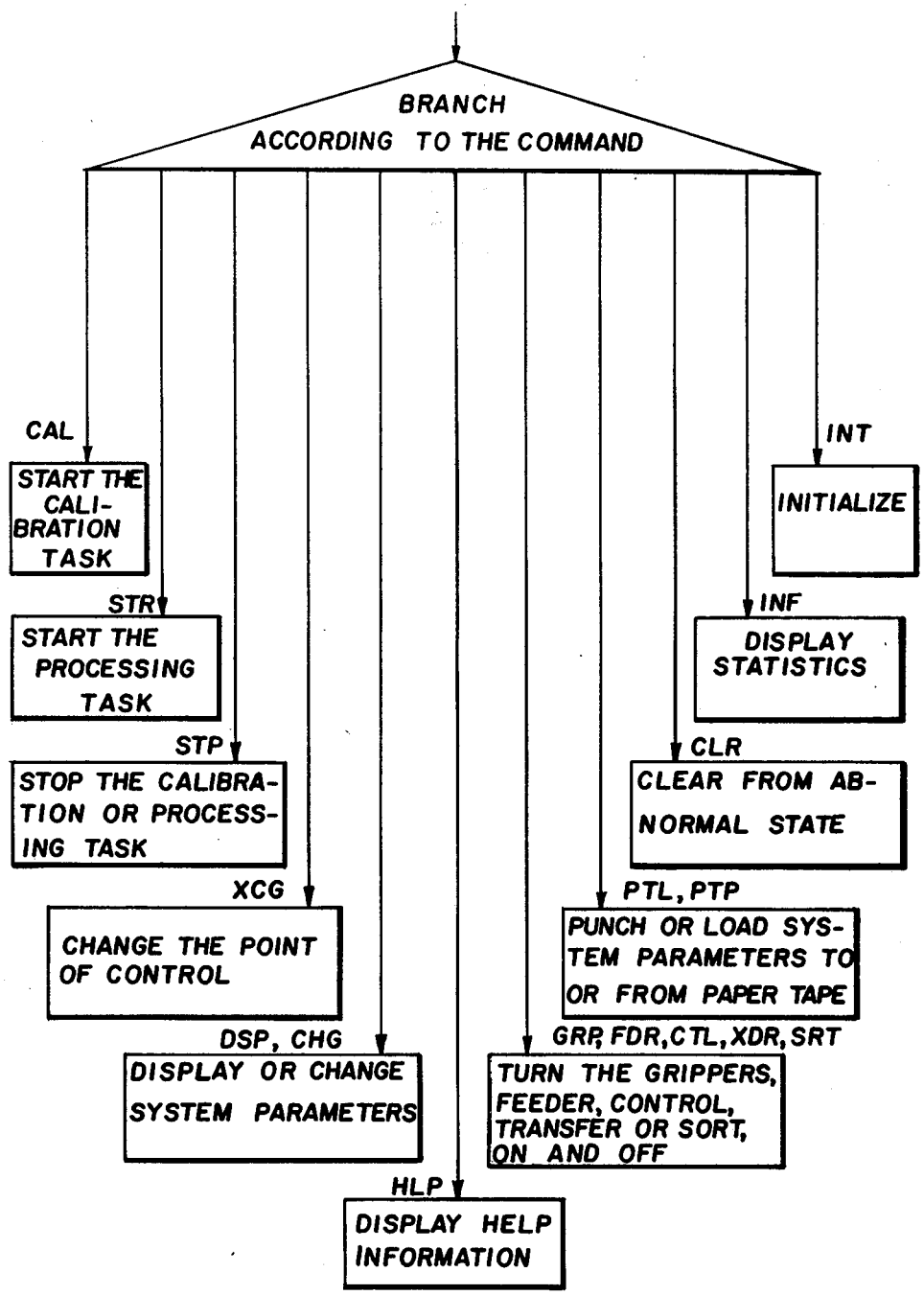
FIG. 46 is a chart showing the command execution and the mnemonics of the commands.

The main program is the task which communicates with the operator. FIG. 45 gives the flow chart for the main program. As shown in FIG. 45 the program operates as a loop in which a command line is read from the point of control, the legality of the command is checked, and depending on the command, the appropriate action is taken, at which point the whole process is repeated. The command executed is shown in FIG. 46.

Most of the commands are executed by subroutine calls; however, two commands, STR (start) and CAL (calibrate) create new tasks for processing and calibrating respectively. By having the processing done by a separate task, the program can respond to user commands while processing.

Figure 47:
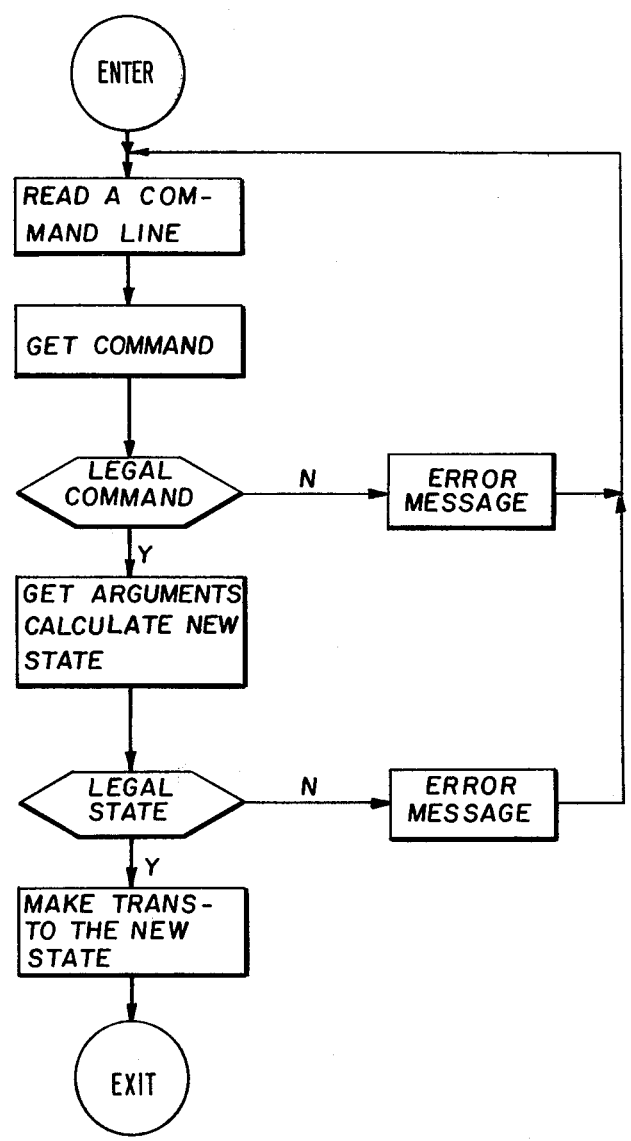
FIG. 47 is the flow chart for the HNDLR, handler, subroutine in which the legality of commands (the possibility of carrying out commands) is checked.

The check for the legality of a command is done in the subroutine HNDLR, FIG. 47. The subroutine prints the prompt sign (##), reads in a command line and compares the first three characters with the possible command strings. If no match exists, an error message is typed and the command is ignored. If a match is found a check is made to see if the command is acceptable in the current state of the system (represented by the variable ISSTT). The array ITRAN represents the allowable transitions among the states. If the system is in state I and command J is typed in, the system will make the transition to state ITRAN (I,J). If ITRAN (I,J) is zero, then the command is illegal in this state. Changing the number of commands (NCMD) or increasing the number of states, requires changing the dimensions of ITRAN. HNDLR puts the index of the command and its arguments in the array JRES before returning it to the main program.

Figure 48:
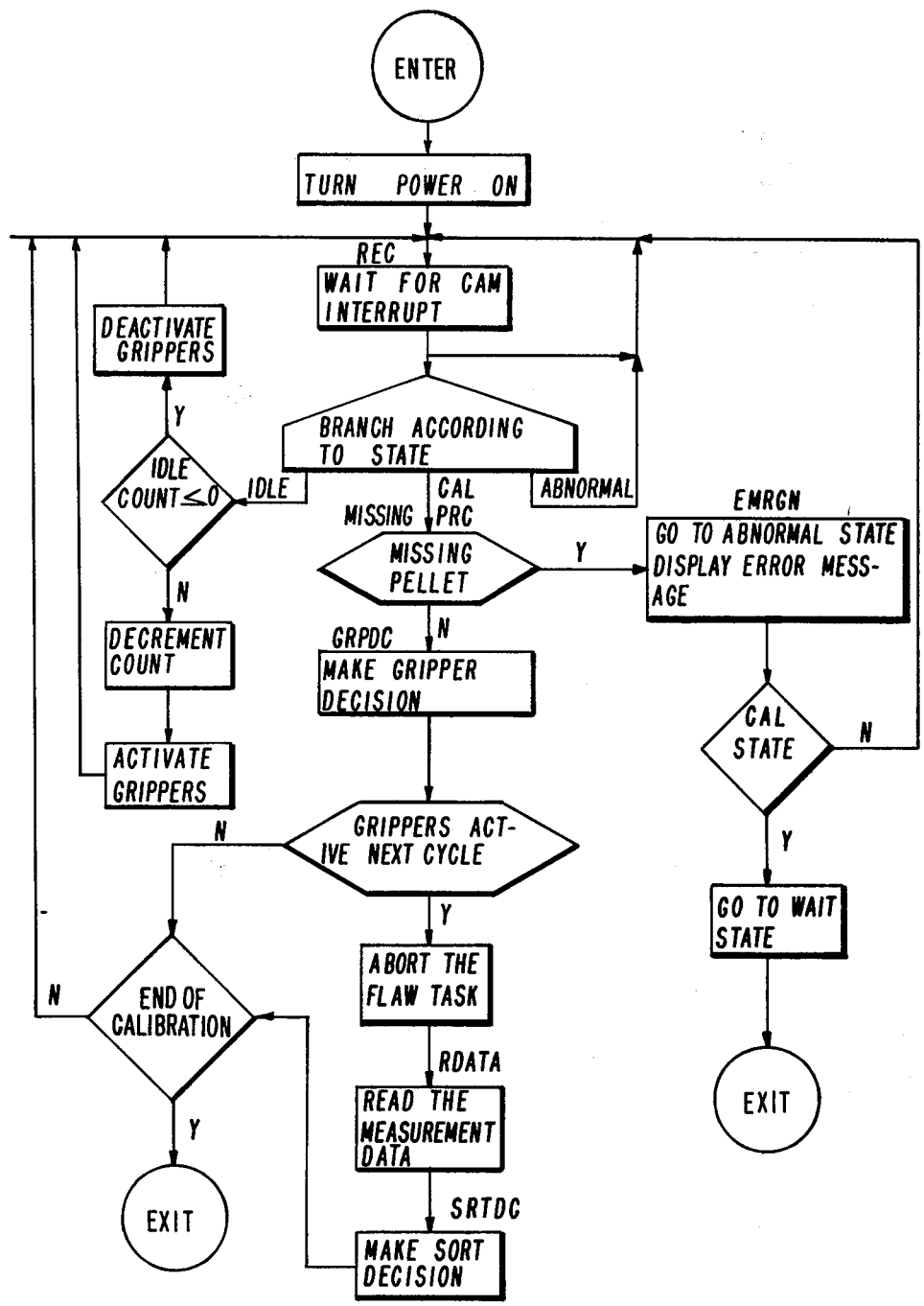
FIG. 48 is the flow chart for the subroutine STRCL, start control.
Figure 49:
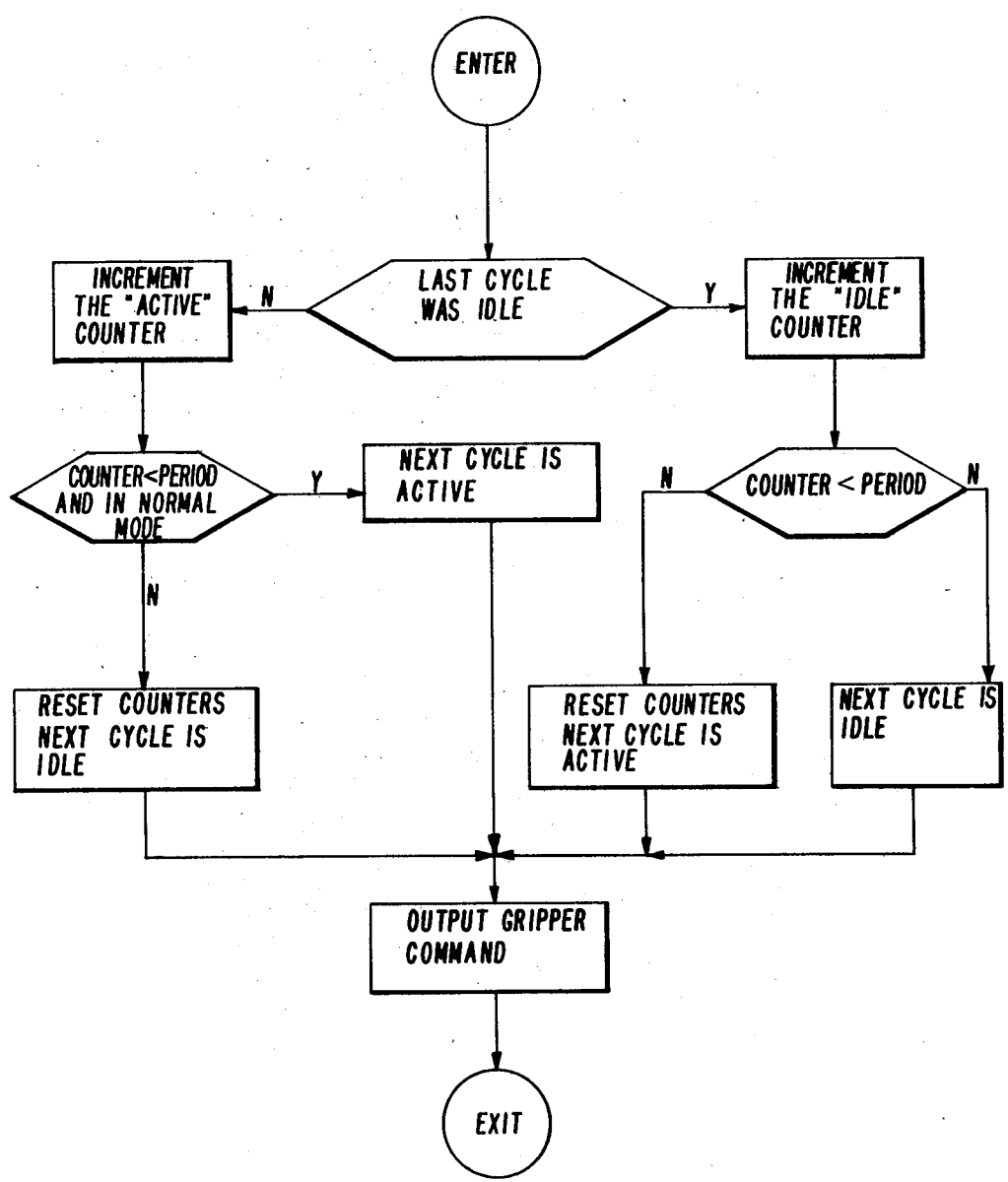
FIG. 49 is the flow chart for the subroutine GRPDC, gripper decision command.

Processing starts by issuing the STR command from the WAIT state. The STRCL task is activated and the statistics are reset. STRCL is used both by the STR and CAL tasks. The flow chart for STRCL is shown in FIG. 48.

STRCL starts by turning the power on for feeder 121 (FIG. 1) transfer drive 145 and control power and it also enables the interrupt (CALL TURN). STRCL then starts executing a loop in which it waits for an interrupt from the mechanical system 101, checks if a pellet is missing, outputs gripper commands, reads the measurement data, except for flaws, outputs sort commands and starts a new measurement cycle in the above order. Flaw data is read during MEASEN, the first 150 ms into the cycle.

FIG. 3 shows the timing diagram. The mechanical data, except for flaw data, is read after 150 ms into each cycle. The gripper command, to remain open or closed, is given no later than 180 ms into the cycle. About 10 ms must be allowed for response of the solenoid (77 FIG. 19 Wilks application) which controls the closing or opening of the grippers 515–523 (FIG. 1). The sort output command is given no later than 323 ms into the cycle to allow 10 ms for response of the sorting gate solenoids (Wilks application FIGS. 30-32).

The subroutine MISSING checks if a pellet is missing from one of the stations. If the grippers were open on the previous cycle, then the position of all the pellets should remain unchanged. If the grippers were active on the previous cycle, then all the pellets should be shifted by one station. If these conditions are not met, the system goes into the ABNORMAL state, processing is halted and an error message is displayed.

The subroutine GRPDC calculates the gripper position (open or active) for the next cycle and outputs a gripper command. This subroutine operates to reactivate the grippers every cycle except during the intervals of several cycles, typically 2 seconds, during which the scale is given time to settle so that a reliable weight may be derived. Also, when a pellet is weighed and its weight is outside of the acceptance limits, the system goes into a 100% weight mode where each pellet is weighed up to a predetermined sample size (S) number of weighings. If more than P percent of these S pellets have unacceptable weight, processing stops and error message is displayed. In the 100% weight mode the grippers idle for each pellet during the weighing interval.

Figure 50:
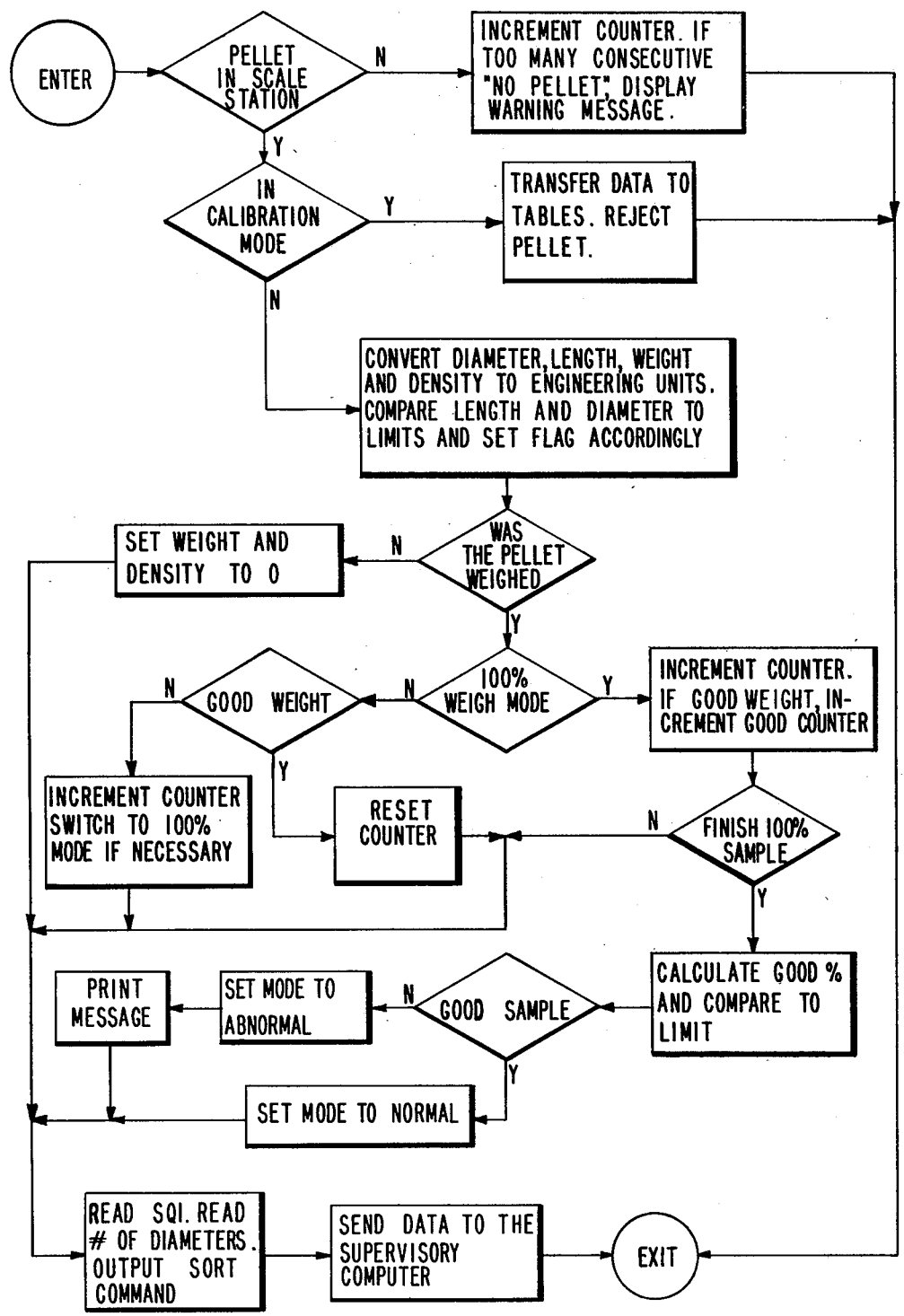
FIG. 50 is the flow chart for the subroutine SRTDC, sort decision command.
Figure 51:
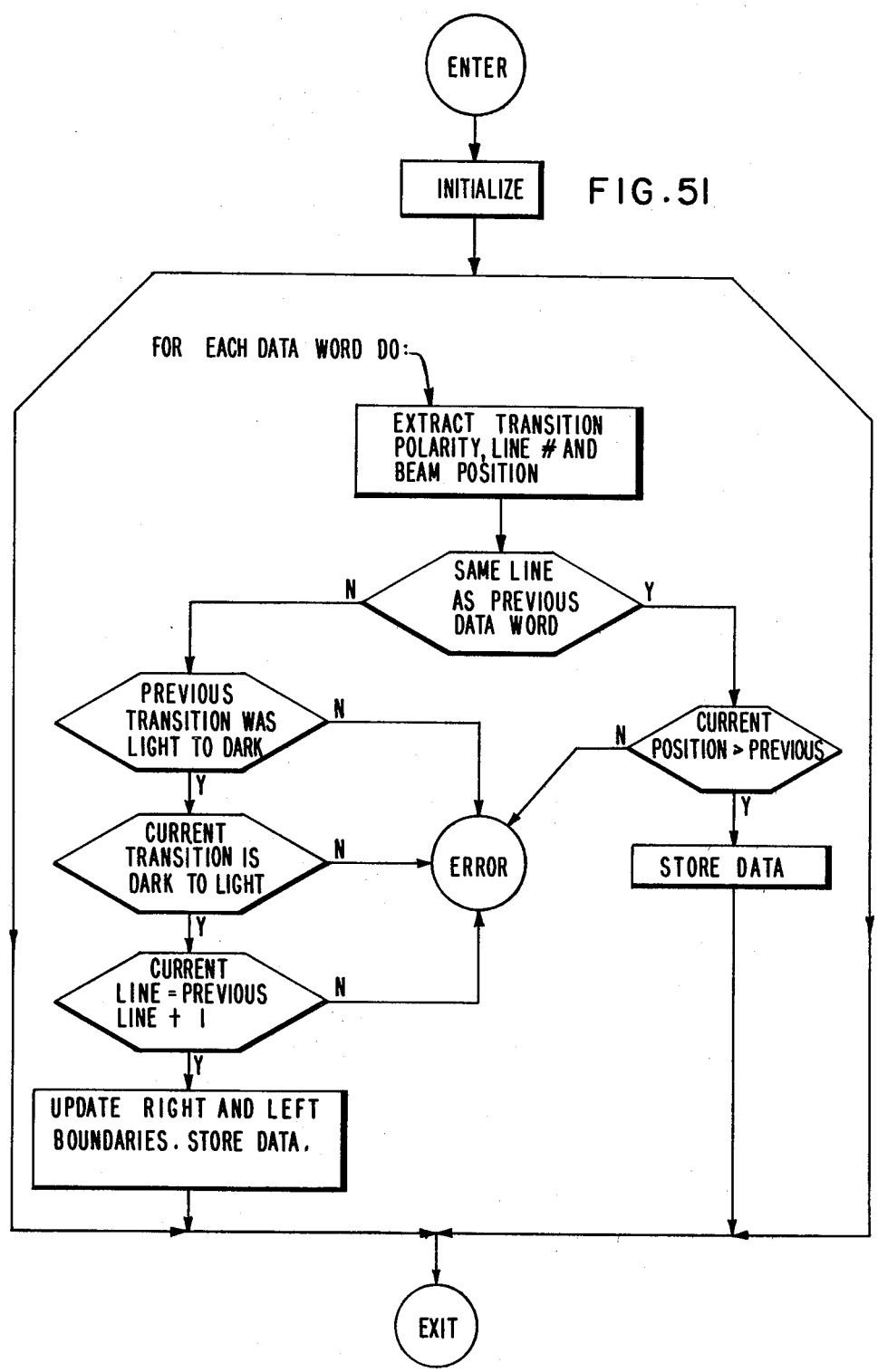
FIG. 51 is the flow chart for the subroutine PREP, preprocess.

If the grippers are to be open on the next cycle, STRCL restarts the loop by waiting for the next interrupt. If however, the grippers were activated (by GRPDC), the measurement data have to be read and a "sort" decision has to be made. The raw measurement data from all the stations except the flaw station 129 are read in by the subroutine RDATA. Flaw daa ae read in real time using DMA 106 (FIG. 1). Flaw data is read in parallel and asynchronously with the other activities of the computer. The analysis of the flaw data is time consuming, and its execution time depends entirely on the input (i.e., on the surface quality of the pellet and the number of flaws in it). The flaw data analysis is performed by an independent background task which is aborted just before the measurement data is read in. After the flaw task is aborted, STRCL calls the subroutine RDATA to read the measurement raw data. Next, STRCL calls the SRTDC subroutine (FIG. 50) to make the sort decision (accept, reject or diameter oversize). SRTDC performs the following: first check if there is a pellet in the last (weight) station. If not, then increment the "no pellet" counter. When a predetermined number of active gripper cycles go without pellets coming in, a warning message is displayed. Next, SRTDC converts the raw data to engineering units and checks if they are within the acceptable limits. It takes into account the fact that not every pellet is weighed, that there are two weight modes (at intervals of 100%), and actually SRTDC switches between the two modes if necessary. Finally, SRTDC outputs the appropriate "sort" command and sends to the supervisory computer 107 a record containing the information for that pellet.

Calibration involves the processing of a fixed number of specially machined mock pellets, processing the data, and storing the results in the calibration tables in the computer memory to be used during normal processing. Calibration is initiated by issuing the CAL command from the WAIT state. The CAL command accepts five possible arguments: DIA (diameter), LNG (length), WGT (weight), FLW (flaw), or DCF (diameter correction factors). In addition the CAL command can come without arguments, in which case it is assumed that calibration will be performed for the diameter, length and weight simultaneously.

The calibration task is to a large extent identical to the normal processing task, but there are differences between them. The first difference is at initialization. The processing task (STR) resets the statistics information and the calibration task (CAL) does not. STR and CAL use different parameters for the number of idle cycles for weight. During processing there are the folowing differences: CAL processes a fixed number of pellets, after which it starts processing the calibration data. All the calibration pellets are weighed and all of them are sorted into the REJECT bin. The calibration procedure is different for the DCF (Diameter Correction Factor) calibration. Here, special (long) pellets are used to take measurement and store the results in eight memory arrays (128 words×8 bit each) which correspond to the eight faces of the prism in the diameter station (FIG. 14). These correction factors, when subtracted from normal measurements, compensate for differences among the faces and for other non-linearities in the optical system. Calibrating the DCF is done simply by outputting a control word to enable the DCF measurement, waiting a predetermined period (say one second), and disabling DCF by another control word.

After the measurement data other than DCF has been collected, the data is processed by the CLSRT subroutine. The calibration data is stored in the array ICALB by the subroutine TRSFR which is called from CAL for each pellet. CLSRT first calls the subroutine CLAVG to calculate the average of the measurement data. The calibration pellets are divided into two groups (small and large pellets) depending on whether they are bigger or smaller than the average. If the number of large pellets is not equal to the number of small pellets, a warning message is displayed but calibration continues. For each of the groups, CLSRT calculates the average and the standard deviation. The average is stored in the calibration tables and is used for conversion of the raw data into engineering units. The standard deviation is compared to a preset permissible value. If the standard deviation is too high, a warning message is displayed for the operator. Calibration can be done separately for the diameter, flaw, length and weight stations, or it can be done simultaneously for diameter, length and weight. In the latter case the pellets are divided into groups by diameter. When calibrating for flaw, the average of all the pellets and their standard deviation are calculated and printed (i.e., the pellets are not divided into groups).

Flaw inspection differs from diameter, length and weight inspection. Whereas the information of the latter properties is encoded in one 16-bit word per pellet per property, the information for flaw is larger, and in fact is unlimited in its size. The second difference between the flaw and other properties is the complexity involved in processing the flaw data. For diameter, length and weight, the raw data is converted into engineering units by linear interpolation between the two extreme calibration points. Then the data are compared to the acceptable limits. The flaw calculations require the interpretation of the raw data which represents the defects in the pellet surface. The program calculates the area and perimeter for each flaw and based on this calculation, determines the surface quality index (SQI) for the pellet.

Since the amount of flaw data and length of calculation are variable, the data collection and processing is done asynchronously with the rest of the system operation. The data collection is done using a direct memory access 106 which "steals" cycles from the computer whenever a new data word is deposited into the memory. The hardware for DMA is on the general purpose interface board (FIG. 43). It includes an address register and word count register and the electronics for synchronizing with the computer. The initialization of the DMA involves loading the start address into the address register and loading the negative word count into the word count address. Every transfer causes the address and word count to be incremented by one. When the word count reaches zero, the DMA is disabled and no more transfers are possible. The computer can find how many words were transferred by reading the final address and subtracting from it the initial address.

Processing is done by a separate task (FLTSK) which has a lower priority. This task is started for each pellet when the pellet is placed in the flaw station 129. FLTSK uses two buffers for the data. When one buffer is being filled, the other buffer, which contains data for the previous pellet, is being processed. On the next cycle, the buffers are switched. The one that was processed is being refilled, and the full buffer is processed. FLTSK is started by the subroutine STRCL. It is terminated either if the calculation is complete, or if a new calculation has to be started before the calculation for the previous pellet has been completed. In the latter case STRCL terminates FLSTK and the pellet is assumed to have a bad surface. FLTSK first initialized the DMA 106 and then starts the processing. The processing is done by two subroutines: PREP (FIG. 51) preprocesses the raw data into a more suitable format and FLAW does the actual processing. The flaw program is presented in the following Table VIII.

TABLE VIII

Initialize;
for each line do
begin reset flaw pointers;
LOOP: if no more flaws on current line
    then increment line;
  if no more flaws on previous line
    then begin start all the remaining flaws on the
      current line;
      increment line;
    end
  compare a flaw on the current line with a
  flaw on the previous line;
  if no match
    then begin update flaw pointers;
    start flaw if necessary;
    end
  else begin update the area and perimeter
    of the flaw;
    update flaw pointers;
    end
  go to LOOP;
end The pellet is rotating and its surface is scanned horizontally by a laser beam. Each transition from smooth surface (light) to flaw (dark), or from dark to light, that the beam encounters, causes one data word to be input to the computer. This word includes the scan line number (0-127), the location within the line at which the transition occurred (0-127), and the polarity of the transition (dark to light or light to dark).

Figure 52:
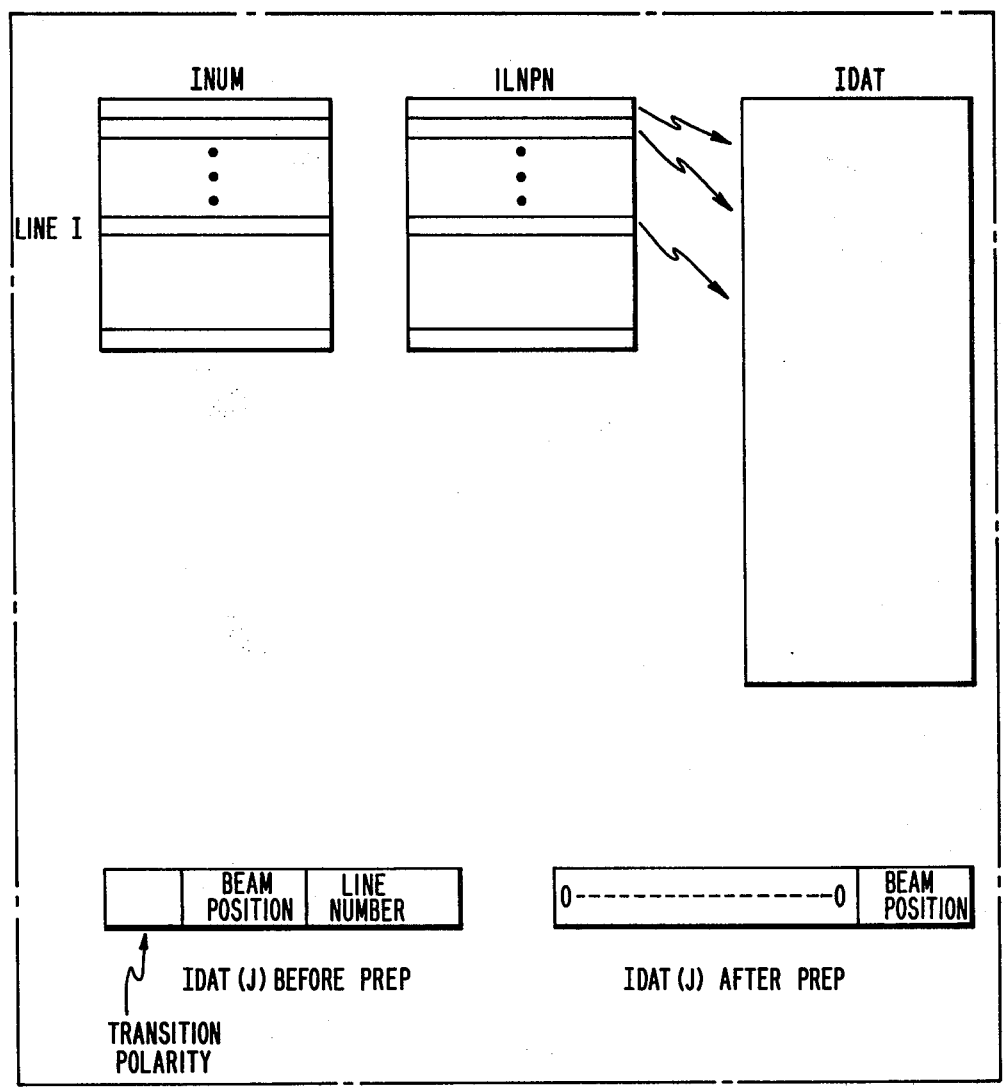
FIG. 52 is a diagrammatic view showing the flaw data structure and the manner in which it is simplified from raw data.

The subroutine PREP checks the consistency of the data to detect transmission errors, and preprocesses the data into temporary arrays which are used by FLAW. PREP first calculates the number of data words for the pellet. Then, PREP initializes its variables and starts building the temporary arrays INUM and ILNPN and simplifies the IDAT array as shown in FIG. 52. INUM is an array containing one element per horizontal line (the maximum number of horizontal lines is MXLIN). INUM(J) is the number of pairs of transitions for line J (the number of transitions for each line must be even). INUM(J) is initialized to zero, but must be at least two; one transition when the beam encounters the pellet and one transition when the beam leaves it. ILNPN is also an array with one element per horizontal line. ILNPN(J) is a pointer into IDAT which points to the first transition in the J'th line. IDAT is simplified such that it contains only the location within the line where the transition occurred. PREP checks that each line starts with a dark to light transition and ends with light to dark transition. PREP makes sure that within a line the locations of the transitions are monotonically increasing, that the line numbers also increase monotonically, and that every two consecutive transitions on a line have the opposite polarity. If any of these conditions are not met, an error flag (IER) is set to zero; otherwise it is set to one. In addition, PREP calculates the leftmost and rightmost transitions which represent the pellet ends (for chipped end calculation by FLAW), and returns them in LOCMN and LOCMX respectively.

The subroutine FLAW receives from PREP the simplified IDAT array, the two temporary arrays INUM and ILNPN (FIG. 52) and the variable IRLMX, designating the actual number of scan line (as opposed to MXLIN which is the maximum possible number of lines). All the variables and arrays are passed through named COMMON blocks. FLAW calculates the areas and perimeters of all the flaws. It returns NHOLE, the number of flaws and the arrays IAREA and IPERIM which contain the areas and perimeters of the flaws. The main features of the flaw program are described below.

Figure 53:
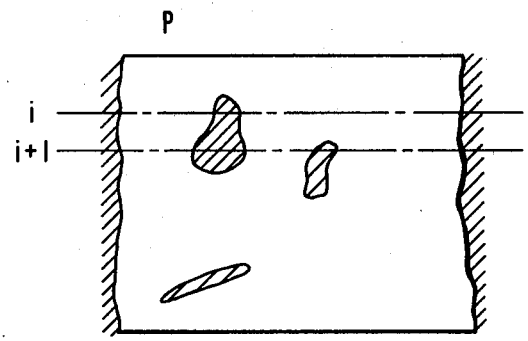
FIG. 53 is a fragmental diagrammatic view showing an enlarged portion of the surface of a pellet and flaws.
Figure 54:
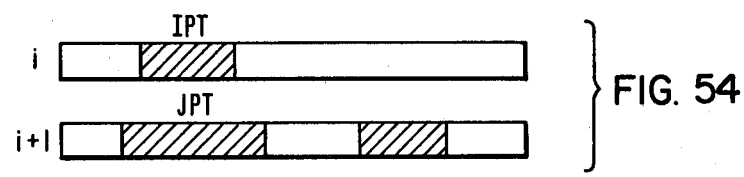
FIG. 54 is a diagrammatic view showing the manner in which the flaws shown in FIG. 53 should appear on two consecutive scanning lines, i and i+1.
Figure 55:
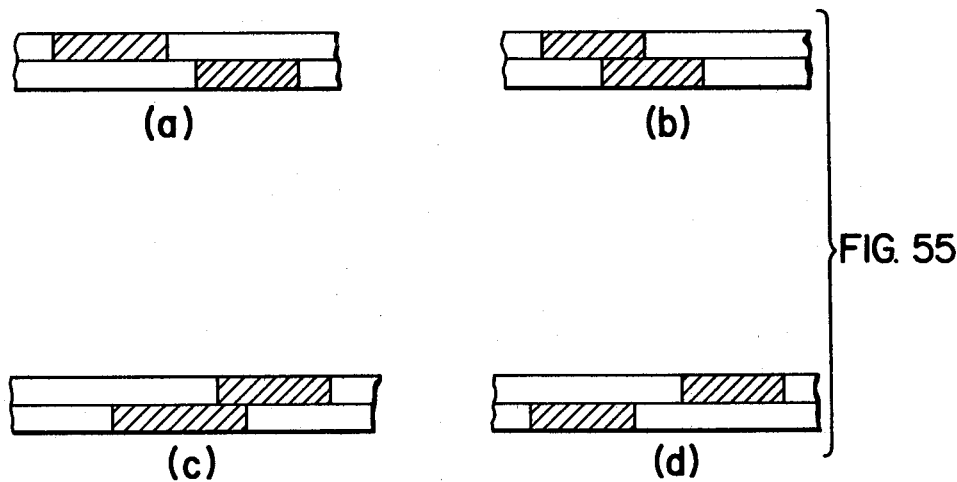
FIGS. 55a, b, c, d show various possible cases of detection of flaws which need be distinguished.

After initialization (number of flaws NHOLE=0, etc.), the FLAW subroutine operates in a big loop in which a horizontal line is compared to the previous horizontal line. For the purpose of this explanation a typical pellet surface is shown in FIG. 53. FIG. 54 shows two consecutive lines (i and i+1). In the i'th iteration through the loop, FLAW compares the flaws in line i with the flaws in line i+1. For this purpose it maintains two pointers; one points to the current flaw in line i and one points to the current flaw in line i+1 (IPT and JPT respectively). FIGS. 55a, b, c and d show the possible cases that have to be distinguished. Cases a and d show mismatch between the flaws on line i and line i+1. In case a, IPT is incremented, and in case d, JPT is incremented to the next flaw in the appropriate line. Cases b and c show match between the flaws. The flaws have to be combined, after which IPT or JPT are incremented depending if case b or c exists. Several special cases have to be taken into consideration. On the first pass through the loop, line 1 is compared with line zero which does not exist and has to be set to be a dummy line. On the last pass through the loop, the last line has to be compared with line 1 (wraparound phenomenon). At the beginning of each loop, IPT and JPT have to be initialized. Also, when no more flaws exist on line i+1, the remaining flaws on line i have to be processed, and when no more flaws on line i exist, the remaining flaws on line i+1 have to be processed.

The main processing is done when a match between tow flaws occur. When a new flaw is found a subroutine (STRHL) generates a new entry in the area and perimeter tables (IAREA and IPERIM) and increments the number of flaws (NHOLE). The area of a new flaw is the number of grid points that it occupies and its perimeter is twice this number plus two. When a match between two flaws occur, the area of the combined flaw is the sum of the two areas. The perimeter of the combined flaw is the sum of the perimeter minus a term which depends on the relative end points of the two flaws. The perimeter calculations are done in the function INPER. In order to increase the resolution, all the perimeter data are multiplied by 64 (i.e., shifted left six positions). INPER uses a table to find the diagonal distance between two points on consecutive lines. The diagonal constants are stored in the table IDAG(6). It is assumed that the diagonal distance is equal to the horizontal distance for distances larger than six.

The DMA 106 (FIG. 1) on the general purpose interface board (FIG. 43) includes two registers (not shown): the address counter and the word counter. The computer has to load the starting address into the address counter and a negative word count into the word counter. In addition, the computer has to enable the DMA by setting the enable flip-flop. After every transfer, both the word and address counters are incremented by one. When the word count reaches zero, the enable flip-flop is reset and no further transfers can take place. In order to output the word count, the instruction DOC has to be executed with the appropriate negative word count in the register. DOB will output the starting address to the address counter. The setting of the enable flip-flop is done by the OUTPT subroutine as described below. All the initialization of the DMA can be done in a single subroutine call OUTAD. The current value of the DMA address counter can be read at any time this can be done using the DIB instruction. Alternatively, the subroutine CHCKDN can be used to read the final address. The word counter cannot be read directly. However, the number of DMA words can be deduced by subtracting the final address from the starting address. The format for the flaw word is as follows:

Bit 0—transition sense. Dark to light =1. Light to dark =0.

Bits 1-8—beam position count. The horizontal displacement from the end of pellet where the transition occurred.

Bits 9-15—scan count. The line number (vertical displacement) where the transition occurred.

Except from the DMA initilization instructions (DOB and DOC), all the other outputs are performed in the same way. The general purpose interface board contains an output register (FIG. 36). This register can be loaded by using the DOA command (FIG. 36). Of the 15 bits in the output register, the three least significant bits (13-15) are used for input address as described below. Bits 10-12 are used as clocks. Each bit combination is decoded, and in conjunction with the interface pulse latches the data in bits 0-9 into flip-flops or registers in the electronics boards. In summary then, outputting to the electronics involves outputting of bits 0-12 using the DOA instruction followed by outputting a pulse using the NIOP instruction. All this can be done by calling the subroutine OUTPT. Following is a description of the various clocks (bits 10-12, diodes 1142, FIG. 36B) and their associated data (bits 0-9, 13-15). Clock O (bits 10-12=000) not used.

Clock 1 (001). This clock is used to clock the $\overline{\text{MEAS}}$/DCF flip-flop (D2U5B FIG. 10c, see also FIG. 36B).

The data for this flip flop is contained in bits 13-15. If bits 13-15 are 110 then this flip-flop is set; otherwise, it is reset. When the flip-flop is set, the DCF memory is loaded from the calibration pellet. If the flip-flop is reset, normal measurement is taken.

Clock 2 (010). This clock is used to strobe the DCF address from bits 0-9 into the address register of the DCF memory (1081, FIG. 11). This action has to be taken before any DCF data can be read or written from or to the DCF memory (see clock 7).

Clock 3 (011). This clock is used to load the minimum diameter limit (bits 0-9) into the diameter minimum limit register (1091 FIG. 12). This logic counts the number of diameter measurements which are above this limit. The computer reads this number.

Clock 4 (100). This is the power strobe which is used for controlling the mechanical system. Bits 0-9 in conjunction with clock 4 have the meaning shown in Table III above. The various controls can be set using the PWR subroutine.

Clock 5 (101). This clock sets the DMA ENB flip flop. When this happens, DMA data can be input to the computer. The DMA ENB flip flop can be reset by using the clear instruction (NIOC 56).

Clock 6 (110). This clock is used in conjunction with bit 15 to set or reset the FLW/DAT flip flop (12 U5, FIG. 37). When set, DMA data are enabled on the bus. Otherwise, station data are enabled.

Clock 7 (111). This clock DCF DNLD STB is used to strobe DCF data (bits 0-9) from the computer memory into the DCF memory (1081 FIG. 11) (i.e., to down line load DCF data). Before this is done, the address of the DCF memory has to be strobed (see clock 2). DCF DNLD STB is entered as a 1 on input terminal F of the logic of FIG. 10 where the DCF data is ready to be strobed into memory 1081. Up to this point there is a 0 on input terminal F.

All the inputs except from the DMA are treated in a uniform way. There are seven input sources to the computer. In order to select one of them, the computer has to output a word (DOA) to the output register, in which the three least significant bits (13-15, decoder 1103, FIG. 36) are decoded, and enables the corresponding input source onto the data line of the input register. Then two input instructions (DIA) have to be executed. The first one loads the data into the input register, and the second one loads the input register into one of the accumulators (buffers) of the computer. The subroutine INPUT can be used for inputting a single word from one input port. The meaning of the status bits is shown in Table VII.

The interface board has the standard Data General Busy/Done network. When the data from the stations are ready for the computer, (DRDY FIG. 4d) the electronics sets the DONE flip flop, signaling to the computer that the data is ready. This in turn generates an interrupt. The interrupt servicing routine is then called to read the data. In diagnostics mode, the computer can wait in an idle loop, check if the DONE flip flop is set or not. In normal operation the subroutine FINTD is used to identify to the system the new interrupt device. When the program task wishes the read data, it issues a call to the REC subroutine which causes its suspension. When the interrupt service routine (SERVI) is called, it issues an "interrupt transmit" task call (.IXMT) which "awakens" the suspended task.

While preferred embodiments of this invention have been disclosed in this application, many modifications thereof are feasible. This invention is not to be restricted except insofar as is necessitated by the spirit of the prior art.

We claim:

1. Apparatus for measuring the diameter of a fuel pellet for a nuclear reactor, including a diameter station in which said pellet is positioned for measurement, means for projecting a beam of light on said pellet, a rotatable prism interposed in said beam for causing said beam to scan elemental areas of said pellet, said prism having a plurality of faces, means connected to said prism to rotate said prism so as to scan said elemental areas of said pellet, the deflection of said beam by each said face in its turn interposed in the path of said beam, as said prism is rotated, causing said beam to scan elemental area lengthwise across said pellet, means responsive to the rotation of said prism for producing a pulse corresponding to each face of said prism as said prism is interposed in the path of said beam, the said pulse-producing means also including means for producing an additional pulse for identifying a starting face of said prism interposed in the path of said beam whereby faces interposed in the path of said beam in succession after said starting face may be identified with reference to said starting face, and means cooperative with the pulses produced by said pulse-producing means for assigning a unique scan-word address to each elemental area of said pellet scanned by rotation of successive faces of said prism.

2. The method of measuring the diameter of a fuel pellet for a nuclear reactor with apparatus including a diameter station on which a pellet is disposed for measurement and means for projecting a light beam on said pellet, the said method including disposing a calibration pellet on said station, scanning said calibration pellet with said beam, each position of the scan having a unique address corresponding to an elemental area of a pellet in said station, at each elemental area of said calibration pellet through which said scan passes determining the diameter of said calibration pellet, deriving the algebraic difference between the measurement of each elemental area and a selected reference measurement at one of the element areas as a diameter-correction factor for each address of said scan, disposing a fuel pellet whose diameter is to be measured on said station, scanning said fuel pellet with said light beam, at each elemental area of said fuel pellet through which said scan passes measuring the diameter of said fuel pellet, and algebraically adding the diameter correction factor for the address corresponding to each elemental area to the diameter measurement of the fuel pellet for the same elemental area to arrive at a corrected diameter.

3. The method of claim 2 wherein the corrected diameter is determined digitally as a corrected diameter count and the corrected diameter count is converted into length measurement units by reference to a linear calibration curve whose determining points are derived from the statistical correct diameter count for a plurality of calibration pellets of the smallest acceptable diameter and the statistical corrected diameter count for a plurality of calibration pellets of the largest acceptable diameter.

4. The method of claim 2 wherein the selected reference measurement for the calibration pellet is the smallest diameter measurement.

5. The method of inspecting fuel pellets for a nuclear reactor with apparatus including means for producing a light beam for inspection and a computer having a memory, the said method including disposing said pellet on a station where it is subject to inspection, rotating said pellet on said station, scanning said pellet with said light beam along scan lines as it is rotated, entering in said memory the total number of scan lines, scanning said pellet when it is rotated through one revolution, transmitting data to said computer as said pellet is being scanned, transmitting a count of the number of scan lines being scanned, and stopping the acquisition of data by said computer when the number of scan lines scanned equals the total number of scan lines scanned for one revolution entered into said memory.

6. The method of inspecting fuel pellets for a nuclear reactor with respect to a plurality of different properties with apparatus including a computer and a buffer, the said method comprising disposing a number of pellets equal to said plurality each in a station where it is subject to inspection, each of said stations being adapted to subject the pellet disposed thereon to inspection with respect to a different one of said properties, inspecting each of said pellets with respect to the property of the station on which it is disposed, deriving data for each pellet of the property of the station on which it is disposed, the data for the pellet at at-least one of said stations being derived at a substantially higher rate than for the pellets at the other of said stations, storing the data derived from said pellet in said at-least one station in said buffer, transferring the data for said pellet at said at-least one station from said buffer to said computer for processing, and thereafter entering the data from said pellets at said other station into said computer directly for processing.

7. The method of claim 5 wherein the plurality of pellets are inspected simultaneously and data is derived therefrom during a measurement-enable interval and wherein the data derived from the pellet at the at-least one station is transferred to the buffer and from the buffer to the computer for processing during the said measurement-enable interval and the data derived from the pellets at the other stations is entered into the computer for processing after the said interval.

8. The method of claim 6 wherein a plurality of pellets are inspected in each station in succession and wherein the computer has at least a first buffer and a second buffer, the said method comprising entering the data for a first of the pellets processed in the at-least one station in said first buffer, processing the said data in said computer, and while the data for the first of the pellets is being processed, entering into the second buffer the data for a second of the pellets processed at the at-least one station.

9. Apparatus for inspecting pellets for a nuclear reactor including a station in which a pellet is disposed for inspection, means for projecting a light beam on a pellet in said station, a scanning prism having a plurality of faces interposed in the path of said light beam, means connected to said prism for rotating said prism said beam to scan said pellet, each said face as it rotates in the path of said beam in its turn actuating said prism to scan said pellet along the length thereof, a first counter responsive to the resulting beam emitted by said pellet for counting the scan elements of the scan produced by each face of said prism, first means connected to said prism for producing a counting pulse corresponding to each face of said prism in synchronism with the rotation thereof, second means connected to said prism for producing a count starting pulse between a pair of said counting pulses, a second counter connected to said first and second means for counting said counting pulses, and means responsive to said count starting pulse and cooperative with said first counter for starting the count of said counting pulse on the pulse following said count starting pulse.

10. The apparatus of claim 9 including means for clearing the count of the second counter, means responsive to a count of the first counter for a scan element intermediate the first and last scan elements for preventing the clearing of said second counter in the absence of a count starting pulse, and means responsive to said count starting pulse for disabling said preventing means and permitting the clearing of said second counter.

11. Apparatus for measuring a dimension of a nuclear fuel pellet including a photo-diode array having a plurality of successive diodes adapted to be exposed to an optical image, a station on which said pellet is disposed for measurement, means, connected to said pellet in said station, for rotating said pellet, abouts its longitudinal axis, means for projecting on said rotating pellet in said station a beam of light in the form of a ribbon or sheet extending transversely to said pellet in said dimension, means for projecting on all said exposed photo-diodes of said array the optical image resulting from the exposure of said pellet to said beam of light, said image including the shadow of said pellet and the light of said beam extending beyond said pellet, said shadow having a length along said array which is a measure of said dimension, means, connected to said array, for scanning said array, and counting means, connected to said scanning means, for producing a count of the number of diodes in said array over which said light extends.

12. The apparatus of claim 11 for determining the diameter of the pellet wherein the projecting means includes means for projecting the beam of light generally transverse to the length dimension of said pellet, and also includes means for sweeping said beam along the length of said pellet so that said beam scans said pellet, and wherein the diode array scanning means includes means for scanning said diode array in a plurality of successive positions along the length of said pellet as the light beam scans said pellet.

13. The apparatus of claim 12 wherein the counting means includes means for producing a count of the number of photo-diodes over which the light extends at each scan position of the light beam, the said apparatus also including means responsive to the counting means for determining the maximum diameter of the pellet and the number of scan positions for which the diameter of the pellet exceeds a predetermined minimum diameter.

14. The apparatus of claim 11 for determining the length of a pellet wherein the beam extends along the length of the pellet generally parallel to its longitudinal axis, scanning said pellet circumferentially as it rotates, the photo-diode array scanning means includes means for scanning said photo-diode array in each of a plurality of scan positions of said beam as said pellet rotates.

15. The apparatus of claim 14 wherein the counting means produces a count for determining the number of photo-diodes over which the light from the pellet extends in each of the scan positions of the beam, the said apparatus including means, responsive to the counts of the counting means for determining the length of the pellet.

16. A control for classifying fuel pellets for a nuclear reactor, said control having a first operative setting and a second operative setting and a non-operative setting, said control including a switch including a blade and a plurality of separate fixed contacts, said blade being movable between engagement with one of said fixed contacts and another of said fixed contacts, means responsive to the engagement of said blade with said one of said fixed contacts, for setting said control in said first operative setting, means responsive to the engagement of said blade with said other of said fixed contacts for setting said control in said second operative setting, and means responsive to the disengagement of said switch from said one and said other fixed contacts during the hiatus during which said blade is moved from said one of said contacts to said other of said contacts for resetting said control to said inoperative setting.

17. The control of claim 16 wherein the apparatus includes a computer having a memory capable of being programmed and wherein the engagement of the blade with the one of the fixed contacts sets said conrol to be operated automatically by the computer under command of the program entered in the memory and wherein the engagement of said blade with the other of said fixed contacts sets said control to be operated manually.

18. The control of claim 16, including NOR logic means having first and second inputs and one output, one of said inputs being connected to the one of the fixed contacts to have a 1 entered thereon when the blade is in engagement with the one contact and the other of said inputs being connected to the other of said fixed contacts to have a 1 entered thereon when said blade is in engagement with said other of said fixed contacts, said inputs having 0's entered thereon when said blade is disengaged from said fixed contacts.

19. Apparatus for classifying fuel pellets for a nuclear reactor including an upstream station in which each of said pellets is disposed for transfer to downstream stations, said upstream station and said downstream station being disposed each fuel pellet in succession, first photosensitive means disposed to detect the presence of a pellet at one position of said upstream station, second photosensitive means disposed downstream of said first photosensitive means to detect the presence of said pellet at a second position of said upstream station, first logic means responsive to the detection of said pellet by either said first or second photosensitive means, for signalling the presence or absence of said pellet in said upstream stations, and second logic means responsive only to the detection of a pellet by both said photosensitive means, for signalling if the pellet is appropriately positioned in said upstream station for transfer to the succeeding station.

20. The apparatus of claim 19 wherein the presence and/or appropriate position of a pellet is detected by interruption of current through the first and second photosensitive means, and wherein the first logic means is NAND means and the second logic means is NOR means.

21. Apparatus for classifying fuel pellets for a nuclear reactor into a plurality of categories in dependence upon a plurality of different mutually exclusive properties of said pellets, the said apparatus including means for inspecting each of said pellets to determine which of said plurality of properties said pellet has, means responsive to said inspecting means to produce a signal identifying the property determined for said pellet, means responsive both to a said signal identifying that said pellet has one of said properties and to a said signal identifying that said pellet does not have other of said properties for classifying said pellet as having said one property, and means responsive to both said signals, when they identify that said pellet has said one property and at least one of said other properties to indicate an error in identification.

22. The apparatus of claim 2 including a plurality of flip-flops each corresponding to one of the properties of the pellets, means responsive to the identifying signals for entering a number, 1 or 0, on the output of the flip-flop corresponding to a property identified for a pellet and a conjugate number, 0 or 1, on the outputs of said other flip-flops and means responsive to identification that a pellet has at least two of said properties for entering conjugate numbers on the output of all said flip-flops.

23. The apparatus of claim 22 including a logic gate corresponding to each of said properties, each gate having an input corresponding to each of said properties, means responsive to a signal identifying a pellet as having only one of said properties for impressing on each of the inputs of the gate corresponding to said property a number which when impressed only on all inputs opens said corresponding gate, means responsive to signals identifying a pellet as having more than one of said properties, for impressing signals on the inputs of all said gates preventing the opening of said gate, means responsive to any gate which is open, for indicating that a pellet has the property corresponding to said gate, and means responsive to said gate when they are all closed for indicating an error in property determination and/or signalling.

24. The method of inspecting fuel pellets for a nuclear reactor for a first property and a second property with apparatus including a mechanical handling system for said pellets and a computer having a memory accessible both through the components of said computer and through a direct-memory access, a substantially higher quantity of data being derived for inspection for said first property than for inspection for said second property, said mechanical handling system including a first station for inspecting a pellet for said first property and a second station for inspecting a pellet for said second property, the said method including actuating said mechanical handling system to deposit successive pellets in said first and second stations during successive cycles of operation of said apparatus, establishing a measurement-enable interval during each cycle during which said mechanical handling system is enabled to inspect first and second pellets in said first and second stations respectively, for said first and second properties respectively, and to derive first and second data respectively from said inspections, setting said apparatus to enter said first data into said memory through said direct memory access during said measurement-enable interval, thereafter setting said apparatus to enter said second data into said memory through the components of said computer after said measurement enable interval, said computer processing the first and second data during each said cycle, and during each said cycle classifying each of said first and second pellets in accordance with said processing.

25. The method of claim 24 including the step of verifying during each cycle that each, the first and second pellets, are positioned in the first and second stations respectively for inspection and that the apparatus is appropriately set for inspection.

26. Apparatus for inspecting fuel pellets for a nuclear reactor based on the length of said pellets, the said apparatus including an inspection station in which each of said pellets is desirably to be disposed for evaluation of its length, means in said station for rotating each said pellet, means for projecting on each said pellet a chisel-shaped beam of light which extends along each pellet and beyond each end of said pellet a predetermined distance, each pellet producing a shadow in said beam of light, the distance between the point at one end of said shadow, which end corresponds to the point at the corresponding end of said pellet on which the beam is incident as the pellet rotates, and the end of the light from said beam extending beyond said shadow from said one end being designated herein as L1, and the distance between the point at the opposite end of said shadow, corresponding to the point at the corresponding opposite end of said pellet on which the beam is incident as the pellet rotates, and the end of the light from said beam extending beyond said shadow at said opposite end being designated herein as L2, means responsive to a measurement of L1, resulting in a magnitude of L1, which is within a predetermined limit, to verify the presence of a pellet in said station, and responsive to an attempted measurement of L1, resulting in a magnitude which exceeds said predetermined limit, for verifying the absence undesirably of a pellet, and means for classifying each pellet present in said station in accordance with the evaluation of its length.

27. Apparatus for measuring a dimension of a fuel pellet for a nuclear reactor including a station on which said fuel pellet is subjected to measurement, a photo-diode array, means for projecting a light beam on said array over a path in which said pellet is interposed in a position such that said pellet is intersected by said beam along said dimension so that said pellet casts a shadow on said array whose length along said array is dependent on said dimension, said light-beam projecting means projecting a beam of small width so that the section of intersection of said beam and pellet is small compared to the dimension of the pellet transverse to the dimension being measured, means for causing said beam to scan said pellet at successive sections of said pellet along said transverse dimension, each said section corresponding to an elemental position of said scan, and for directing the part of the beam from substantially all elemental positions of said scan along said diode array, so that successive elemental sections of said pellet produce shadows on said diode array, each said shadow being of a length dependent on the magnitude of the dimension being measured of the associated elemental section, electronic means for scanning said diode array at each elemental position of the scan of said pellet to determine the magnitude being measured at each elemental section, and means for comparing said magnitudes to determine the maximum magnitude of the dimension being measured.

28. Apparatus for measuring a dimension of a fuel pellet for a nuclear reactor including a station on which said fuel pellet is subjected to measurement, a photo-diode array, means for projecting a light beam on said array over a path in which said pellet is interposed in a position such that it is intersected by said beam along said dimension so that said pellet casts a shadow on said array whose length along said array is dependent on said dimension, and electronic means for scanning said array to determine the length of said shadow in terms of the number of photo-diodes of said array, thereby to determine the said dimension of said pellet, said electronic scanning means including means for impressing on said array, during each scan of said array, a plurality of pulses having a frequency commensurate with the number of photo-diodes in said array and the rate at which said array is scanned, and means for counting the number of said pulses which occur during the scanning of the lighted photo-diodes of said array left unexposed by said shadow of said pellet.

29. Apparatus for measuring the diameter of a fuel pellet for a nuclear reactor including a station on which said fuel pellet is subjected to measurement, a photo-diode array, means for projecting a light beam on said array over a path in which said pellet is interposed in said light beam in a position such that it is intersected by said beam along sections transverse to the length of said pellet whereby said pellet casts a shadow on said array at each said section, the length of said shadow along said array being dependent on the diameter of said pellet at said last-named section, and means for scanning said photo-diode array to determine the length of said shadow at each said section in terms of the number of photo-diodes of said array thereby to determine the diameter of said pellet.

30. Apparatus for measuring the length of a fuel pellet for a nuclear reactor including a station on which said fuel pellet is subjected to measurement, a photo-diode array, means for projecting a light beam on said array over a path in which said pellet is interposed in said light beam in a position such that it is intersected by said beam along sections transverse to the transverse cross-sectional dimension of said pellet whereby said pellet casts a shadow on said array at each said section, the length of said shadow along said array being dependent on the length of said pellet at said last-named section, and means for scanning said photo-diode array to determine the length of said shadow at each said section in terms of the number of photo-diodes of said array thereby to determine the length of said pellet.

31. The apparatus of claim 30 characterized by light beam projecting means projecting a light beam on the pellet which extends beyond the ends of the pellet, whereby the photo-diode array, having the shadow of the pellet therein, includes lighted diodes beyond both ends of the shadow, the said apparatus being also characterized by means for measuring the magnitudes of the lighted diodes at each end of the shadow and means for determining the length of the pellet from said magnitudes.

32. Apparatus for inspecting fuel pellets for a nuclear reactor with respect to certain properties including means for producing a scanning beam of light, a beam splitter interposed in said beam splitting said beam into a first branch scanning beam and a second branch scanning beam, means interposing each of said pellets in said first branch beam so that said first branch beam scans said pellet, first photo-responsive means, responsive to the resulting light reflected by said pellet, for producing a first response when said resulting reflected light is predominantly incident on said first photo-responsive means and a second different response when said resulting reflected light is not predominantly incident on said first photo-responsive means, a grating, means interposing said grating in said second branch beam so that said second beam scans said grating, second photo-responsive means, responsive to the scanning of said grating by said second branch beam, for producing a train of pulses coordinated with the scanning by said first branch beam of said pellet, and means, connected to said pulse producing means and to said first and second response-producing means, responsive to the transitions from said first to said second response or from said second to said first response, for evaluating said pellet with respect to said properties.

33. The apparatus of claim 32 wherein the second branch scanning beam is focused on the surface of the pellet and the grating is disposed at the same optical distance from the beam splitter as the surface of the pellet so that the first branch scanning beam is focused on the grating.

34. Apparatus for inspecting fuel pellets for a nuclear reactor based on flaws in the surface of said pellets, said apparatus including at least one inspection station in which each of said pellets is desirably to be disposed for evaluation of the flaws in the surface of said each of said pellets, means cooperative with said station for evaluating each of said pellets with respect to surface flaws, including (a) means for scanning successive elemental areas of said pellets with a beam of light, (b) means, cooperative with said beam of light, producing a train of pulses, each pulse corresponding to a said elemental area, and (c) means, responsive to the resulting light reflected from each elemental as the beam scans said pellet, for producing a signal dependent on the light reflected from each said elemental area, there being a positive transition in said signal when the scanning light beam passes from beyond an end of a pellet under inspection to be incident thereon at said end and when said beam passes from an elemental area at the end of a flaw into an unflawed area, means, to be actuated by said evaluating means in its normal operation in carrying out an evaluating operation, responsive to the presence of a pellet in said station, for verifying said presence, and, responsive to the absence of pellet in said station undesirably, for indicating said absence, the said verifying and indicating means including means, responsive to a selected pulse of said train corresponding to an elemental area a substantial distance along said pellet from the end of said pellet on which said beam is incident, for verifying the presence of a pellet in said station if there has been a positive transition in said signal prior to the occurrence of said selected pulse and for indicating the absence of a pellet in said station if there has not been a positive transition in said signal prior to the occurrence of said pulse, and means for classifying each pellet present in said station in accordance with the evaluation of its surface flaws.

35. Apparatus for inspecting fuel pellets for a nuclear reactor based on the weight of said pellets, the said apparatus including at least one inspection station in which each of said pellets is desirably to be disposed for evaluation as to its weight, means, cooperative with said station, for evaluating said pellets as to their weight, the said evaluating means including weighing means for said pellets, and means, responsive to a weight signal from said weighing means, when a pellet is in said weighing means, verifying the presence of a pellet in said weighing means if said weight signal corresponds to a weight greater than a predetermined magnitude and indicating the absence of a pellet undesirably in said weighing means if said weight signal corresponds to a weight less than said predetermined magnitude, the said weighing means including a digital voltmeter for producing a numerical weight of each pellet, said voltmeter having a plurality of terminals on which binary coded decimals measuring the weight are entered, the verifying and indicating means including NOR logic means and means, connecting each of said terminals of said voltmeter on which a weight greater than a predetermined minimum limit is entered to an input of said NOR logic means, whereby on the entry of a said decimal on one or more of said terminals connected to said NOR logic means, the presence of a pellet in said weighing means is indicated, and means for classifying each pellet present in said station in accordance with the evaluation of its weight.

* * * * *